US008974694B2

(12) United States Patent
Haseba et al.

(10) Patent No.: US 8,974,694 B2
(45) Date of Patent: Mar. 10, 2015

(54) LIQUID-CRYSTAL COMPOSITION

(75) Inventors: Yasuhiro Haseba, Chiba (JP); Koki Sago, Chiba (JP); Takafumi Kuninobu, Chiba (JP); Shin-Ichi Yamamoto, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

(21) Appl. No.: 13/877,173

(22) PCT Filed: Sep. 29, 2011

(86) PCT No.: PCT/JP2011/072388

§ 371 (c)(1),
(2), (4) Date: Apr. 1, 2013

(87) PCT Pub. No.: WO2012/046626

PCT Pub. Date: Apr. 12, 2012

(65) Prior Publication Data

US 2013/0188107 A1 Jul. 25, 2013

(30) Foreign Application Priority Data

Oct. 6, 2010 (JP) ................................ 2010-226950

(51) Int. Cl.

| | |
|---|---|
| ***C09K 19/34*** | (2006.01) |
| ***C09K 19/30*** | (2006.01) |
| ***C09K 19/12*** | (2006.01) |
| ***C09K 19/02*** | (2006.01) |
| ***C09K 19/00*** | (2006.01) |
| ***C09K 19/06*** | (2006.01) |
| ***C09K 19/52*** | (2006.01) |
| ***C09K 19/20*** | (2006.01) |
| ***G02F 1/1337*** | (2006.01) |
| *C09K 19/04* | (2006.01) |

(52) U.S. Cl.
CPC ................ *C09K 19/12* (2013.01); *C09K 19/20* (2013.01); *C09K 2019/0466* (2013.01); *G02F 1/1337* (2013.01)
USPC ........... 252/299.61; 252/299.63; 252/299.66; 428/1.1; 428/1.3; 349/167; 349/182

(58) Field of Classification Search
CPC .................... C09K 19/544; C09K 2019/0448; C09K 19/2007; C09K 19/38; C09K 19/42; C09K 19/3402; C09K 19/46; C09K 19/3003; C09K 19/3001; C09K 19/3068; C09K 19/3028; C09K 19/22; C09K 19/126; C07C 2101/14; C07C 43/225; G02B 5/3083; G02B 5/2016; C08J 5/18; G02F 1/1393; G02F 1/3306; G02F 1/134309; G09G 3/3648; G09G 3/2011
USPC ............... 252/299.01, 299.6, 299.63, 299.66; 428/1.1, 1.3; 349/33, 167, 182
See application file for complete search history.

(56) References Cited

U.S. PATENT DOCUMENTS

| | | | | |
|---|---|---|---|---|
| 7,722,783 B2 * | 5/2010 | Haseba et al. | .......... | 252/299.01 |
| 8,343,595 B2 * | 1/2013 | Haseba | .......................... | 428/1.1 |
| 8,409,673 B2 | 4/2013 | Haseba et al. | | |
| 8,501,285 B2 * | 8/2013 | Haseba et al. | ................ | 428/1.1 |
| 2011/0242473 A1 | 10/2011 | Haseba et al. | | |
| 2013/0100369 A1 | 4/2013 | Sagou et al. | | |

FOREIGN PATENT DOCUMENTS

| | | |
|---|---|---|
| JP | 2004-231742 | 8/2004 |
| JP | 2006-509078 | 3/2006 |
| JP | 2009-144135 | 7/2009 |
| JP | 2009-215556 | 9/2009 |
| WO | 2008090780 | 7/2008 |
| WO | 2010058681 | 5/2010 |

OTHER PUBLICATIONS

"International Search Report (Form PCT/ISA/210)", published on Nov. 8, 2011, with English translation thereof, p. 1-5, in which the listed references (JP2009-215556, WO2010058681, JP2006-509078, JP2004-231742, JP2009-144135 and WO2008090780) were cited.
Hidekatsu Sigihara, "The Cholesteric Liquid Crystal Display Technology", Ekisho, 2007, p. 137-144, vol. 11, No. 2.

* cited by examiner

*Primary Examiner* — Geraldina Visconti
(74) *Attorney, Agent, or Firm* — Jianq Chyun IP Office

(57) ABSTRACT

A cholesteric liquid-crystal composition is described, which contains a liquid-crystal component and a chiral agent, and has a selective reflection wavelength in the range of 400 nm to 800 nm at 25° C.

28 Claims, 1 Drawing Sheet

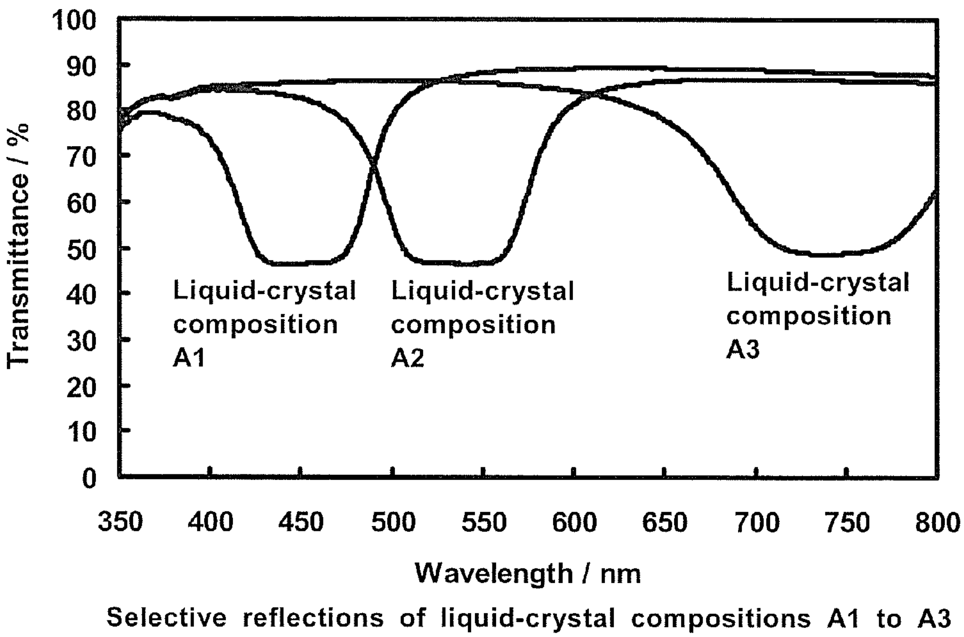
Selective reflections of liquid-crystal compositions A1 to A3

LIQUID-CRYSTAL COMPOSITION

CROSS-REFERENCE TO RELATED APPLICATION

This application is a 371 application of an International PCT application serial no. PCT/JP2011/072388, filed on Sep. 29, 2011, which claims the priority benefit of Japan Patent Application No. 2010-226950, filed on Oct. 6, 2010. The entirety of each of the above-mentioned patent applications is hereby incorporated by reference herein and made a part of this specification.

TECHNICAL FIELD

The present invention relates to a liquid-crystal composition. More specifically, the invention relates to a liquid-crystal composition that can be driven in a cholesteric phase. The invention also relates to a mixture containing a cholesteric liquid-crystal composition and a polymerizable monomer, a polymer/liquid-crystal composite material obtained by polymerizing the mixture in a cholesteric layer, and a microcapsule that encapsulates the liquid-crystal composition and so forth. The invention further relates to an optical device using the liquid-crystal composition, the microcapsule or the like.

BACKGROUND ART

An optical device that uses a cholesteric liquid-crystal composition showing a cholesteric phase at room temperature by adding a chiral agent to a nematic liquid crystal is known. Such an optical device is generally formed in which the cholesteric liquid-crystal composition is interposed between a pair of substrates with electrodes having at least one electrode being a transparent electrode, and a display is performed by controlling liquid-crystals in planer (or Grandjean) alignment, focalconic alignment or homeotropic alignment when a voltage (driving voltage) is applied between the electrodes. In particular, at the planar alignment, a color display is allowed when light having a specific wavelength is reflected by selective reflection and a selective reflection wavelength is controlled in a visible light region. Light that enters in parallel to the helical axis of the planar alignment is separated into right-handed and left-handed circularly polarized light, and light in a direction identical with the helical direction of the cholesteric liquid-crystals is selectively reflected, and the peak wavelength of the reflected light is provided by an equation: $\lambda_0 = n \times p$. Herein, p is the helical pitch (or pitch), and n is the average refractive index. Accordingly, if the pitch is changed by controlling the addition amount of the chiral agent, light having various wavelengths can be selectively reflected.

Memory properties can be provided for the cholesteric liquid-crystal composition. As a technique for providing the memory properties, the surface stabilized cholesteric texture (SSCT), the polymer stabilized cholesteric texture or the like is known. In an optical device using such cholesteric liquid-crystals having the memory properties, the voltage may be applied only upon rewriting the displays, and therefore the electric power consumption is low.

The optical device using the cholesteric liquid-crystals includes a liquid-crystal composition having suitable physical properties. In order to improve characteristics of the optical device, the liquid-crystal composition preferably has suitable physical properties. General physical properties necessary for a liquid-crystal compound being a component of the liquid-crystal composition are as described below:

(1) being chemically stable and physically stable;
(2) having a high clearing point (phase transition temperature between a liquid-crystal phase and an isotropic phase);
(3) having a low minimum temperature of the liquid-crystal phase;
(4) having an excellent compatibility with other liquid-crystal compounds;
(5) having a dielectric anisotropy of a suitable magnitude; and
(6) having a refractive index anisotropy of a suitable magnitude.

From the viewpoint of reducing the driving voltage of the cholesteric liquid-crystals, a compound having a large dielectric anisotropy is preferred. From the viewpoint of expanding the selective reflection wavelength band, a compound having a large refractive index anisotropy is preferred.

If a liquid-crystal composition containing a liquid-crystal compound being chemically and physically stable as described in property (1) is used for a liquid-crystal display device being one kind of optical device, the voltage holding ratio can be increased.

In a liquid-crystal composition containing a liquid-crystal compound having the high clearing point or the low minimum temperature of the liquid-crystal phase as described in properties (2) and (3), the temperature range of the cholesteric phase can be extended, and the liquid-crystal composition can be used in a display device in a wide temperature range. In order to develop characteristics that are difficult to be achieved by a single compound, the liquid-crystal compound is generally used in the form of a liquid-crystal composition prepared by mixing the compound with many other liquid-crystal compounds. Accordingly, the liquid-crystal compound to be used for the liquid-crystal display device preferably has the good compatibility with other liquid-crystal compounds as described in property (4). Furthermore, a liquid-crystal composition having a low driving voltage is required for the liquid-crystal material to be used. A liquid-crystal compound having the large dielectric anisotropy is preferably used in order to drive at a low voltage the optical device to be driven in the cholesteric phase, and a liquid-crystal compound having the large refractive index anisotropy is preferably used in order to expand the selective reflection wavelength band.

WO 2010/058681 (Patent literature 1) discloses an optically isotropic liquid-crystal composition containing a compound represented by formula (1-1), but any of the liquid-crystal compositions each containing a chiral agent described in Examples in Patent literature 1 has a selective reflection wavelength of the cholesteric phase in the range of less than 400 nm at ordinary temperature (25° C.)

CITATION LIST

Patent Literature

Patent literature 1: WO 2010/058681.

Non-Patent Literature

Non-patent literature 1: EKISHO, 11, 137 (2007).

SUMMARY OF INVENTION

Technical Problem

Under the above situation, for example, a liquid-crystal composition having stability to heat and light, a wide temperature range of a liquid-crystal phase, a large refractive index anisotropy and a large dielectric anisotropy and having a cholesteric phase is required. Moreover, for example, various kinds of optical devices that can be used in a wide temperature range and have a low driving voltage and a high reflectance are required.

Solution to Problem

The invention provides a liquid-crystal medium (a liquid-crystal composition, a polymer/liquid-crystal composite material or a microcapsule), an optical device including the liquid-crystal medium, and so on as described below.

Item 1. A cholesteric liquid-crystal composition that contains a liquid-crystal component and a chiral agent and has a selective reflection wavelength in the range of 400 nm to 800 nm at 25° C., wherein the liquid-crystal component contains liquid-crystal component A including at least one compound selected from the group of compounds represented by formulas (1-1), (1-2) and (1-3):

(1-1)

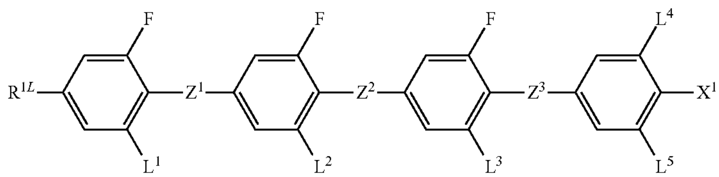

(1-2)

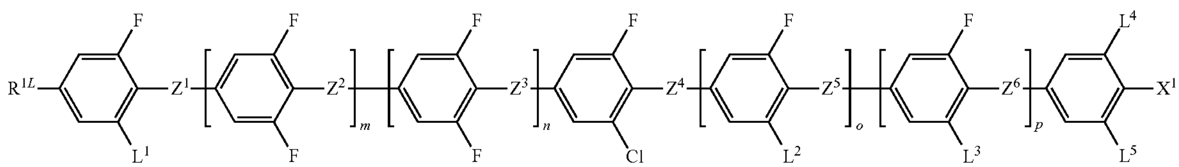

(1-3)

$$R^{1D}—A^1—(Z^1—A^2)_m—(Z^2—A^3)_n—(Z^3—A^4)_p—Z^4—A^5—X^1$$

wherein, in formulas (1-1) to (1-3), $R^{1L}$ is hydrogen, straight-chain alkyl having 1 to 20 carbons in which arbitrary —$CH_2$— may be replaced by —S—, —COO— or —OCO—, straight-chain alkenyl having 2 to 20 carbons, straight-chain alkynyl having 2 to 20 carbons, straight-chain alkoxy having 1 to 20 carbons, straight-chain alkoxyalkyl having 2 to 20 carbons or straight-chain alkenyloxy having 2 to 20 carbons, and hydrogen in the alkyl, the alkenyl, the alkynyl, the alkoxy, the alkoxyalkyl and the alkenyloxy may be replaced by halogen; $R^{1D}$ is branched alkyl having 3 to 20 carbons, branched alkenyl having 3 to 20 carbons, branched alkoxy having 3 to 20 carbons or branched alkoxyalkenyl having 3 to 20 carbons, arbitrary —$CH_2$—$CH_2$— in the branched alkyl or the branched alkenyl may be replaced by —CH═CH—, —CF═CF— or —C≡C—, and arbitrary hydrogen in the branched alkyl, the branched alkenyl, the branched alkoxy and the branched alkoxyalkenyl may be replaced by fluorine; rings $A^1$, $A^2$, $A^3$, $A^4$ and $A^5$ are independently 1,4-phenylene, 1,3-dioxane-2,5-diyl, tetrahydropyran-2,5-diyl, tetrahydropyran-3,6-diyl, pyrimidine-2,5-diyl, pyridine-2,5-diyl or naphthalene-2,6-diyl, and arbitrary hydrogen in the ring may be replaced by fluorine or chlorine; $Z^1$, $Z^2$, $Z^3$, $Z^4$, $Z^5$ and $Z^6$ are independently a single bond or alkylene having 1 to 4 carbons, arbitrary —$CH_2$— in the alkylene may be replaced by —O—, —COO— or —$CF_2O$—, arbitrary —$CH_2$—$CH_2$— in the alkylene may be replaced by —CH═CH—, —CF═CF— or —C≡C—, and arbitrary hydrogen may be replaced by halogen, with a proviso that at least one of $Z^1$ to $Z^3$ in formula (1-1) is $CF_2O$, and at least one of $Z^1$ to $Z^6$ in formula (1-2) is $CF_2O$; $L^1$, $L^2$, $L^3$, $L^4$ and $L^5$ are independently hydrogen or fluorine; $X^1$ is halogen, —C≡N, —N═C═S, —$SF_5$, or alkyl having 1 to 3 carbons in which arbitrary —$CH_2$— may be replaced by —S—, —COO— or —OCO—, alkenyl having 2 to 3 carbons, alkynyl having 2 to 3 carbons, alkoxy having 1 to 3 carbons, alkoxyalkyl having 2 to 3 carbons or alkenyloxy having 2 to 3 carbons, and hydrogen in the alkyl, the alkenyl, the alkynyl, the alkoxy, the alkoxyalkyl and the alkenyloxy may be replaced by halogen; and m, n, o and p are independently 0 or 1, the inequality of $1 \leq m+n+o+p \leq 2$ applies to formula (1-2), and the inequality of $1 \leq a+n+p \leq 3$ applies to formula (1-3).

Item 2. The cholesteric liquid-crystal composition according to item 1, wherein the selective reflection wavelength at 25° C. is in the range of 400 nm to 750 nm.

Item 3. The cholesteric liquid-crystal composition according to item 1, wherein liquid-crystal component A contains a compound represented by formula (1-2) or a compound represented by formula (1-3).

Item 4. The cholesteric liquid-crystal composition according to item 1, wherein liquid-crystal component A contains a compound represented by formula (1-1), a compound represented by formula (1-2) and a compound represented by formula (1-3).

Item 5. The cholesteric liquid-crystal composition according to item 4, wherein in liquid-crystal component A, the content of the compound represented by formula (1-1) is in the range of 5 wt % to 90 wt %, the content of the compound represented by formula (1-2) is in the range of 5 wt % to 90 wt %, and the content of the compound represented by formula (1-3) is in the range of 5 wt % to 90 wt %.

Item 6. The cholesteric liquid-crystal composition according to any one of items 1 to 5, wherein in the liquid-crystal component, the content of liquid-crystal component A including at least one compound selected from the group of compounds represented by formulas (1-1), (1-2) and (1-3) is in the range of 15 wt % or more.

Item 7. The cholesteric liquid-crystal composition according to item 6, wherein in the liquid-crystal component, the content of liquid-crystal component A is in the range of 40 wt % to 85 wt %.

Item 8. The cholesteric liquid-crystal composition according to item 1 or 2, wherein liquid-crystal component A contains a compound of formula (1-3) in which at least one of $Z^1$ to $Z^4$ is $CF_2O$.

Item 9. The cholesteric liquid-crystal composition according to item 1 or 2, wherein liquid-crystal component A contains a compound of formula (1-3) in which $R^{1D}$ is alkyl or alkenyl each having 4 to 20 carbons and branched on the 2-position carbon.

Item 10. The cholesteric liquid-crystal composition according to item 1 or 2, wherein liquid-crystal component A contains a compound represented by formula (1-3-1) or a compound represented by formula (1-3-2):

(1-3-1)

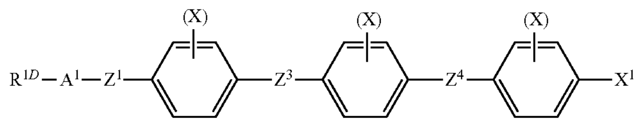

(1-3-2)

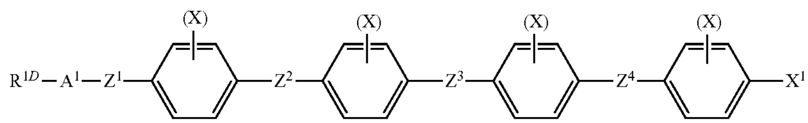

wherein, in formulas (1-3-1) to (1-3-2), $R^{1D}$ is branched alkyl or branched alkenyl each having 3 to 20 carbons, and arbitrary hydrogen in the alkyl may be replaced by fluorine; ring $A^1$ is 1,4-phenylene, 1,3-dioxane-2,5-diyl, tetrahydropyran-2,5-diyl, tetrahydropyran-3,6-diyl, pyrimidine-2,5-diyl or pyridine-2,5-diyl, and arbitrary hydrogen in the ring may be replaced by fluorine; $Z^1$, $Z^2$, $Z^3$ and $Z^4$ are independently a single bond, —$CH_2CH_2$—, —COO— or —$CF_2O$—, with a proviso that arbitrary one of $Z^1$, $Z^2$, $Z^3$ and $Z^4$ is —COO— or —$CF_2O$—; $X^1$ is fluorine, chlorine, —C≡N or alkyl having 1 to 3 carbons in which arbitrary hydrogen is replaced by fluorine, arbitrary —$CH_2$— in the alkyl may be replaced by —O—, and arbitrary —$CH_2$—$CH_2$— in the alkyl may be replaced by —CH=CH—; X is fluorine or chlorine; and the expression in which 1,4-phenylene and (X) are connected with a straight line represents 1,4-phenylene in which one or two of hydrogen may be replaced by X.

Item 11. The cholesteric liquid-crystal composition according to item 1 or 2, wherein liquid-crystal component A contains at least one compound selected from the group of compounds represented by formulas (1-1-2), (1-1-3), (1-2-1-1), (1-2-1-2), (1-2-2-1), (1-2-2-2), (1-2-3-1), (1-2-3-2), (1-2-4-2), (1-2-4-3), (1-2-5-3), (1-3-1-1), (1-3-1-2), (1-3-1-3), (1-3-1-4), (1-3-1-5), (1-3-1-6), (1-3-1-7), (1-3-1-8), (1-3-2-1), (1-3-2-2), (1-3-2-3), (1-3-2-4), (1-3-2-5), (1-3-2-6), (1-3-2-7) and (1-3-2-8):

(1-1-2)

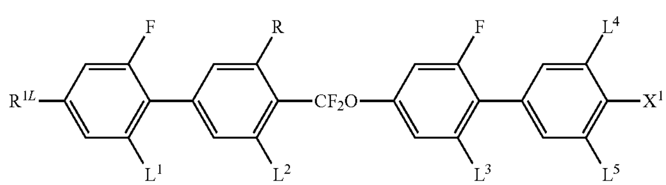

(1-1-3)

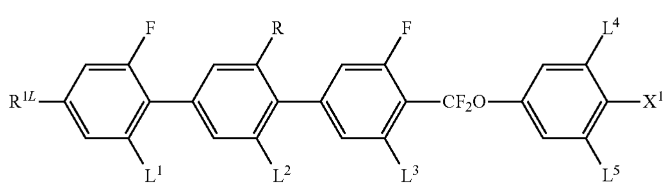

-continued
(1-2-1-1)
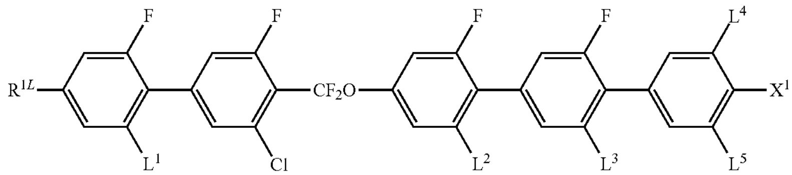
(1-2-1-2)
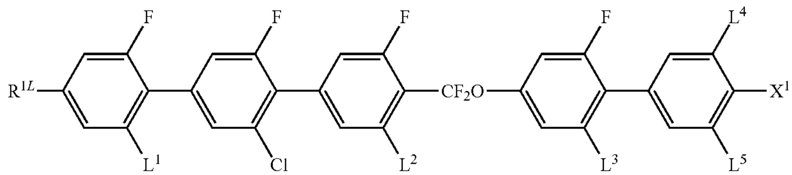
(1-2-2-1)
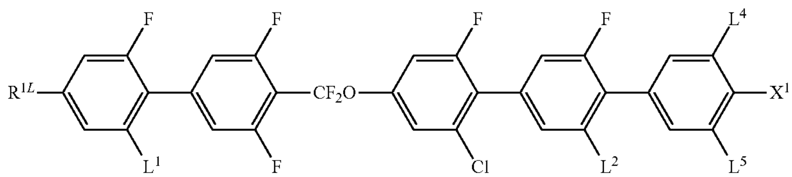
(1-2-2-2)
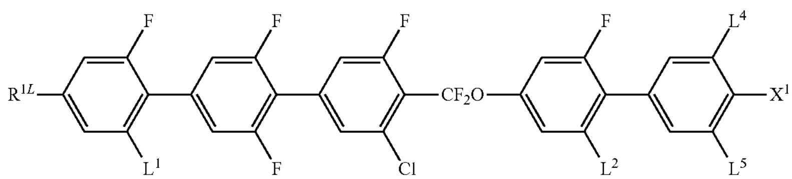
(1-2-3-1)
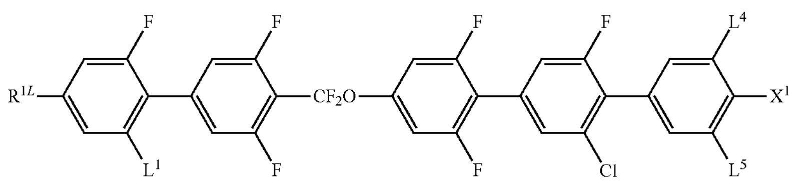
(1-2-3-2)
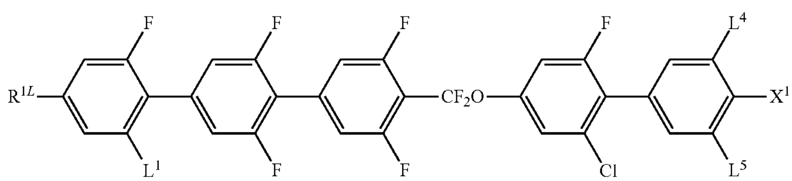
(1-2-4-2)
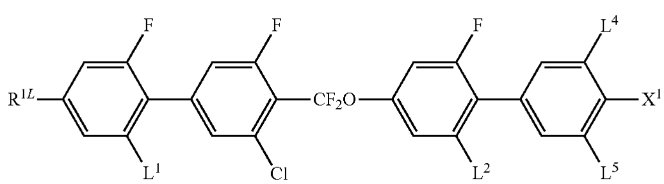
(1-2-4-3)
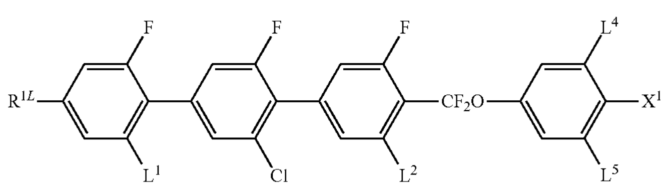

-continued
(1-2-5-3)
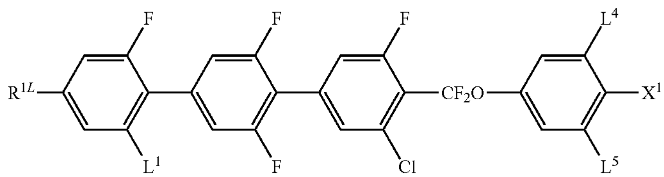
(1-3-1-1)
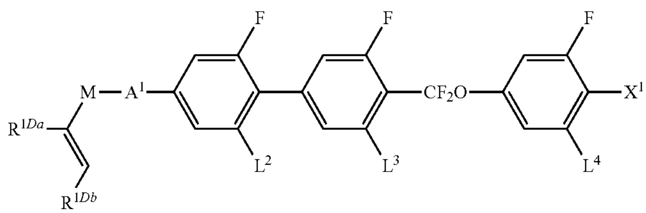
(1-3-1-2)
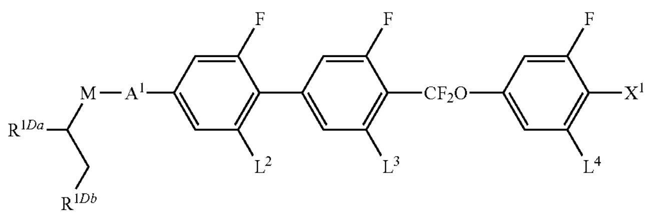
(1-3-1-3)
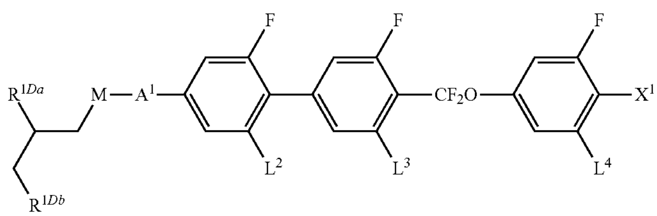
(1-3-1-4)
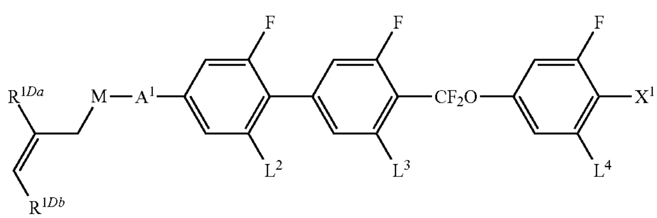
(1-3-1-5)
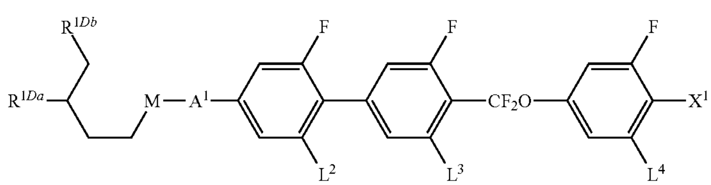
(1-3-1-6)
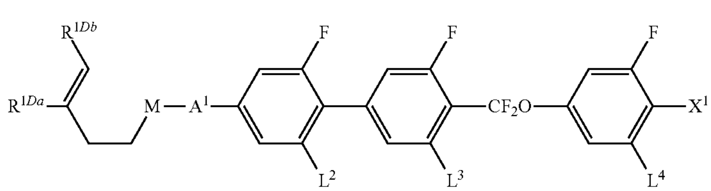
(1-3-1-7)
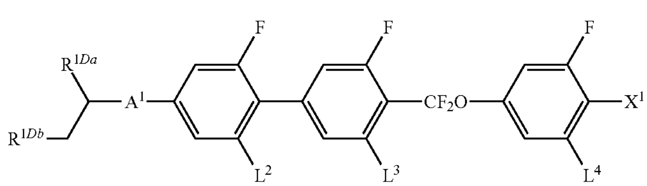

-continued
(1-3-1-8)
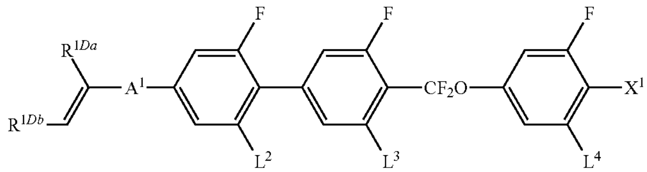
(1-3-2-1)
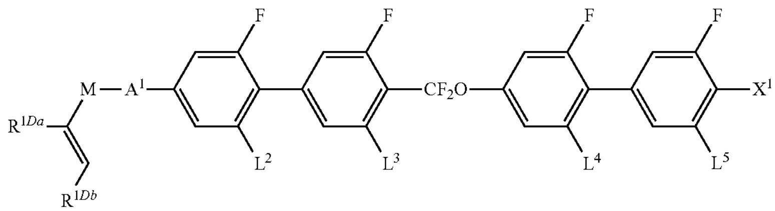
(1-3-2-2)
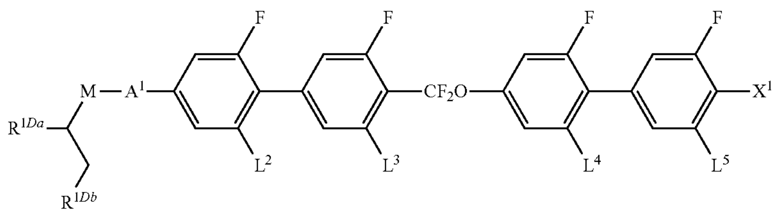
(1-3-2-3)
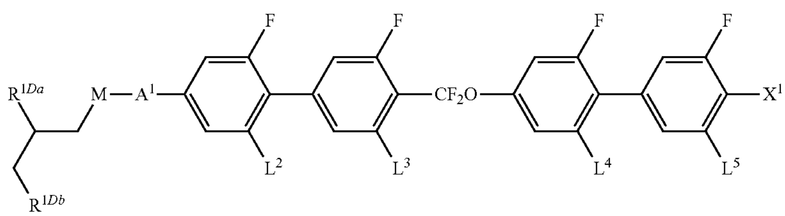
(1-3-2-4)
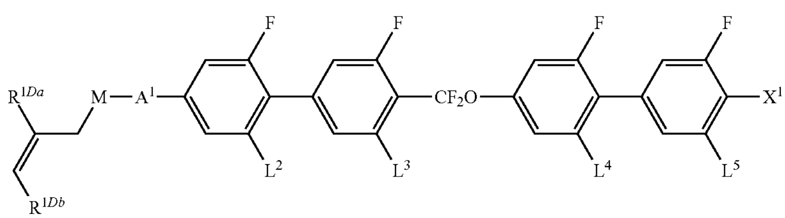
(1-3-2-5)
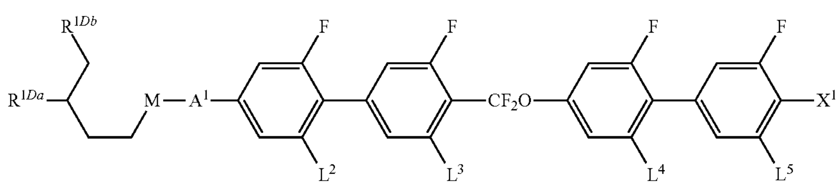
(1-3-2-6)
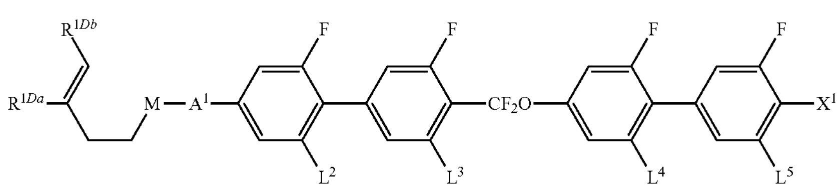
(1-3-2-7)
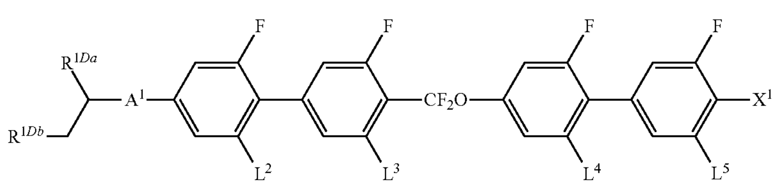

-continued (1-3-2-8)

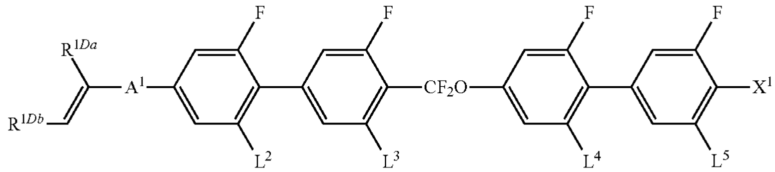

wherein, in the formulas, $R^{1L}$ is hydrogen or straight-chain alkyl having 1 to 20 carbons, arbitrary —$CH_2$— in the alkyl may be replaced by —O—, —S—, —COO—, —OCO—, —CH═CH—, —CF═CF— or —C≡C—, and arbitrary hydrogen in the alkyl or in a group obtained by replacing arbitrary —$CH_2$— in the alkyl by —O—, —S—, —COO—, —OCO—, —CH═CH—, —CF═CF— or —C≡C— may be replaced by halogen or alkyl having 1 to 3 carbons; $R^{1Da}$ is alkyl having 1 to 10 carbons, arbitrary —$CH_2$— in the alkyl may be replaced by —O—, and arbitrary —$CH_2$—$CH_2$— in the alkyl may be replaced by —CH═CH—; $R^{1Db}$ is hydrogen or alkyl having 1 to 10 carbons, arbitrary —$CH_2$— in the alkyl may be replaced by —O—, and arbitrary —$CH_2$—$CH_2$— in the alkyl may be replaced by —CH═CH—; M is —$CH_2$— or —O—; $L^1$, $L^2$, $L^3$, $L^4$ and $L^5$ are independently hydrogen, fluorine or chlorine; $A^1$ is 1,4-phenylene, 1,3-dioxane-2,5-diyl, tetrahydropyran-2,5-diyl, tetrahydropyran-3,6-diyl, pyrimidine-2,5-diyl or pyridine-2,5-diyl, and arbitrary hydrogen in the ring may be replaced by fluorine; and $X^1$ is fluorine, chlorine, —C≡N, alkyl having 1 to 3 carbons in which arbitrary hydrogen is replaced by fluorine, alkenyl having 1 to 3 carbons in which arbitrary hydrogen is replaced by fluorine or alkoxy having 1 to 3 carbons in which arbitrary hydrogen is replaced by fluorine.

Item 12. The liquid-crystal composition according to item 1 or 2, wherein the liquid-crystal component further contains at least one compound selected from the group of compounds represented by formulas (2), (3) and (4):

(2)

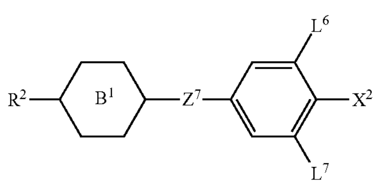

(3)

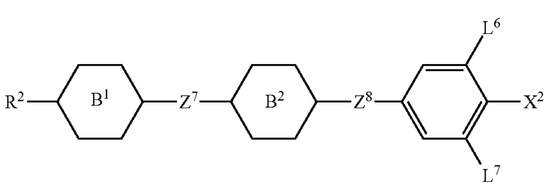

(4)

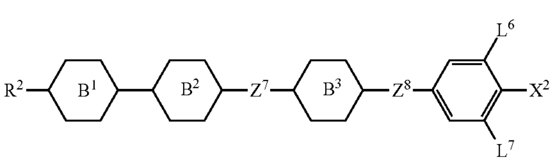

wherein, in the formulas, $R^2$ is alkyl having 1 to 10 carbons or alkenyl having 2 to 10 carbons, and in the alkyl and the alkenyl, arbitrary hydrogen may be replaced by fluorine, and arbitrary —$CH_2$— may be replaced by —O—; $X^2$ is fluorine, chlorine, —$OCF_3$, —$OCHF_2$, —$CF_3$, —$CHF_2$, —$CH_2F$, —$OCF_2CHF_2$ or —$OCF_2CHFCF_3$; ring $B^1$, ring $B^2$ and ring $B^3$ are independently 1,4-cyclohexylene, 1,3-dioxane-2,5-diyl, pyrimidine-2,5-diyl, tetrahydropyran-2,5-diyl, 1,4-phenylene, naphthalene-2,6-diyl, 1,4-phenylene in which arbitrary hydrogen is replaced by fluorine, or naphthalene-2,6-diyl in which arbitrary hydrogen is replaced by fluorine or chlorine; $Z^7$ and $Z^8$ are independently —$(CH_2)_2$—, —$(CH_2)_4$—, —COO—, —$CF_2O$—, —$OCF_2$—, —CH═CH—, —C≡C—, —$CH_2O$— or a single bond; and $L^6$ and $L^7$ are independently hydrogen or fluorine.

Item 13. The cholesteric liquid-crystal composition according to item 1 or 2, wherein the liquid-crystal component further contains a compound represented by formula (5):

(5)

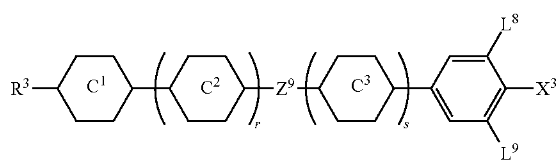

wherein, in formula (5), $R^3$ is alkyl having 1 to 10 carbons or alkenyl having 2 to 10 carbons, and in the alkyl and the alkenyl, arbitrary hydrogen may be replaced by fluorine, and arbitrary —$CH_2$— may be replaced by —O—; $X^3$ is —C≡N or —C≡C—C≡N; ring $C^1$, ring $C^2$ and ring $C^3$ are independently 1,4-cyclohexylene, 1,4-phenylene, 1,4-phenylene in which arbitrary hydrogen is replaced by fluorine, naphthalene-2,6-diyl, naphthalene-2,6-diyl in which arbitrary hydrogen is replaced by fluorine or chlorine, 1,3-dioxane-2,5-diyl, tetrahydropyran-2,5-diyl or pyrimidine-2,5-diyl; $Z^9$ is —$(CH_2)_2$—, —COO—, —$CF_2O$—, —$OCF_2$—, —C≡C—, —$CH_2O$— or a single bond; $L^8$ and $L^9$ are independently hydrogen or fluorine; and r is 1 or 2, s is 0 or 1, and a sum of r and s is 0, 1 or 2.

Item 14. The cholesteric liquid-crystal composition according to item 1 or 2, wherein the liquid-crystal component further contains a compound represented by formula (6):

(6)

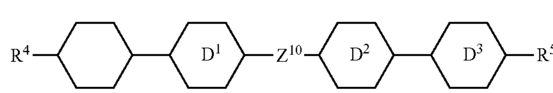

wherein, in formula (6), $R^4$ and $R^5$ are independently alkyl having 1 to 10 carbons or alkenyl having 2 to 10 carbons, and in the alkyl and the alkenyl, arbitrary hydrogen may be replaced by fluorine, and arbitrary —$CH_2$— may be replaced by —O—; ring $D^1$, ring $D^2$ and ring $D^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^{10}$ is —C≡C—, —COO—, —$(CH_2)_2$—, —CH═CH— or a single bond.

Item 15. The cholesteric liquid-crystal composition according to any one of items 1 to 14, further containing at least one antioxidant and/or at least one ultraviolet light absorber.

Item 16. The cholesteric liquid-crystal composition according to any one of items 1 to 15, wherein the ratio of the chiral agent is in the range of 1 wt % to 20 wt % based on the total weight of the cholesteric liquid-crystal composition.

Item 17. The cholesteric liquid-crystal composition according to any one of items 1 to 16, wherein the chiral agent contains at least one compound selected from the group of compounds represented by formulas (K1) to (K5), respectively:

(K1)

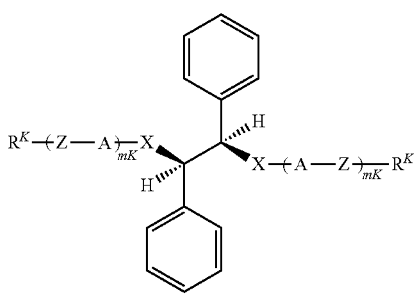

(K2)

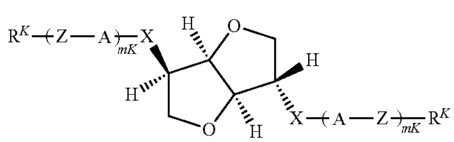

(K3)

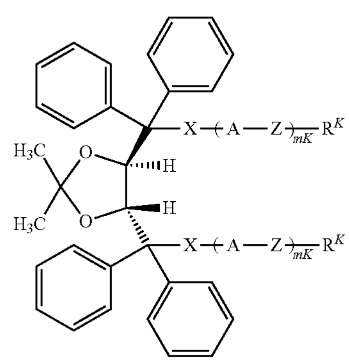

-continued (K4)

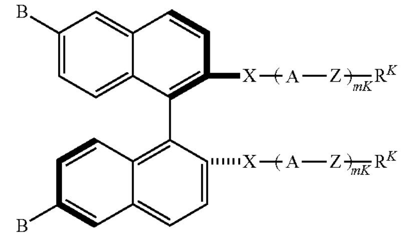

(K5)

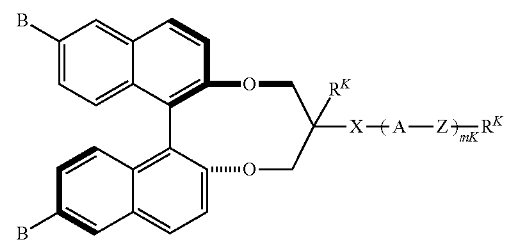

wherein, in formulas (K1) to (K5), each $R^K$ is independently hydrogen, halogen, —C≡N, —N═C═O, —N═C═S or alkyl having 1 to 20 carbons, arbitrary —$CH_2$— in the alkyl may be replaced by —O—, —S—, —COO—, —OCO—, —CH═CH—, —CF═CF— or —C≡C—, and arbitrary hydrogen in the alkyl may be replaced by halogen; each A is independently an aromatic or non-aromatic three-membered to eight-membered ring, or a fused ring having 9 or more carbons, arbitrary hydrogen in the rings may be replaced by halogen, or alkyl or haloalkyl each having 1 to 3 carbons, —$CH_2$— of the ring may be replaced by —O—, —S— or —NH—, and —CH═ may be replaced by —N═; each B is independently hydrogen, halogen, alkyl having 1 to 3 carbons, haloalkyl having 1 to 3 carbons, an aromatic or non-aromatic three-membered to eight-membered ring, or a fused ring having 9 or more carbons, arbitrary hydrogen in the rings may be replaced by halogen, or alkyl or haloalkyl each having 1 to 3 carbons, —$CH_2$— may be replaced by —O—, —S— or —NH—, and —CH═ may be replaced by —N═; each Z is independently a single bond, or alkylene having 1 to 8 carbons in which arbitrary —$CH_2$— may be replaced by —O—, —S—, —COO—, —OCO—, —CSO—, —OCS—, —N═N—, —CH═N—, —N═CH—, —CH═CH—, —CF═CF— or —C≡C—, and arbitrary hydrogen may be replaced by halogen; X is a single bond, —COO—, —OCO—, —$CH_2O$—, —$OCH_2$—, —$CF_2O$—, —$OCF_2$— or —$CH_2CH_2$—; and mK is an integer of from 1 to 4.

Item 18. The cholesteric liquid-crystal composition according to any one of items 1 to 16, wherein the chiral agent contains at least one compound selected from the group of compounds represented by formulas (K2-1) to (K2-8), (K4-1) to (K4-6) and (K5-1) to (K5-3), respectively:

(K2-1)

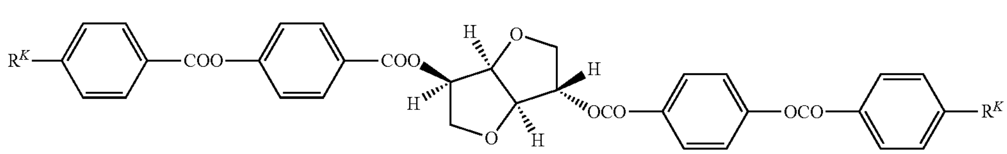

-continued
(K2-2)
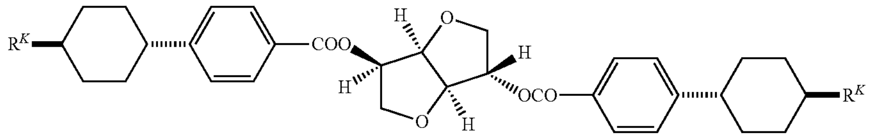
(K2-3)
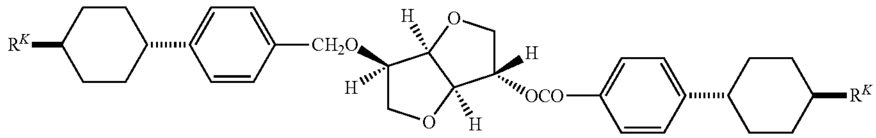
(K2-4)
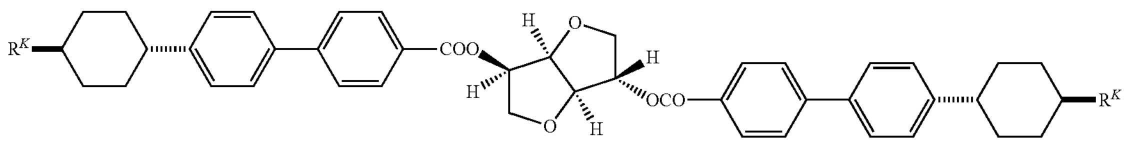
(K2-5)
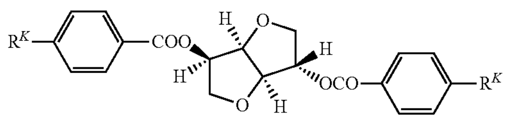
(K2-6)
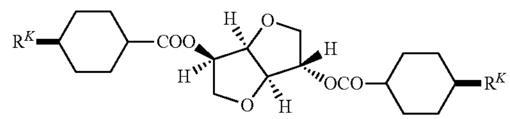
(K2-7)
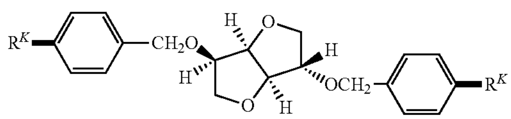
(K2-8)
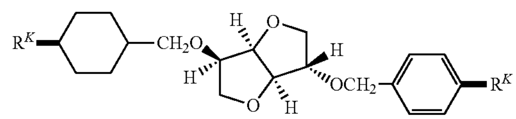
(K4-1)
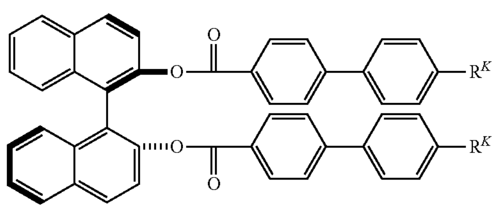
(K4-5)
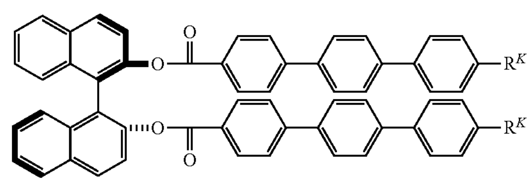
(K4-2)
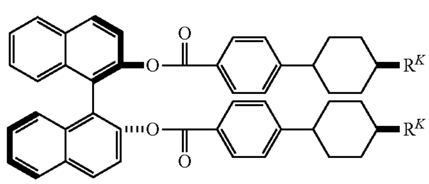
(K4-6)
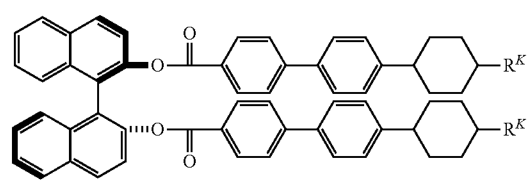
(K4-3)
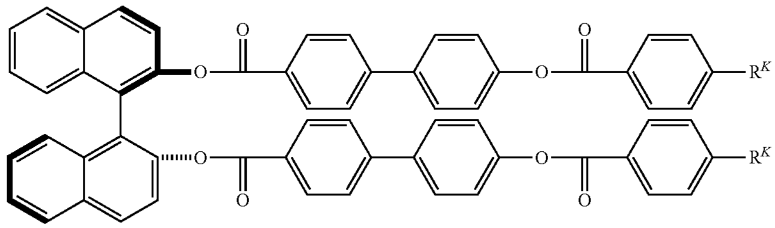
(K4-4)
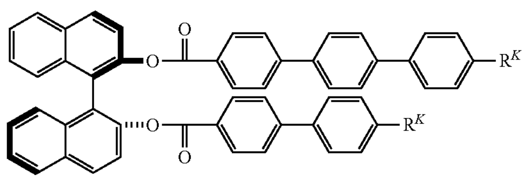
(K5-1)
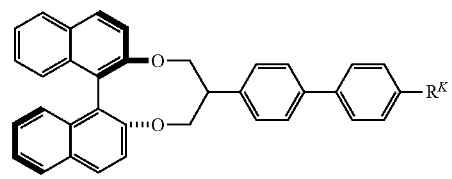

-continued (K5-2)

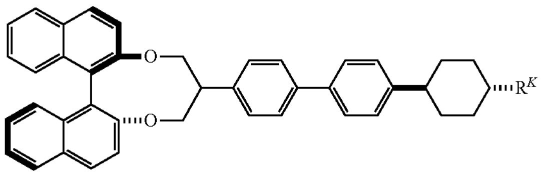

(K5-3)

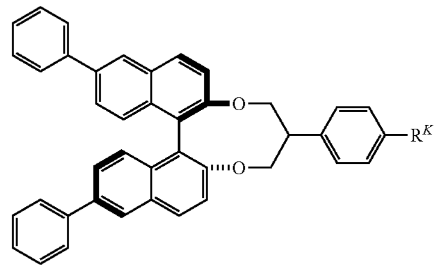

wherein, in the formulas, each $R^K$ is independently alkyl having 3 to 10 carbons, in which the —$CH_2$— adjacent to a ring may be replaced by —O—, and arbitrary —$CH_2$— may be replaced by —CH═CH—.

Item 19. A mixture, containing the cholesteric liquid-crystal composition according to any one of items 1 to 18 and a polymerizable monomer.

Item 20. A polymer/liquid-crystal composite material, obtained by polymerizing the mixture according to item 19 in a cholesteric phase.

Item 21. The polymer/liquid-crystal composite material according to item 20, wherein a polymer contained in the polymer/liquid-crystal composite material has a mesogen moiety.

Item 22. The polymer/liquid-crystal composite material according to item 20 or 21, wherein the cholesteric liquid-crystal composition is contained in the range of 60 wt % to 99 wt % and the polymer is contained in the range of 1 wt % to 40 wt %.

Item 23. A microcapsule, encapsulating the cholesteric liquid-crystal composition according to any one of items 1 to 18, the mixture according to item 19 or the polymer/liquid-crystal composite material according to any one of items 20 to 22.

Item 24. An optical device, having two substrates with an electrode arranged on the surface of one or both thereof, a liquid-crystal medium arranged between the substrates, and an electric field applying means for applying an electric field to the liquid-crystal medium through the electrode, wherein the liquid-crystal medium is the cholesteric liquid-crystal composition according to any one of items 1 to 18, the polymer/liquid-crystal composite material according to anyone of items 20 to 22 or the microcapsule according to item 23, and planar alignment and focalconic alignment are controlled by voltage.

Item 25. Use of the liquid-crystal composition according to item 1 for an optical device.

Specifically, the optical device according to item 25 has two substrates with an electrode arranged on the surface of one or both thereof, a liquid-crystal medium arranged between the substrates, and an electric field applying means for applying an electric field to the liquid-crystal medium through the electrode, in which planar alignment and focalconic alignment are controlled by voltage, and the liquid-crystal medium is selected from the cholesteric liquid-crystal composition, the polymer/liquid-crystal composite material or the microcapsule. The cholesteric liquid-crystal composition is preferably according to any one of items 1 to 18, the polymer/liquid-crystal composite material is preferably according to item 20 or 22, and the microcapsule is preferably according to item 23.

The liquid-crystal composition of the invention may further contain at least one compound selected from the group of compounds represented by formulas (7), (8), (9) and (10), respectively:

(7)

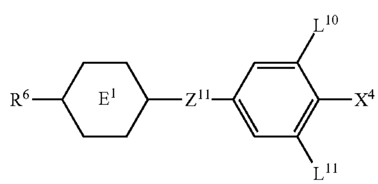

(8)

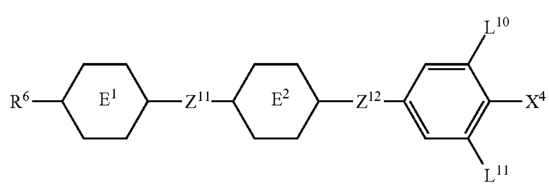

(9)

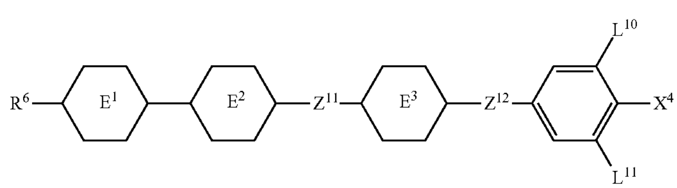

-continued (10)

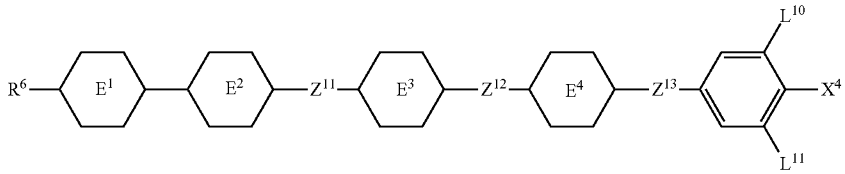

wherein, in the formulas, $R^6$ is straight-chain alkyl having 1 to 10 carbons, alkenyl having 2 to 10 carbons or alkynyl having 2 to 10 carbons, and in the alkyl, the alkenyl and the alkynyl, arbitrary hydrogen may be replaced by fluorine, and arbitrary $—CH_2—$ may be replaced by —O—; $X^4$ is fluorine, chlorine, $—SF_5$, $—OCF_3$, $—OCHF_2$, $—CF_3$, $—CHF_2$, $—CH_2F$, $—OCF_2CHF_2$ or $—OCF_2CHFCF_3$; ring $E^1$, ring $E^2$, ring $E^3$ and ring $E^4$ are independently 1,4-cyclohexylene, 1,3-dioxane-2,5-diyl, pyrimidine-2,5-diyl, tetrahydropyran-2,5-diyl, 1,4-phenylene, naphthalene-2,6-diyl, 1,4-phenylene in which arbitrary hydrogen is replaced by fluorine or chlorine, or naphthalene-2,6-diyl in which arbitrary hydrogen is replaced by fluorine or chlorine; $Z^{11}$, $Z^{12}$ and $Z^{13}$ are independently $—(CH_2)_2—$, $—(CH_2)_4—$, —COO—, $—CF_2O—$, $—OCF_2—$, —CH═CH—, —C≡C—, $—CH_2O—$ or a single bond, but when any of the rings $E^1$, $E^2$, $E^3$ and $E^4$ is 3-chloro-5-fluoro-1,4-phenylene and when the ring $E^1$ is fluorine-substituted 1,4-phenylene in formula (9), $Z^{11}$, $Z^{12}$ and $Z^{13}$ are not $—CF_2O—$; and $L^{10}$ and $L^{11}$ are independently hydrogen or fluorine.

The liquid-crystal composition of the invention may further contain at least one compound selected from the group of compounds represented by formula (11):

(11)

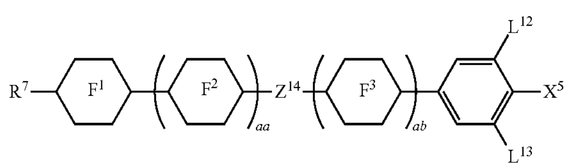

wherein, in the formula, $R^7$ is alkyl having 1 to 10 carbons, alkenyl having 2 to 10 carbons or alkynyl having 2 to 10 carbons, and in the alkyl, the alkenyl and the alkynyl, arbitrary hydrogen may be replaced by fluorine, and arbitrary $—CH_2—$ may be replaced by —O—; $X^5$ is —C≡N, —N═C═S or —C≡C—C≡N; ring $F^1$, ring $F^2$ and ring $F^3$ are independently 1,4-cyclohexylene, 1,4-phenylene, 1,4-phenylene in which arbitrary hydrogen is replaced by fluorine or chlorine, naphthalene-2,6-diyl, naphthalene-2,6-diyl in which arbitrary hydrogen is replaced by fluorine or chlorine, 1,3-dioxane-2,5-diyl, tetrahydropyran-2,5-diyl or pyrimidine-2,5-diyl; $Z^{14}$ is $—(CH_2)_2—$, —COO—, $—CF_2O—$, $—OCF_2—$, —C≡C—, $—CH_2O—$ or a single bond; $L^{12}$ and $L^{13}$ are independently hydrogen or fluorine; and aa is 0, 1 or 2, ab is 0 or 1, and a sum of aa and ab is 0, 1 or 2.

"Liquid-crystal medium" herein is a generic term for the liquid-crystal composition, the polymer/liquid-crystal composite material, and the microcapsule. Moreover, "optical device" means various kinds of devices that produce a function such as optical modulation and optical switching by utilizing an electro-optic effect, and specific examples thereof include the display device (liquid-crystal display device), and an optical modulation device that is used for an optical communication system, optical information processing and various sensor systems.

"Liquid-crystal component" herein means a liquid-crystal composition that contains no chiral agent and exhibits a nematic phase.

"Compound" (hereinafter, referred to also as "liquid-crystal compound") contained in the liquid-crystal component herein is a generic term for a compound having a mesogen, and a compound having a liquid-crystal phase such as a nematic phase or a smectic phase, and a compound having no liquid-crystal phase but being useful as a liquid-crystal component.

"Chiral agent" herein is an optically active compound, and is added in order to provide the liquid-crystal composition with desired twisted molecular arrangement. "Liquid-crystal display device" is a generic term for a liquid-crystal display panel and a liquid-crystal display module. "Liquid-crystal compound," "liquid-crystal composition," and "liquid-crystal display device" are occasionally abbreviated as "compound," "composition," and "device," respectively.

Moreover, for example, the upper limit of the temperature range of the liquid-crystal phase is a phase transition temperature between the liquid-crystal phase and an isotropic phase, and is occasionally abbreviated simply as a clearing point or a maximum temperature. The lower limit of the temperature range of the liquid-crystal phase is occasionally abbreviated simply as a minimum temperature.

A compound represented by formula (1) is occasionally abbreviated as compound (1). The abbreviation is occasionally applied to a compound represented by formula (2) or the like. In formulas (1) to (11), symbols such as B, D and E surrounded by a hexagonal shape correspond to ring B, ring D and ring E, respectively. An amount of a compound expressed in terms of percentage is expressed in terms of weight percent (wt %) based on the total weight of the composition. A plurality of identical symbols such as ring $A^1$, $Y^1$ and B are described in identical formulas or different formulas, but the plurality of symbols may represent identical or different groups.

"Arbitrary" herein means that not only the position but also the number is arbitrary, without including a case where the number is 0 (zero). The expression "arbitrary A may be replaced by B, C or D" includes a case where arbitrary A is replaced by B, a case where arbitrary A is replaced by C, and a case where arbitrary A is replaced by D, and also a case where a plurality of A are replaced by at least two of B to D. For example, "alkyl in which arbitrary $—CH_2—$ may be replaced by —O—, and arbitrary $—CH_2—CH_2—$ in the alkyl may be replaced by —CH═CH—" includes alkyl, alkenyl, alkoxy, alkoxyalkyl, alkoxyalkenyl and alkenyloxyalkyl. In the invention, a case where two successive $—CH_2—$ is replaced by —O— to form —O—O— is not preferred. Then, a case where $—CH_2—$ at a terminal of alkyl is replaced by —O— is not preferred, either. The invention will be further explained below. With regard to the terminal group, the ring, the bonding group or the like in the compound represented by formula (1), a preferred example is also described.

Advantageous Effects of Invention

A liquid-crystal compound according to a preferred embodiment of the invention has stability to heat, light and so forth, a large refractive index anisotropy, a large dielectric anisotropy and a low melting point, and therefore a high content of the compound in the liquid-crystal composition is allowed. A liquid-crystal composition according to a preferred embodiment of the invention shows stability to heat, light and so forth, a high maximum temperature of the cholesteric phase, and a low minimum temperature thereof, and has a low driving voltage and a high reflectance in a device driven in the cholesteric phase. A polymer/liquid-crystal composite material and a microcapsule each according to a preferred embodiment of the invention show a high maximum temperature of the cholesteric phase and a low minimum temperature thereof, and have a low driving voltage and a high reflectance in the device driven in the cholesteric phase.

Moreover, an optical device of a preferred embodiment of the invention has a wide temperature range in which the device can be used, a low driving voltage and a high reflectance.

BRIEF DESCRIPTION OF DRAWINGS

FIG. 1 is a diagram showing the wavelength-transmittance relationships of the liquid-crystal compositions A1 to A3.

DESCRIPTION OF EMBODIMENTS

A liquid-crystal composition of the invention includes a cholesteric liquid-crystal composition that has a liquid-crystal component containing liquid-crystal component A including at least one compound selected from the group of compounds represented by formulas (1-1), (1-2) and (1-3), and a chiral agent, and does not exhibit an optically isotropic liquid-crystal phase.

1. Liquid-Crystal Component Contained in a Liquid-Crystal Composition of the Invention The liquid-crystal component of the invention contains liquid-crystal component A including at least one compound represented by the formula (1-1), (1-2) or (1-3).

The liquid-crystal component of the invention may also contain compounds represented by formulas (2) to (11) in addition to liquid-crystal component A.

1.1 Liquid-Crystal Component A

Liquid-crystal component A of the invention includes at least one compound selected from the group of compounds represented by formulas (1-1), (1-2) and (1-3). More specifically, liquid-crystal component A includes at least one compound selected from the group of the compounds represented by formula (1-1), those represented by formula (1-2) and those represented by formula (1-3), and does not contain any other compound.

Liquid-crystal component A may include one compound, or two or more compounds.

1.1.1 Compound (1-1)

(1) Compound (1-1)

A compound represented by formula (1-1) (compound (1-1)) will be explained.

(1-1)

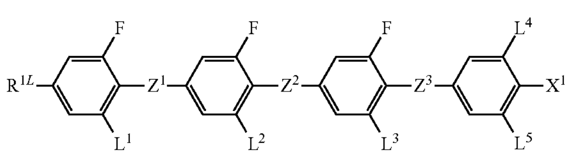

In formula (1-1), $R^{1L}$ is hydrogen, straight-chain alkyl having 1 to 20 carbons (arbitrary —$CH_2$— in the alkyl may be replaced by —S—, —COO— or —OCO—), straight-chain alkenyl having 2 to 20 carbons, straight-chain alkynyl having 2 to 20 carbons, straight-chain alkoxy having 1 to 20 carbons, straight-chain alkoxyalkyl having 2 to 20 carbons or straight-chain alkenyloxy having 2 to 20 carbons, and hydrogen in these groups (alkyl, alkenyl, alkynyl, alkoxy, alkoxyalkyl and alkenyloxy) may be replaced by halogen.

Specific examples of alkyl include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$C_{11}H_{23}$, —$C_{12}H_{25}$, —$C_{13}H_{27}$, —$C_{14}H_{29}$ and —$C_{15}H_{31}$.

The preferred configuration of —CH═CH— in alkenyl depends on the position of the double bond. A trans configuration is preferred in alkenyl having a double bond in an odd-numbered position, such as —CH═$CHCH_3$, —CH═$CHC_2H_5$, —CH═$CHC_3H_7$, —CH═$CHC_4H_9$, —$C_2H_4$—CH═$CHCH_3$ and —$C_2H_4$—CH═$CHC_2H_5$. A cis configuration is preferred in alkenyl having a double bond in an even-numbered position, such as —$CH_2CH$═$CHCH_3$, —$CH_2CH$═$CHC_2H_5$ and —$CH_2CH$═$CHC_3H_7$. An alkenyl compound having the preferred configuration has a high maximum temperature or a wide temperature range of the liquid-crystal phase. A detailed explanation is found in *Mol. Cryst. Liq. Cryst.,* 1985, 131, 109 and *Mol. Cryst. Liq. Cryst.,* 1985, 131, 327.

Specific examples of alkenyl include —CH═$CH_2$, —CH═$CHCH_3$, —$CH_2CH$═$CH_2$, —CH═$CHC_2H_5$, —$CH_2CH$═$CHCH_3$, —$(CH_2)_2$—CH═$CH_2$, —CH═$CHC_3H_7$, —$CH_2CH$═$CHC_2H_5$, —$(CH_2)_2$—CH═$CHCH_3$ and —$(CH_2)_3$—CH═$CH_2$.

Specific examples of alkynyl include —C≡CH, —C≡$CCH_3$, —$CH_2C$≡CH, —C≡$CC_2H_5$, —$CH_2C$≡$CCH_3$, —$(CH_2)_2$—C≡CH, —C≡$CC_3H_7$, $CH_2C$≡$CC_2H_5$, —$(CH_2)_2$—C≡$CCH_3$ and —C≡$C(CH_2)_5$.

Specific examples of alkoxy include —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$, —$OC_9H_{19}$, —$OC_{10}H_{21}$, —$OC_{11}H_{23}$, —$OC_{12}H_{25}$, —$OC_{13}H_{27}$ and —$OC_{14}H_{29}$.

Specific examples of alkoxyalkyl include —$CH_2OCH_3$, —$CH_2OC_2H_5$, —$CH_2OC_3H_7$, —$(CH_2)_2$—$OCH_3$, —$(CH_2)_2$—$OC_2H_5$, —$(CH_2)_2$—$OC_3H_7$, —$(CH_2)_3$—$OCH_3$, —$(CH_2)_4$—$OCH_3$ and —$(CH_2)_5$—$OCH_3$.

Specific examples of alkenyloxy include —$OCH_2CH$═$CH_2$, —$OCH_2CH$═$CHCH_3$ and —$OCH_2CH$═$CHC_2H_5$.

Moreover, $R^{1L}$ preferably has a structure represented by formulas (CHN-1) to (CHN-19). Herein, $R^{1a}$ is hydrogen or alkyl having 1 to 10 carbons. More preferred $R^{1L}$ has a structure represented by formulas (CHN-1) to (CHN-4) or (CHN-6) to (CHN-7).

(CHN-1)

$R^{1a}$—

(CHN-2)

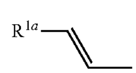

(CHN-3)

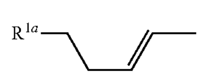

(CHN-4)

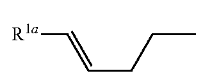

(CHN-5)

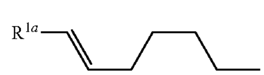

-continued (CHN-6)

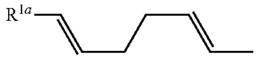

(CHN-7)

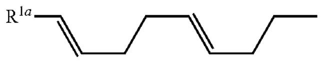

(CHN-8)

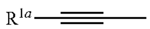

(CHN-9)

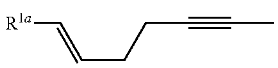

(CHN-10)

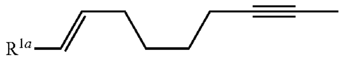

(CHN-11)

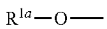

(CHN-12)

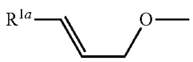

(CHN-13)

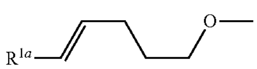

(CHN-14)

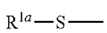

(CHN-15)

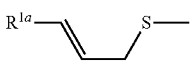

(CHN-16)

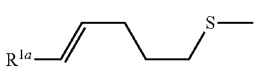

(CHN-17)

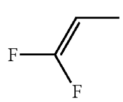

(CHN-18)

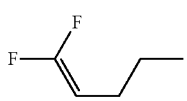

(CHN-19)

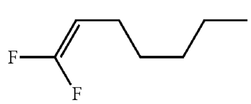

In formula (1-1), $Z^1$, $Z^2$ and $Z^3$ are independently a single bond or alkylene having 1 to 4 carbons, arbitrary —$CH_2$— in the alkylene may be replaced by —O—, —COO— or —$CF_2O$—, arbitrary —$CH_2$—$CH_2$— in the alkylene may be replaced by —CH═CH—, —CF═CF— or —C≡C—, and arbitrary hydrogen may be replaced by halogen, with a proviso that at least one of $Z^1$ to $Z^3$ is $CF_2O$.

Preferred examples of $Z^1$, $Z^2$ and $Z^3$ include a single bond and —$CF_2O$—.

In formula (1-1), $L^1$, $L^2$, $L^3$, $L^4$ and $L^5$ are independently hydrogen or fluorine. Moreover, $L^2$ and $L^4$ are preferably fluorine, and $L^2$, $L^4$ and $L^5$ are more preferably fluorine.

In formula (1-1), $X^1$ is halogen, —C≡N, —N═C═S, —$SF_5$ or alkyl having 1 to 3 carbons (arbitrary —$CH_2$— in the alkyl may be replaced by —S—, —COO— or —OCO—), alkenyl having 2 to 3 carbons, alkynyl having 2 to 3 carbons, alkoxy having 1 to 3 carbons, alkoxyalkyl having 2 to 3 carbons or alkenyloxy having 2 to 3 carbons, and hydrogen in the groups (alkyl, alkenyl, alkynyl, alkoxy, alkoxyalkyl and alkenyloxy) may be replaced by halogen.

Specific examples of alkyl in which arbitrary hydrogen is replaced by halogen include —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F and —$(CF_2)_5$—F.

Specific examples of alkoxy in which arbitrary hydrogen is replaced by halogen include —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —O$(CH_2)_4$—F, —O—$(CF_2)_4$—F, —O—$(CH_2)_5$—F and —O—$(CF_2)_5$—F.

Specific examples of alkenyl in which arbitrary hydrogen is replaced by halogen include —CH═CHF, —CH═$CF_2$, —CF═CHF, —CH═$CHCH_2F$, —CH═$CHCF_3$, —$(CH_2)_2$—CH═$CF_2$, —$CH_2CH$═$CHCF_3$, —CH═$CHCF_3$ and —CH═$CHCF_2CF_3$.

Specific examples of $X^1$ include fluorine, chlorine, —C≡N, —N═C═S, —$SF_5$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$. —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_3$, —$OC_2H_5$, —$OC_3H_7$, —$OC_4H_9$, —$OC_5H_{11}$, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —O$(CH_2)_4$—F, —O—$(CF_2)_4$—F, —O—$(CH_2)_5$—F, —O—$(CF_2)_5$—F, —CH═$CH_2$, —CH═$CHCH_3$, —$CH_2CH$═$CH_2$, —CH═$CHC_2H_5$, —$CH_2CH$═$CHCH_3$, —$(CH_2)_2$—CH═$CH_2$, —CH═$CHC_3H_7$, —$CH_2CH$═$CHC_2H_5$, —$(CH_2)_2$—CH═$CHCH_3$, $(CH_2)_3$—CH═$CH_2$, —CH═CHF, —CH═$CF_2$, —CF═CHF, —CH═$CHCH_2F$, —CH═$CHCF_3$, —$(CH_2)_2$—CH═$CF_2$, —CH═$CHCF_3$, —$CH_2CH$═$CHCF_3$ and —CH═$CHCF_2CF_3$.

Preferred examples of formula (1-1) include the structures represented by formulas (1-1-1) to (1-1-3). More preferred examples include the structures represented by formulas (1-1-2) and (1-1-3).

(1--1-1)

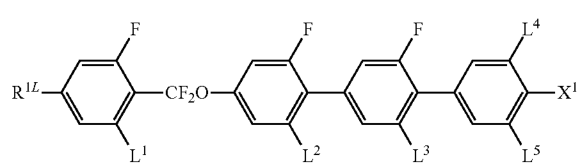

(1--1-2)

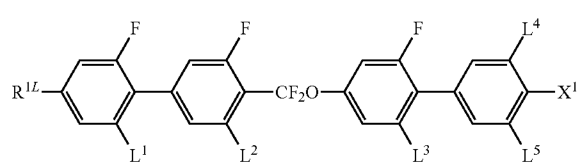

(1-1-3)

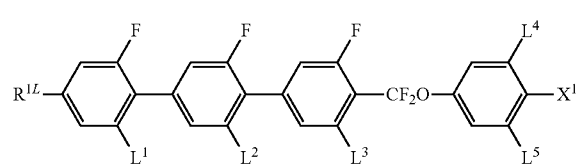

In formulas (1-1-1) to (1-1-3), $R^{1L}$ is a structure represented by any one of formulas (CHN-1) to (CHN-19), $R^{1a}$ in formulas (CHN-1) to (CHN-19) is hydrogen or alkyl having 1 to 20 carbons, $L^1$, $L^2$, $L^3$, $L^4$ and $L^5$ are independently hydrogen or fluorine, and $X^1$ is fluorine, chlorine, —$CF_3$, —$CHF_2$, —$OCF_3$, —$OCHF_2$, —C≡C—$CF_3$, —CH═$CHCF_3$ or —$OCF_2CFHCF_3$.

(2) Properties of Compound (1-1)

Compound (1-1) used in the invention will be explained in more details. Compound (1-1) has four benzene rings and at least one —$CF_2O$— linking group. The compound is physically and chemically very stable under conditions in which the device is ordinarily used, and has a good compatibility with other liquid-crystal compounds. A composition containing the compound is stable under conditions in which the device is ordinarily used. Accordingly, the temperature range of a cholesteric phase can be expanded in the composition, and the compound can be used in a display device in a wide temperature range. Furthermore, the compound has a large dielectric anisotropy and a large refractive index anisotropy, and therefore is useful as a component for decreasing the driving voltage and increasing the reflectance of the composition driven in the cholesteric phase.

Physical properties such as a clearing point, refractive index anisotropy and dielectric anisotropy can be arbitrarily adjusted by suitably selecting the left-terminal group $R^{1L}$, the groups ($L^1$ to $L^5$, and $X^1$) on the benzene ring or the bonding groups $Z^1$ to $Z^3$ in compound (1-1). The effects of the species of the left-terminal group $R^{1L}$, the groups ($L^1$ to $L^5$, and $X^1$) on the benzene ring or the bonding groups $Z^1$ to $Z^3$ on the physical properties of compound (1) will be explained below.

When $R^{1L}$ is alkenyl, the preferred configuration depends on the position of the double bond. An alkenyl compound having the preferred configuration has a high maximum temperature or a wide temperature range of the liquid-crystal phase.

When the bonding groups $Z^1$, $Z^2$ and $Z^3$ each are a single bond or —$CF_2O$—, compound (1-1) has a small viscosity. When the bonding groups $Z^1$, $Z^2$ and $Z^3$ each are —COO— or —$CF_2O$—, compound (1-1) has a large dielectric anisotropy. When $Z^1$, $Z^2$ and $Z^3$ each area single bond or —$CF_2O$—, compound (1-1) is relatively chemically stable and relatively hard to cause degradation.

When the right-terminal group $X^1$ is fluorine, chlorine, —$SF_5$, —$CF_3$, —$CHF_2$, —$CH_2F$, —$OCF_3$, —$OCHF_2$ or —$OCH_2F$, compound (1-1) has a large dielectric anisotropy. When $X^1$ is fluorine, —$OCF_3$ or —$CF_3$, compound (1-1) is chemically stable.

When the number of fluorine in $L^1$ to $L^5$ is large, compound (1-1) has a large dielectric anisotropy. When $L^1$ is hydrogen, compound (1-1) has an excellent compatibility with other liquid-crystal compounds. When both $L^4$ and $L^5$ are fluorine, compound (1-1) has a particularly large dielectric anisotropy.

As described above, a compound having objective physical properties can be obtained by suitably selecting the species of the terminal groups, the bonding groups and so on.

(3) Specific Examples of Compound (1-1)

Preferred examples of the compound (1-1) include compounds represented by formulas (1-1-1) to (1-1-3). More preferred examples include compounds represented by formulas (1-1-2A) to (1-1-2H) and (1-1-3A) to (1-1-3C). Still more preferred examples include compounds represented by formulas (1-1-2A) to (1-1-2D), (1-1-3A) and (1-1-3B). Most preferred examples include those represented by formulas (1-1-2A), (1-1-2C) and (1-1-3A).

(1-1-2A)

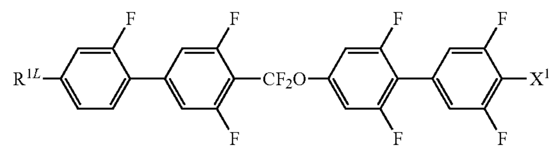

(1-1-2B)

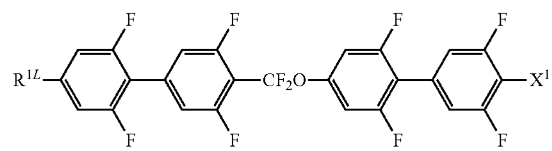

(1-1-2C)

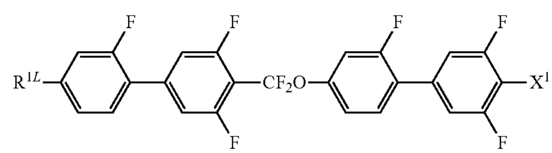

(1-1-2D)

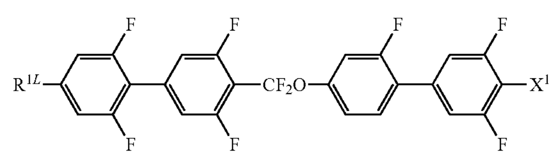

(1-1-2E)

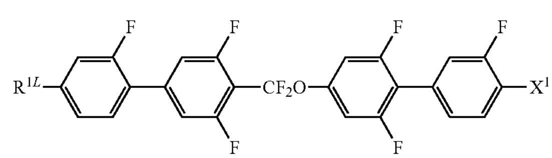

(1-1-2F)

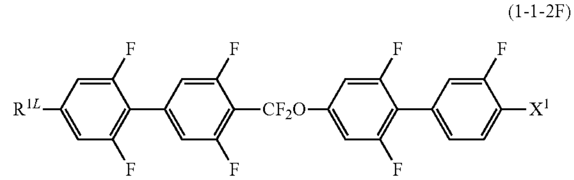

-continued (1-1-2G)

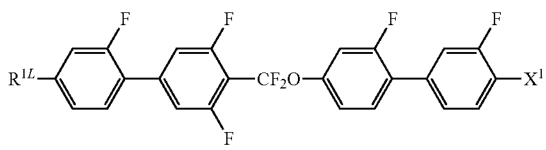

(1-1-2H)

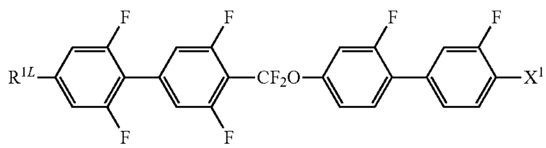

(1-1-3A)

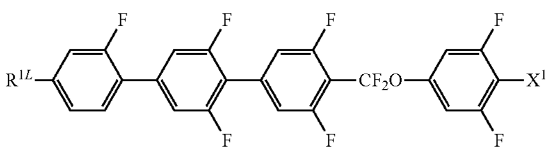

(1-1-3B)

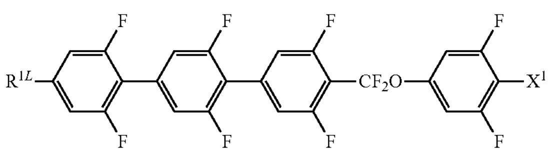

(1-1-3C)

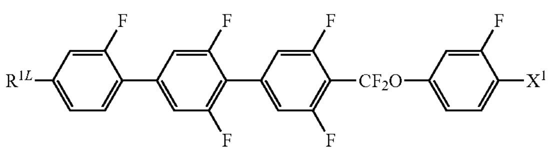

(1-1-3D)

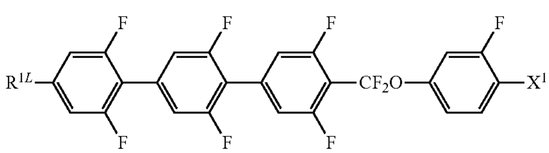

In the formulas, $R^{1L}$ has the structure represented by formula (CHN-1), (CHN-4), (CHN-7), (CHN-8) or (CHN-11), and $X^1$ is fluorine, chlorine, —$CF_3$, —$CHF_2$, —$CH_2F$, —$OCF_3$, —$OCHF_2$, —$OCF_2CFHCF_3$ or —CH═$CHCF_3$.

1.1.2 Compound (1-2)

(1) Compound (1-2)

The compound represented by formula (1-2) will be explained:

wherein, in formula (1-2), $R^{1L}$ is hydrogen, straight-chain alkyl having 1 to 20 carbons (arbitrary —$CH_2$— in the alkyl may be replaced by —S—, —COO— or —OCO—), straight-chain alkenyl having 2 to 20 carbons, straight-chain alkynyl having 2 to 20 carbons, straight-chain alkoxy having 1 to 20 carbons, straight-chain alkoxyalkyl having 2 to 20 carbons or straight-chain alkenyloxy having 2 to 20 carbons, and hydrogen in the groups (alkyl, alkenyl, alkynyl, alkoxy, alkoxyalkyl and alkenyloxy) may be replaced by halogen.

The alkyl, the alkenyl, the alkynyl, the alkoxy, the alkoxyalkyl and the alkenyloxy in $R^{1L}$ in formula (1-2) are defined in the same way as the alkyl, the alkenyl, the alkynyl, the alkoxy, the alkoxyalkyl and the alkenyloxy in $R^{1L}$ in formula (1-1).

In formula (1-2), $Z^1$, $Z^2$, $Z^3$, $Z^4$, $Z^5$ and $Z^6$ are independently a single bond or alkylene having 1 to 4 carbons, arbitrary —$CH_2$— in the alkylene may be replaced by —O—, —COO— or —$CF_2O$—, arbitrary —$CH_2$—$CH_2$— in the alkylene may be replaced by —CH═CH—, —CF═CF— or —C≡C—, and arbitrary hydrogen may be replaced by halogen, with a proviso that at least one of $Z^1$ to $Z^6$ is $CF_2O$.

Preferred examples of $Z^1$, $Z^2$, $Z^3$, $Z^4$, $Z^5$ and $Z^6$ Z include a single bond and —$CF_2O$—.

In formula (1-2), $L^1$, $L^2$, $L^3$, $L^4$ and $L^5$ are independently hydrogen or fluorine. When $L^1$ is hydrogen, compound (1-2) has a low melting point and an excellent compatibility with other liquid-crystal compounds. When $L^1$ is fluorine, compound (1-2) has a large dielectric anisotropy. $L^4$ is preferably fluorine. More preferably, both of $L^4$ and $L^5$ are fluorine.

In formula (1-2), $X^1$ is halogen, —C≡N, —N═C═S, —$SF_5$ or alkyl having 1 to 3 carbons (arbitrary —$CH_2$— in alkyl may be replaced by —S—, —COO— or —OCO—), alkenyl having 2 to 3 carbons, alkynyl having 2 to 3 carbons, alkoxy having 1 to 3 carbons, alkoxyalkyl having 2 to 3 carbons or alkenyloxy having 2 to 3 carbons, and hydrogen in these groups (alkyl, alkenyl, alkynyl, alkoxy, alkoxyalkyl and alkenyloxy) may be replaced by halogen.

The alkyl, the alkenyl, the alkynyl, the alkoxy, the alkoxyalkyl and the alkenyloxy in $X^1$ in formula (1-2) are defined in the same way as the alkyl, the alkenyl, the alkynyl, the alkoxy, the alkoxyalkyl and the alkenyloxy in $X^1$ in formula (1-1).

In formula (1-2), m, n, o and p are independently 0 or 1, and the inequality of $1 \leq m+n+o+p \leq 2$ applies.

Preferred structures of formula (1-2) are represented by formulas (1-2-1) to (1-2-5).

(1-2)

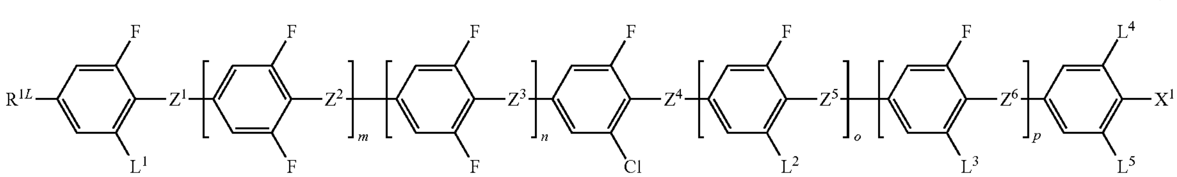

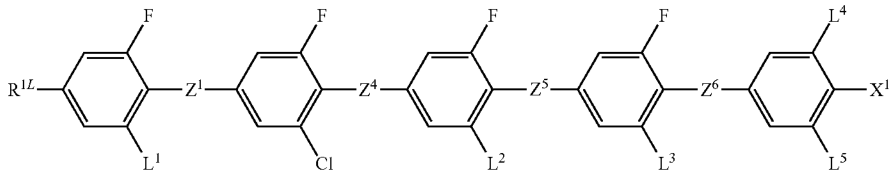
(1-2-1)

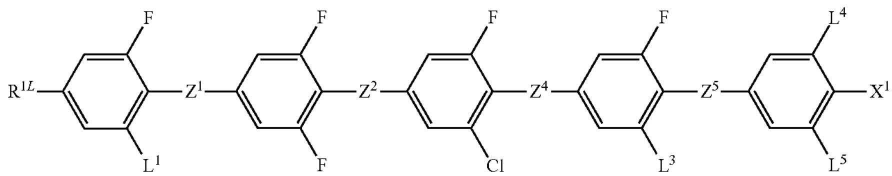
(1-2-2)

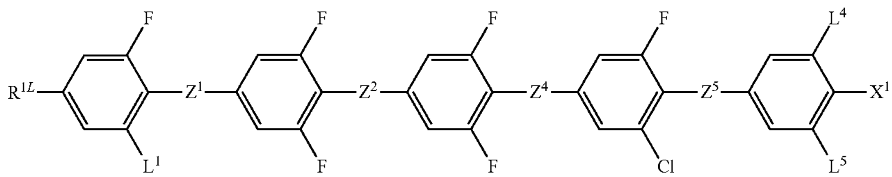
(1-2-3)

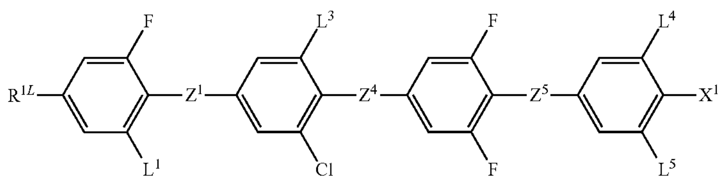
(1-2-4)

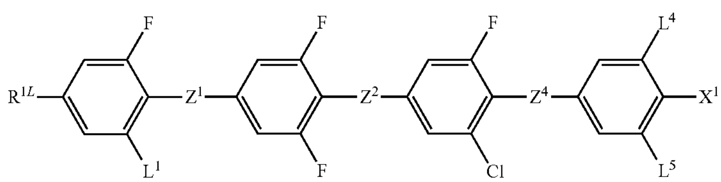
(1-2-5)

In the formulas, $R^{1L}$ is alkyl having 1 to 20 carbons, alkenyl having 2 to 21 carbons, alkynyl having 2 to 21 carbons, alkoxy having 1 to 19 carbons, alkenyloxy having 2 to 20 carbons, alkylthio having 1 to 19 carbons, alkenylthio having 2 to 19 carbons or —$(CH_2)_v$—CH═$CF_2$, wherein v is an integer of 0 or 1 to 19; $Z^1$, $Z^2$, $Z^3$, $Z^4$, $Z^5$ and $Z^6$ are independently a single bond or —$CF_2O$—, with a proviso that at least one of $Z^1$, $Z^2$, $Z^3$, $Z^4$, $Z^5$ and $Z^6$ is —$CF_2O$—; $L^1$, $L^2$, $L^3$, $L^4$ and $L^5$ are independently hydrogen or fluorine; and $X^1$ is halogen, —$SF_5$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —$O(CH_2)_4$—F, —O—$(CF_2)_4$—F, —O—$(CH_2)_5$—F, —O—$(CF_2)_5$—F, —CH═CHF, —CH═$CF_2$, —CF═CHF, —CH═$CHCH_2F$, —CH═$CHCF_3$, —$(CH_2)_2$—CH═$CF_2$, —$CH_2CH$═CHCF3 or —CH═$CHCF_2CF_3$.

Among the compounds, the preferred ones include the compounds in which $R^{1L}$ has a structure represented by any one of formulas (CHN-1) to (CHN-6), $R^{1a}$ is hydrogen or alkyl having 1 to 20 carbons, $Z^1$, $Z^2$, $Z^3$, $Z^4$, $Z^5$ and $Z^6$ are independently a single bond or —$CF_2O$— with a proviso that at least one of $Z^1$, $Z^2$, $Z^3$, $Z^4$, $Z^5$ and $Z^6$ is —$CF_2O$—, $L^1$, $L^2$, $L^3$, $L^4$ and $L^5$ are independently hydrogen or fluorine, and $X^1$ is fluorine, chlorine, —$CF_3$, —$CHF_2$, —$OCF_3$, —$OCHF_2$, —$OCH_2F$ or —C≡C—$CF_3$.

Among the compounds represented by formulas (1-2-1) to (1-2-5), the more preferred ones include the compounds represented by formulas (1-2-1-1) to (1-2-1-3), (1-2-2-1) to (1-2-2-3), (1-2-3-1) to (1-2-3-3), (1-2-4-1) to (1-2-4-3) and (1-2-5-1) to (1-2-5-3). Still more preferred examples include the compounds represented by formulas (1-2-1-1), (1-2-1-2), (1-2-2-1), (1-2-2-2), (1-2-3-1), (1-2-3-2), (1-2-4-2), (1-2-4-3) and (1-2-5-3).

(1-2-1-1)
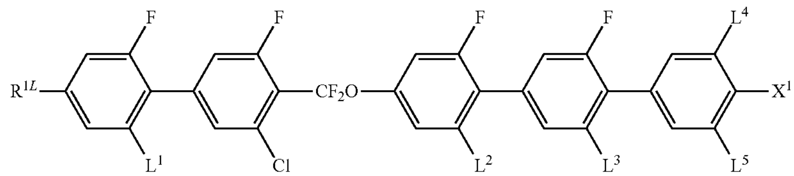
(1-2-1-2)
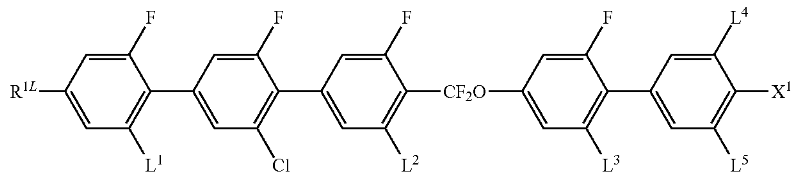
(1-2-1-3)
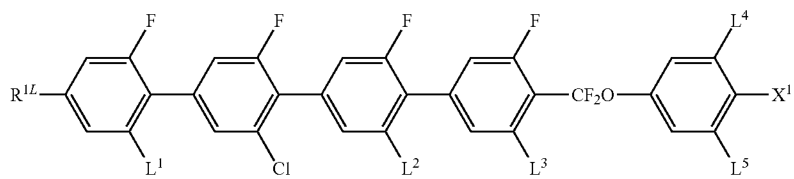
(1-2-2-1)
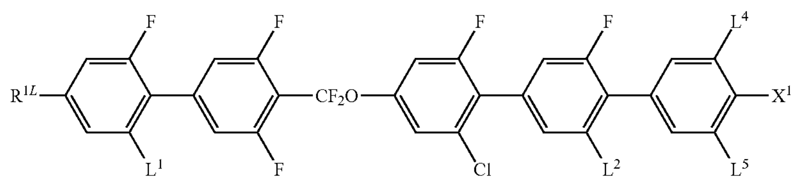
(1-2-2-2)
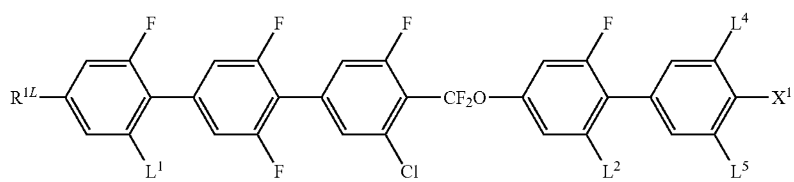
(1-2-2-3)
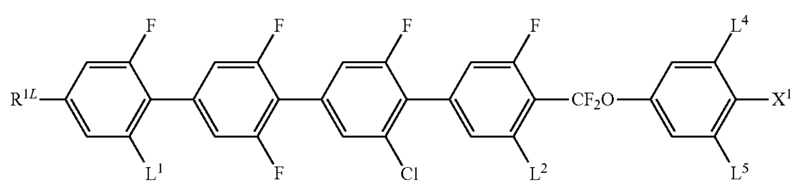
(1-2-3-1)
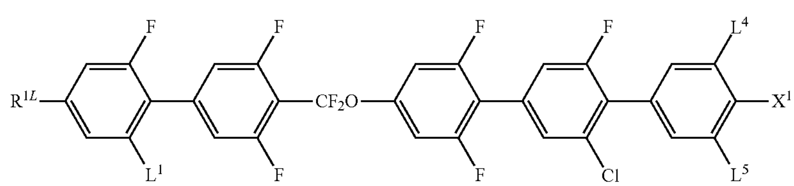
(1-2-3-2)
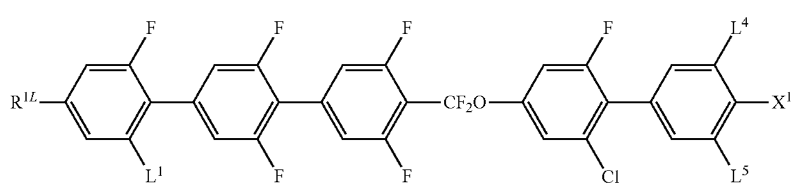

-continued (1-2-3-3)

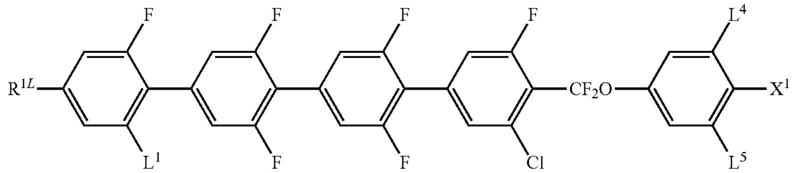

(1-2-4-1)

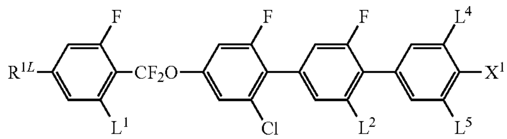

(1-2-4-2)

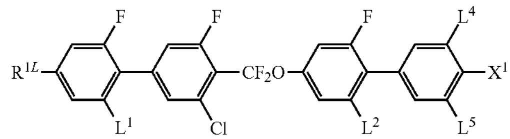

(1-2-4-3)

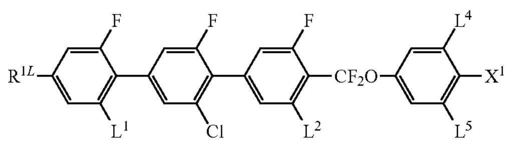

(1-2-5-1)

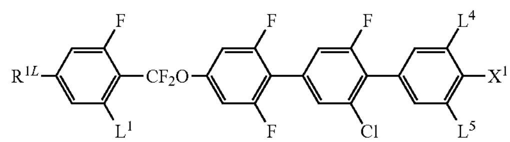

(1-2-5-2)

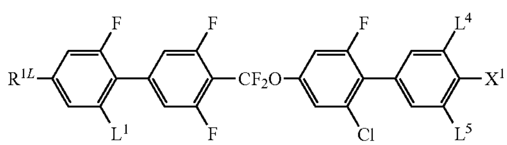

(1-2-5-3)

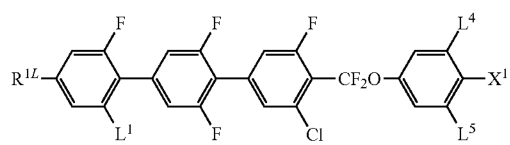

In the formulas, $R^{1L}$, $L^1$, $L^2$, $L^3$, $L^4$, $L^5$ and $X^1$ are defined as in the cases of formulas (1-2-1) to (1-2-5).

(2) Properties of Compound (1-2)

Compound (1-2) used in the invention will be explained in more details. Compound (1-2) is a liquid-crystal compound having a chlorobenzene ring. The compound is physically and chemically very stable under conditions in which the device is ordinarily used, and has a good compatibility with other liquid-crystal compounds. The compound is also hard to exhibit a smectic phase. A composition containing the compound is stable under conditions in which the device is ordinarily used. Accordingly, the temperature range of the cholesteric phase of the composition can be expanded, and the compound can be used in a display device in a wide temperature range. Furthermore, the compound has a large dielectric anisotropy and a large refractive index anisotropy, and therefore is useful as a component for decreasing the driving voltage and increasing the reflectance of the composition driven in the cholesteric phase.

Physical properties such as a clearing point, refractive index anisotropy and dielectric anisotropy can be arbitrarily adjusted by suitably selecting a combination of m, n, o and p, the left-terminal group $R^{1L}$, the group on the rightmost benzene ring and the substitution position thereof ($L^1$, $L^2$ and $X^1$), or the bonding groups $Z^1$ to $Z^6$ of compound (1-2). The effects of the combination of m, n, o and p, the left-terminal group $R^{1L}$, the right-terminal group $X^1$, the bonding groups $Z^1$ to $Z^6$, and $L^1$ to $L^5$ on the physical properties of compound (1-2) are explained below.

In general, a compound of m+n+o+p=2 has a high clearing point, and a compound of m+n+o+p=1 has a low melting point.

When $R^{1L}$ is alkenyl, the preferred configuration depends on the position of the double bond. An alkenyl compound having the preferred configuration has a high maximum temperature or a wide temperature range of the liquid-crystal phase.

The bonding groups $Z^1$, $Z^2$ and $Z^3$ each are a single bond or —$CF_2O$—, and therefore compound (1-2) is relatively chemically stable, and relatively hard to cause degradation. Furthermore, when the bonding groups each are a single bond, compound (1-2) has a low viscosity. Moreover, when the bonding groups each are —$CF_2O$—, compound (1-2) has a large dielectric anisotropy.

When the right-terminal group $X^1$ is fluorine, chlorine, —$SF_5$, —$CF_3$, —$OCF_3$ or —CH═CH—$CF_3$, compound (1-2) has a large dielectric anisotropy. When $X^1$ is fluorine, —$OCF_3$ or —$CF_3$, compound (1-2) is chemically stable.

When $L^1$ is hydrogen, compound (1-2) is has a low melting point. When $L^1$ is fluorine, compound (1-2) has a large dielectric anisotropy. When both $L^4$ and $L^5$ are fluorine, compound (1-2) has a particularly large dielectric anisotropy.

As described above, a compound having objective physical properties can be obtained by suitably selecting the species of the ring structures, the terminal groups, the bonding groups and so on.

(3) Specific Example of Compound (1-2)

Preferred examples of compound (1-2) are those represented by formulas (1-2-1) to (1-2-5). More preferred examples are those represented by formulas (1-2-1-1) to (1-2-1-3), (1-2-2-1) to (1-2-2-3), (1-2-3-1) to (1-2-3-3), (1-2-4-1) to (1-2-4-3) and (1-2-5-1) to (1-2-5-3). Still more preferred examples are those represented by formulas (1-2-1-1), (1-2-1-2), (1-2-2-1), (1-2-2-2), (1-2-3-1), (1-2-3-2), (1-2-4-2), (1-2-4-3) and (1-2-5-3). Specific examples of the compounds include those represented by the following formulas.

(1-2-1-1-a)
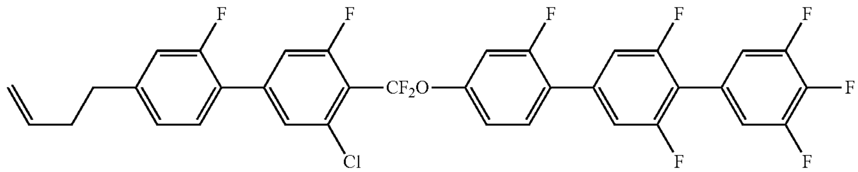
(1-2-1-1-a)
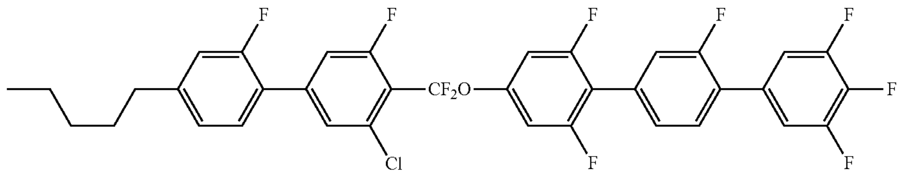
(1-2-1-1-c)
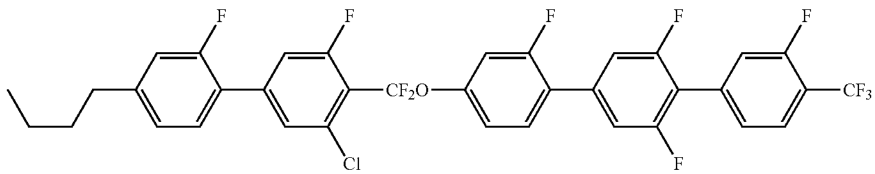
(1-2-1-1-d)
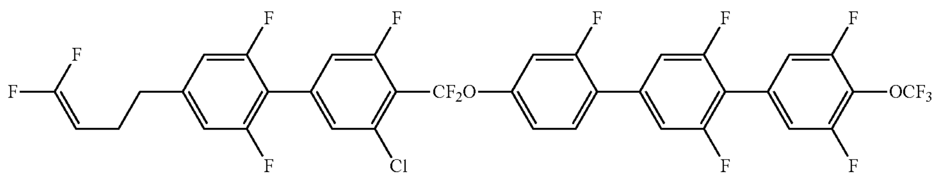
(1-2-1-1-e)
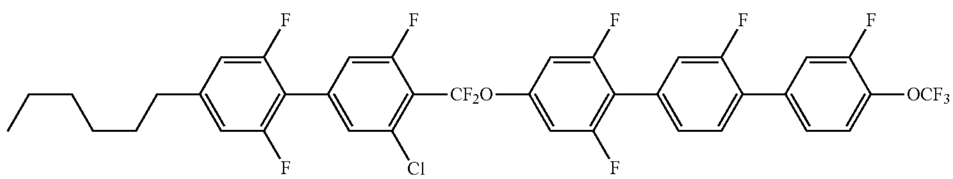
(1-2-1-1-f)
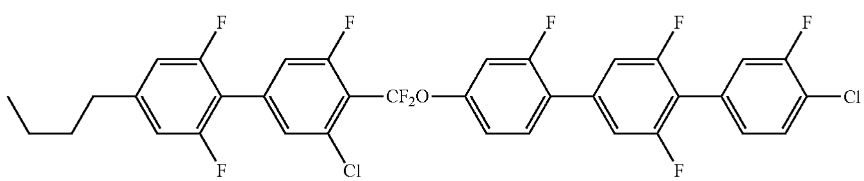
(1-2-1-2-a)
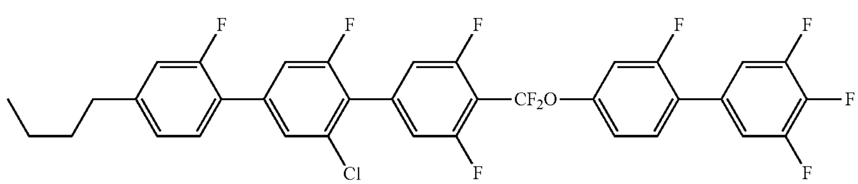
(1-2-1-2-b)
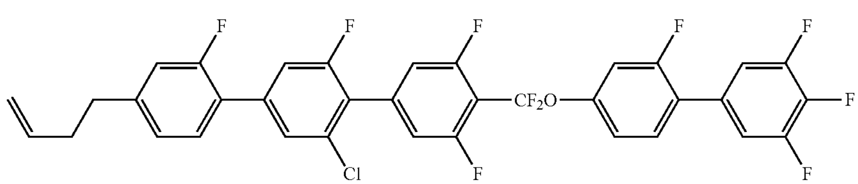
(1-2-1-2-c)
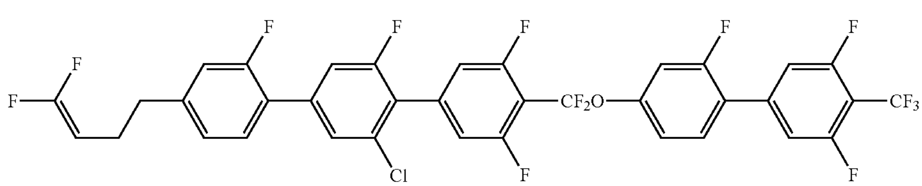

-continued
(1-2-1-2-d)
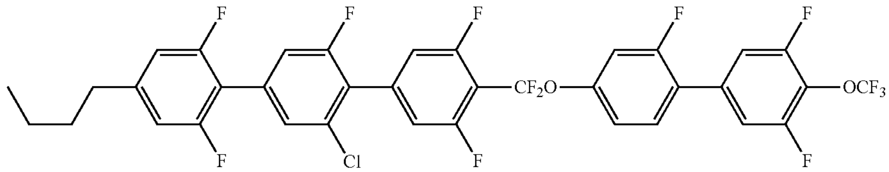
(1-2-1-2-e)
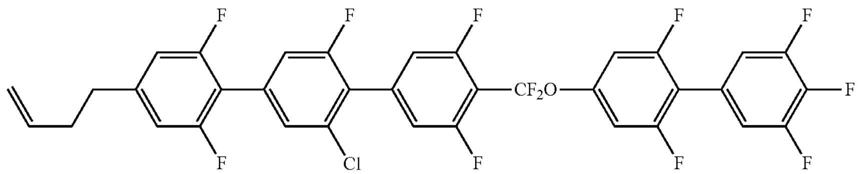
(1-2-1-2-f)
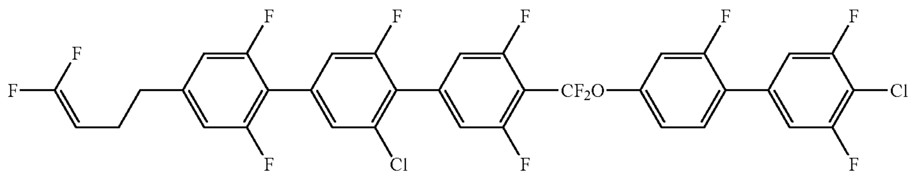
(1-2-2-1-a)
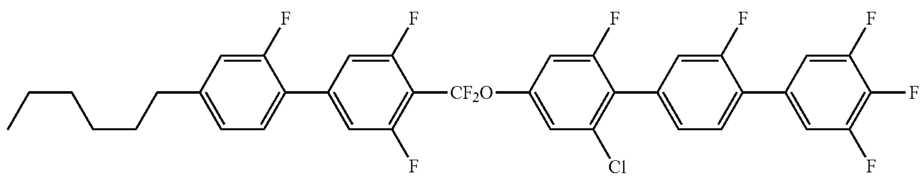
(1-2-2-1-b)
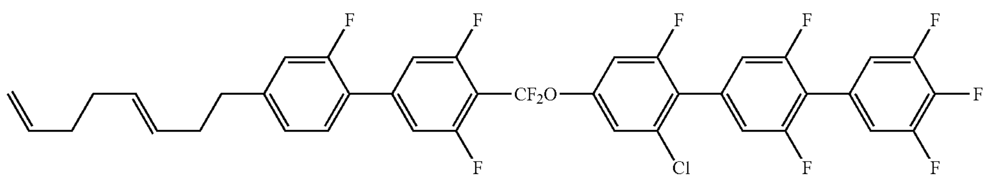
(1-2-2-1-c)
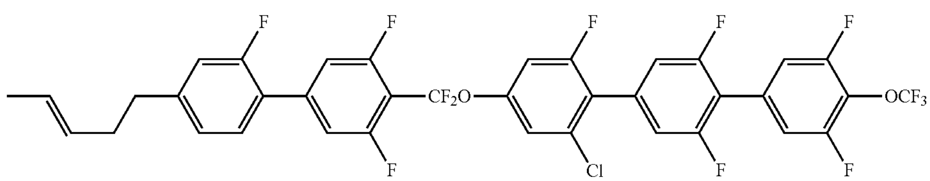
(1-2-2-1-d)
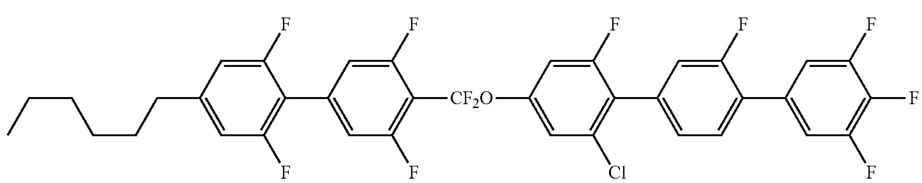
(1-2-2-1-e)
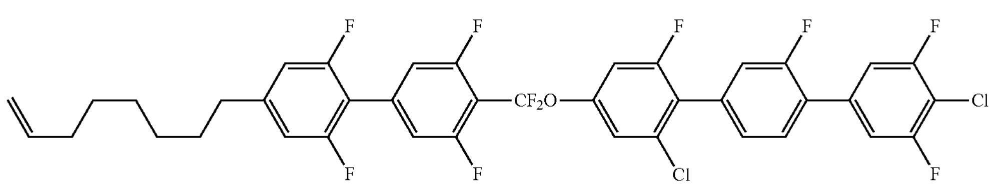
(1-2-2-1-f)
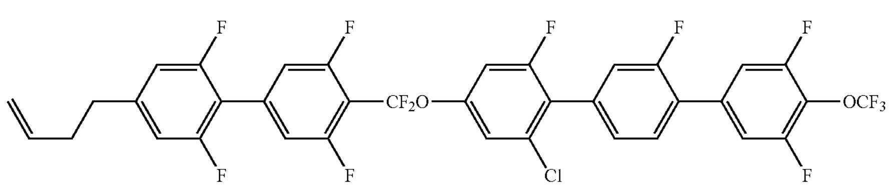

-continued
(1-2-2-2-a)
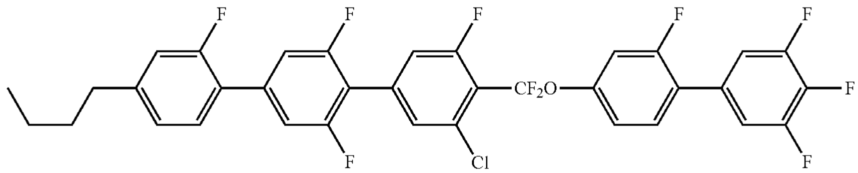
(1-2-2-2-b)
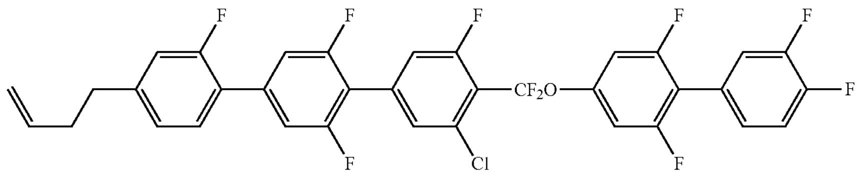
(1-2-2-2-c)
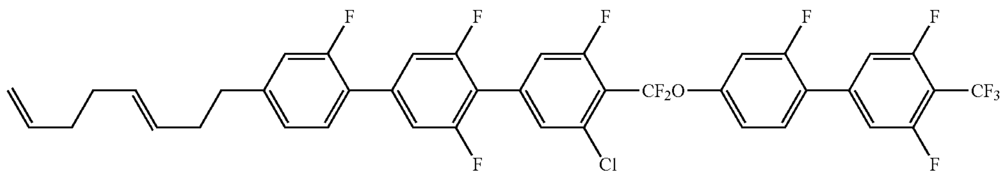
(1-2-2-2-d)
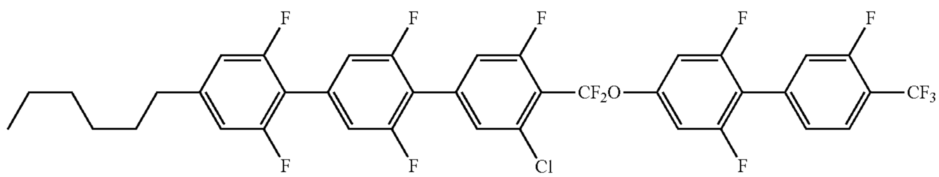
(1-2-2-2-e)
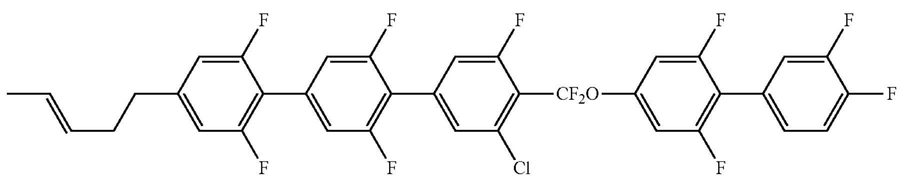
(1-2-2-2-f)
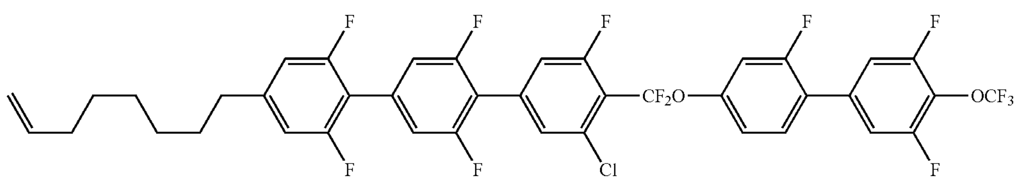
(1-2-3-1-a)
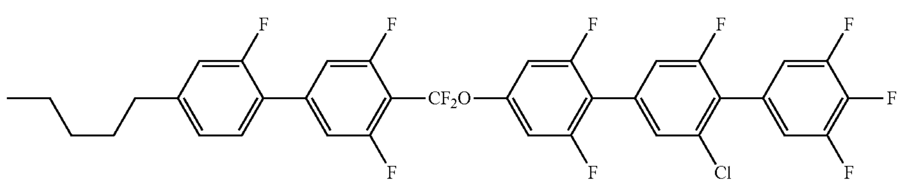
(1-2-3-1-b)
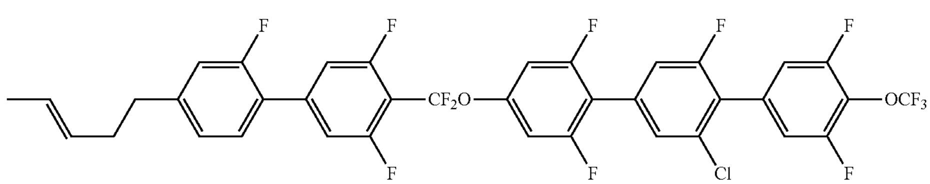
(1-2-3-1-c)
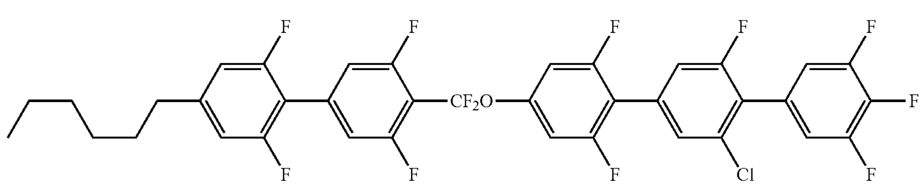

-continued
(1-2-3-1-d)
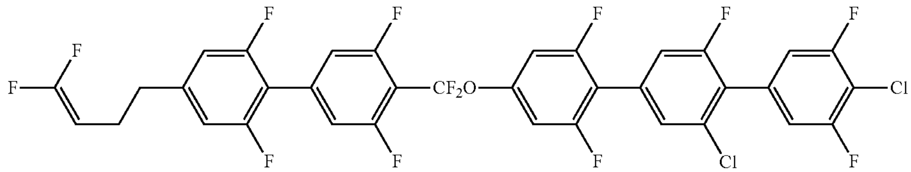
(1-2-3-2-a)
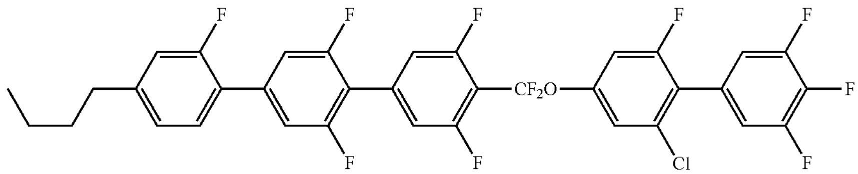
(1-2-3-2-b)
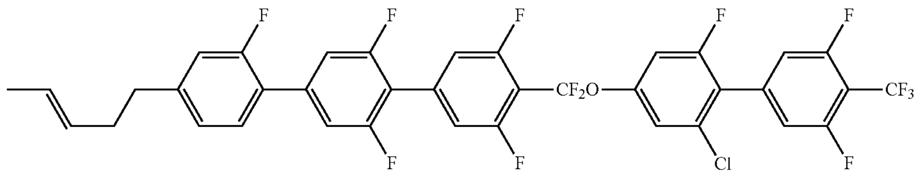
(1-2-3-2-c)
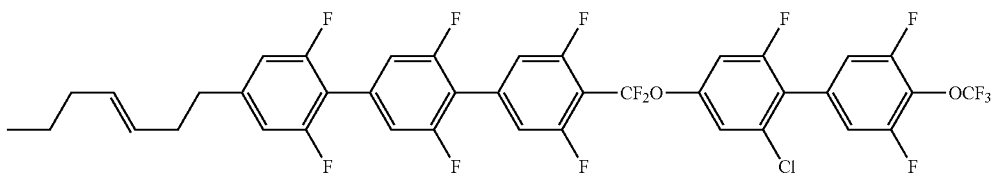
(1-2-3-2-d)
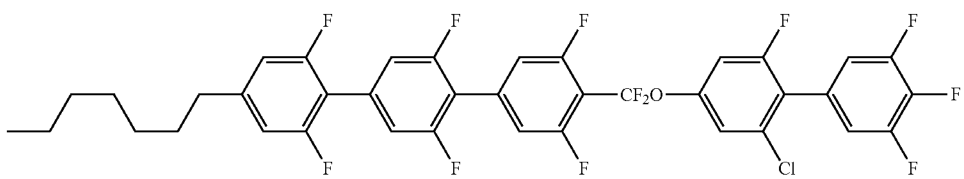
(1-2-4-2-a)
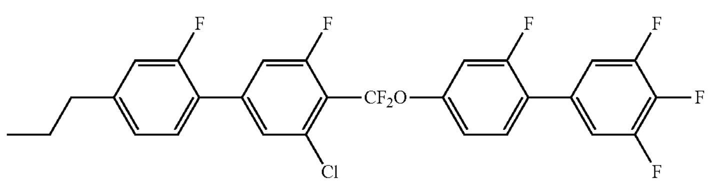
(1-2-4-2-b)
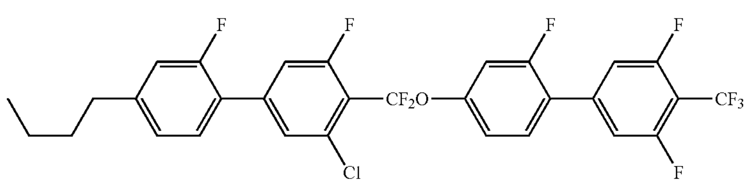
(1-2-4-2-c)
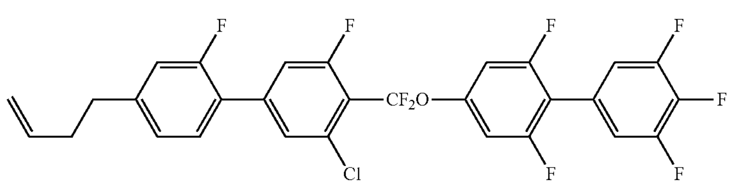
(1-2-4-2-d)
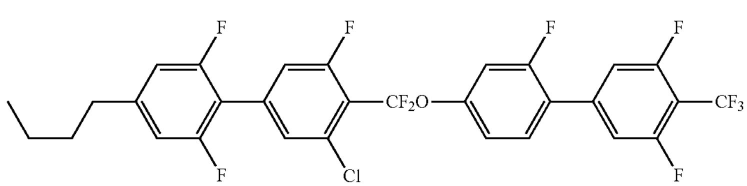

-continued
(1-2-3-2-e)
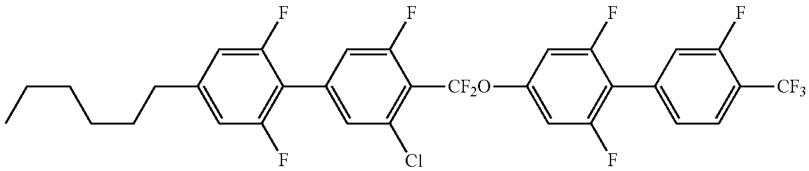
(1-2-4-2-f)
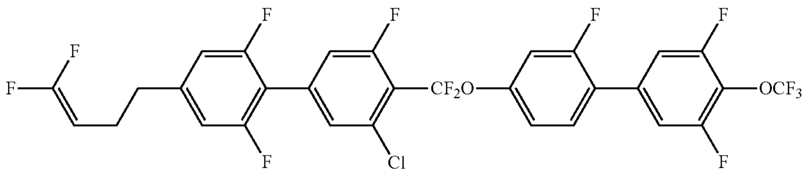
(1-2-4-3-a)
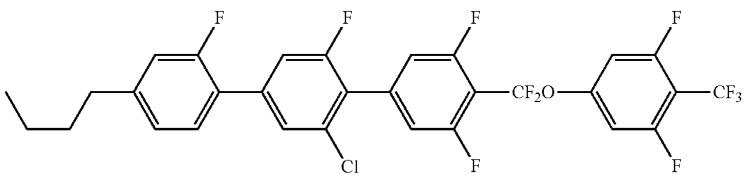
(1-2-4-3-b)
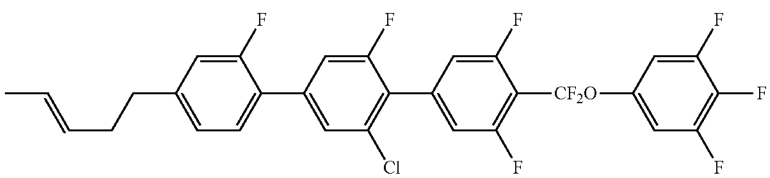
(1-2-4-3-c)
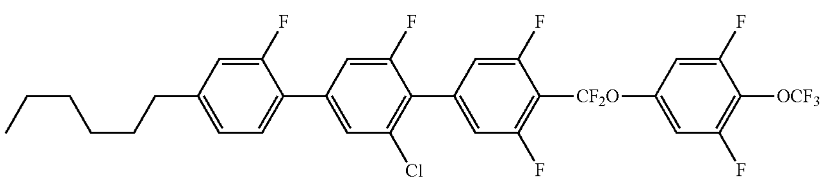
(1-2-4-3-d)
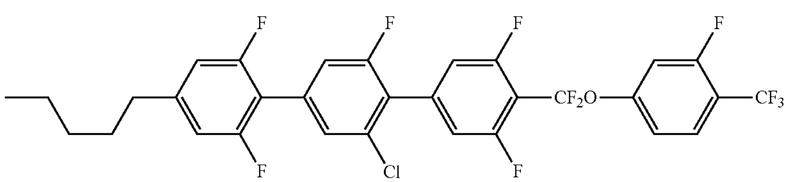
(1-2-4-3-e)
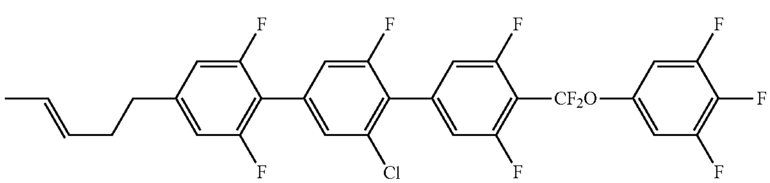
(1-2-4-3-f)
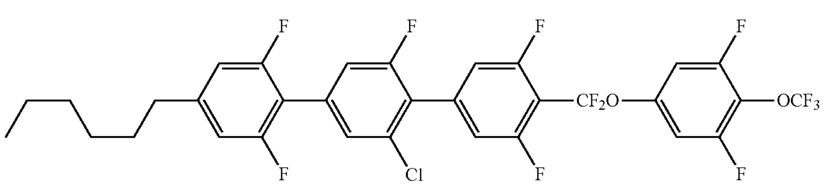
(1-2-5-3-a)
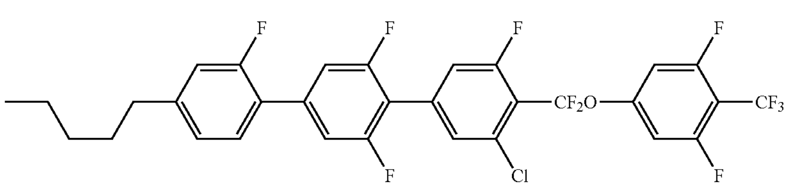

-continued (1-2-5-3-b)

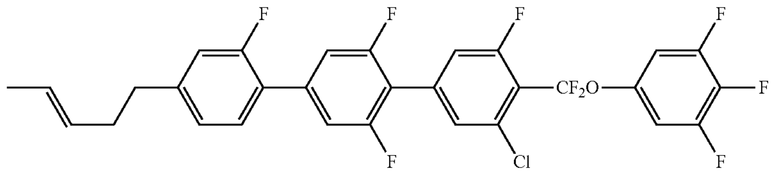

(1-2-5-3-c)

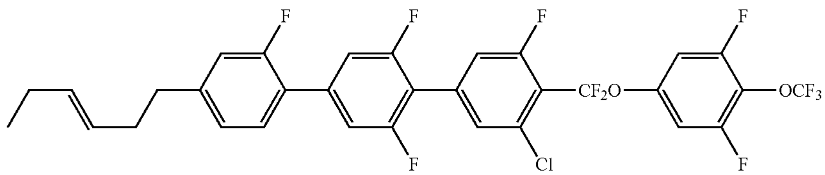

(1-2-5-3-d)

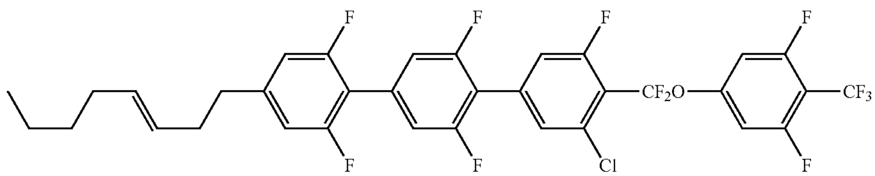

(1-2-5-3-e)

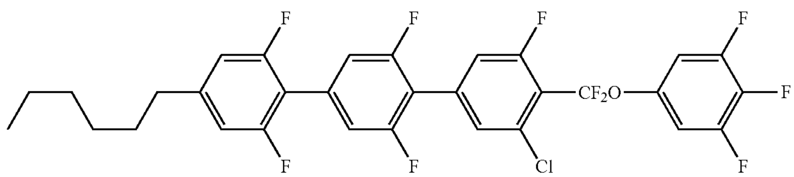

(1-2-5-3-f)

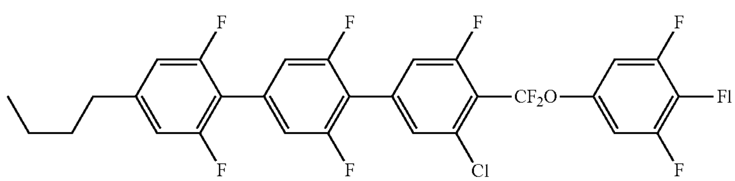

1.1.3 Compound (1-3)

(1) Compound (1-3)

The compound represented by formula (1-3) will be explained:

(1-3)

$$R^{1D}—A^1—(Z^1—A^2)_m—(Z^2—A^3)_n—(Z^3—A^4)_p—Z^4—A^5—X^1$$

wherein, in formula (1-3), $R^{1D}$ is branched alkyl having 3 to 20 carbons, branched alkenyl having 3 to 20 carbons, branched alkoxy having 3 to 20 carbons or branched alkenyloxy having 3 to 20 carbons, arbitrary $—CH_2—CH_2—$ in the branched alkyl or the branched alkenyl may be replaced by —CH═CH—, —CF═CF— or —C≡C—, and arbitrary hydrogen in the branched alkyl, the branched alkenyl, the branched alkoxy and the branched alkenyloxy may be replaced by fluorine.

Specific examples of the branched alkyl are shown by the following formulas (CHN1-1) to (CHN1-9):

(CHN 1-1)

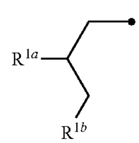

(CHN 1-2)

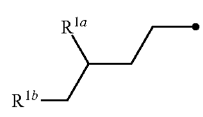

(CHN 1-3)

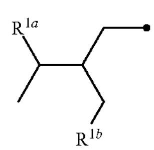

(CHN 1-4)

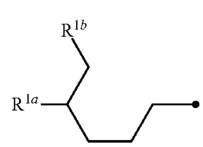

-continued (CHN 1-5)

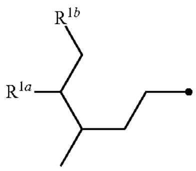

(CHN 1-6)

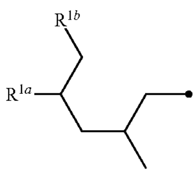

(CHN 1-7)

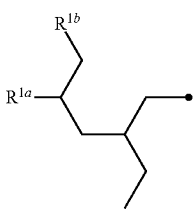

(CHN 1-8)

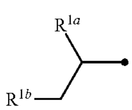

(CHN 1-9)

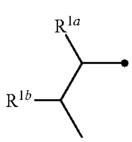

wherein, in formulas (CHN1-1) to (CHN1-9), $R^{1a}$ is alkyl having 1 to 10 carbons, arbitrary —$CH_2$— in the alkyl may be replaced by —O—, and arbitrary —$CH_2$—$CH_2$— in the alkyl may be replaced by —CH═CH—; $R^{1b}$ is hydrogen or alkyl having 1 to 10 carbons, arbitrary —$CH_2$— in the alkyl may be replaced by —O—, and arbitrary —$CH_2$—$CH_2$— in the alkyl may be replaced by —CH═CH—.

Features of a compound having branched alkyl depend on the branching position. An alkyl compound branched on a carbon at 2-position, 3-position, 4-position or 1-position as in formulas (CHN1-1) to (CHN-9) shows a much lower melting point, as compared with a straight-chain compound.

Specific examples of the branched alkenyl are shown by the following formulas (CHN2-1) to (CHN2-32):

(CHN 2-1)

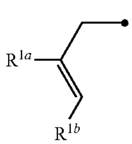

(CHN 2-2)

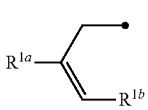

-continued (CHN 2-3)

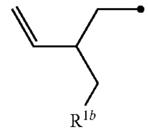

(CHN 2-4)

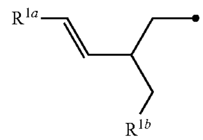

(CHN 2-5)

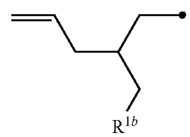

(CHN 2-6)

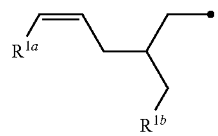

(CHN 2-7)

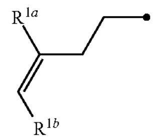

(CHN 2-8)

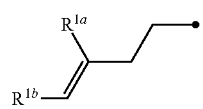

(CHN 2-9)

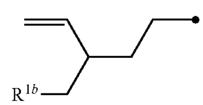

(CHN 2-10)

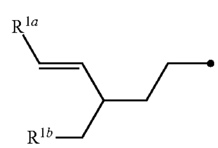

(CHN-2-11)

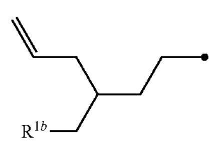

(CHN 2-12)

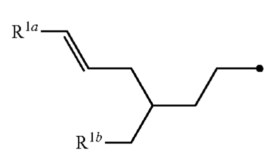

(CHN 2-13)

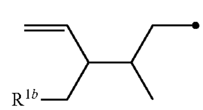

-continued (CHN 2-14)

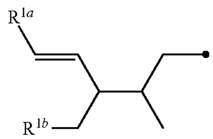

(CHN 2-15)

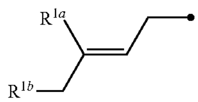

(CHN 2-16)

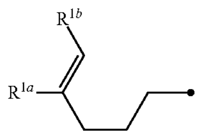

(CHN 2-17)

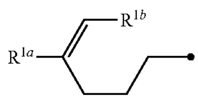

(CHN 2-18)

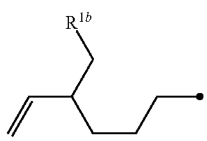

(CHN 2-19)

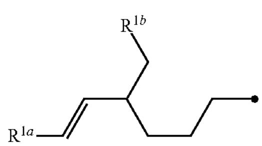

(CHN 2-20)

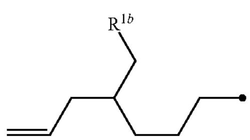

(CHN 2-21)

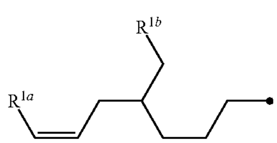

(CHN 2-22)

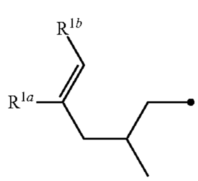

(CHN 2-23)

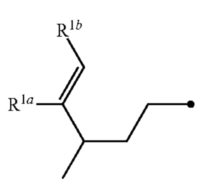

(CHN 2-24)

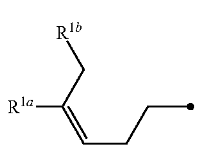

-continued (CHN 2-25)

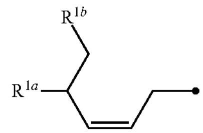

(CHN 2-26)

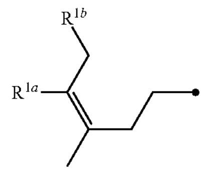

(CHN 2-27)

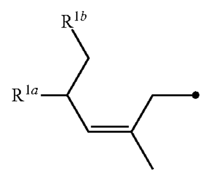

(CHN 2-28)

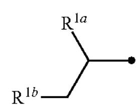

(CHN 2-29)

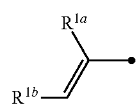

(CHN 2-30)

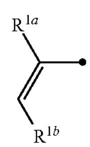

(CHN 2-31)

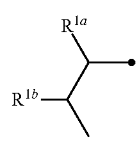

(CHN 2-32)

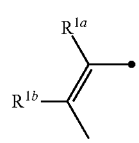

wherein $R^{1a}$ and $R^{1b}$ in formulas (CHN2-1) to (CHN2-32) are defined as in the case of $R^{1a}$ and $R^{1b}$ in formulas (CHN1-1) to (CHN1-9).

Features of a compound having branched alkenyl depend on the branching position. An alkenyl compound branched on a carbon at 2-position, 3-position, 4-position or 1-position as in formulas (CHN2-1) to (CHN2-32) shows a much lower melting point, as compared with a straight-chain compound.

The preferred configuration of —CH═CH— in alkenyl depends on the position of the double bond. For example, a trans configuration is generally preferred in alkenyl having a double bond in an odd-numbered position as in formula (CHN2-1), and a cis configuration is generally preferred in alkenyl having a double bond in an even-numbered position as in formula (CHN2-5). An alkenyl compound having the preferred configuration has a wide temperature range of the liquid-crystal phase. A detailed explanation is found in *Mol. Cryst. Liq. Ciyst.,* 1985, 131, 109 and *Mol. Cryst. Liq. Cryst.,*

1985, 131, 327. Moreover, the position of the double bond desirably does not conjugate with other double bonds or a ring of 1,4-phenylene or the like.

Specific examples of the branched alkoxy and the branched alkenyloxy are shown by the following formulas (CHN3-1) to (CHN3-15).

$R^{1a}$ and $R^{1b}$ in the formulas are defined as above.

(CHN 3-1)

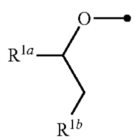

(CHN 3-2)

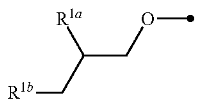

(CHN 3-3)

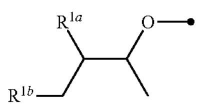

(CHN 3-4)

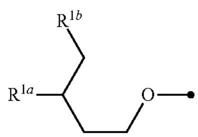

(CHN 3-5)

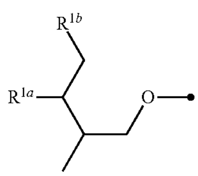

(CHN 3-6)

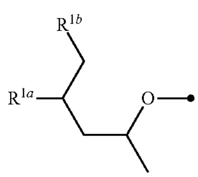

(CHN 3-7)

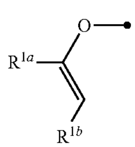

(CHN 3-8)

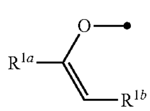

(CHN 3-9)

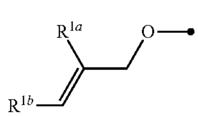

(CHN 3-10)

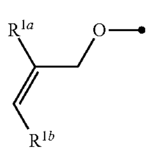

-continued (CHN 3-11)

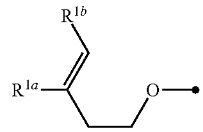

(CHN 3-12)

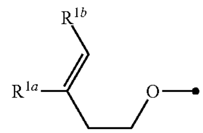

(CHN 3-13)

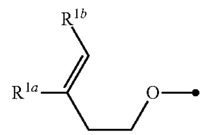

(CHN 3-14)

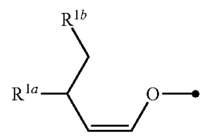

(CHN 3-15)

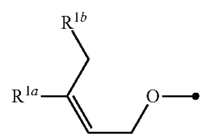

Features of a compound having branched alkoxy and branched alkenyloxy depend on the branching position. An alkoxy or alkenyloxy compound branched on a carbon at 2-position, 3-position or 4-position as in formulas (CHN3-1) to (CHN3-15) shows a much lower melting point, as compared with a straight-chain compound. Moreover, the position of the double bond in the branched alkenyloxy desirably does not conjugate with other double bonds or a ring of 1,4-phenylene or the like.

Preferred examples of $R^{1a}$ and $R^{1b}$ in formulas (CHN2-1) to (CHN2-32) and (CHN3-1) to (CHN3-15) include hydrogen, —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$ and —$C_{10}H_{21}$. Each of $R^{1a}$ and $R^{1b}$ more preferably includes —$CH_3$, —$C_2H_5$ or —$C_3H_7$.

Specific examples of groups obtained by replacing arbitrary —$CH_2$— in $R^{1a}$ and $R^{1b}$ in formulas (CHN2-1) to (CHN2-32) and (CHN3-1) to (CHN3-15) by —O— or by replacing arbitrary —$CH_2$—$CH_2$— in the same by —CH═CH— include $CH_3$ $(CH_2)_2O$—, $CH_3$—O—$(CH_2)_2$—, $CH_3$—O—$CH_2$—O—, $CH_2$═CH—$(CH_2)_3$—, $CH_3$—CH═CH—$(CH_2)_2$— and $CH_3$—CH═CH—$CH_2O$—.

Moreover, specific examples of groups obtained by replacing, by halogen, arbitrary hydrogen in groups obtained by replacing arbitrary —$CH_2$— in $R^{1a}$ in formulas (CHN2-1) to (CHN2-32) and (CHN3-1) to (CHN3-15) by —O— or by replacing arbitrary —$CH_2$—$CH_2$— in the same by —C≡C— or —CH═CH— include $CF_2$═CH—, $CH_2F$ $(CH_2)_2O$— and $CH_2FCH_2C$≡C—.

In formula (1-3), the rings $A^1$, $A^2$, $A^3$, $A^4$ and $A^5$ are independently 1,4-phenylene, 1,3-dioxane-2,5-diyl, tetrahydropyran-2,5-diyl, tetrahydropyran-3,6-diyl, pyrimidine-2,5-diyl, pyridine-2,5-diyl or naphthalene-2,6-diyl, and arbitrary hydrogen in the ring may be replaced by fluorine or chlorine.

Preferred examples of the rings $A^1$, $A^2$, $A^3$, $A^4$ and $A^5$ are represented by formulas (RG-1) to (RG-15).

-continued (RG-1)

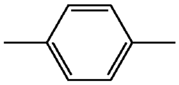

(RG-2)

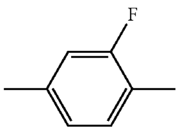

(RG-3)

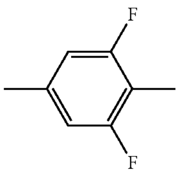

(RG-4)

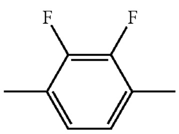

(RG-5)

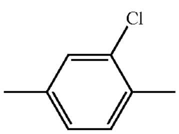

(RG-6)

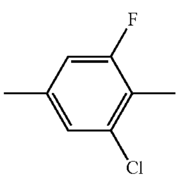

(RG-7)

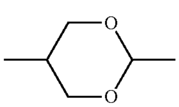

(RG-8)

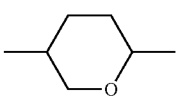

(RG-9)

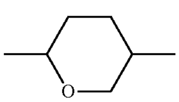

(RG-10)

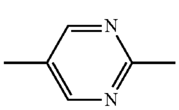

(RG-11)

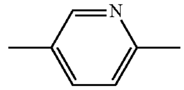

(RG-12)

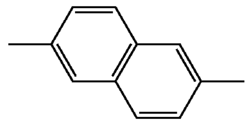

(RG-13)

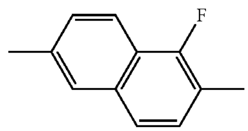

(RG-14)

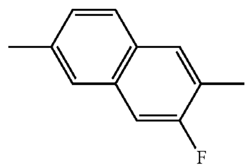

(RG-15)

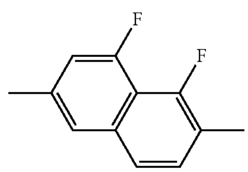

(RG-16)

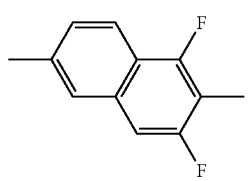

More preferred examples of the structures of the rings $A^1$, $A^2$, $A^3$, $A^4$ and $A^5$ are represented by formulas (RG-1) to (RG-3), (RG-5) to (RG-7) and (RG-12) to (RG-16). In particular, a compound having a structure of formula (RG-2) or (RG-3) as 1,4-phenylene in which one or two hydrogens are replaced by fluorine has a large dielectric anisotropy. Moreover, a compound with two or more rings of formula (RG-2) or (RG-3) has a particularly large dielectric anisotropy.

Moreover, a compound in which the ring $A^1$ includes a ring of formula (RG-2) or (RG-3) has a low melting point.

In formula (1-3), $Z^1$, $Z^2$, $Z^3$ and $Z^4$ are independently a single bond or alkylene having 1 to 4 carbons, arbitrary —$CH_2$— in the alkylene may be replaced by —O—, —COO— or —$CF_2O$—, arbitrary —$CH_2$—$CH_2$— in the alkylene may be replaced by —CH═CH—, —CF═CF— or —C≡C—, and arbitrary hydrogen may be replaced by halogen.

In formula (1-3), preferred examples of $Z^1$, $Z^2$, $Z^3$ and $Z^4$ include a single bond, —$CH_2$—, —$(CH_2)_2$—, —COO—, —$CF_2O$— and —CH═CH—. More preferably, arbitrary one of $Z^1$, $Z^2$, $Z^3$ and $Z^4$ is —COO— or —$CF_2O$—.

In formula (1-2), $X^1$ is halogen, —C≡N, —N═C═S, —$SF_5$ or alkyl having 1 to 3 carbons (arbitrary —$CH_2$— in the alkyl may be replaced by —S—, —COO— or —OCO—), alkenyl having 2 to 3 carbons, alkynyl having 2 to 3 carbons, alkoxy having 1 to 3 carbons, alkoxyalkyl having 2 to 3 carbons or alkenyloxy having 2 to 3 carbons, and hydrogen in the groups (alkyl, alkenyl, alkynyl, alkoxy, alkoxyalkyl and alkenyloxy) may be replaced by halogen.

The alkyl, the alkenyl, the alkynyl, the alkoxy, the alkoxyalkyl and the alkenyloxy in $X^1$ in formula (1-3) are defined in the same way as the alkyl, the alkenyl, the alkynyl, the alkoxy, the alkoxyalkyl and the alkenyloxy in $X^1$ in formula (1-1).

In $X^1$ in formula (1-3), specific examples of alkyl in which arbitrary hydrogen is replaced by fluorine or chlorine include —$CHF_2$, —$CF_3$, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$ and —$CHFCF_2CF_3$.

In $X^1$ in formula (1-3), specific examples of alkoxy in which arbitrary hydrogen is replaced by fluorine or chlorine include —$OCHF_2$, —$OCF_3$, —$OCF_2CH_2F$, —$OCF_2CHF_2$, —$OCH_2CF_3$, —O—$(CF_2)_3$—F, —$OCF_2CHFCF_3$ and —$OCHFCF_2CF_3$.

In $X^1$ in formula (1-3), specific examples of alkenyl in which arbitrary hydrogen is replaced by fluorine or chlorine include —CH═$CF_2$, —CF═CHF, —CH═$CHCH_2F$, —CH═$CHCF_3$, —$(CH_2)_2$—CH═$CF_2$, —$CH_2CH$═$CHCF_3$ and —CH═$CHCF_2CF_3$.

Specific examples of preferred $X^1$ in formula (1-3) include fluorine, chlorine, —C≡N, —$CF_3$, —$CHF_2$, —$OCF_3$ and —$OCHF_2$. Specific examples of more preferred $X^1$ include fluorine, chlorine, —C≡N, —$CF_3$ and —$OCF_3$. When $X^1$ is chlorine or fluorine, compound (1-3) has a low melting point, and a superb compatibility with other liquid-crystal compounds. When $X^1$ is —C≡N, —$CF_3$, —$CHF_2$, —$OCF_3$ or —$OCHF_2$, compound (1-3) shows a particularly large dielectric anisotropy.

In formula (1-3), m, n and p are independently 0 or 1, and an expression: 1≤m+n+p≤3 applies.

Preferred structures of formula (1-3) are represented by formulas (1-3-1) and (1-3-2):

(1-3-1)

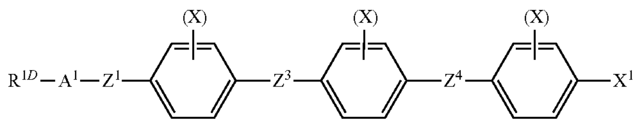

(1-3-2)

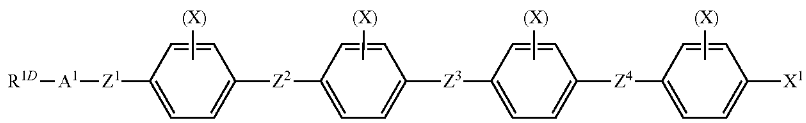

wherein, in formulas (1-3-1) to (1-3-2), $R^{1D}$ is branched alkyl or branched alkenyl each having 3 to 20 carbons; $A^1$ is 1,4-phenylene, 1,3-dioxane-2,5-diyl, tetrahydropyran-2,5-diyl, tetrahydropyran-3,6-diyl, pyrimidine-2,5-diyl or pyridine-2,5-diyl, and arbitrary hydrogen in the ring may be replaced by fluorine; $Z^1$, $Z^2$, $Z^3$ and $Z^4$ are independently a single bond, —$CH_2CH_2$—, —COO— or —$CF_2O$—, with a proviso that arbitrary one of $Z^1$, $Z^2$, $Z^3$ and $Z^4$ is —COO— or —$CF_2O$—; $X^1$ is fluorine, chlorine, —C≡N, or alkyl having 1 to 3 carbons in which arbitrary hydrogen is replaced by fluorine, arbitrary —$CH_2$— in the alkyl may be replaced by —O—, and arbitrary —$CH_2$—$CH_2$— in the alkyl may be replaced by —CH═CH—; X is fluorine or chlorine; and the expression in which 1,4-phenylene and (X) are connected with a straight line represents 1,4-phenylene in which one or two hydrogens may be replaced by X.

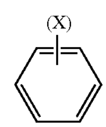

Among the compounds, the particularly preferred ones are the compounds in which $R^{1D}$ has a structure represented by any one of formulas (CHN-1-1) to (CHN-1-9), $Z^1$, $Z^2$, $Z^3$ and $Z^4$ are independently a single bond, —$(CH_2)_2$—, —COO— or —$CF_2O$— with a proviso that at least one of $Z^1$, $Z^2$, $Z^3$ and $Z^4$ is —COO— or —$CF_2O$—, X is fluorine or chlorine, and $X^1$ is fluorine, chlorine, —C≡N, —$CF_3$ or —$OCF_3$.

The more preferred ones among the compounds represented by formulas (1-3-1) to (1-3-2) are those represented by the following formulas (1-3-1-1) to (1-3-1-8) and (1-3-2-1) to (1-3-2-16). Still more preferred examples are those represented by formulas (1-3-1-1) to (1-3-1-2) and (1-3-2-1) to (1-3-2-6).

(1-3-1-1)
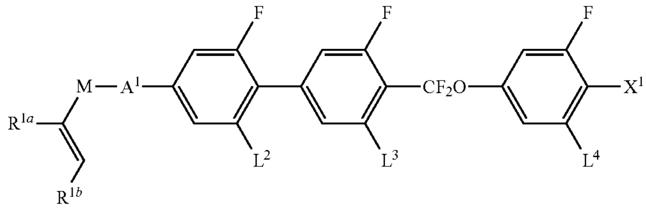
(1-3-1-2)
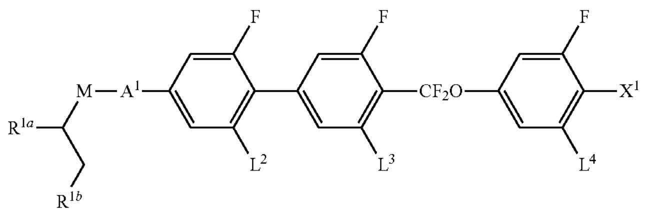
(1-3-1-3)
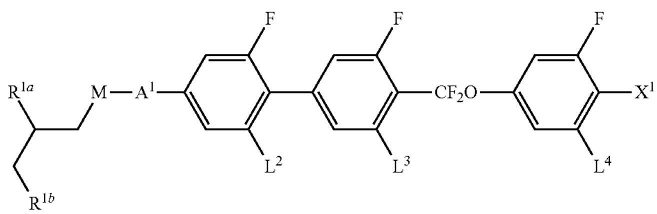
(1-3-1-4)
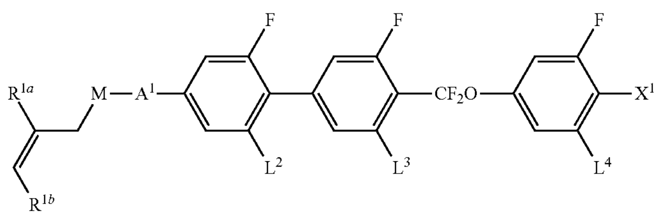
(1-3-1-5)
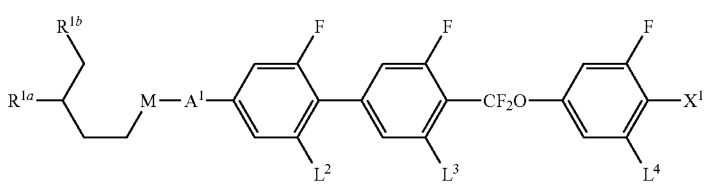
(1-3-1-6)
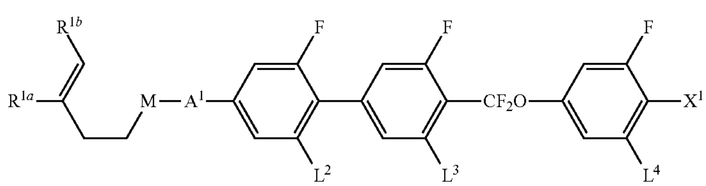
(1-3-1-7)
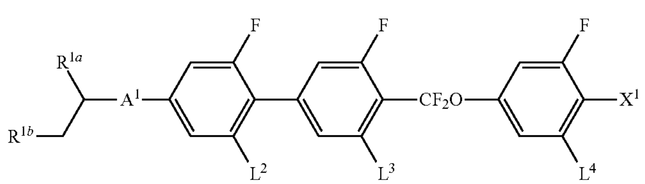
(1-3-1-8)
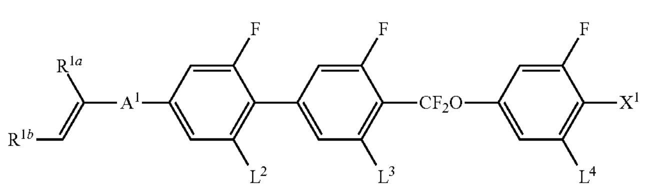

-continued
(1-3-2-1)
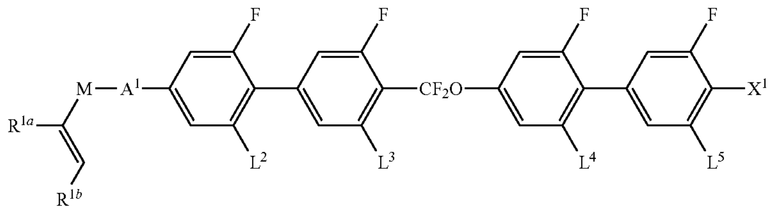
(1-3-2-2)
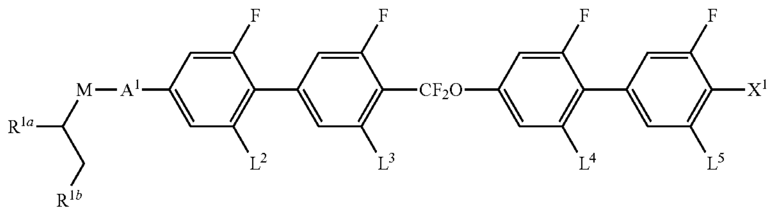
(1-3-2-3)
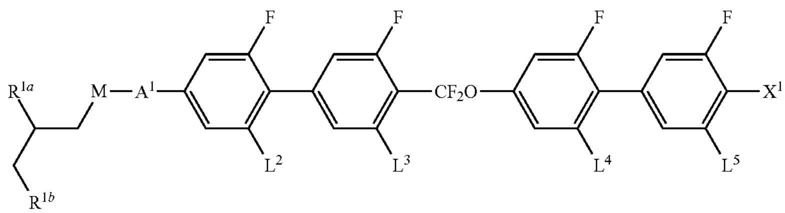
(1-3-2-4)
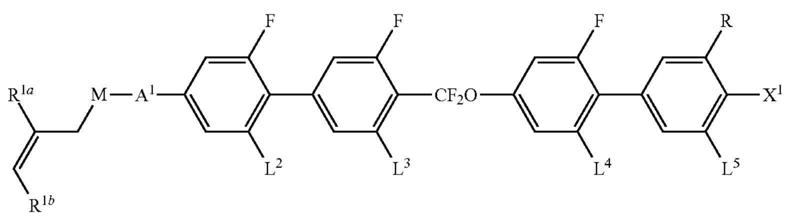
(1-3-2-5)
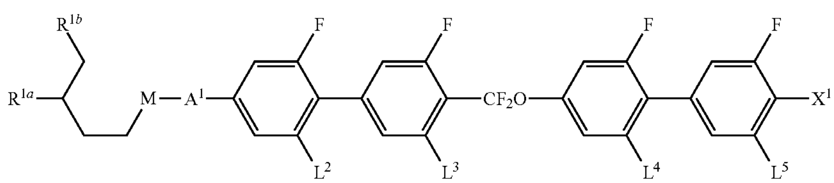
(1-3-2-6)
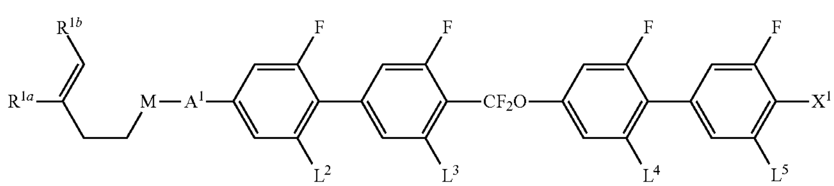
(1-3-2-7)
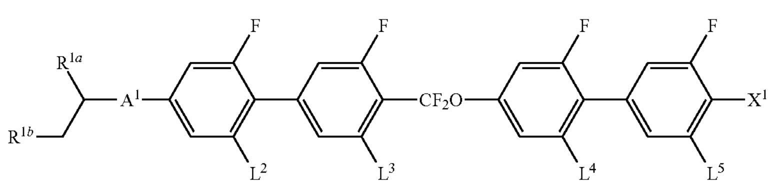
(1-3-2-8)
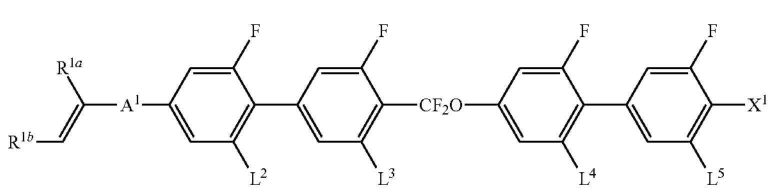

-continued
(1-3-2-9)
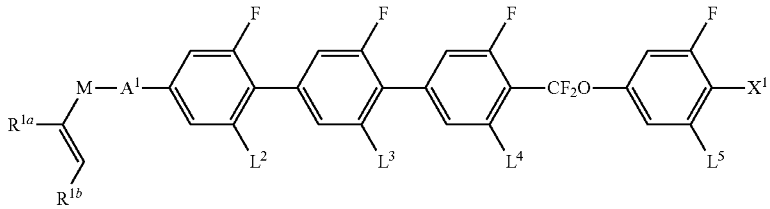
(1-3-2-10)
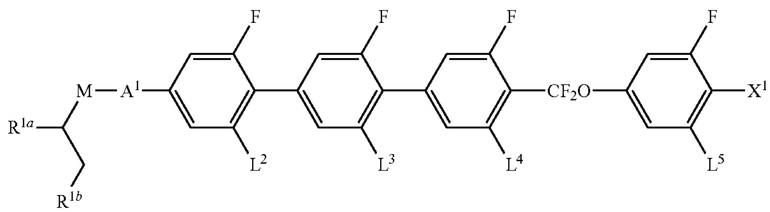
(1-3-2-11)
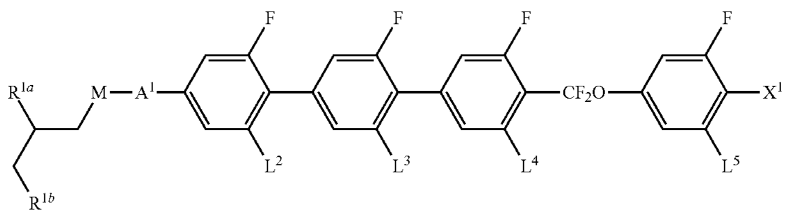
(1-3-2-12)
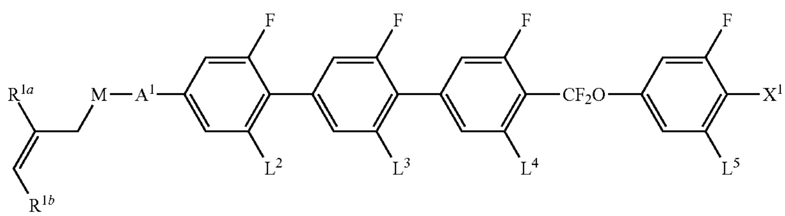
(1-3-2-13)
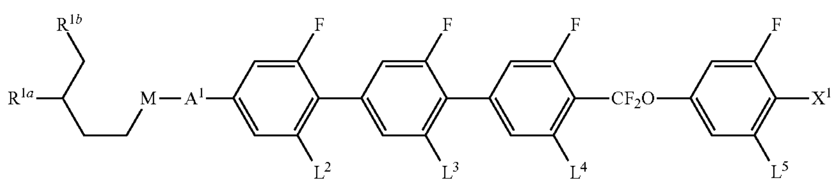
(1-3-2-14)
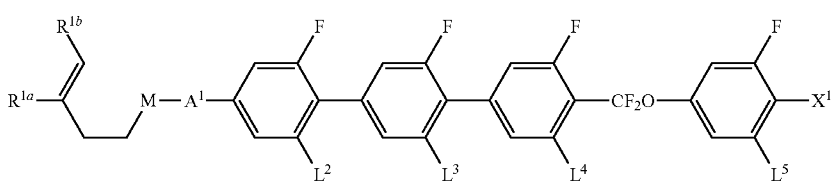
(1-3-2-15)
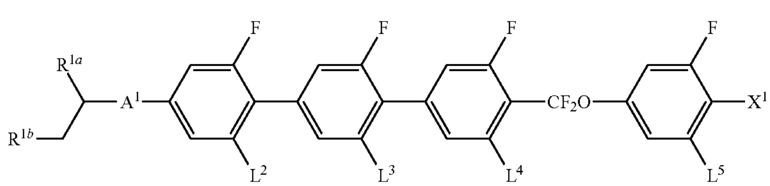
(1-3-2-16)
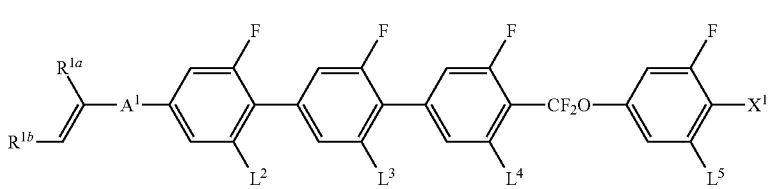

In formulas (1-3-1-1) to (1-3-1-8) and (1-3-2-1) to (1-3-2-16), $R^{1a}$ is alkyl having 1 to 10 carbons or alkenyl having 2 to 10 carbons; $R^{1b}$ is hydrogen or alkyl having 1 to 10 carbons; M is —$CH_2$— or —O—; $A^1$ is 1,4-phenylene, 1,3-dioxane-2,5-diyl, tetrahydropyran-2,5-diyl, tetrahydropyran-3,6-diyl, pyrimidine-2,5-diyl or pyridine-2,5-diyl, and arbitrary hydrogen in the ring may be replaced by fluorine; $L^2$, $L^3$, $L^4$ and $L^5$ are independently hydrogen, fluorine or chlorine; $X^1$ is fluorine, chlorine, —C≡N, alkyl having 1 to 3 carbons in which arbitrary hydrogen is replaced by fluorine, alkenyl in which arbitrary hydrogen is replaced by fluorine, or alkoxy in which arbitrary hydrogen is replaced by fluorine.

In formulas (1-3-1-1) to (1-3-1-8) and (1-3-2-1) to (1-3-2-16), $L^1$, $L^2$, $L^3$, $L^4$ and $L^5$ are independently hydrogen, fluorine or chlorine. When $L^1$ is fluorine, compound (1-3) has a low melting point and an excellent compatibility with other liquid-crystal compounds. When at least one of $L^2$, $L^3$, $L^4$ and $L^5$ is chlorine or fluorine, compound (1-3) has a large dielectric anisotropy, a low melting point, and an excellent compatibility with other liquid-crystal compounds.

(2) Properties of Compound (1-3)

Compound (1-3) used in the invention will be explained in more details. Compound (1-3) is a liquid-crystal compound having a branched alkyl group or a branched alkenyl group. The compound is physically and chemically very stable under conditions in which the device is ordinarily used, and has a good compatibility with other liquid-crystal compounds. The compound is also hard to exhibit a smectic phase. A composition containing the compound is stable under conditions in which the device is ordinarily used. Accordingly, the temperature range of the cholesteric phase can be expanded in the composition, and the compound can be used in a display device in a wide temperature range. Furthermore, the compound has a large dielectric anisotropy and a large refractive index anisotropy, and therefore is useful as a component for decreasing the driving voltage and increasing the reflectance of the composition driven in the cholesteric phase.

Physical properties such as the clearing point, refractive index anisotropy and dielectric anisotropy can be arbitrarily adjusted by suitably selecting a combination of m, n and p, the left-terminal group $R^{1D}$, the right-terminal group $X^1$ and the bonding groups $Z^1$ to $Z^4$ in compound (1-3). The effect of the combination of m, n and p and the species of the left-terminal group $R^{1D}$, the right-terminal group $X^1$, the bonding groups $Z^1$ to $Z^4$, and $L^2$ to $L^5$ in 1,4-phenylene on the physical properties of compound (I) will be explained below.

In compound (1-3), a compound of m+n+p=3 generally has a high clearing point, and shows a large refractive index anisotropy. A compound of m+n+p=2 has a low melting point and good compatibility with other liquid-crystal compounds. A compound having of m+n+p=1 has a very low melting point.

A compound in which $R^{1D}$ is an optically active group is useful as a chiral dopant. A compound in which $R^{1D}$ is not an optically active group is useful as a component of the composition. When $R^{1D}$ is alkenyl, the preferred configuration depends on the position of the double bond. An alkenyl compound having the preferred configuration has a wide temperature range of the liquid-crystal phase.

In compound (1-3), when bonding group $Z^1$, $Z^2$, $Z^3$ and $Z^4$ each are a single bond, —$CH_2CH_2$—, —CH═CH—, —$CF_2O$—, —$OCF_2$—, —$CH_2O$—, —$OCH_2$—, —CF═CF—, —$(CH_2)_3$—O—, —O—$(CH_2)_3$—, —$(CH_2)_2$—$CF_2O$—, —$OCF_2$—$(CH_2)_2$— or —$(CH_2)_4$—, compound (1-3) has a low viscosity. When the bonding groups each are a single bond, —$(CH_2)_2$—, —$CF_2O$—, —$OCF_2$— or —CH═CH—, compound (1-3) has an even lower viscosity. When the bonding groups each are —CH═CH—, compound (1-3) has a wide temperature range of the liquid-crystal phase, and a large elastic constant ratio $K_{33}/K_{11}$ ($K_{33}$: bend elastic constant, $K_{11}$: splay elastic constant). When the bonding groups each are —C≡O—, compound (1-3) has a large refractive index anisotropy. When the bonding groups each are —COO— or —$CF_2O$—, compound (1-3) has a large dielectric anisotropy. When $Z^1$, $Z^2$, $Z^3$ and $Z^4$ each are a single bond, —$(CH_2)_2$—, —$CH_2O$—, —$CF_2O$—, —$OCF_2$— or —$(CH_2)_4$—, compound (1-3) is chemically stable and hard to cause degradation.

When the right-terminal group $X^1$ is fluorine, chlorine, —C≡N, —$SF_5$, —$CF_3$, —$OCF_3$ or —CH═CH—$CF_3$, compound (1-3) has a large dielectric anisotropy. When $X^1$ is fluorine, —$CF_3$ or —$OCF_3$, compound (1-3) is chemically stable.

When $L^2$, $L^3$, $L^4$ and $L^5$ each are hydrogen or chlorine, compound (1-3) has a low melting point. When $L^2$, $L^3$, $L^4$ and $L^5$ each are fluorine, compound (1-3) has a large dielectric anisotropy. When at least two or more of $L^1$ to $L^5$ are fluorine, compound (1-3) has a very large dielectric anisotropy. Moreover, when at least one of $L^1$ to $L^5$ is chlorine, compound (1-3) has a good compatibility with other liquid-crystal compounds.

As described above, a compound having objective physical properties can be obtained by suitably selecting the species of the ring structures, the terminal groups, the bonding groups and so on.

(3) Specific Example of Compound (1-3)

Preferred examples of compound (1-3) are those represented by formulas (1-3-1) to (1-3-2). More preferred examples include those represented by formulas (1-3-1-1) to (1-3-1-8) and (1-3-2-1) to (1-3-2-16). Still more preferred examples are represented by formulas (1-3-1-1) to (1-3-1-8) and (1-3-2-1) to (1-3-2-6).

Specific examples of compound (1-3) are those represented by the following formulas (1-3-1-1a) to (1-3-2-16j).

In the formulas, $R^{1a}$ and $R^{1b}$ each are hydrogen or alkyl having 1 to 10 carbons, $L^1$, $L^2$, $L^3$ and $L^4$ each are hydrogen, fluorine or chlorine, and $X^1$ is fluorine, chlorine, —$SF_5$, —C≡N, —N═C═S, —$CF_3$, —$CF_2H$, —$OCF_3$ or —$OCF_2H$.

(1-3-1-1a)

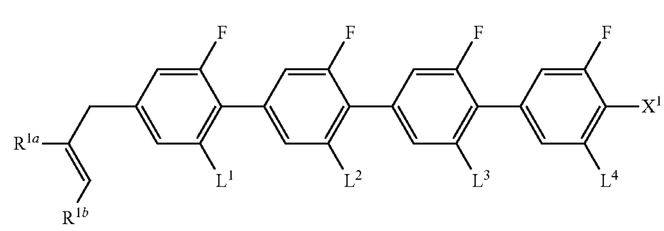

-continued
(1-3-1-2a)
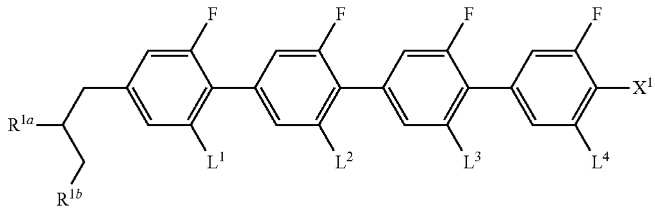
(1-3-1-3a)
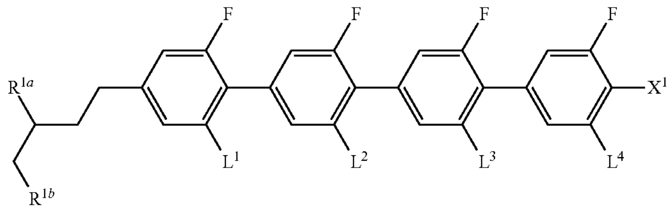
(1-3-1-4a)
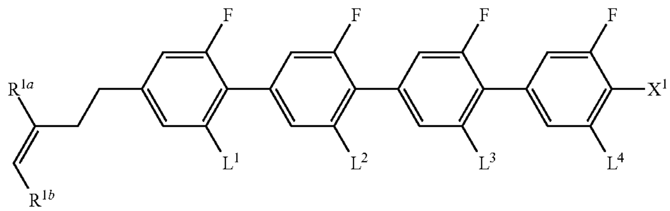
(1-3-1-5a)
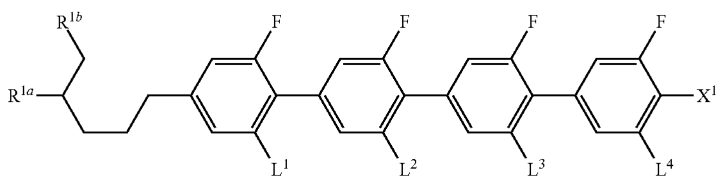
(1-3-1-6a)
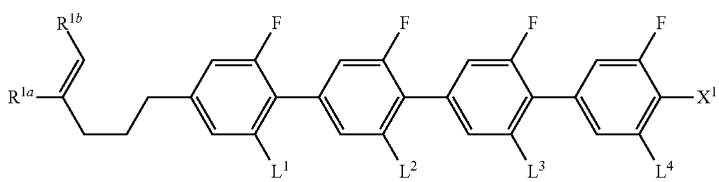
(1-3-1-7a)
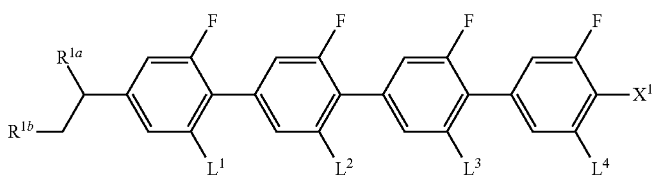
(1-3-1-8a)
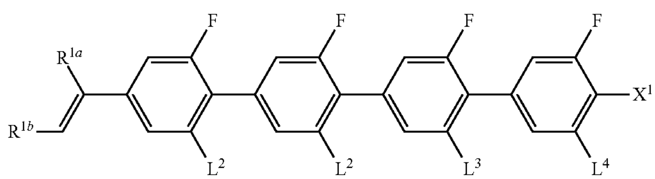
(1-3-1-1b)
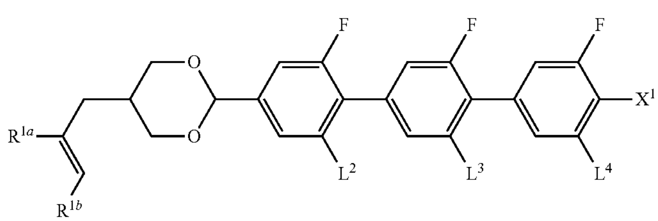

-continued
(1-3-1-2b)
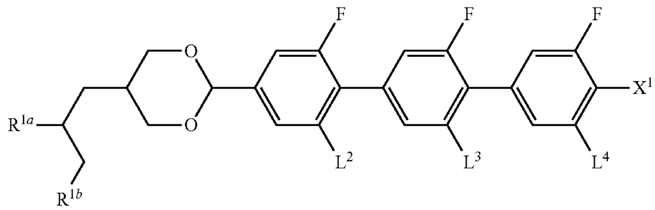
(1-3-1-3b)
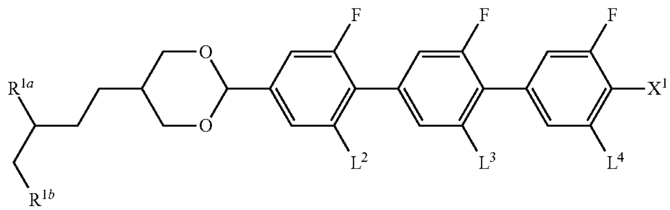
(1-3-1-4b)
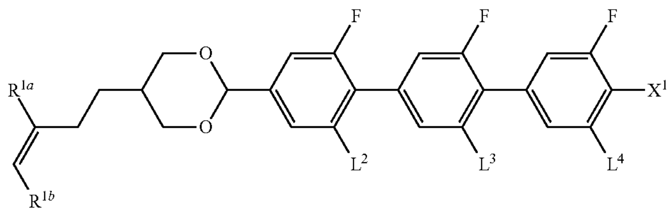
(1-3-1-5b)
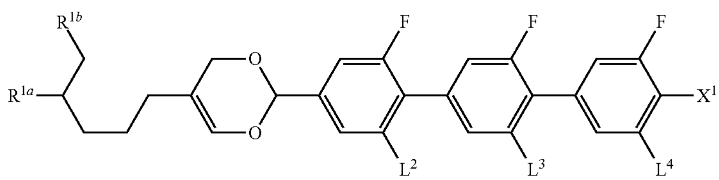
(1-3-1-6b)
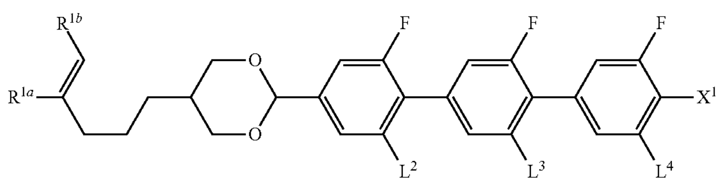
(1-3-1-7b)
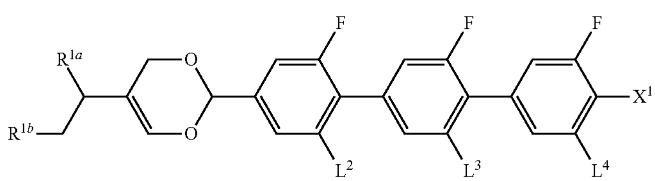
(1-3-1-8b)
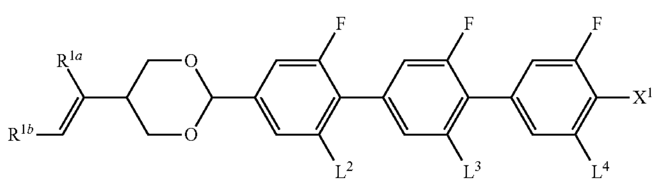
(1-3-1-1c)
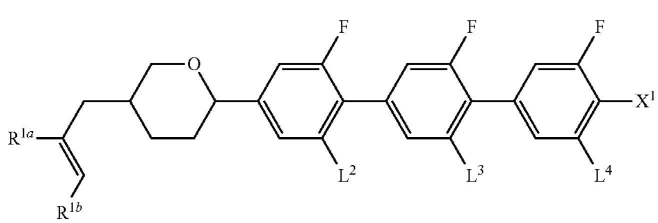

-continued
(1-3-1-2c)
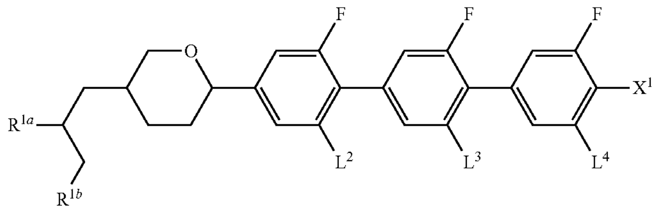
(1-3-1-3c)
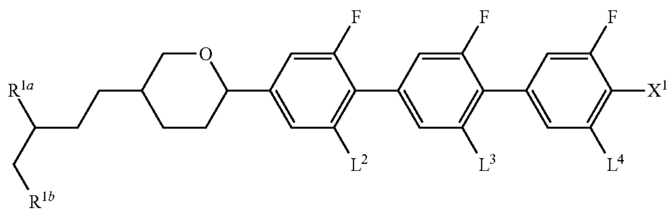
(1-3-1-4c)
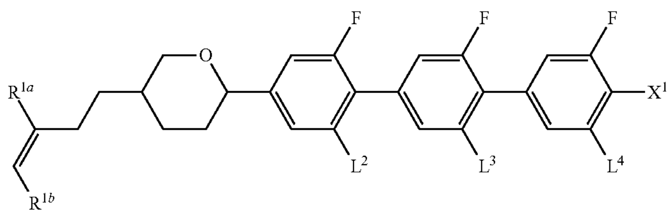
(1-3-1-5c)
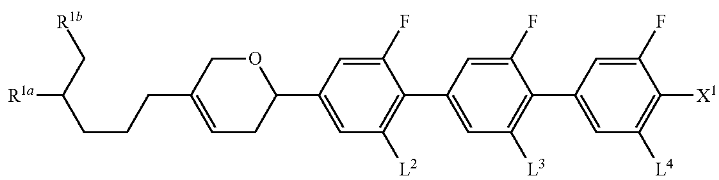
(1-3-1-6c)
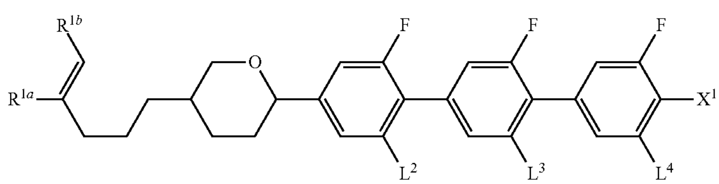
(1-3-1-7c)
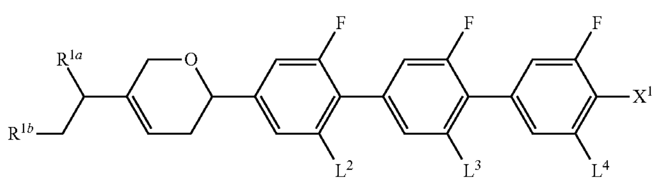
(1-3-1-8c)
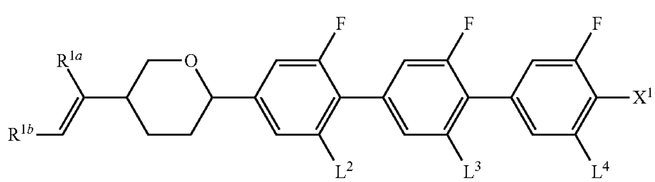
(1-3-1-1d)
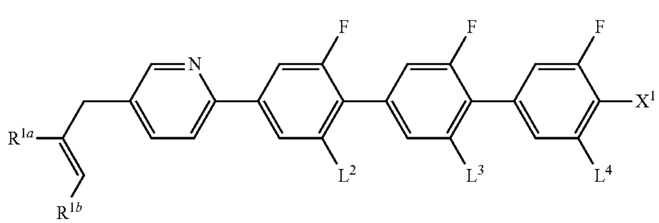

-continued
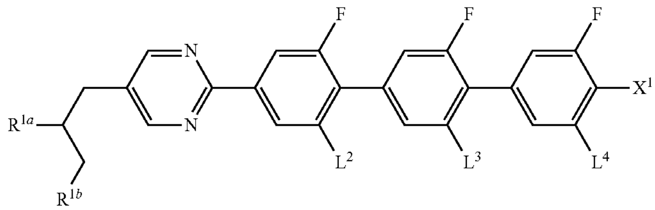
(1-3-1-2d)
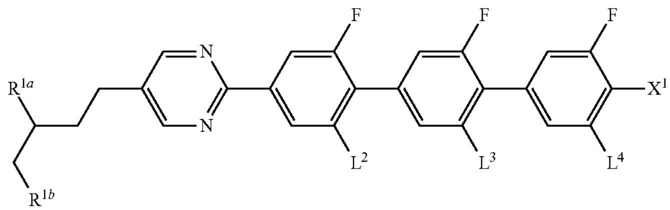
(1-3-1-3d)
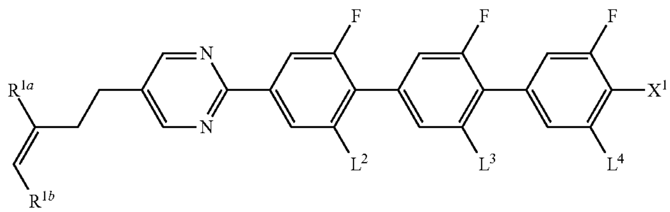
(1-3-1-4d)
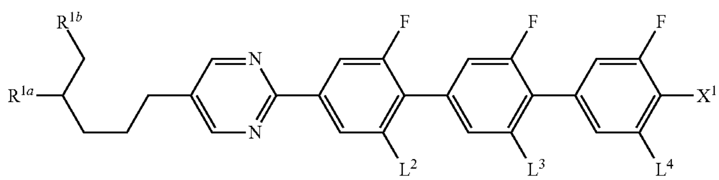
(1-3-1-5d)
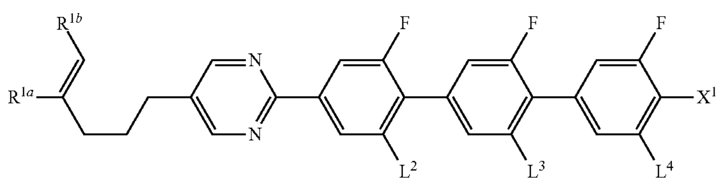
(1-3-1-6d)
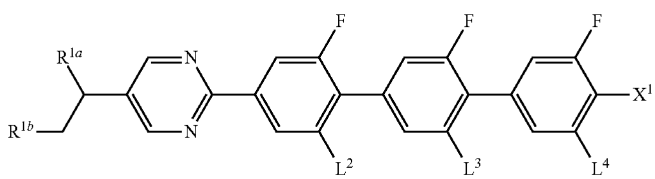
(1-3-1-7d)
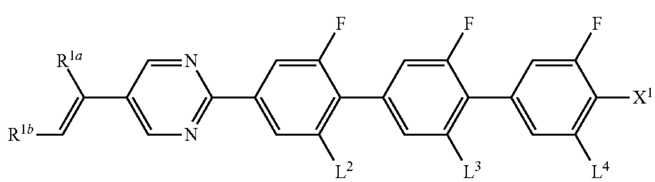
(1-3-1-8d)
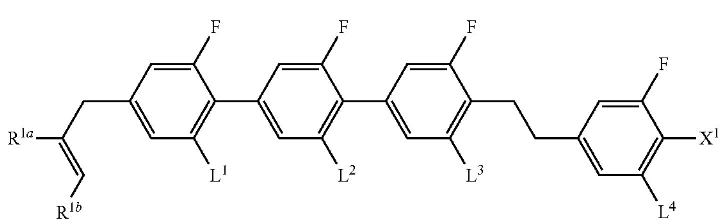
(1-3-1-1e)

-continued
(1-3-1-2e)
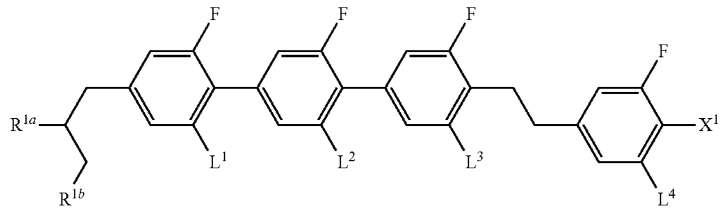
(1-3-1-3e)
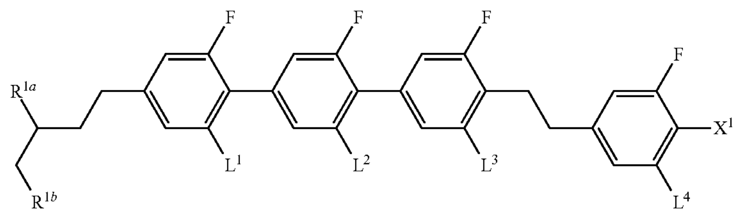
(1-3-1-4e)
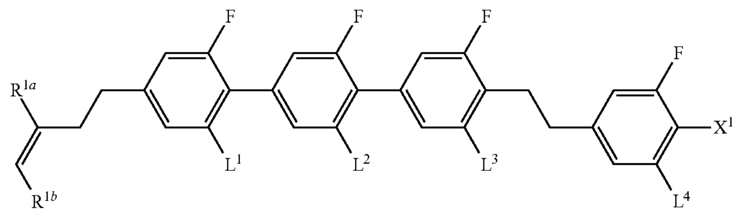
(1-3-1-5e)
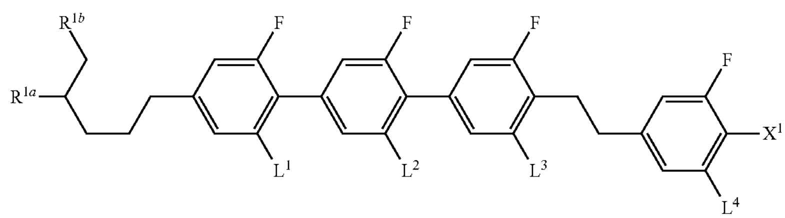
(1-3-1-6e)
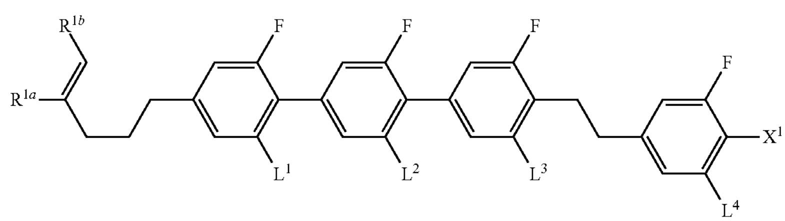
(1-3-1-7e)
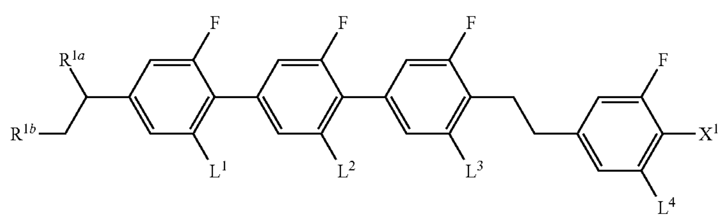
(1-3-1-8e)
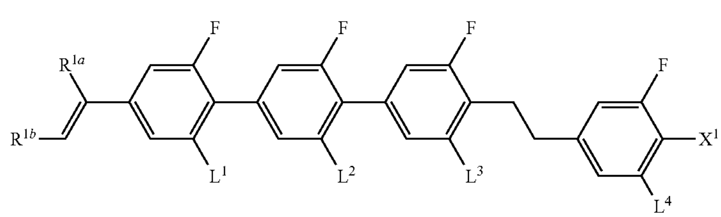

-continued
(1-3-1-1f)
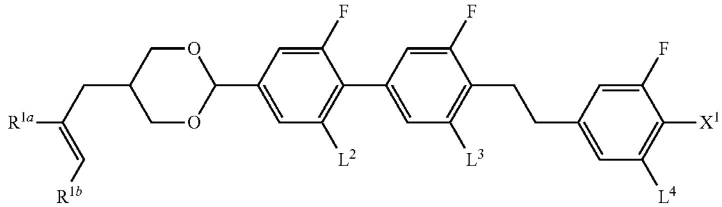
(1-3-1-2f)
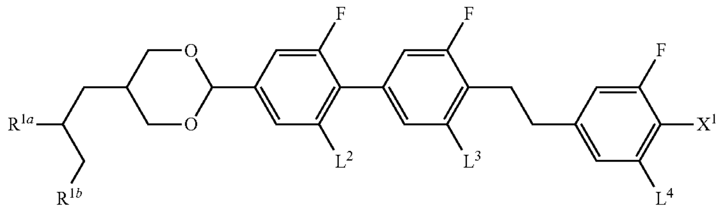
(1-3-1-3f)
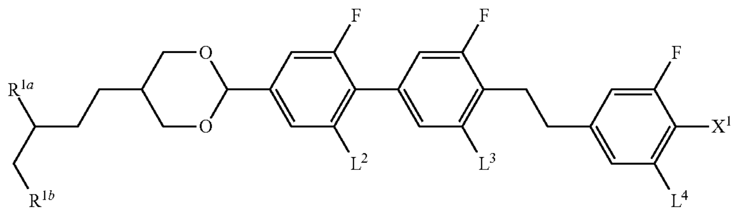
(1-3-1-4f)
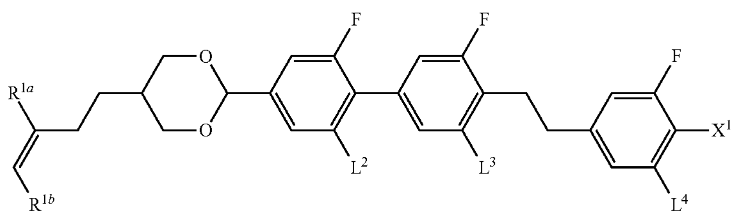
(1-3-1-5f)
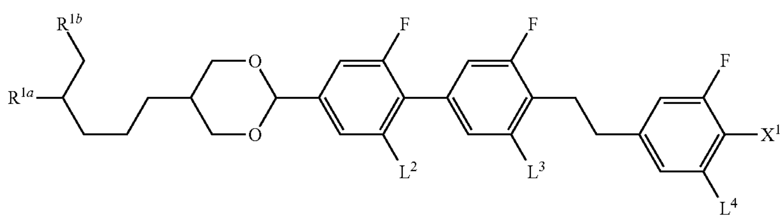
(1-3-1-6f)
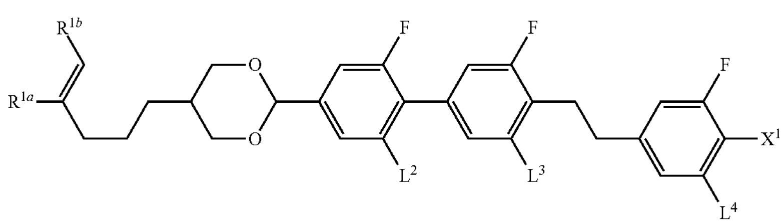
(1-3-1-7f)
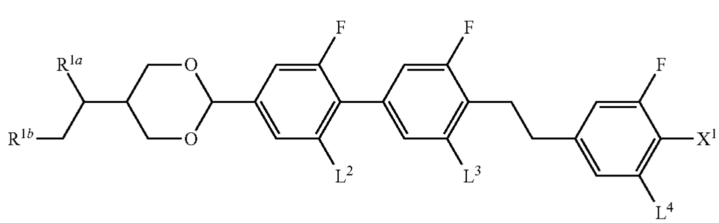

-continued
(1-3-1-8f)
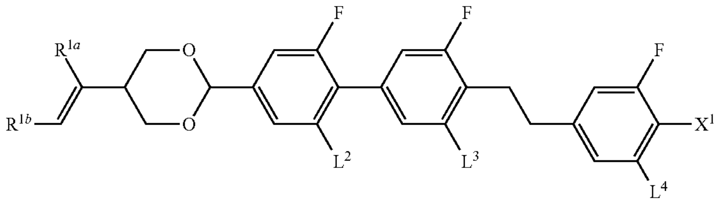
(1-3-1-1g)
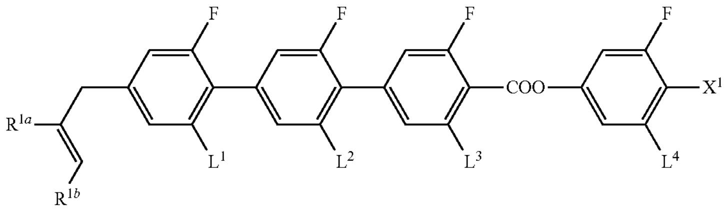
(1-3-1-2g)
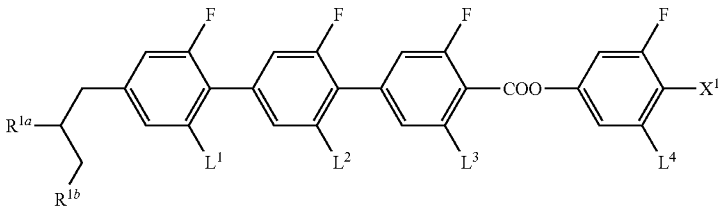
(1-3-1-3g)
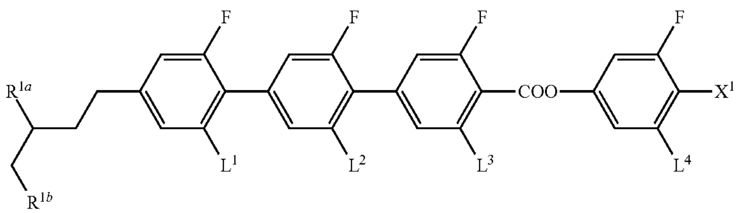
(1-3-1-4g)
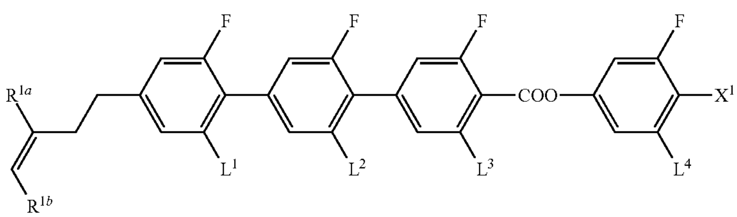
(1-3-1-5g)
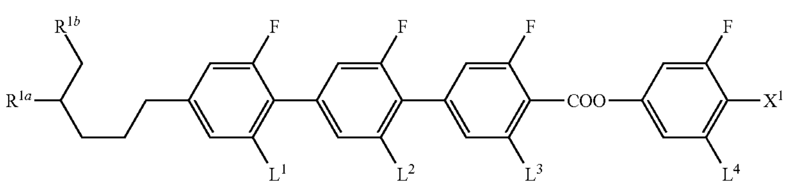
(1-3-1-6g)
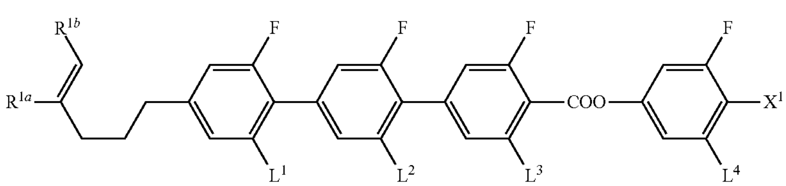
(1-3-1-7g)
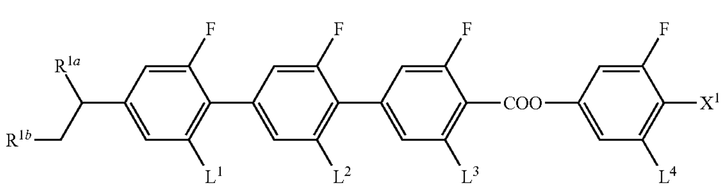

-continued
(1-3-1-8g)
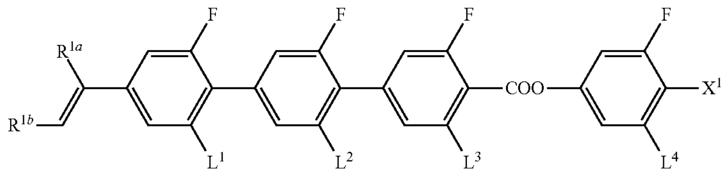
(1-3-1-1h)
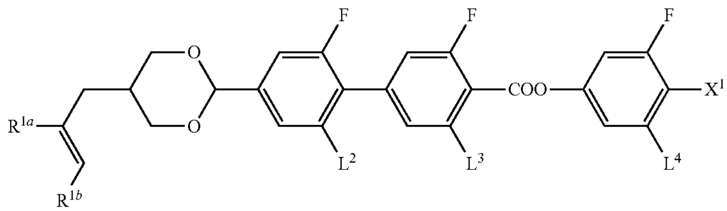
(1-3-1-2h)
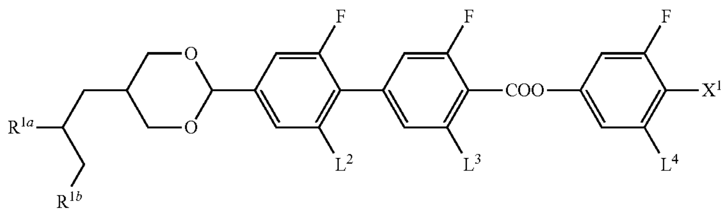
(1-3-1-3h)
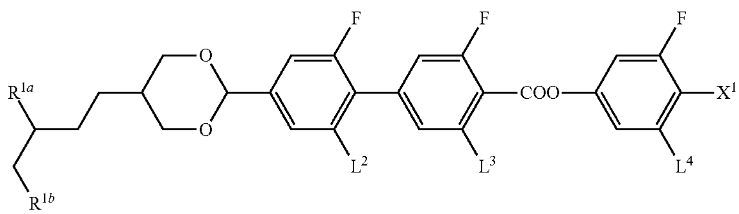
(1-3-1-4h)
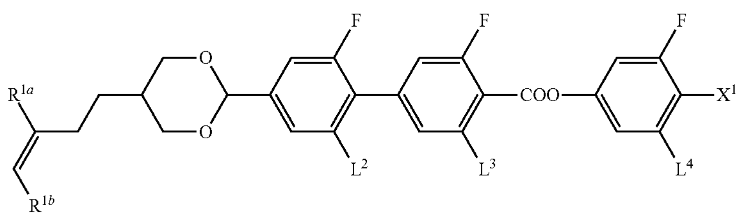
(1-3-1-5h)
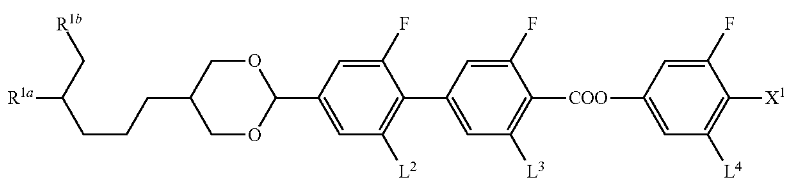
(1-3-1-6h)
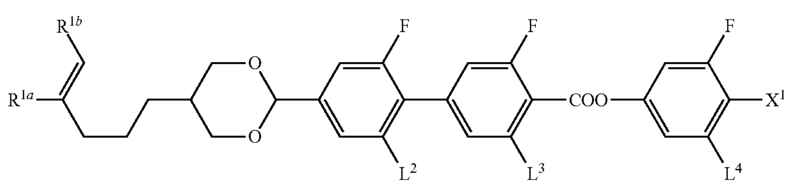
(1-3-1-7h)
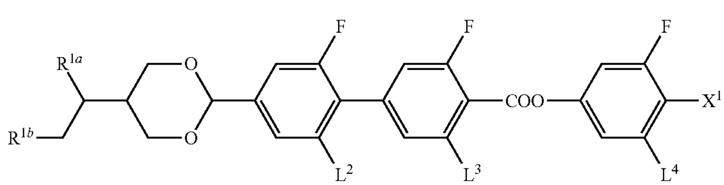

-continued
(1-3-1-8h)
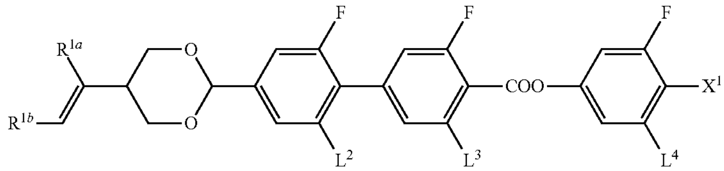
(1-3-1-1i)
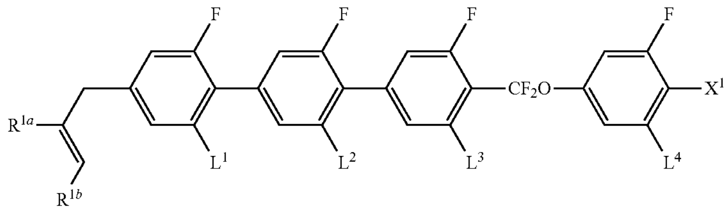
(1-3-1-2i)
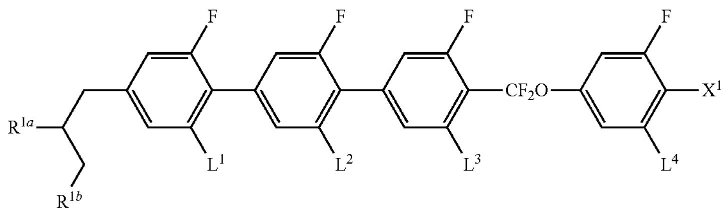
(1-3-1-3i)
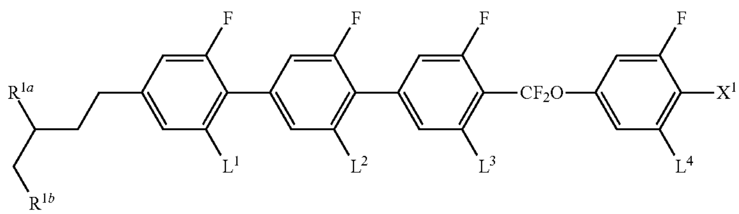
(1-3-1-4i)
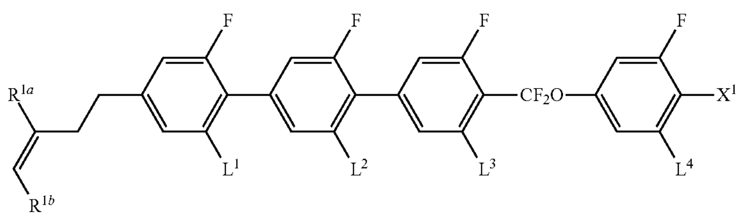
(1-3-1-5i)
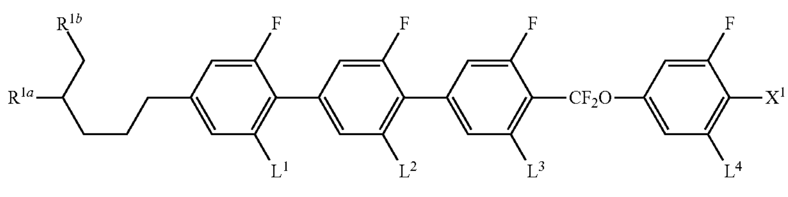
(1-3-1-6i)
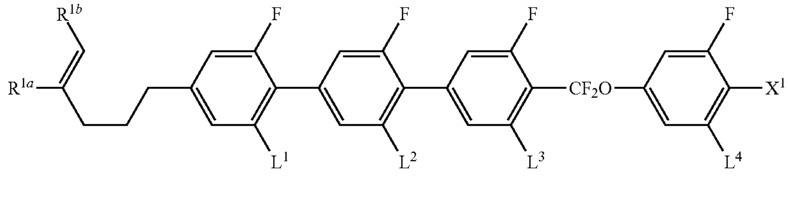
(1-3-1-7i)
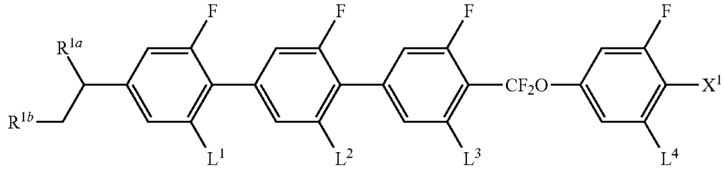

-continued
(1-3-1-8i)
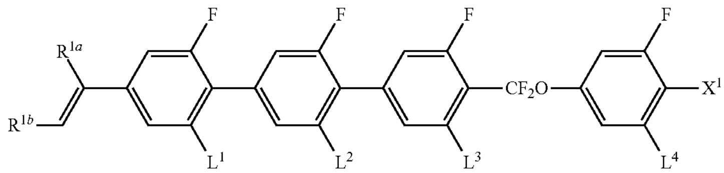
(1-3-1-1j)
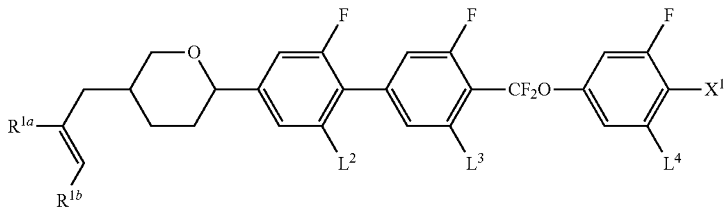
(1-3-1-2j)
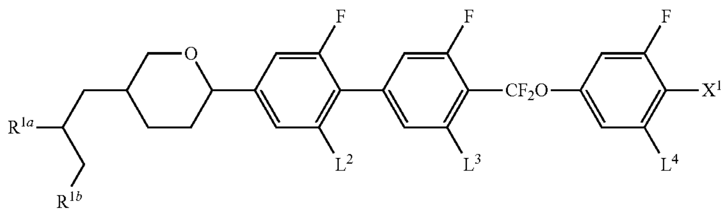
(1-3-1-3j)
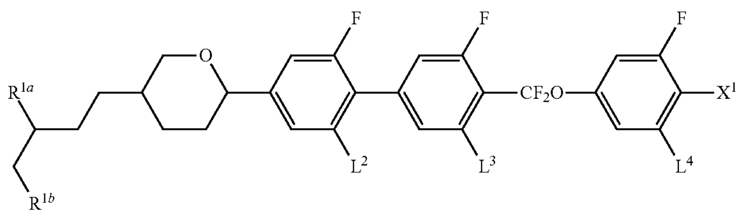
(1-3-1-4j)
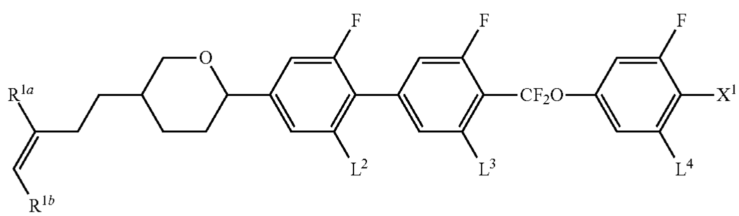
(1-3-1-5j)
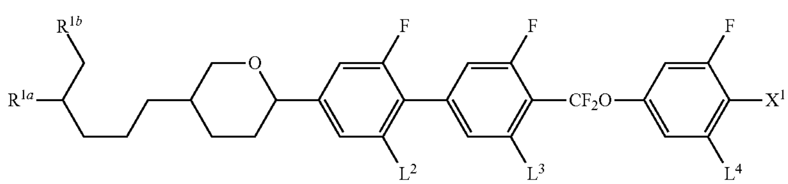
(1-3-1-6j)
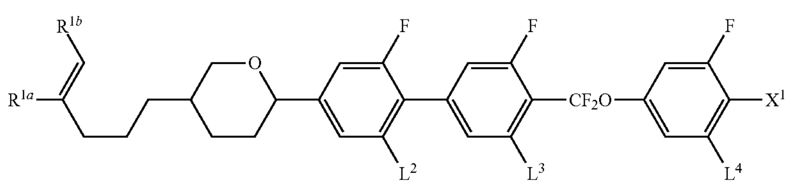
(1-3-1-7j)
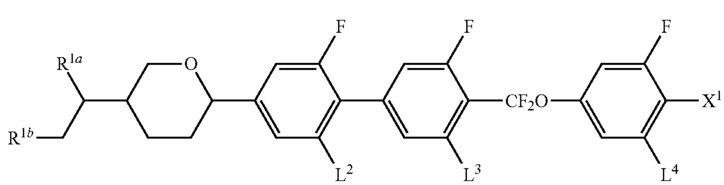

-continued
(1-3-1-8j)
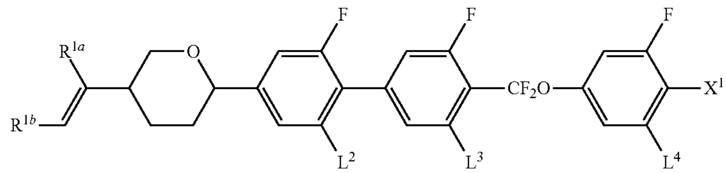
(1-3-1-1k)
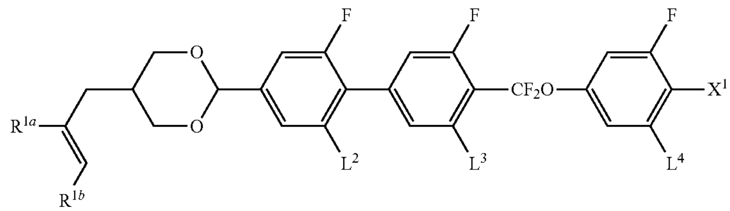
(1-3-1-2k)
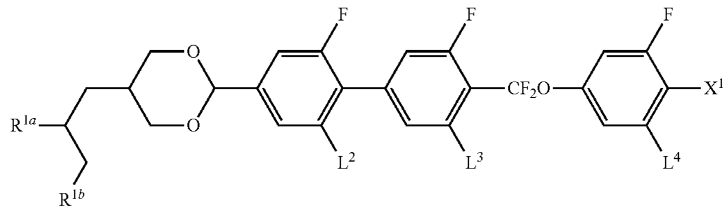
(1-3-1-3k)
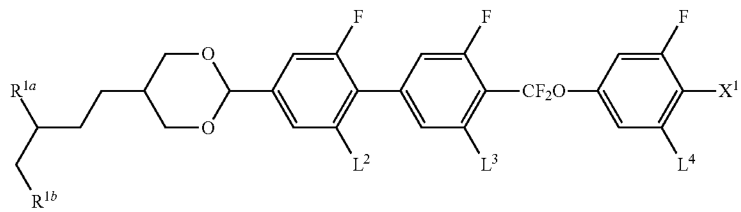
(1-3-1-4k)
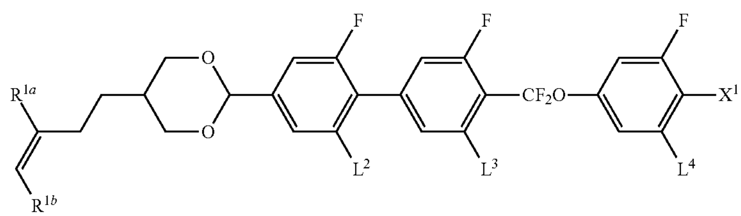
(1-3-1-5k)
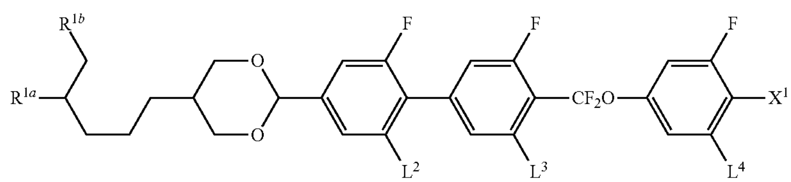
(1-3-1-6k)
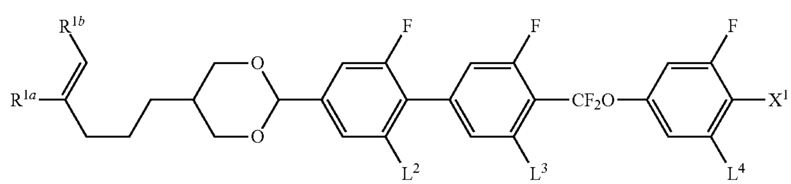
(1-3-1-7k)
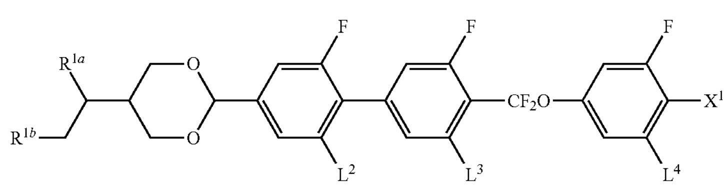

-continued
(1-3-1-8k)
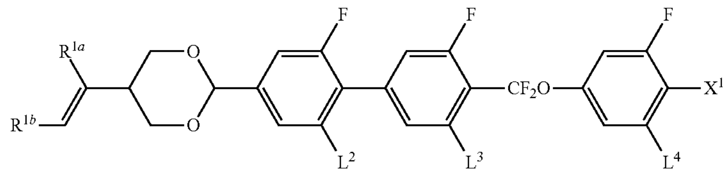
(1-3-1-1l)
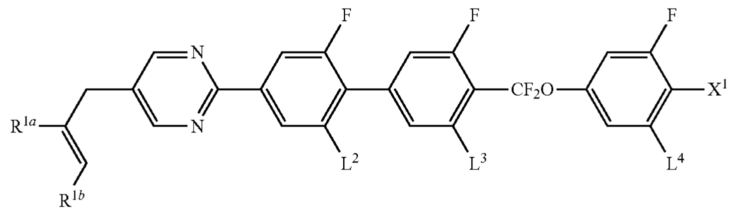
(1-3-1-2l)
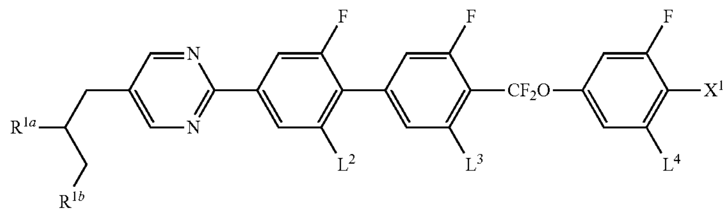
(1-3-1-3l)
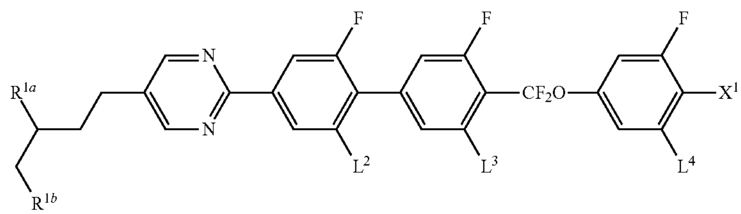
(1-3-1-4l)
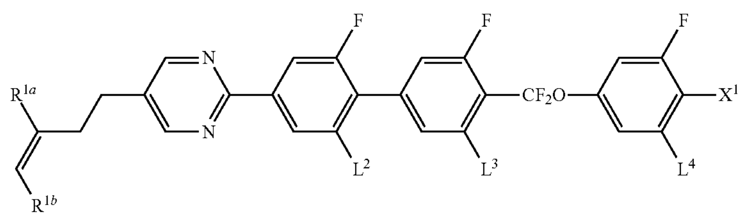
(1-3-1-5l)
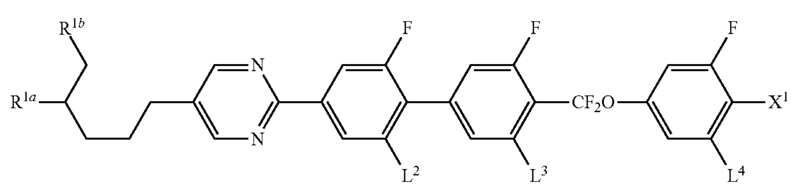
(1-3-1-6l)
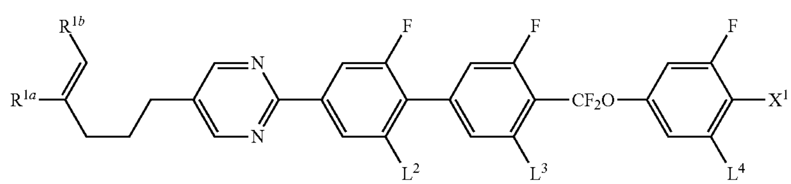
(1-3-1-7l)
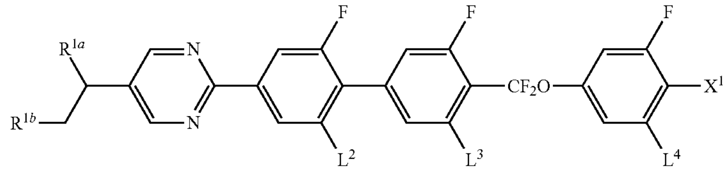

-continued
(1-3-1-8l)
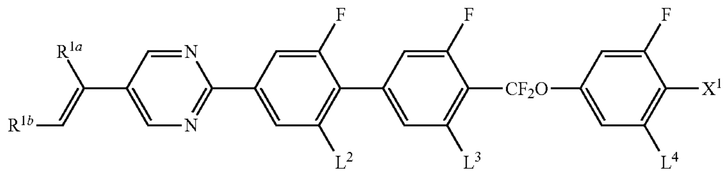
(1-3-2-1a)
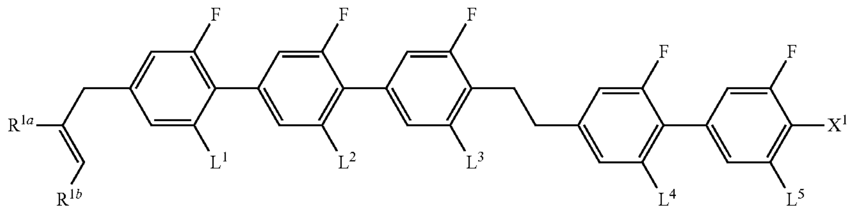
(1-3-2-2a)
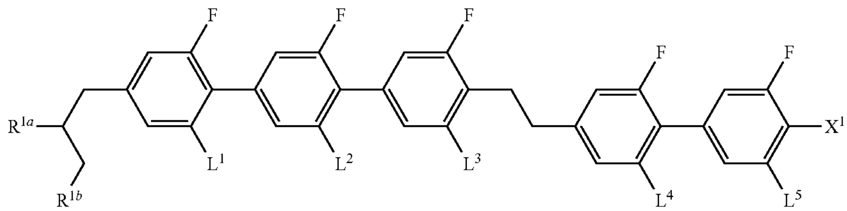
(1-3-2-3a)
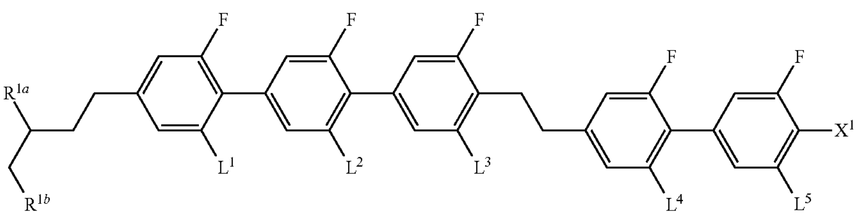
(1-3-2-4a)
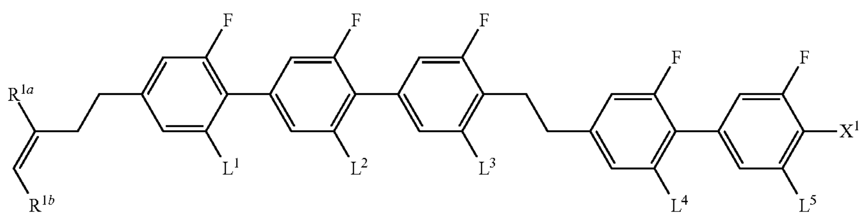
(1-3-2-5a)
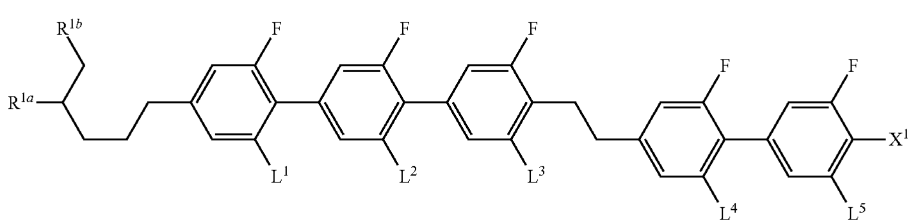
(1-3-2-6a)
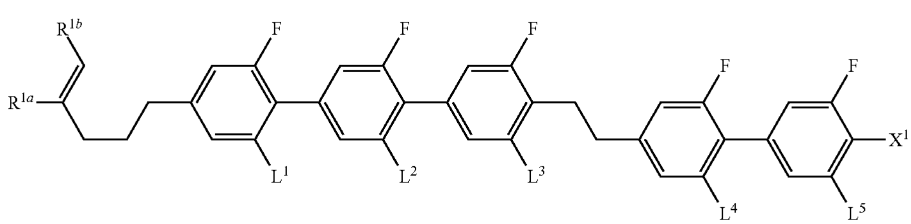

-continued
(1-3-2-7a)
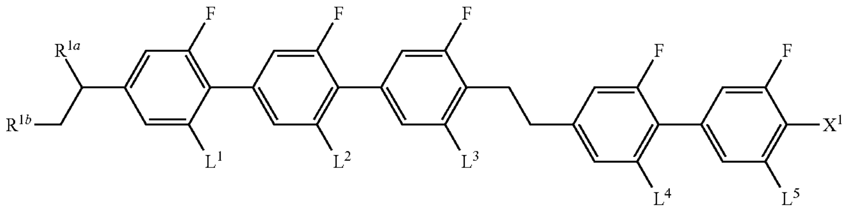
(1-3-2-8a)
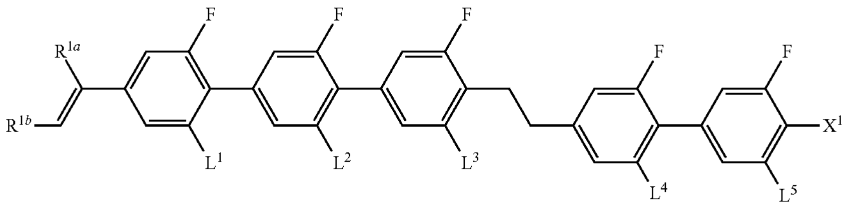
(1-3-2-1b)
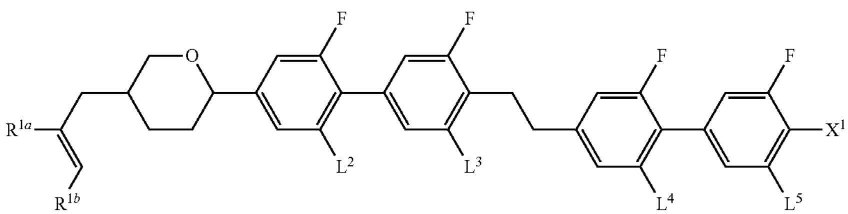
(1-3-2-2b)
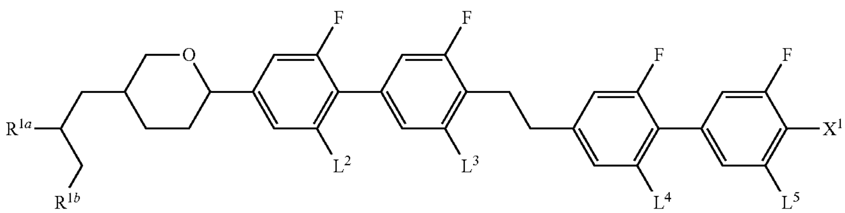
(1-3-2-3b)
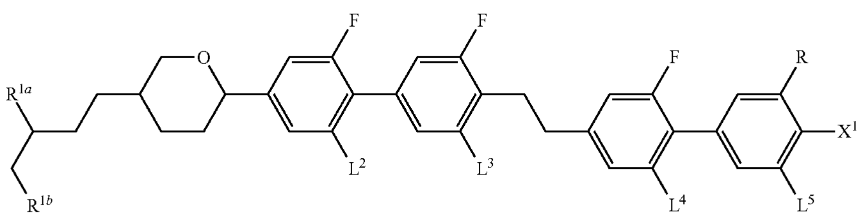
(1-3-2-4b)
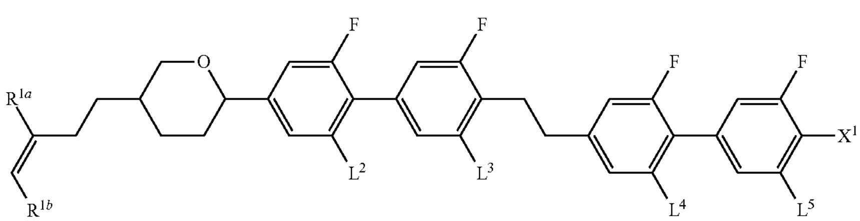
(1-3-2-5b)
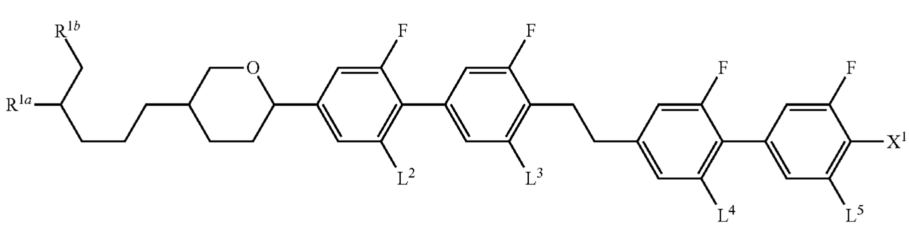

-continued
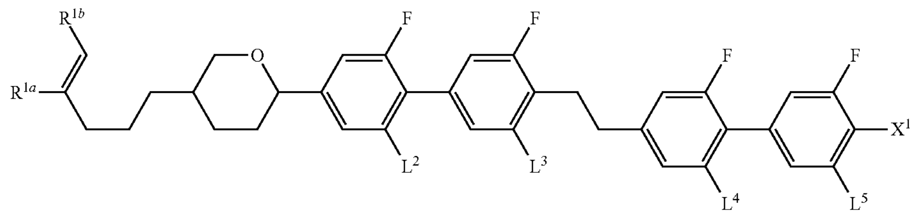
(1-3-2-6b)
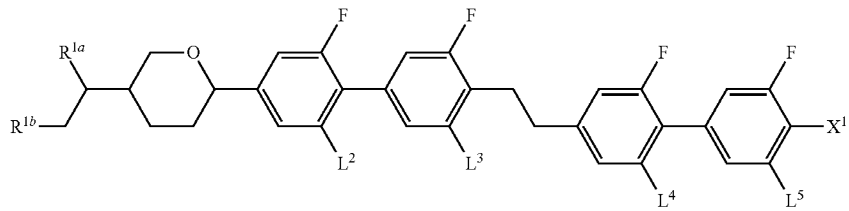
(1-3-2-7b)
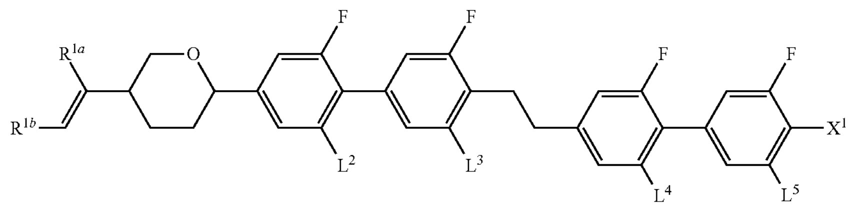
(1-3-2-8b)
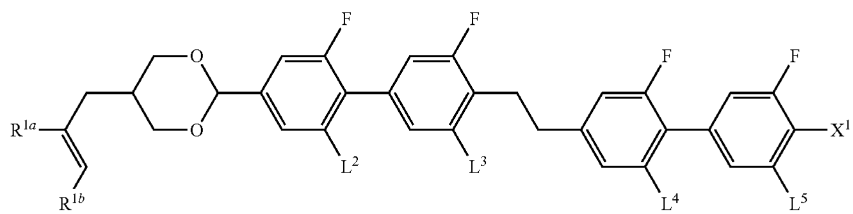
(1-3-2-1c)
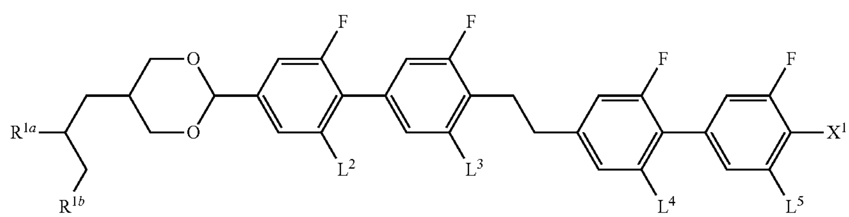
(1-3-2-2c)
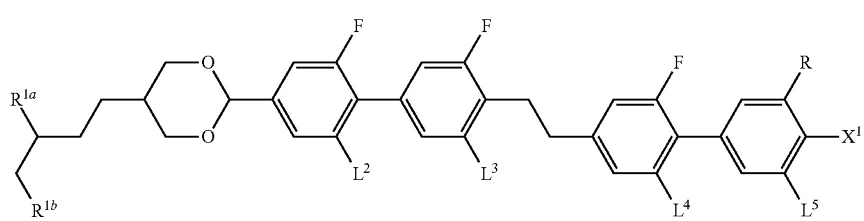
(1-3-2-3c)
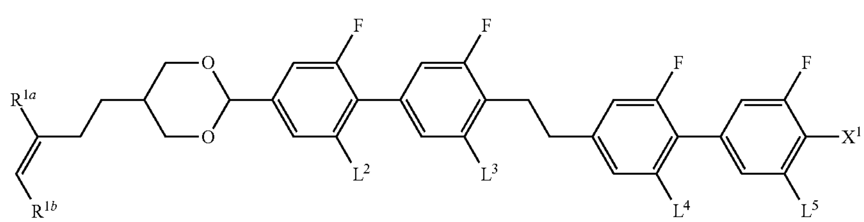
(1-3-2-4c)

-continued
(1-3-2-5c)
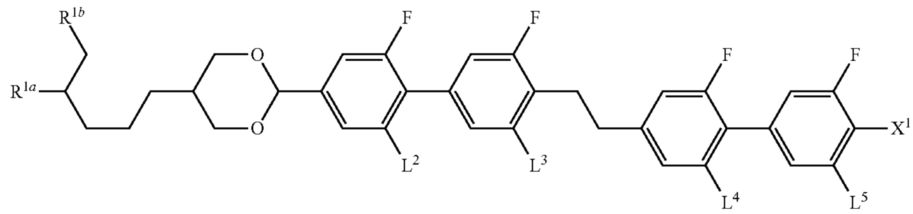
(1-3-2-6c)
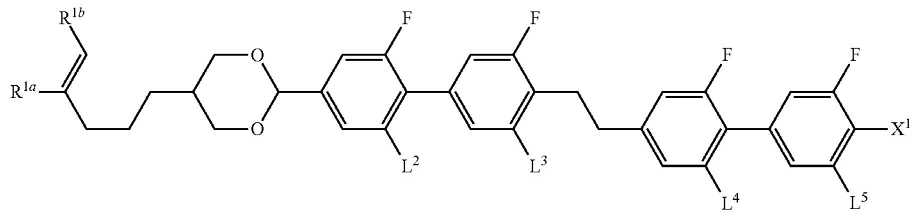
(1-3-2-7c)
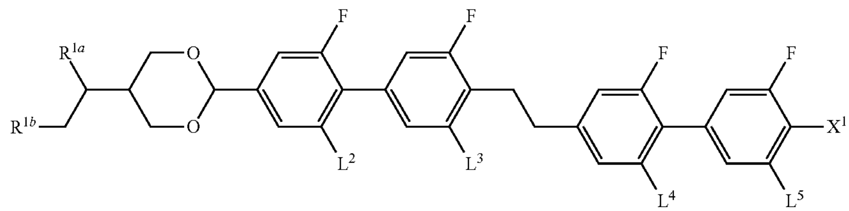
(1-3-2-8c)
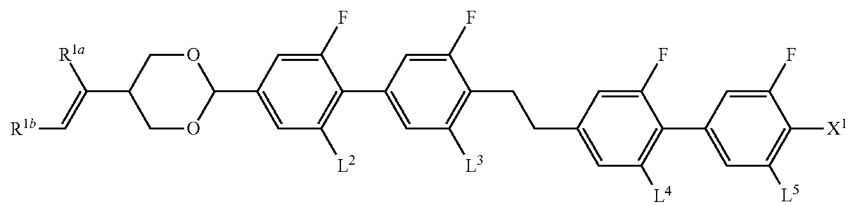
(1-3-2-1d)
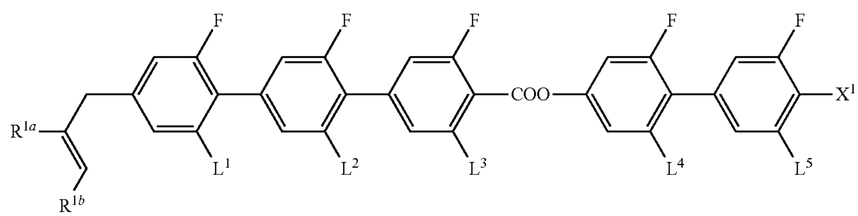
(1-3-2-2d)
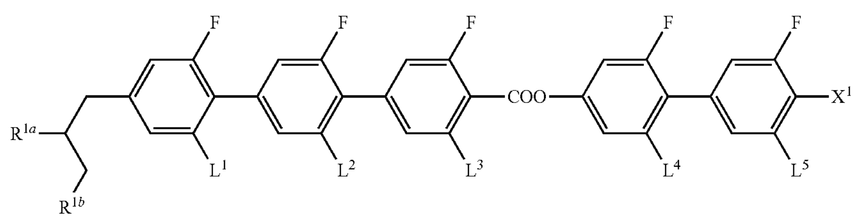
(1-3-2-3d)
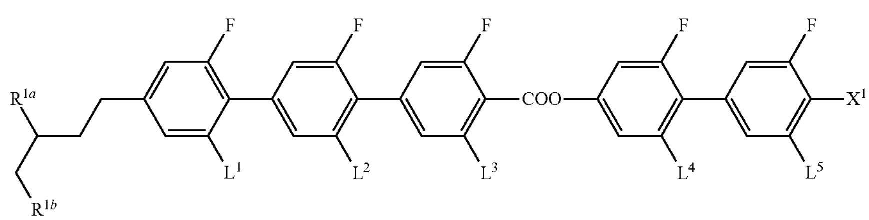

-continued
(1-3-2-4d)
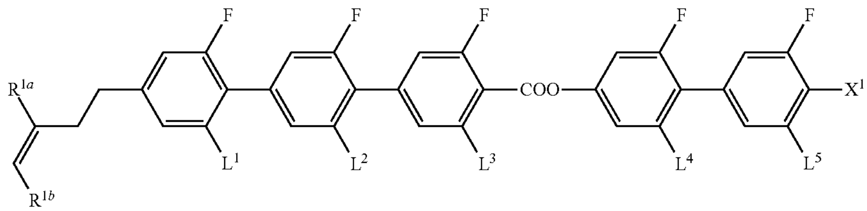
(1-3-2-5d)
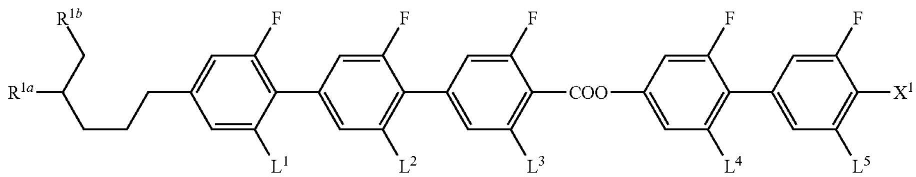
(1-3-2-6d)
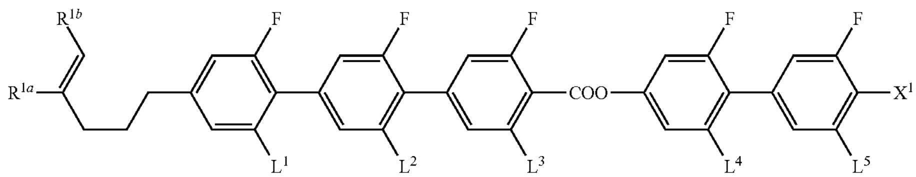
(1-3-2-7d)
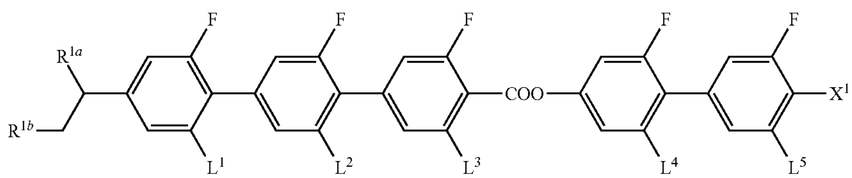
(1-3-2-8d)
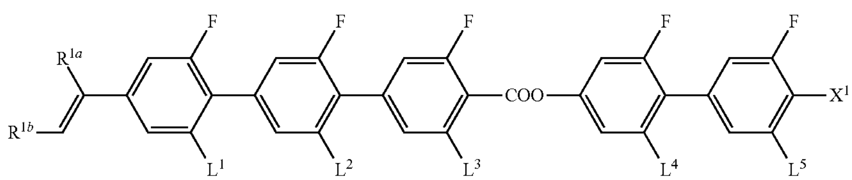
(1-3-2-1e)
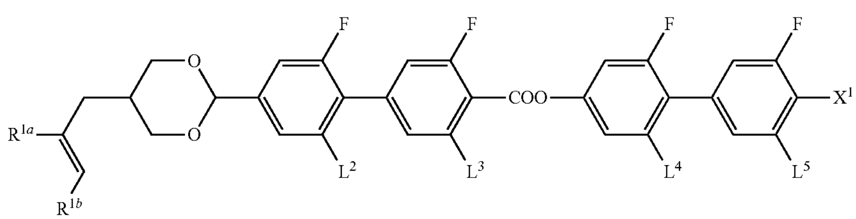
(1-3-2-2e)
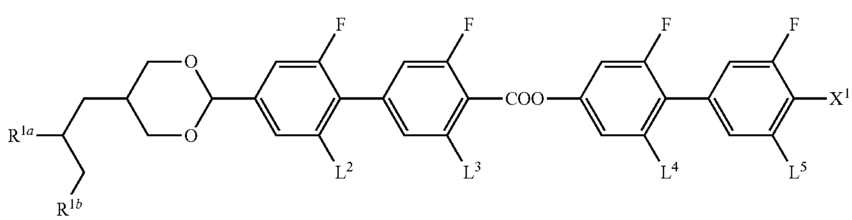
(1-3-2-3e)
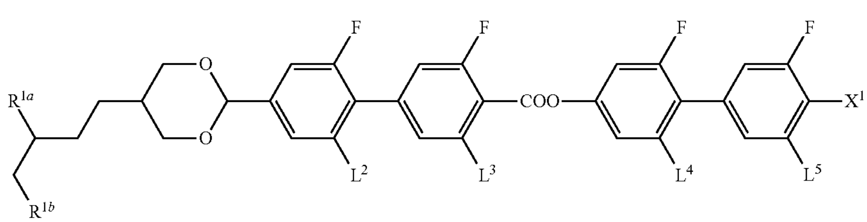

-continued
(1-3-2-4e)
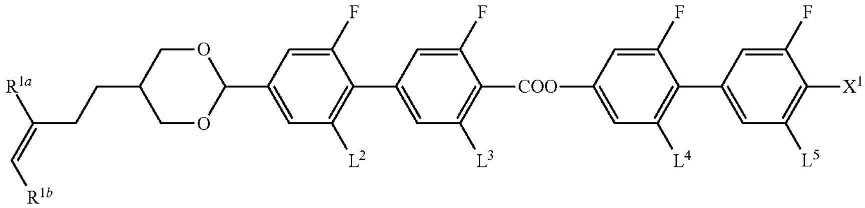
(1-3-2-5e)
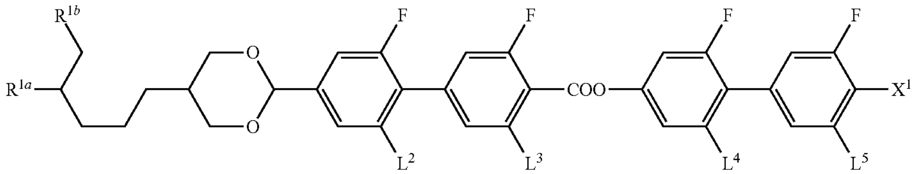
(1-3-2-6e)
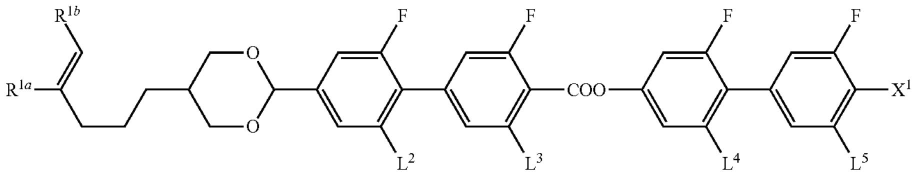
(1-3-2-7e)
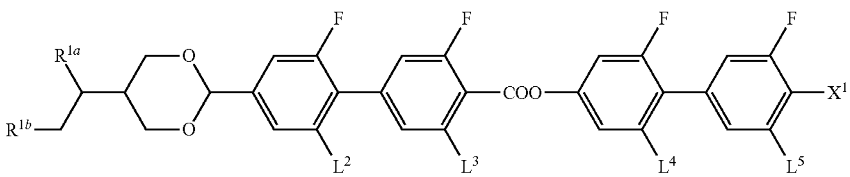
(1-3-2-8e)
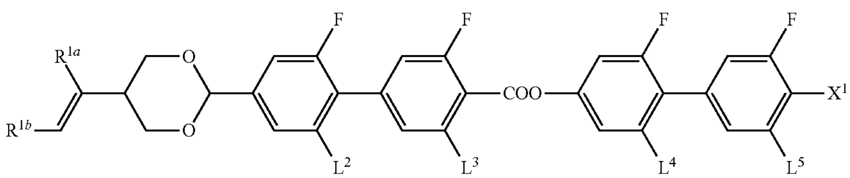
(1-3-2-1f)
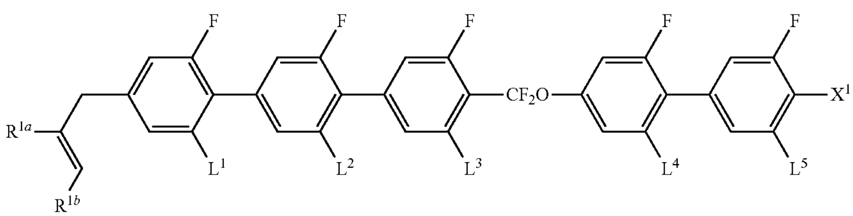
(1-3-2-2f)
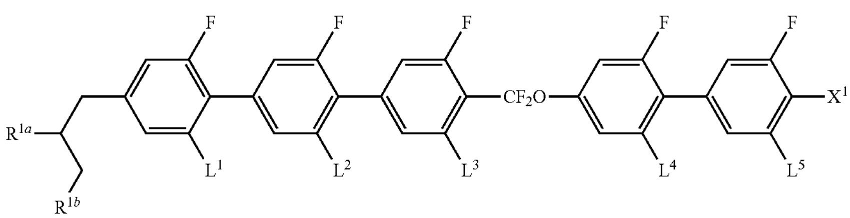
(1-3-2-3f)
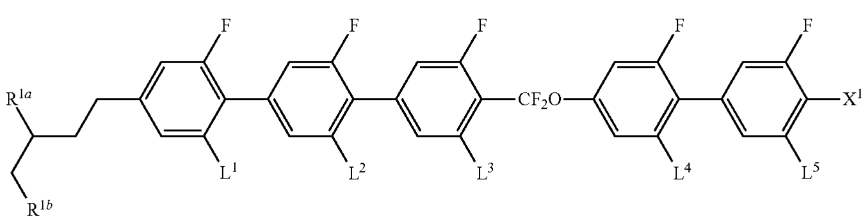

-continued
(1-3-2-4f)
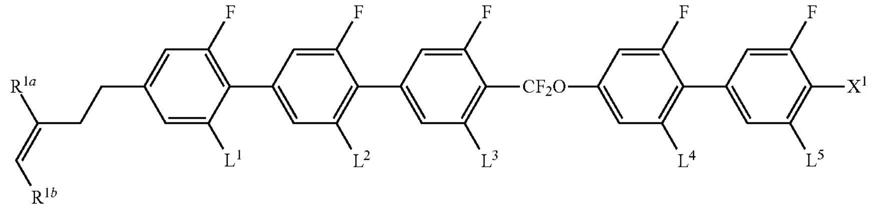
(1-3-2-5f)
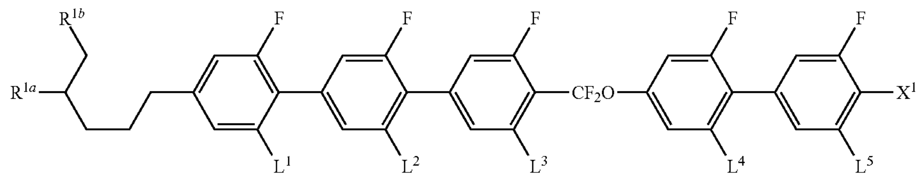
(1-3-2-6f)
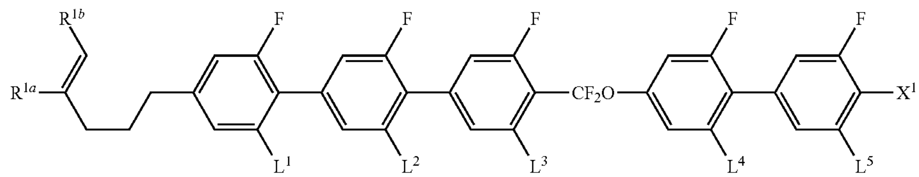
(1-3-2-7f)
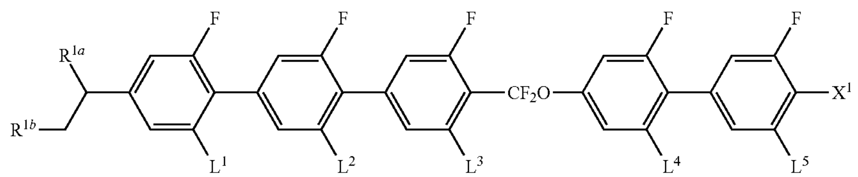
(1-3-2-8f)
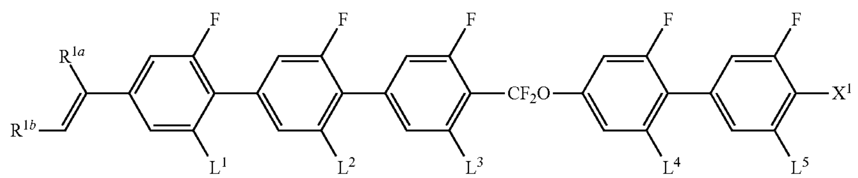
(1-3-2-1g)
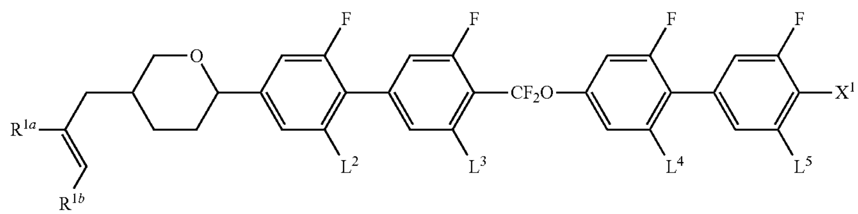
(1-3-2-2g)
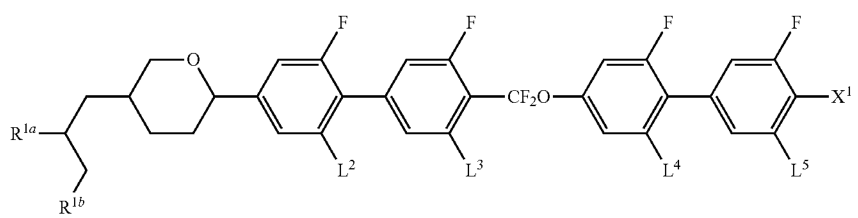
(1-3-2-3g)
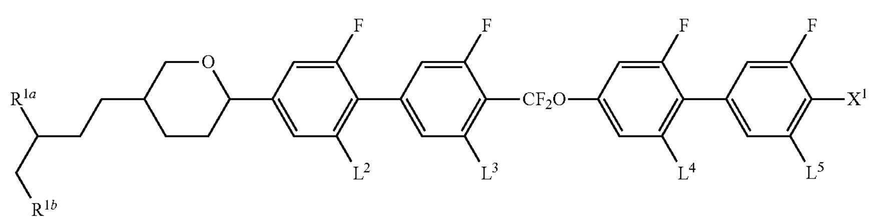

-continued
(1-3-2-4g)
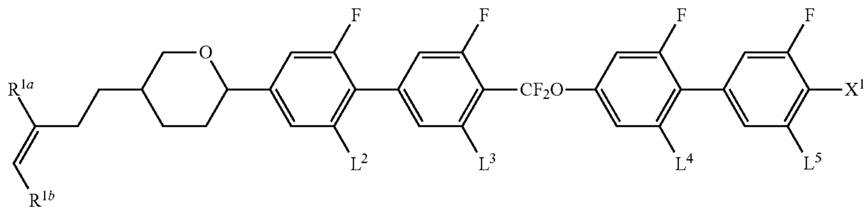
(1-3-2-5g)
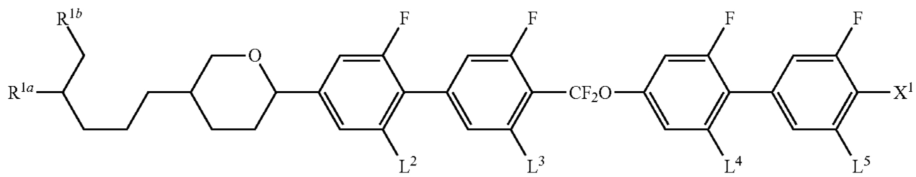
(1-3-2-6g)
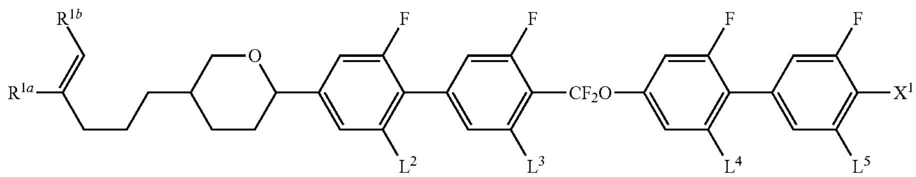
(1-3-2-7g)
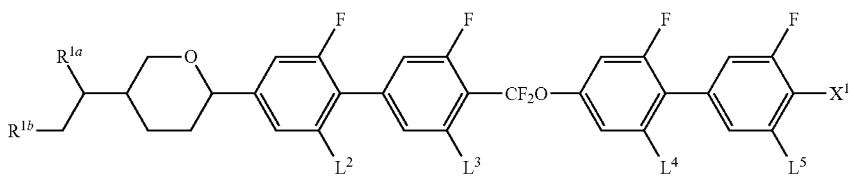
(1-3-2-8g)
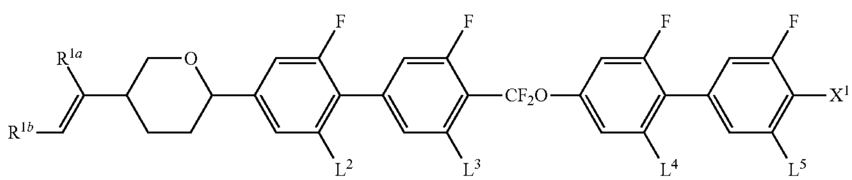
(1-3-2-1h)
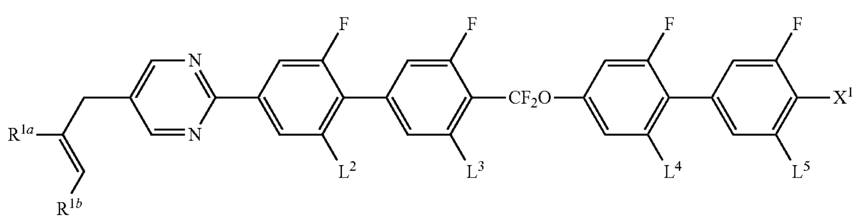
(1-3-2-2h)
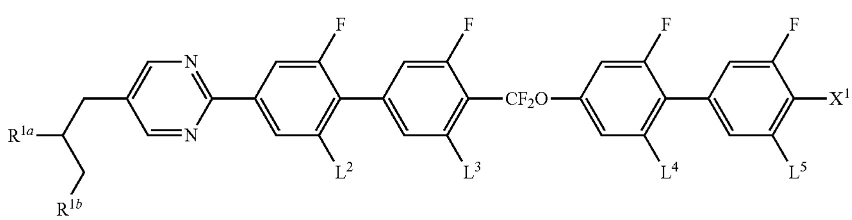
(1-3-2-3h)
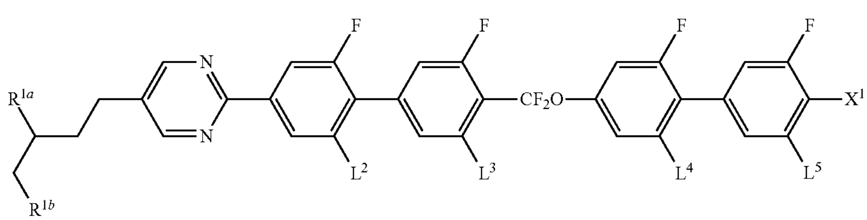

-continued
(1-3-2-4h)
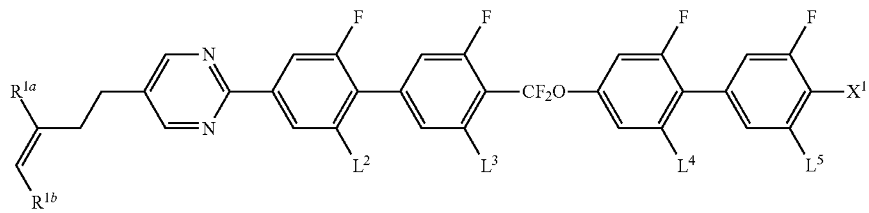
(1-3-2-5h)
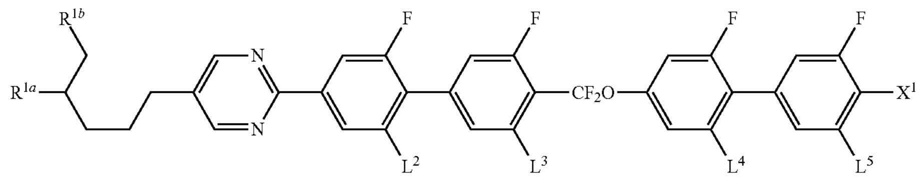
(1-3-2-6h)
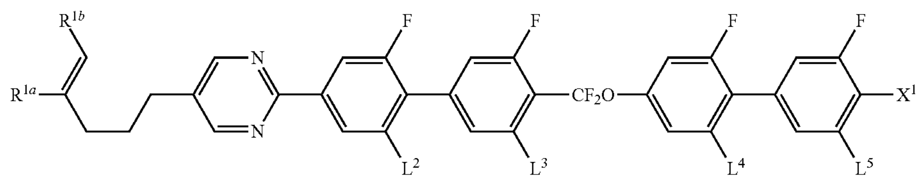
(1-3-2-7h)
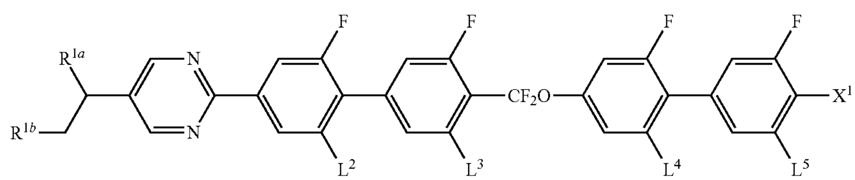
(1-3-2-8h)
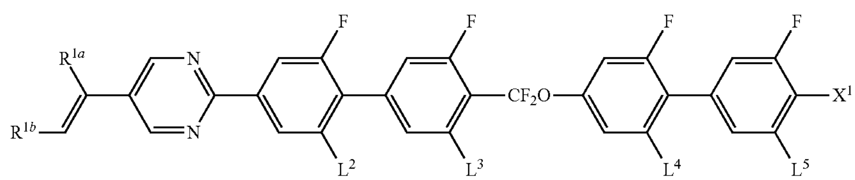
(1-3-2-1i)
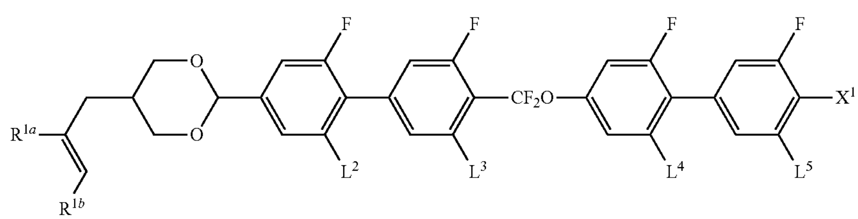
(1-3-2-2i)
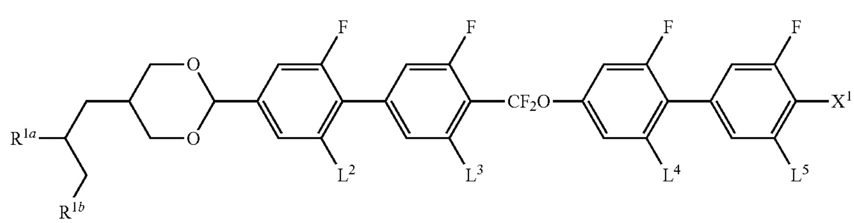
(1-3-2-3i)
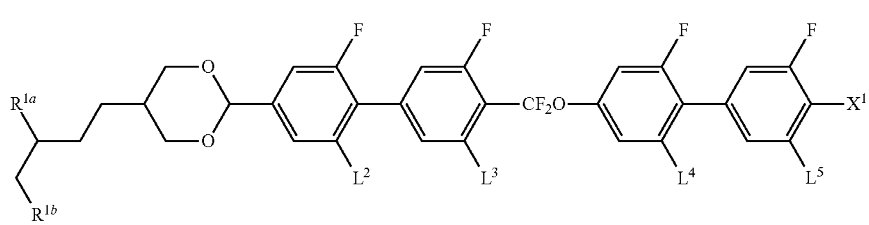

-continued
(1-3-2-4i)
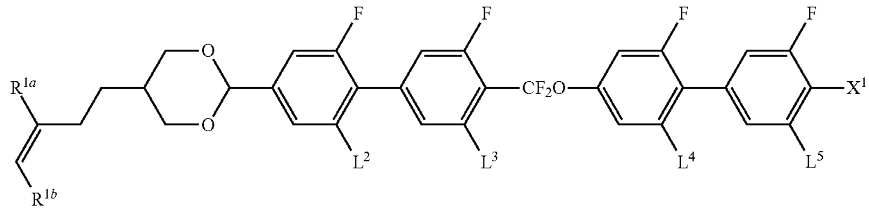
(1-3-2-5i)
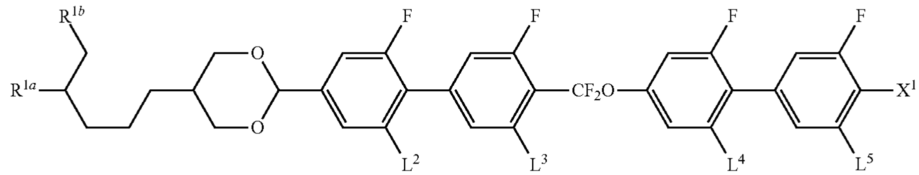
(1-3-2-6i)
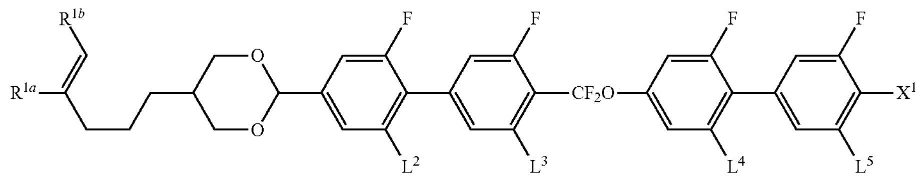
(1-3-2-7i)
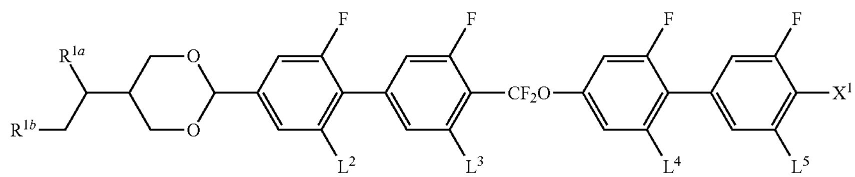
(1-3-2-8i)
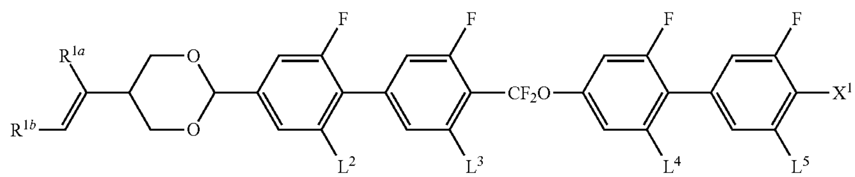
(1-2-9a)
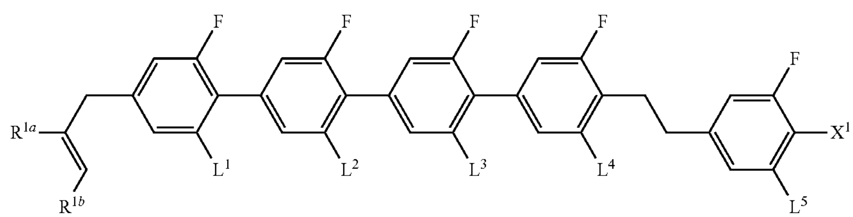
(1-3-2-10a)
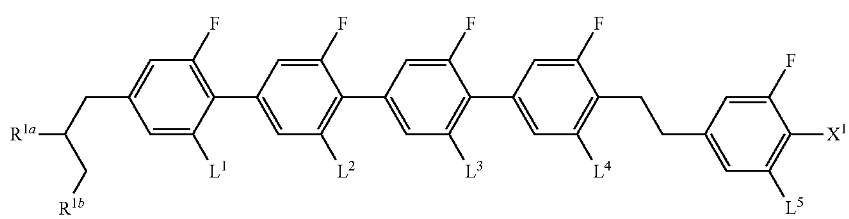
(1-3-2-11a)
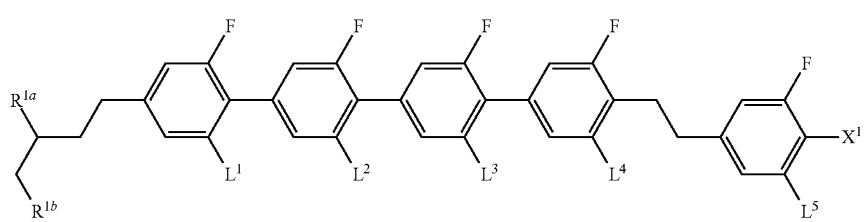

-continued
(1-3-2-12a)
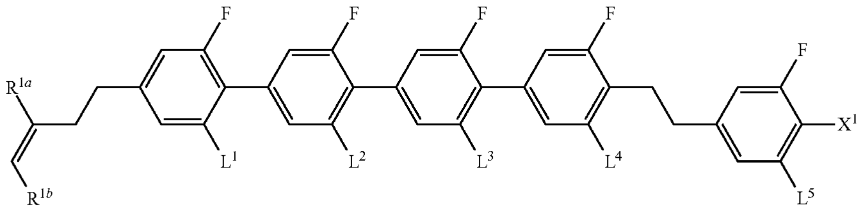
(1-3-2-13a)
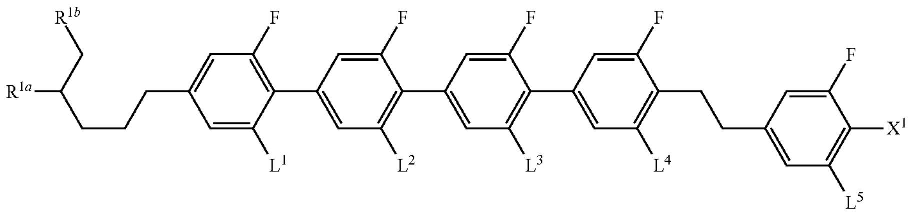
(1-3-2-14a)
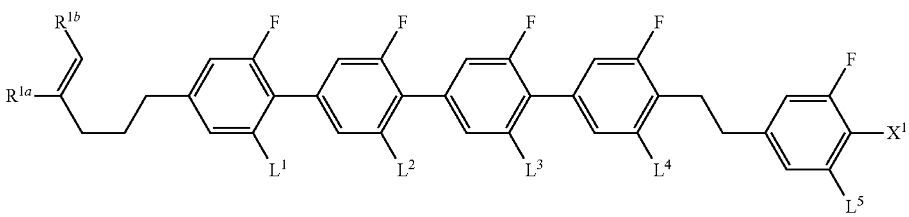
(1-3-2-15a)
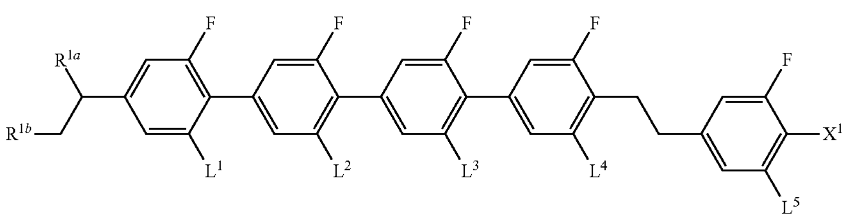
(1-3-2-16a)
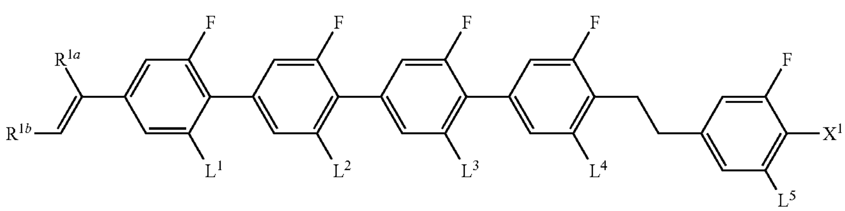
(1-2-9b)
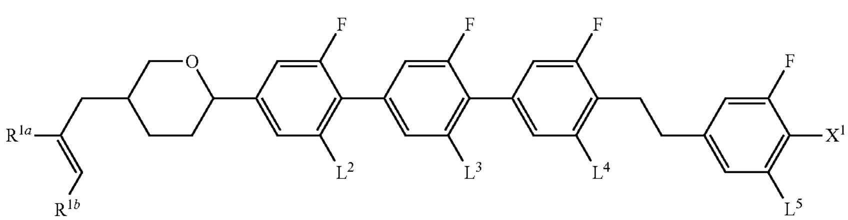
(1-3-2-10b)
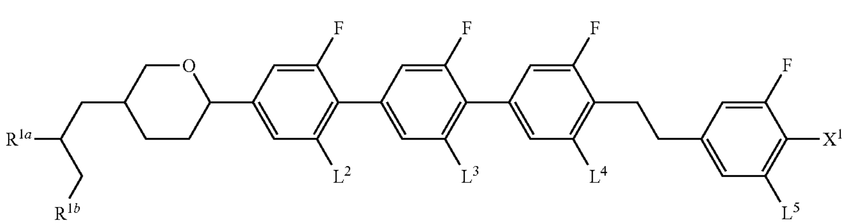

-continued
(1-3-2-11b)
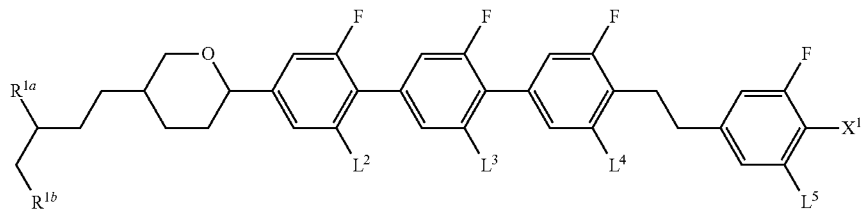
(1-3-2-12b)
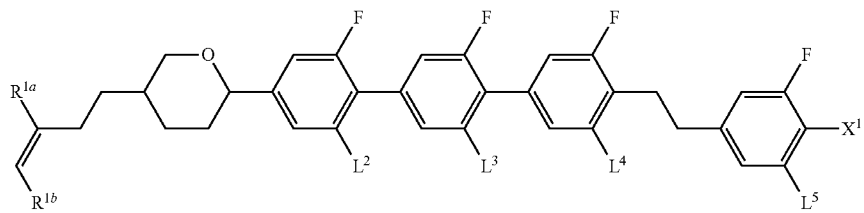
(1-3-2-13b)
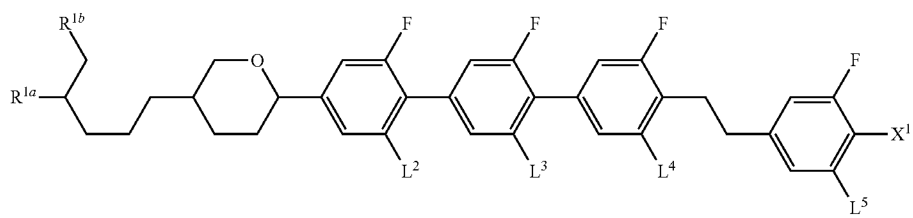
(1-3-2-14b)
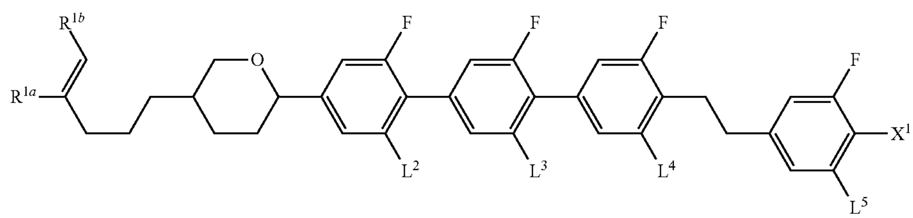
(1-3-2-15b)
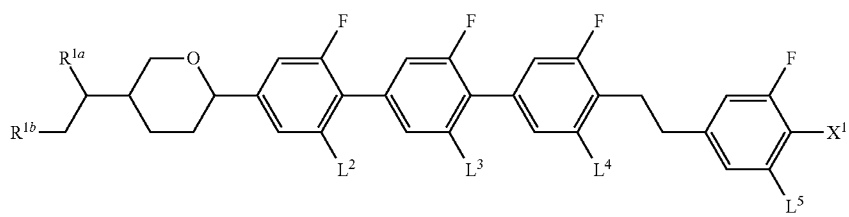
(1-3-2-16b)
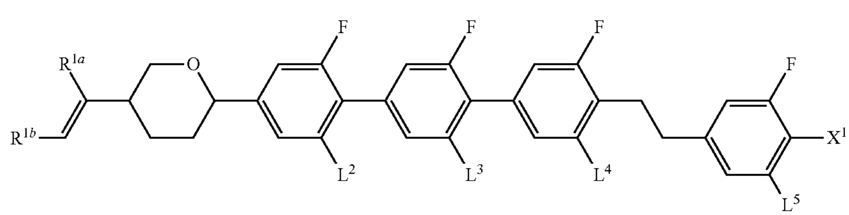
(1-2-9c)
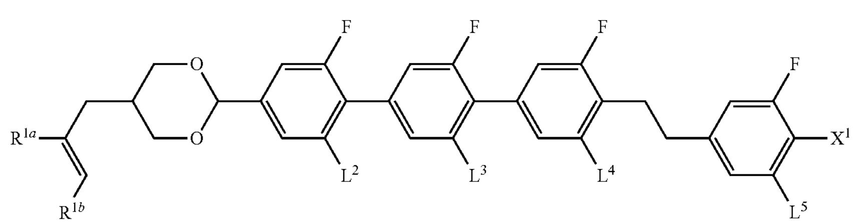

-continued
(1-3-2-10c)
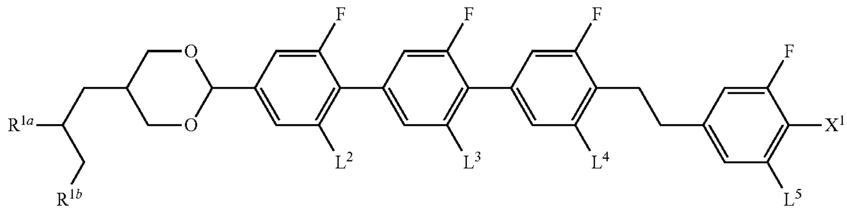
(1-3-2-11c)
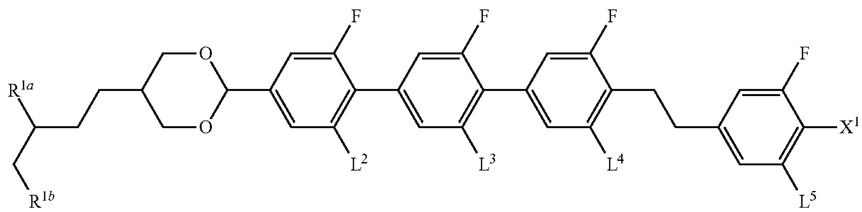
(1-3-2-12c)
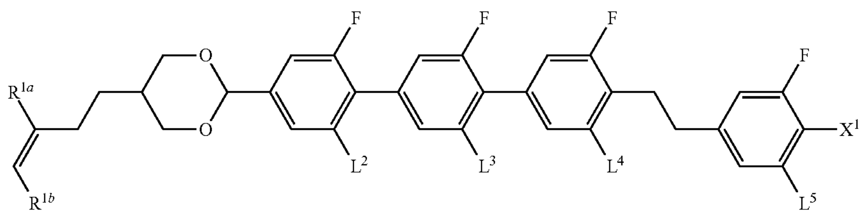
(1-3-2-13c)
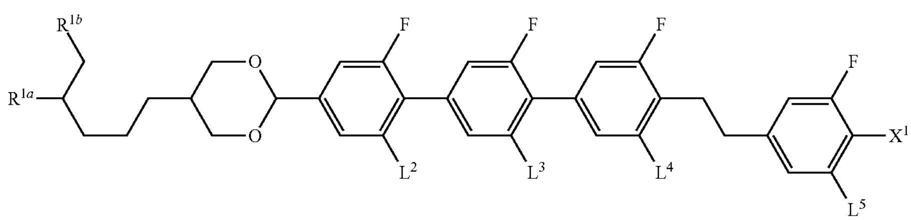
(1-3-2-14c)
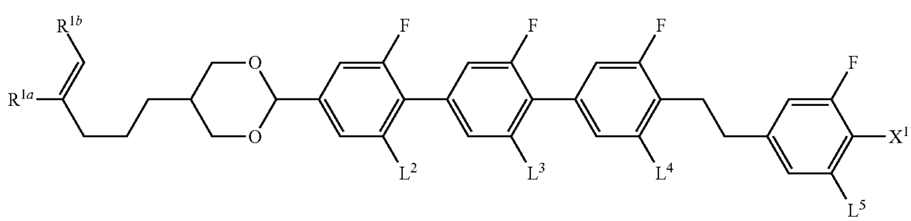
(1-3-2-15c)
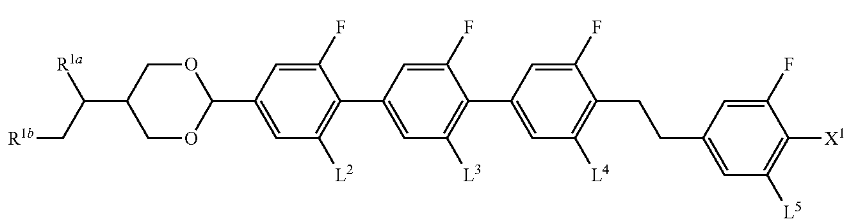
(1-3-2-16c)
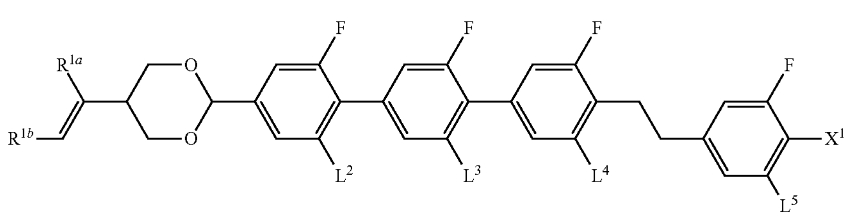

-continued
(1-3-2-9d)
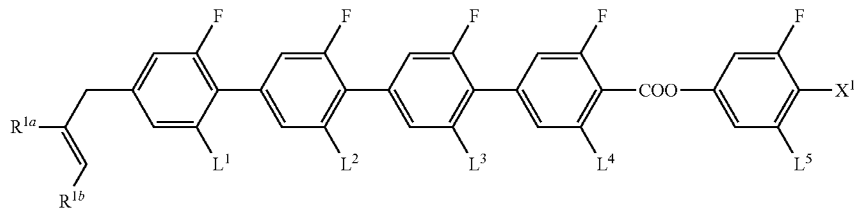
(1-3-2-10d)
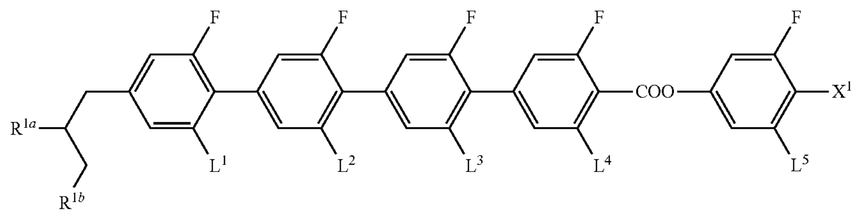
(1-3-2-11d)
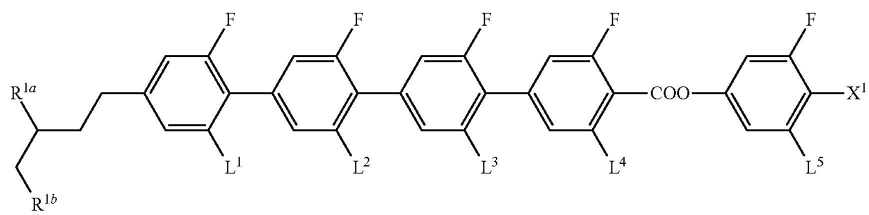
(1-3-2-12d)
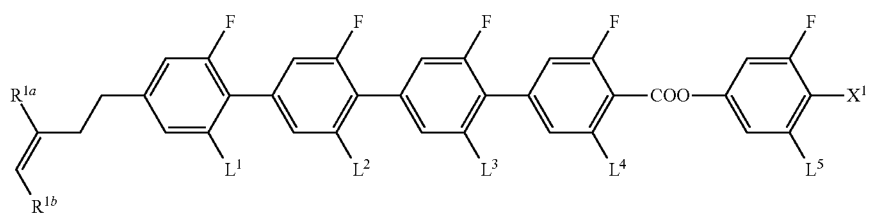
(1-3-2-13d)
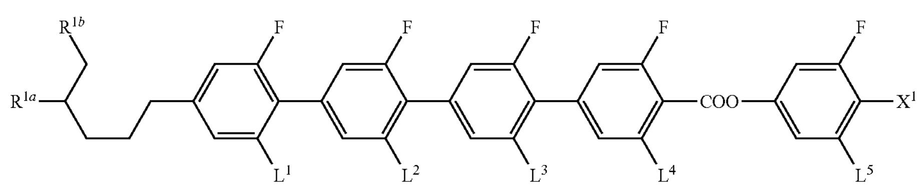
(1-3-2-14d)
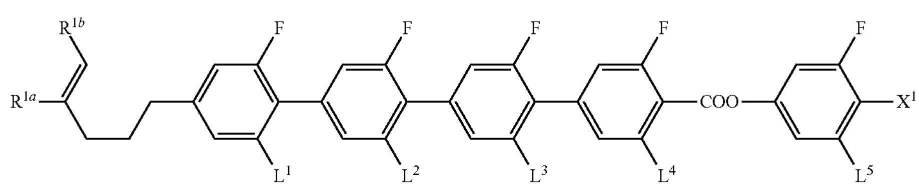
(1-3-2-15d)
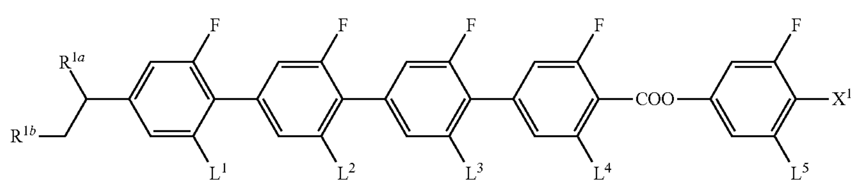
(1-3-2-16d)
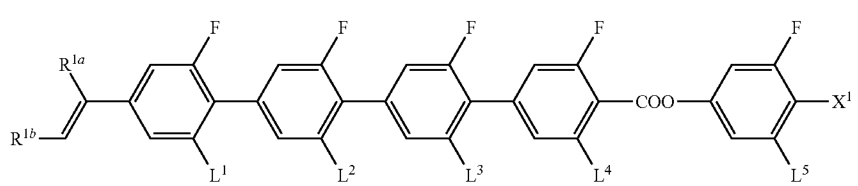

-continued
(1-3-2-9e)
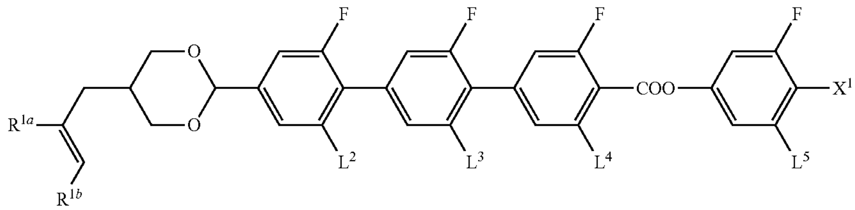
(1-3-2-10e)
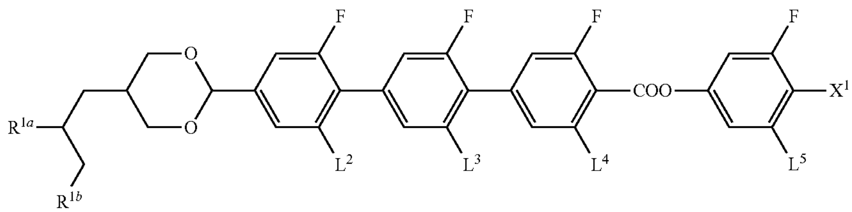
(1-3-2-11e)
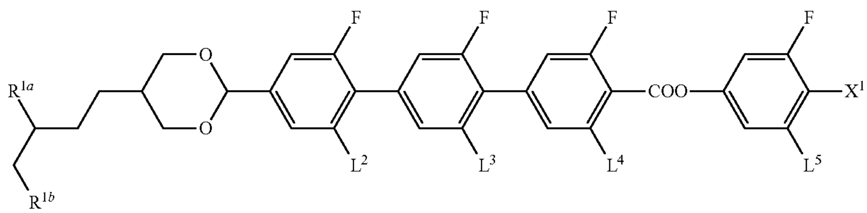
(1-3-2-12e)
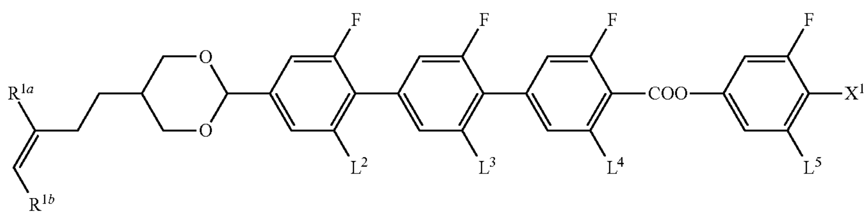
(1-3-2-13e)
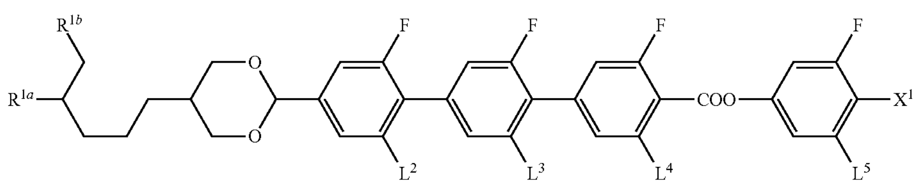
(1-3-2-14e)
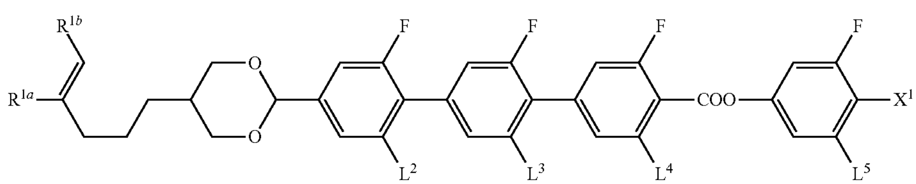
(1-3-2-15e)
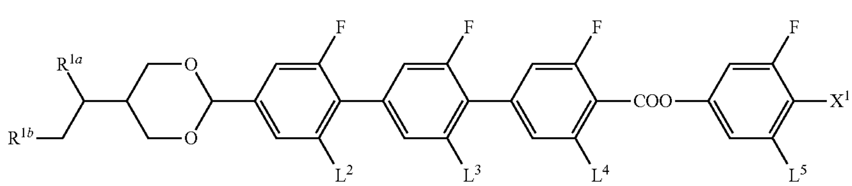
(1-3-2-16e)
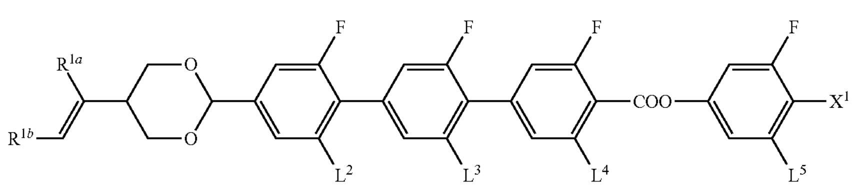

-continued
(1-3-2-9f)
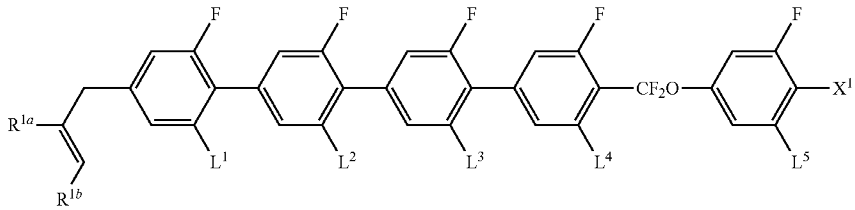
(1-3-2-10f)
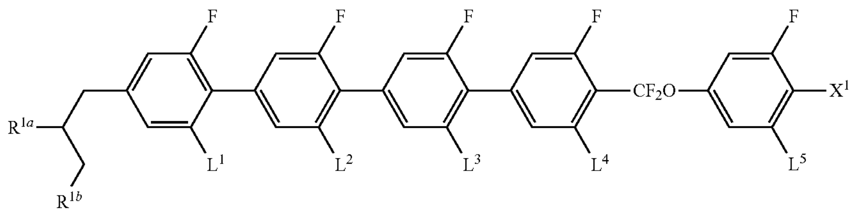
(1-3-2-11f)
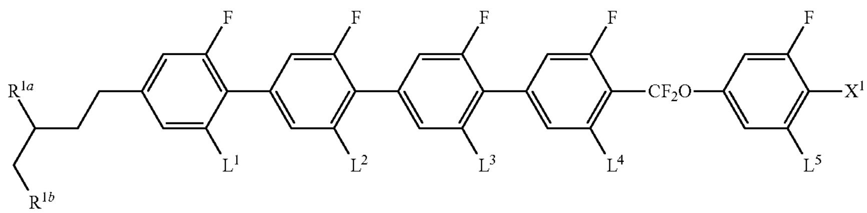
(1-3-2-12f)
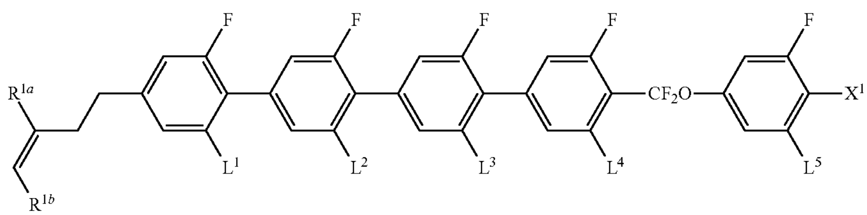
(1-3-2-13f)
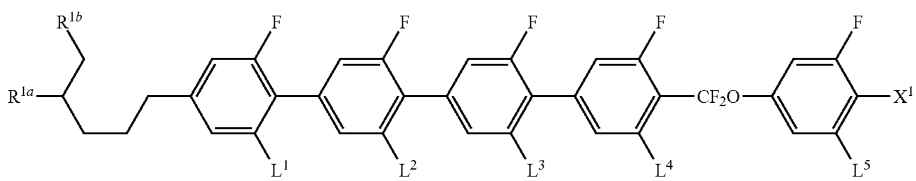
(1-3-2-14f)
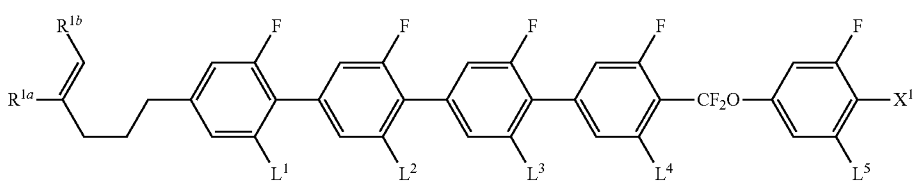
(1-3-2-15f)
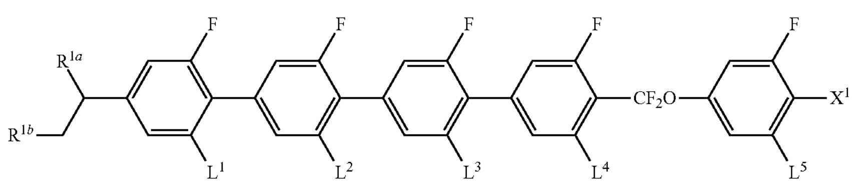
(1-3-2-16f)
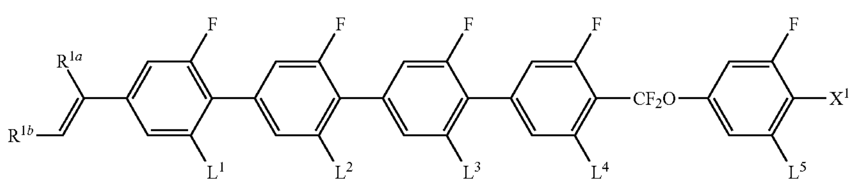

-continued
(1-3-2-9g)
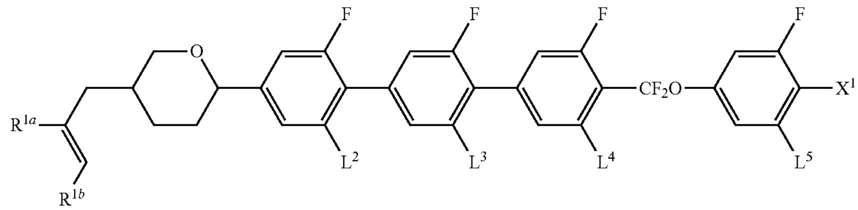
(1-3-2-10g)
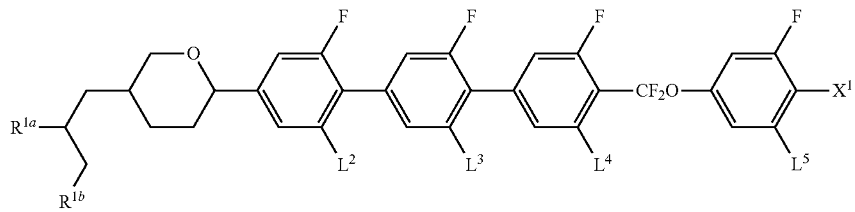
(1-3-2-11g)
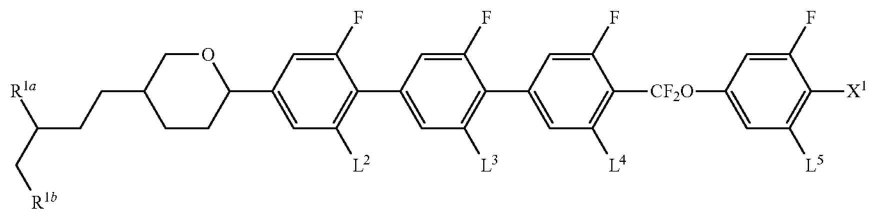
(1-3-2-12g)
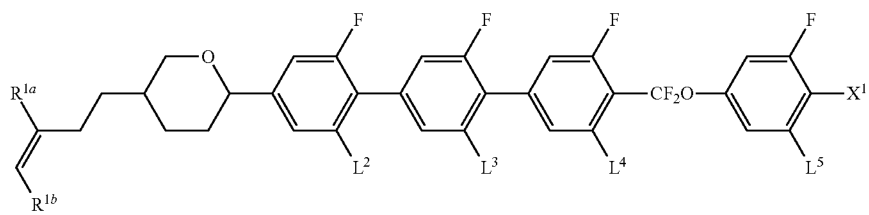
(1-3-2-13g)
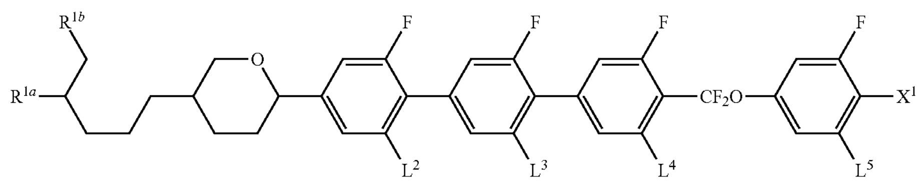
(1-3-2-14g)
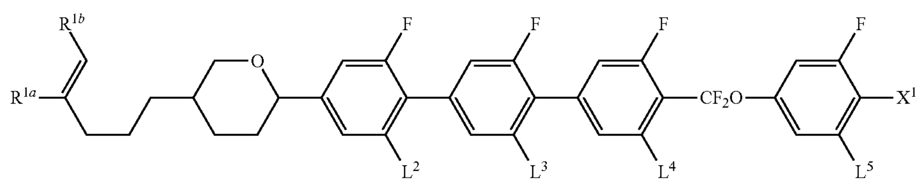
(1-3-2-15g)
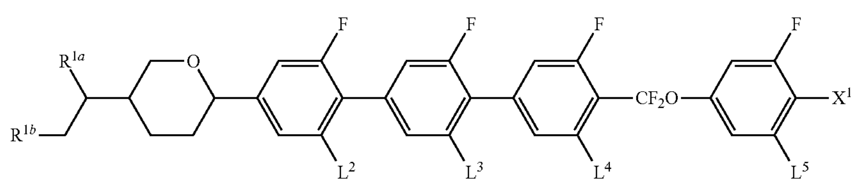
(1-3-2-16g)
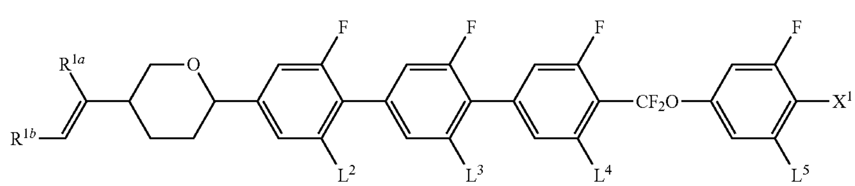

-continued
(1-3-2-9h)
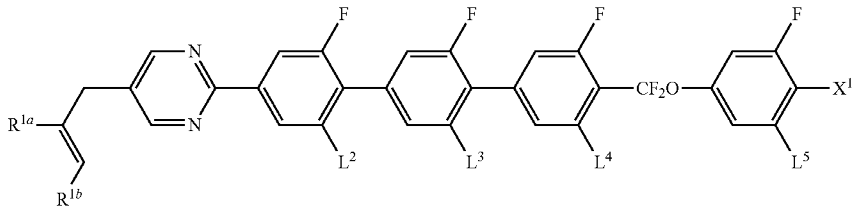
(1-3-2-10h)
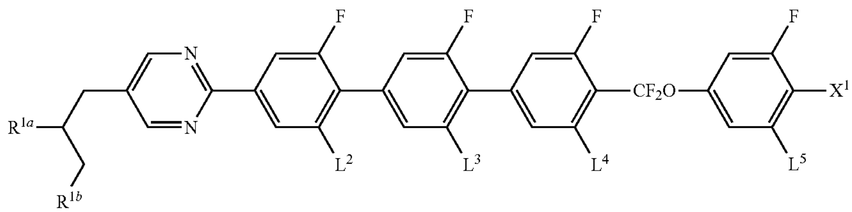
(1-3-2-11h)
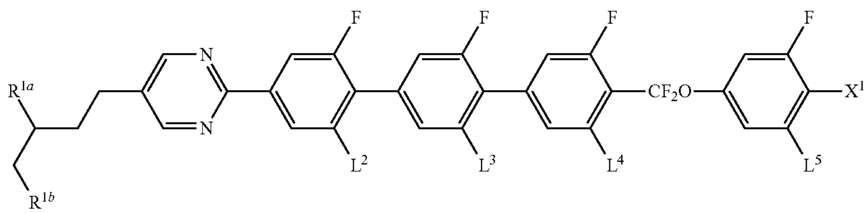
(1-3-2-12h)
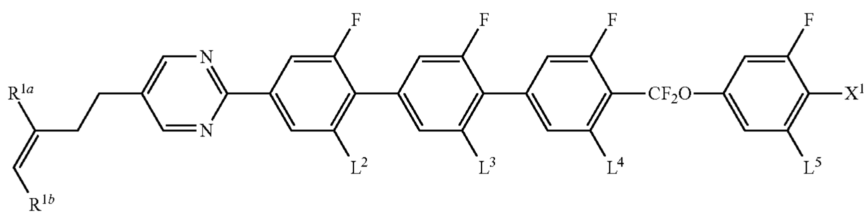
(1-3-2-13h)
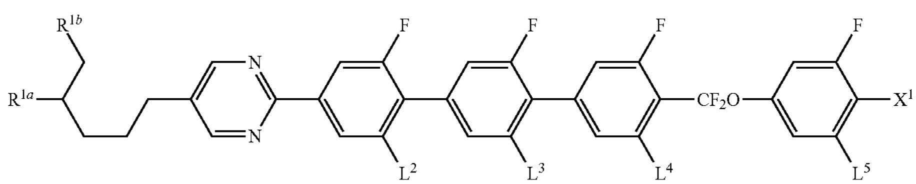
(1-3-2-14h)
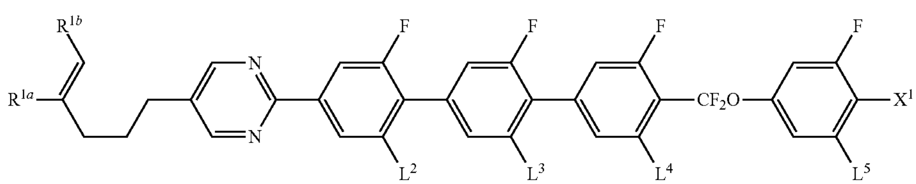
(1-3-2-15h)
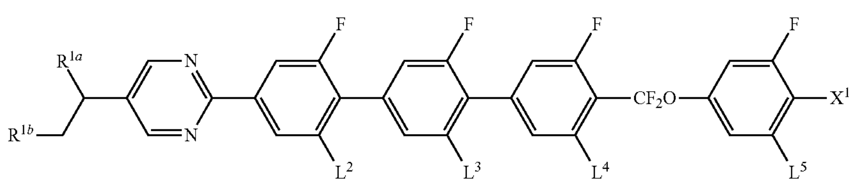
(1-3-2-16h)
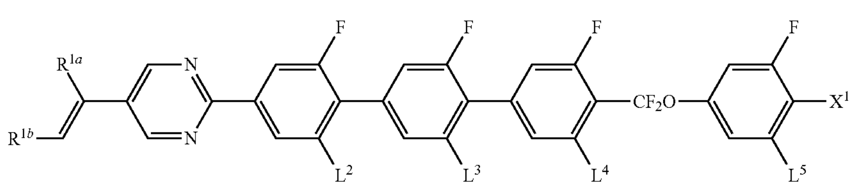

-continued
(1-3-2-9i)
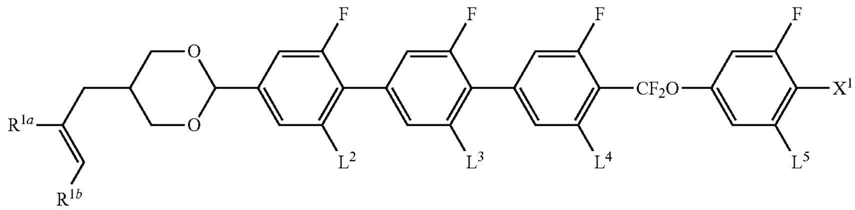
(1-3-2-10i)
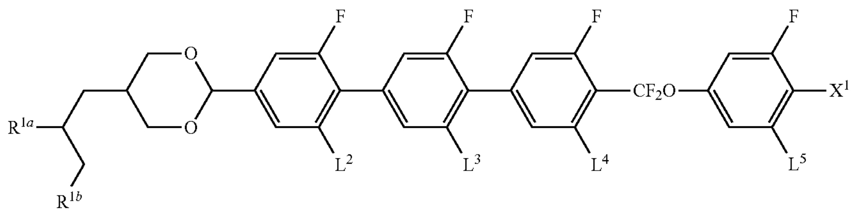
(1-3-2-11i)
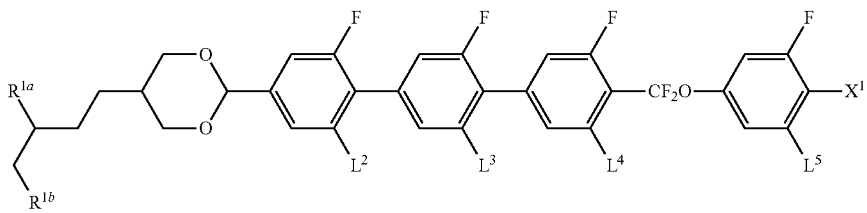
(1-3-2-12i)
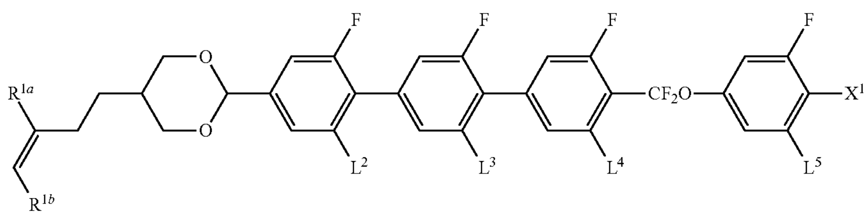
(1-3-2-13i)
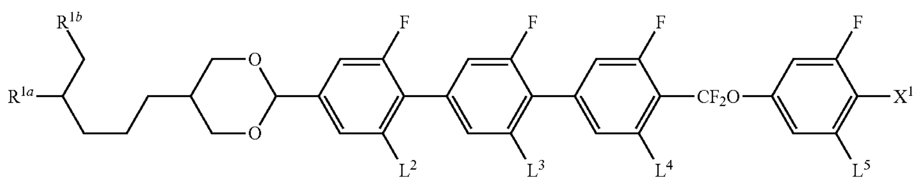
(1-3-2-14i)
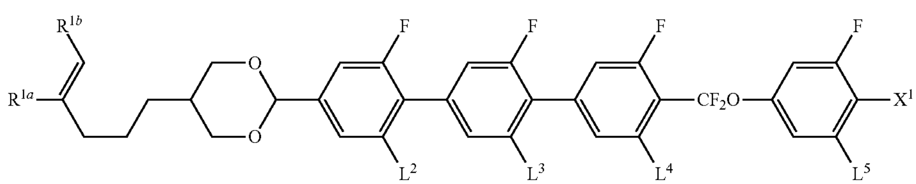
(1-3-2-15i)
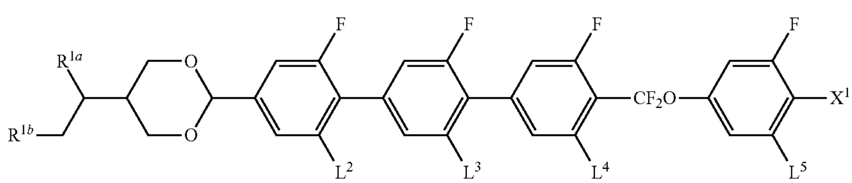
(1-3-2-16i)
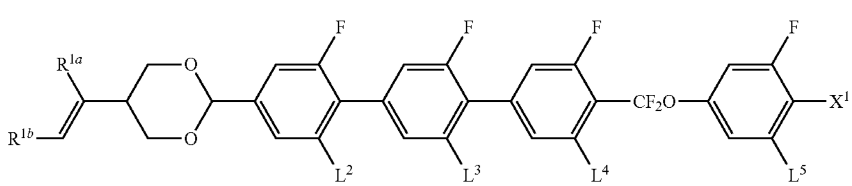

-continued
(1-3-2-9j)
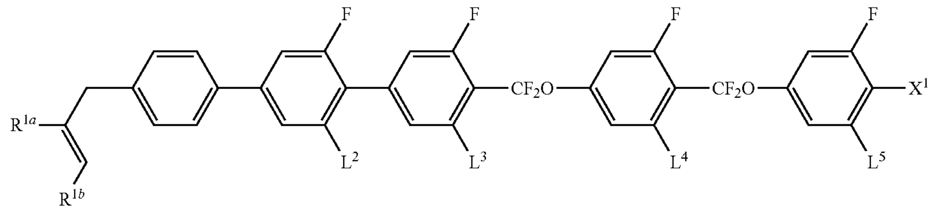
(1-3-2-10j)
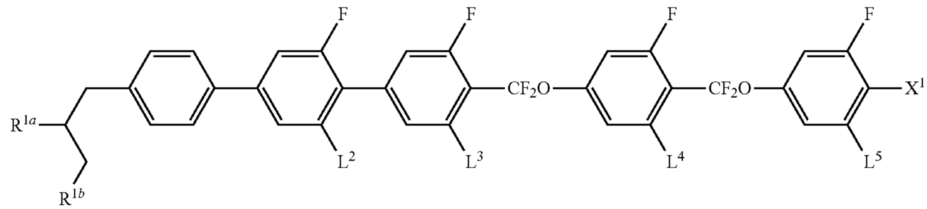
(1-3-2-11j)
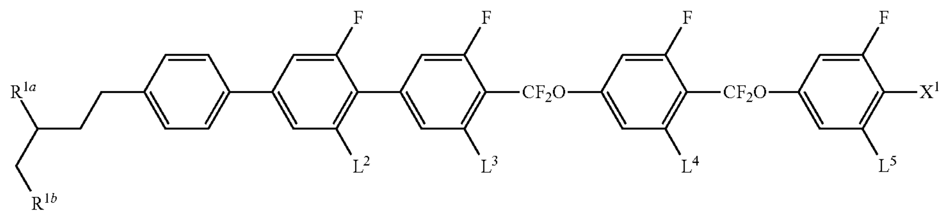
(1-3-2-12j)
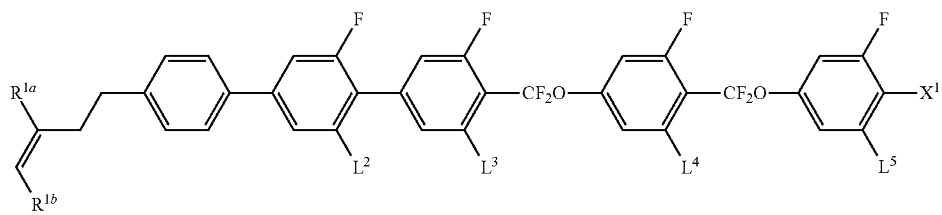
(1-3-2-13j)
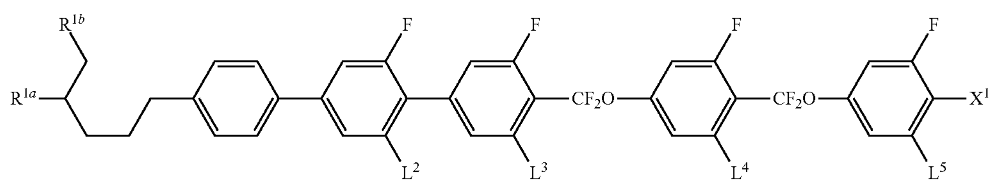
(1-3-2-14j)
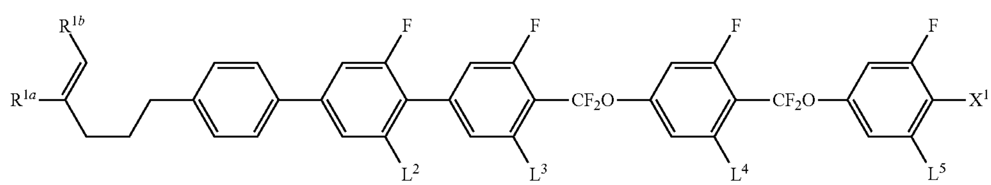
(1-3-2-15j)
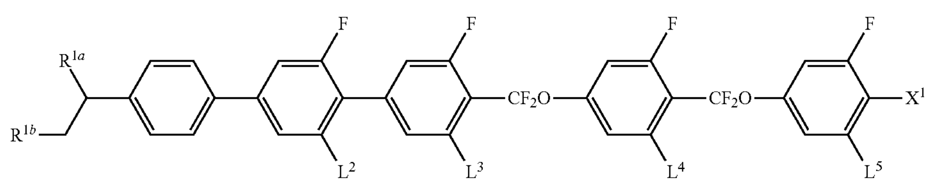
(1-3-2-16j)
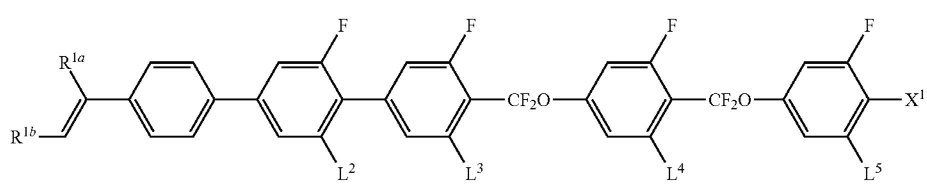

(4) Method for Synthesizing Compound (1-3)

A plurality of methods for synthesizing compound (1-3) are provided, and compound (1-3) can be appropriately synthesized from a commercially available reagent or based on the technologies as described in Examples herein and publicly known arts.

Compound (1-3) can be synthesized according to Scheme 1 and Scheme 2 as shown below, but its synthesis method is not limited to the synthesis method as described below.

Scheme 1

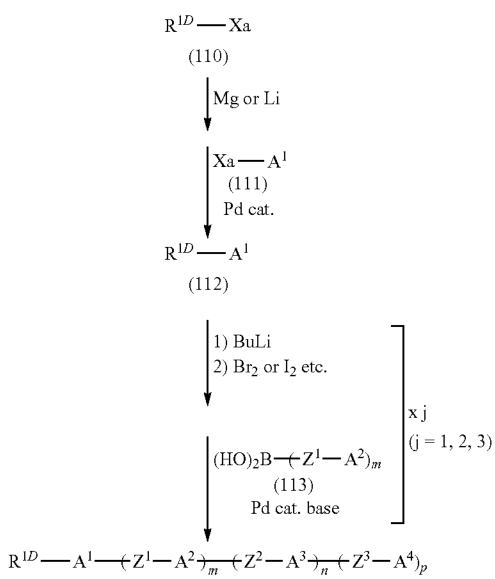

Scheme 2

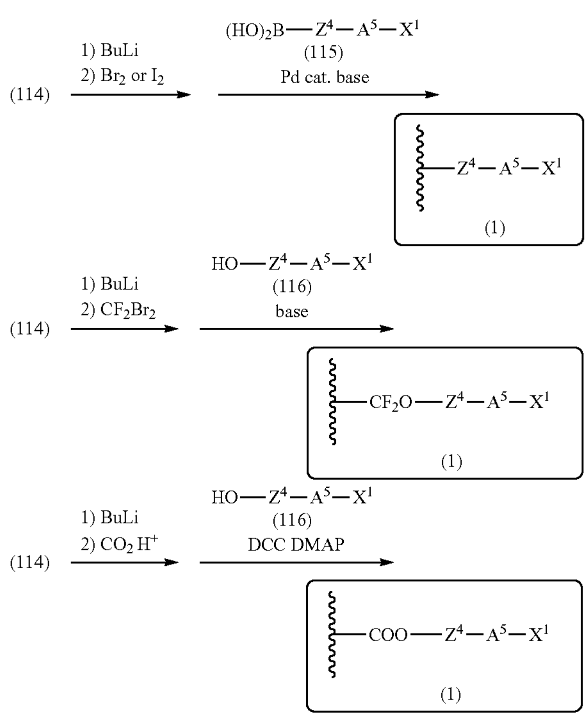

In the Scheme 1 and the Scheme 2, $R^{1D}$, $A^1$ to $A^5$, $Z^1$ to $Z^4$, m, n, o and p are defined as in the case of formula (1-3). Moreover, Xa is halogen, a triflate group, a mesyl group or a tosyl group.

Compound (112) can be obtained by first preparing halogen derivative (110) having branched alkyl, and performing a cross-coupling reaction between a product obtained by allowing magnesium or the like to react with compound (110), and a corresponding halogen derivative (111). Intermediate (114) can be obtained by converting compound (112) into a halogen derivative or the like and then repeating coupling reactions using a palladium catalyst by the necessary number of times.

Various kinds of compound (1-3) can be obtained by using intermediate (114) as a starting material.

For example, compound (1-3) having a single bond can be obtained by further performing a coupling reaction with boronic acid derivative (115).

Moreover, compound (1-3) having a $CF_2O$ bond can be obtained by allowing dibromodifluoromethane to react with alkyl lithium and then performing an etherification reaction with phenol derivative (116).

Moreover, compound (1-3) having an ester bond can be obtained by converting intermediate (114) into a carboxylic acid derivative by using alkyl lithium and dry ice, and then performing an esterification reaction using dicyclohexylcarbodiimide (DCC) and dimethylaminopyridine (DMAP).

(5) Synthesis of Branched Alkyl $R^{1D}$ in formula (1-3) is branched alkyl or branched alkenyl.

Several methods for introducing branched alkyl into a left-terminal group are provided. Basically, as shown in Scheme 3 below, a branched alkyl group is introduced by preparing halogen derivative (93) with branched alkyl and running a cross-coupling reaction, in the presence of a palladium catalyst, with a Grignard reagent of the halogen derivative and aromatic halogen derivative (94) or the like halogen derivative (94).

Scheme 3

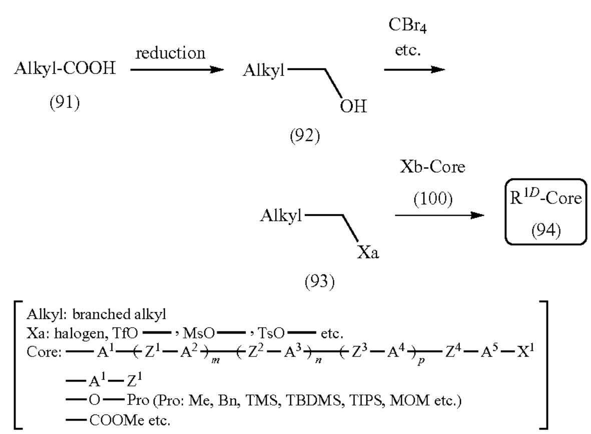

In Scheme 3, Alkyl represents branched alkyl, Xa represents halogen, a triflate group, a mesyl group or a tosyl group, and Core represents an organic group having a ring structure, or an alcohol derivative or an ester derivative into which a protective group (Pro) is introduced.

Halogen derivative (93) having branched alkyl may be a commercially available product, or may be obtained by conversion from carboxylic acid derivative (91) having corresponding branched alkyl, alcohol derivative (92) having corresponding branched alkyl or the like according to a known method.

Moreover, branched alkyl can be formed, according to a known method, from a general synthetic reagent. One example (Scheme 4) of such schemes is shown below.

Scheme 4
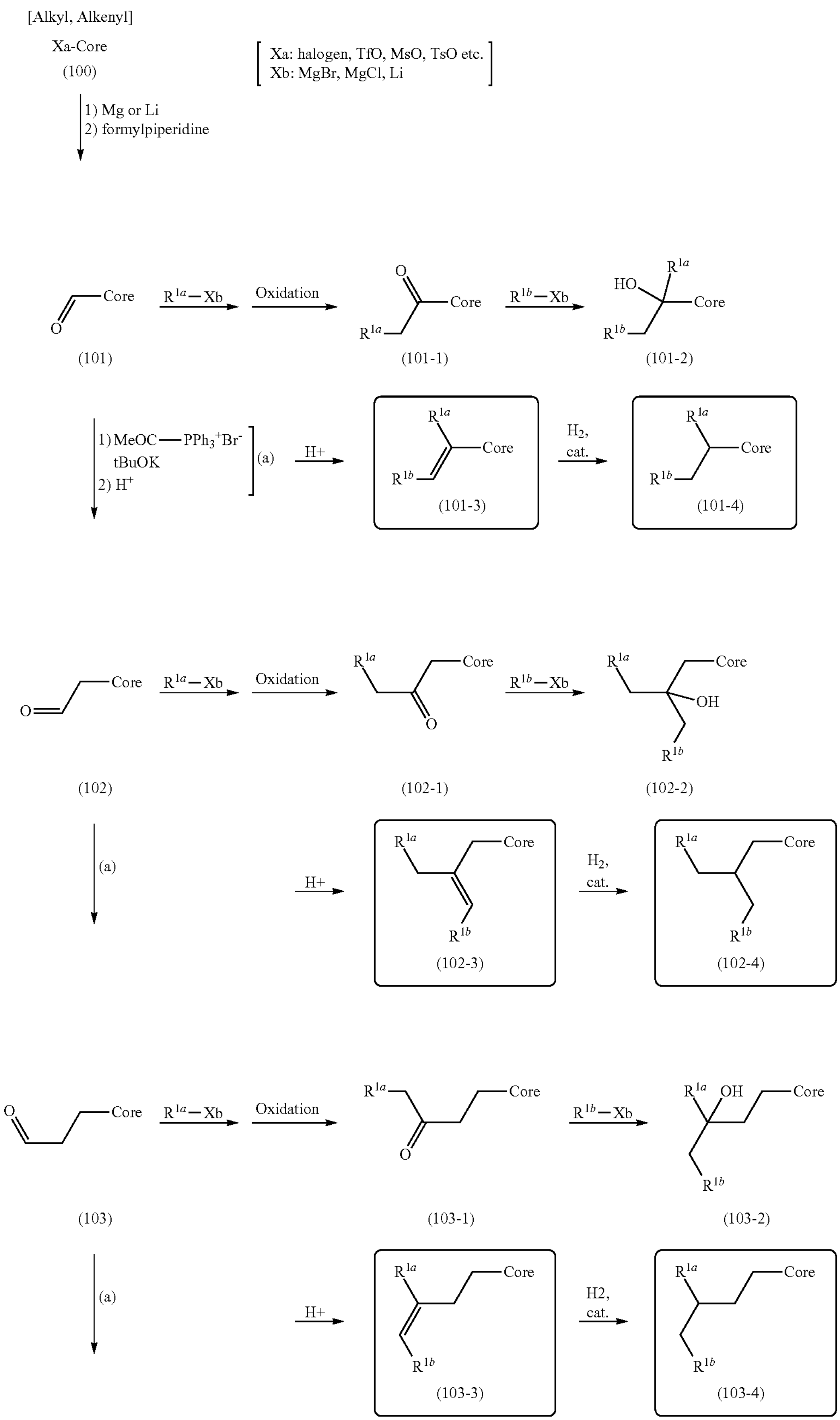

-continued

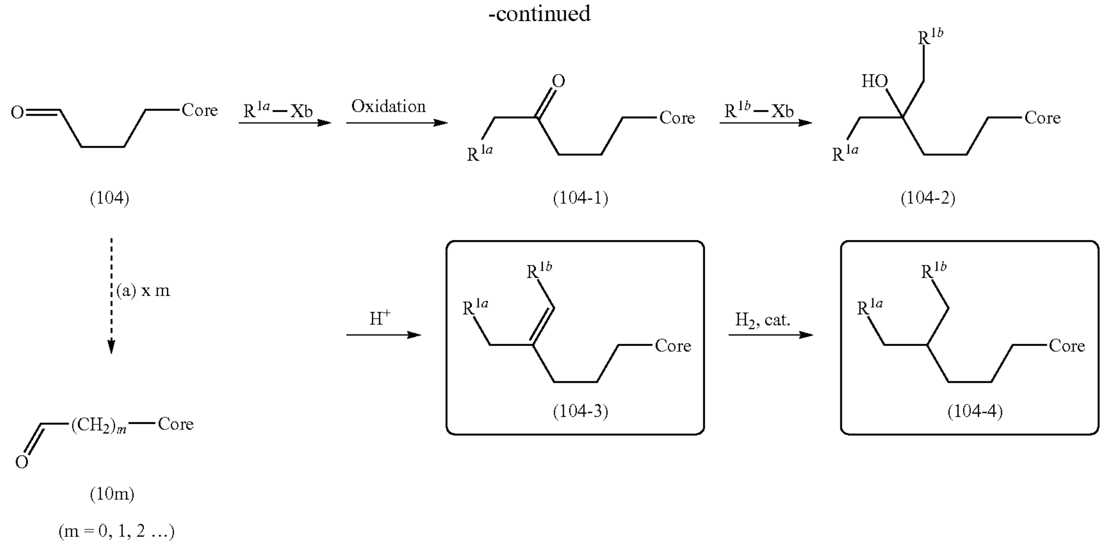

In the Scheme 4, Xa represents halogen, a triflate group, a mesyl group or a tosyl group, and Xb represents MgBr, MgCl or Li.

Corresponding halogen derivative (100) can be converted into aldehyde derivative (101) by allowing magnesium, for example, to react with halogen derivative (100) to prepare a Grignard reagent and adding a formylating agent thereto. From compound (101), aldehyde derivatives (102) ((103), (104) and (10m)) each having a required chain length are prepared by repeating a Wittig reaction using (methoxymethyl)triphenyl-phosphine bromide and a base, and a subsequent operation (a) of a hydrolysis reaction.

In a case where alkyl or alkenyl branched at 2-position is prepared, alcohol derivative (102-2) having branched alkyl is obtained by reacting compound (102) with a corresponding alkyl Grignard reagent or the like, performing an oxidation reaction to derive compound (102-1), and then reacting a corresponding alkyl Grignard reagent or the like with compound (102-1).

Branched alkenyl (102-3) is obtained by performing a dehydration reaction of alcohol derivative (102-2) with an acid or the like, and branched alkyl (102-4) is obtained by performing hydrogen reduction of compound (102-3).

Branched alkenyl (103-3) and branched alkyl (101-4) each branched at 3-position, branched alkenyl (104-3) and branched alkyl (104-4) each branched at 4-position, and branched alkenyl (101-3) and branched alkyl (101-4) each branched at 1-position can also be prepared in a similar manner.

Moreover, as shown in Scheme 5 below, a method for synthesizing branched alkenyl ((103-5) and (103-6)) is also provided, which starts from an above derivative, for example, compound (103-1) and utilizing a Tebbe reaction, a Wittig reaction or an olefin metathesis reaction.

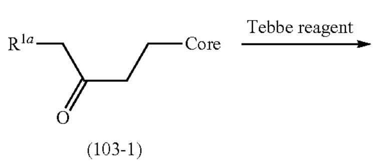

-continued

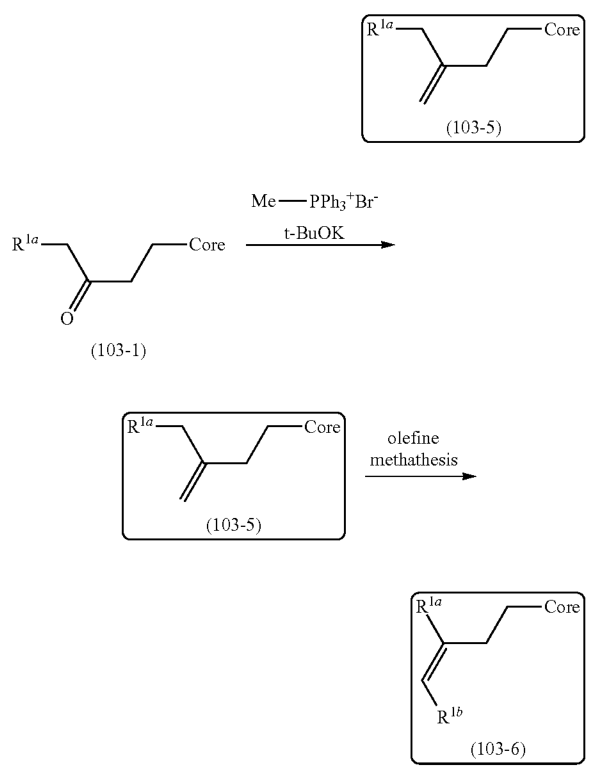

Furthermore, Scheme 6 is shown as one example in which oxygen is introduced into branched alkyl and branched alkenyl.

Scheme 6

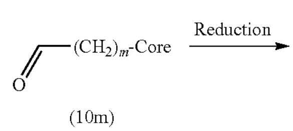

-continued

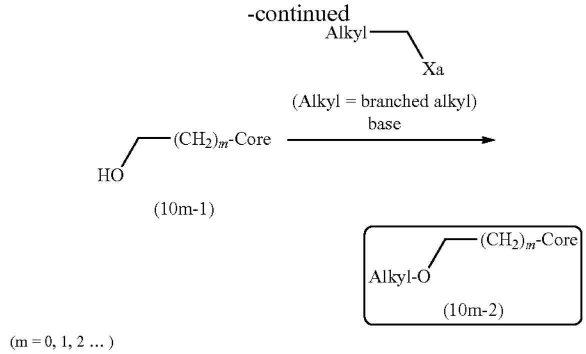

An ether bond can be introduced into branched alkyl by converting a corresponding derivative, for example, compound (10m) into alcohol derivative (10m−1) by a reduction reaction, and then performing etherification by allowing a base to react with a halogen derivative. An ether bond can also be introduced into branched alkenyl in a similar manner.

In addition, Scheme 7 as one example for introducing alkyne into branched alkyl and branched alkenyl is shown below.

Scheme 7

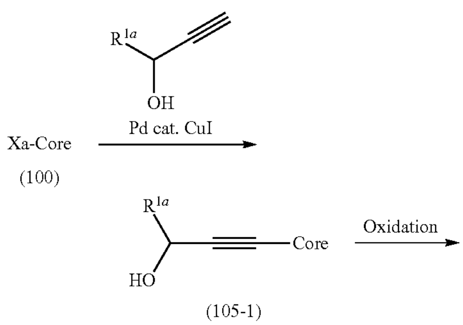

-continued

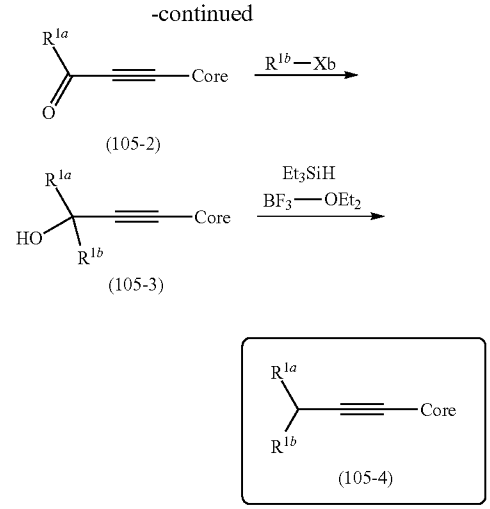

Compound (105-1) is obtained from a corresponding halogen derivatives (100) by allowing halogen derivative (100) to react with an alkyne derivative with a Sonogashira reaction using a palladium catalyst and Cu, and then can be converted into a compound (105-3) by performing an oxidation reaction and a Grignard reaction. Branched compound (105-4) can be obtained by allowing triethylsilane and boron halide to react with compound (105-3).

(6) Method for forming bonding groups $Z^1$ to $Z^4$ in a compound represented by formula (1-3)

The bonding groups $Z^1$ to $Z^4$ in formula (1-3) are each a single bond or alkylene having 1 to 4 carbons.

One example of methods for forming the bonding groups $Z^1$ to $Z^4$ in compound (1-3) is as shown in Schemes 8 and 9 below. In Schemes 8 and 9, $MSG^1$ or $MSG^2$ is a monovalent organic group having at least one ring. A plurality of $MSG^1$ (or $MSG^2$) used may be identical or different. Compounds (1A) to (1J) correspond to compound (1-3).

Scheme 8

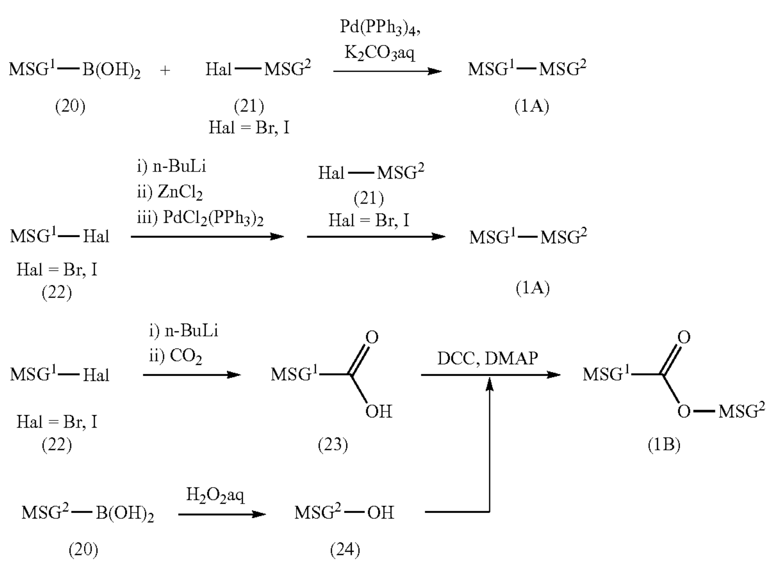

-continued

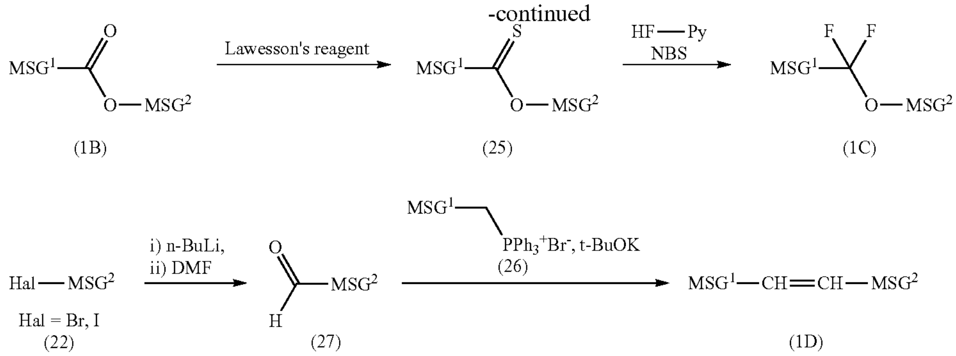

Scheme 9

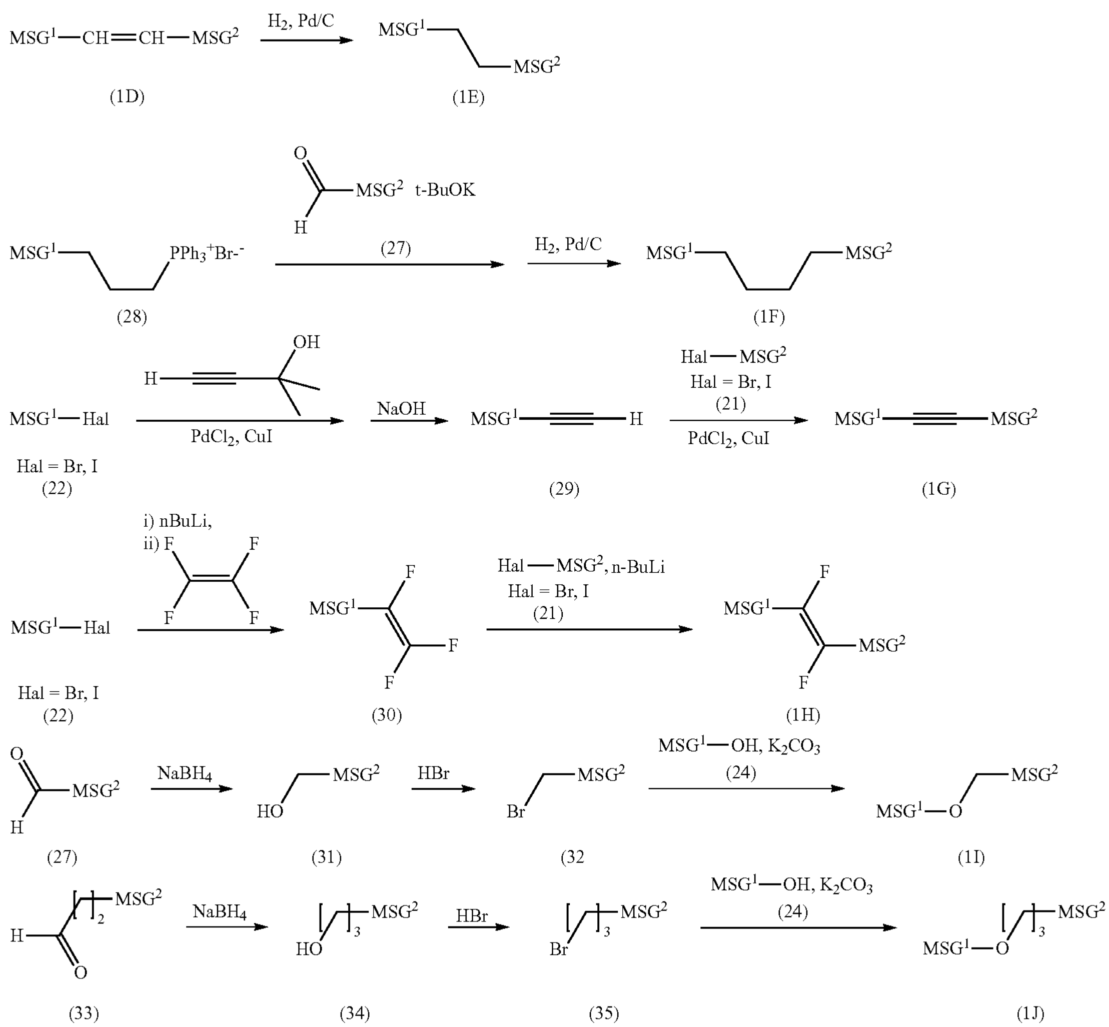

1.1.4 Methods for Introducing a Bonding Group, a Ring, a Terminal Group or the Like into Compounds (1-1), (1-2) and (1-3)

Methods for introducing the objective terminal groups, rings and bonding groups into a starting material used upon synthesizing compound (1-1), (1-2) and (1-3) are described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Koza in Japanese) (Maruzen Co., Ltd.) and so on.

In addition, for example, the bonding groups $Z^1$ to $Z^4$, and the rings $A^1$ to $A^5$ can be formed according to a method described below.

1.1.4.1 Methods for Forming Bonding Groups $Z^1$ to $Z^4$ in Compounds (1-1), (1-2) and (1-3)

For the bonding groups $Z^1$ to $Z^4$ in compounds (1-1), (1-2) and (1-3), methods for forming various kinds of bonds will be explained in more details in sections (I) to (X) based on Schemes 8 and 9.

(1) Formation of a Single Bond

As shown in Scheme 8, compound (1A) is prepared by allowing compound (20) (arylboronic acid) to react, in the presence of an aqueous solution of carbonate and a catalyst such as tetrakis(triphenylphosphine)palladium, with compound (21) prepared by a publicly known method. Compound (1A) is also prepared by allowing compound (22) prepared by a publicly known method to react with n-butyllithium and subsequently with zinc chloride, and further with compound (21) in the presence of a catalyst such as dichlorobis(triphenylphosphine)palladium.

(2) Formation of —COO— and —OCO—

A carboxylic acid (23) is obtained by allowing compound (22) to react with n-butyllithium, and subsequently with carbon dioxide. Compound (1B) having —COO— is prepared by dehydrating compound (23) and the phenol (24) in the presence of 1,3-dicyclohexylcarbodiimide (DDC) and 4-dimethylaminopyridine (DMAP). A compound having —OCO— is also prepared by the method.

(3) Formation of —$CF_2O$— and —$OCF_2$—

Compound (25) is obtained by treating compound (1B) with a thiation reagent such as Lawesson's reagent. Compound (1C) having —$CF_2O$— is prepared by fluorinating compound (25) with a hydrogen fluoride pyridine complex and N-bromosuccinimide (NBS) (see M. Kuroboshi et al., *Chem. Lett.,* 1992, 827). Compound (1C) is also prepared by fluorinating compound (25) with (diethylamino)sulfur trifluoride (DAST) (see W. H. Bunnelle et al., J. Org. Chem. 1990, 55, 768). A compound having —$OCF_2$— is also prepared by the method. The bonding groups can also be formed by the method described in Peer. Kirsch et al., *Angew. Chem. Int. Ed.* 2001, 40, 1480.

(4) Formation of —CH═CH—

Aldehyde (27) is obtained by treating compound (22) by n-butyl lithium and reacting the product with a formamide such as N,N-dimethylformamide (DMF). Compound (1D) is prepared by reacting, with aldehyde (27), a phosphorus ylide that is formed by treating, with a base such as potassium t-butoxide, phosphonium salt (26) prepared by a known method. Because a cis-isomer is formed due to the reaction conditions, the cis-isomer is isomerized to a trans-isomer according to a known method, as required.

(5) Formation of —$(CH_2)_2$—

As shown in Scheme 9, compound (1E) is prepared by hydrogenating compound (1D) in the presence of a catalyst such as palladium on carbon.

(6) Formation of —$(CH_2)_4$—

A compound having —$(CH_2)_2$—CH═CH— is obtained by using phosphonium salt (28) in place of phosphonium salt (26) according to the method in section (IV). Compound (1F) is prepared by performing catalytic hydrogenation to the compound obtained.

(7) Formation of —C≡C—

Compound (29) is obtained by reacting 2-methyl-3-butyn-2-ol with compound (22) in the presence of a catalyst including dichloropalladium and a copper halide, and then performing deprotection under a basic condition. Compound (1G) is prepared by reacting compound (29) with compound (21) in the presence of a catalyst including dichlorobistriphenylphosphine palladium and a copper halide.

(8) Formation of —CF═CF—

Compound (30) is obtained by treating compound (22) by n-butyl lithium and reacting the product with tetrafluoroethylene. Compound (1H) is prepared by treating compound (21) by n-butyl lithium and reacting the product with compound (30).

(9) Formation of —$CH_2O$— or —$OCH_2$—

Compound (31) is obtained by reducing compound (27) with a reducing agent such as sodium borohydride. Compound (32) is obtained by halogenating compound (31) with hydrobromic acid or the like. Compound (1I) is prepared by reacting compound (32) with compound (24) in the presence of potassium carbonate or the like.

(10) Formation of —$(CH_2)_3O$— or —$O(CH_2)_3$—

Compound (1J) is prepared by using compound (38) in place of compound (27) in a manner similar to the preceding section (9).

1.1.4.2 Methods for Preparing Rings $A^1$ to $A^5$ in Compound (1-1), Compound (1-2) and Compound (1-3)

The rings $A^1$ to $A^5$ in compound (1-1), compound (1-2) and compound (1-3) will be explained.

In order to form the rings $A^1$ to $A^5$ in compounds (1-1), (1-2) and (1-3), as the starting materials for preparing compounds (1-1), (1-2) and (1-3), 1,4-phenylene, 1,3-dioxane-2,5-diyl, 2-fluoro-1,4-phenylene, 2,3-difluoro-1,4-phenylene, 2,5-difluoro-1,4-phenylene, 2,6-difluoro-1,4-phenylene, 2,3,5,6-tetrafluoro-1,4-phenylene, pyrimidine-2,5-diyl, pyridine-2,5-diyl or the like is preferably used. As the compounds, commercially available products or products prepared according to a publicly known synthesis method may be used.

1.2 Component B to component F

The liquid-crystal composition of the invention may contain, as a liquid-crystal component, not only liquid-crystal component A including at least one compound represented by formula (1-1) to (1-3) but also at least one component selected from the group of components B, C, D, E and F.

Component B includes at least one compound selected from the group of compounds represented by formulas (2), (3) and (4), component C includes a compound represented by formula (5), component D includes a compound represented by formula (6), component E includes at least one compound selected from the group of compounds represented by formulas (7) to (10), and component F includes a compound represented by formula (11).

If components B to F are added to the liquid-crystal component of the invention, as compared with the composition using liquid-crystal component A only, the driving voltage, the temperature range of the liquid-crystal phase, the value of refractive index anisotropy, the value of dielectric anisotropy, the viscosity and so on can be more favorably adjusted.

(1) Component B

Component B includes at least one compound selected from the group of compounds represented by formulas (2), (3) and (4). Preferred examples of the compounds represented by formula (2) include those represented by formulas (2-1) to (2-16), preferred examples of the compounds represented by formula (3) include those represented by formulas (3-1) to (3-112), and preferred examples of the compounds represented by formula (4) includes those represented by formulas (4-1) to (4-52).

(2-1)

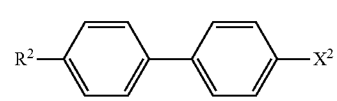

(2-2)

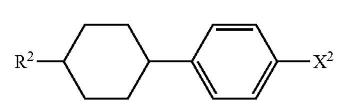

-continued
(2-3)
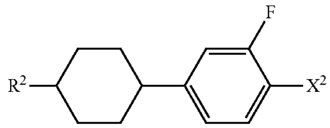
(2-4)
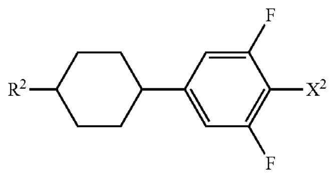
(2-5)
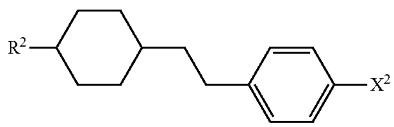
(2-6)
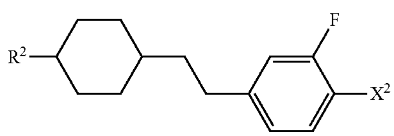
(2-7)
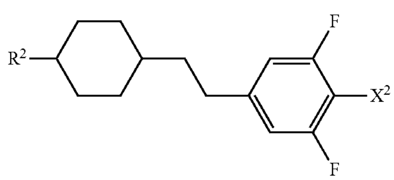
(2-8)
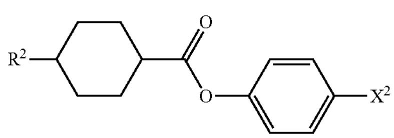
(2-9)
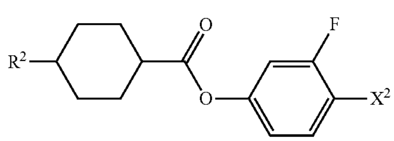
(2-10)
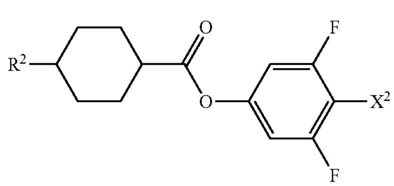
(2-11)
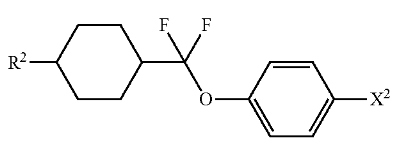
(2-12)
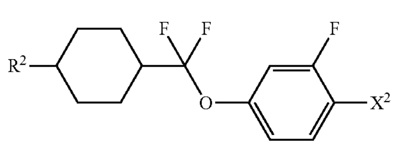
-continued
(2-13)
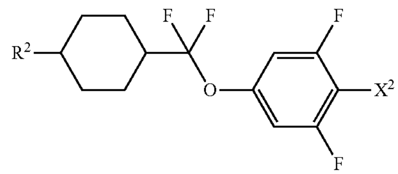
(2-14)
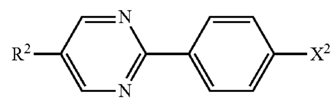
(2-15)
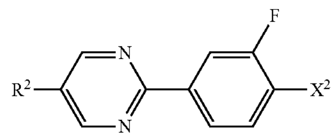
(2-16)
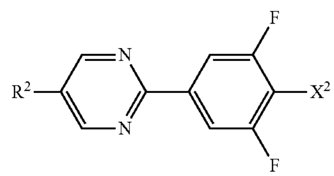
(3-1)
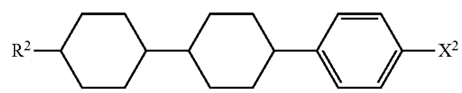
(3-2)
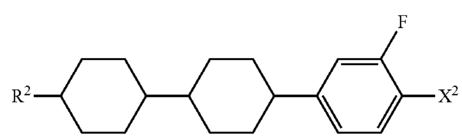
(3-3)
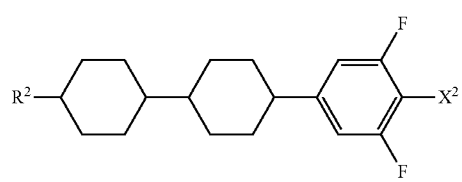
(3-4)
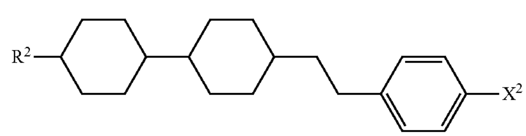
(3-5)
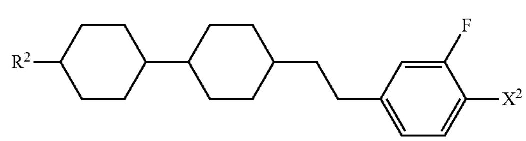
(3-6)
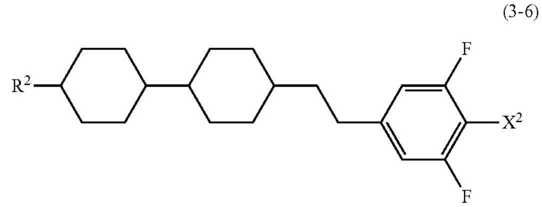

-continued
(3-7)
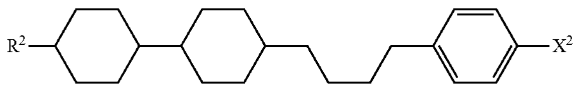
(3-8)
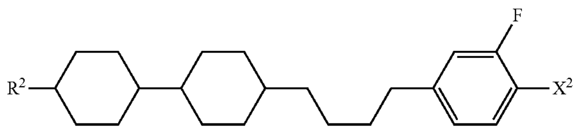
(3-9)
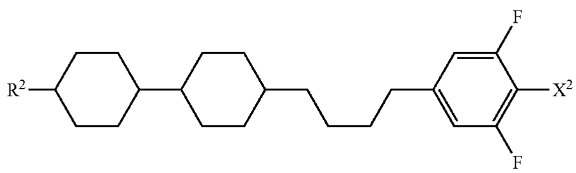
(3-10)
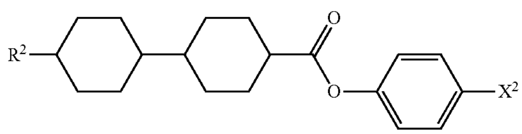
(3-11)
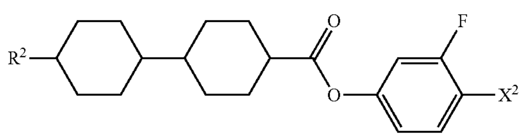
(3-12)
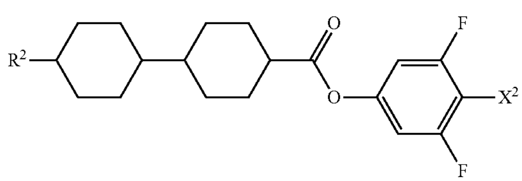
(3-13)
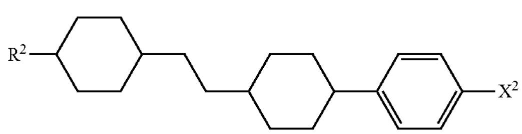
(3-14)
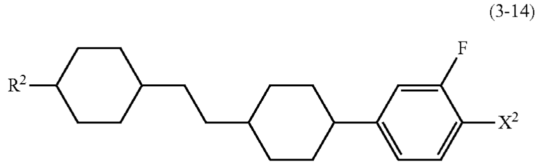
(3-15)
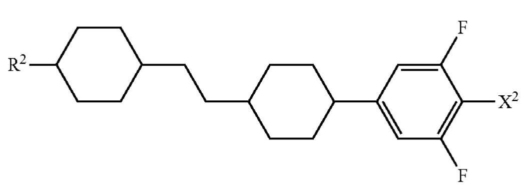
-continued
(3-16)
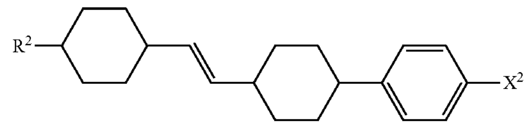
(3-17)
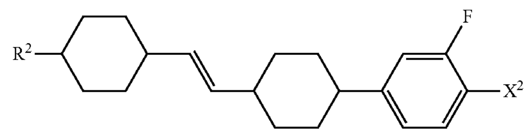
(3-18)
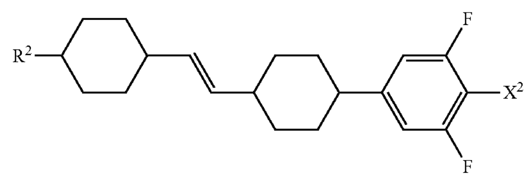
(3-19)
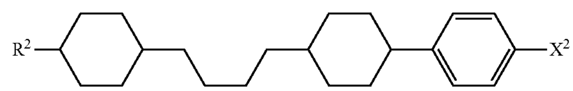
(3-20)
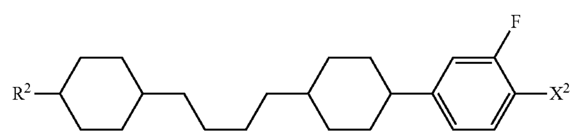
(3-21)
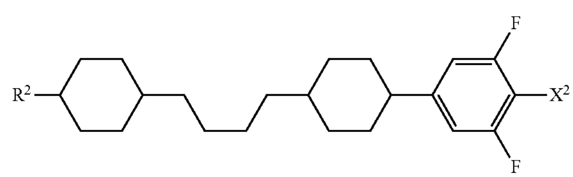
(3-22)
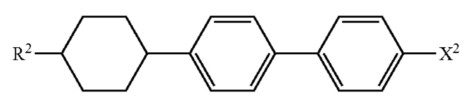
(3-23)
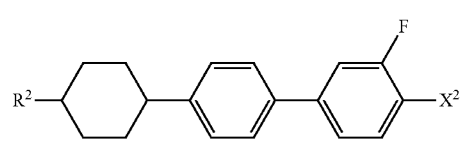
(3-24)
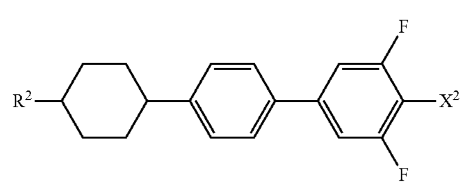
(3-25)
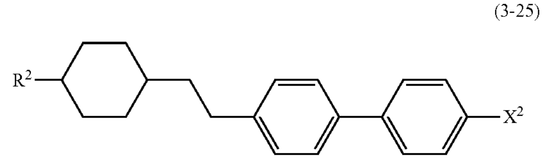

-continued
(3-26)
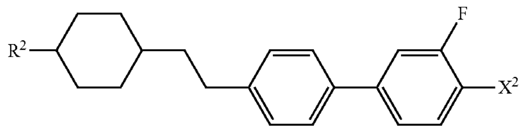
(3-27)
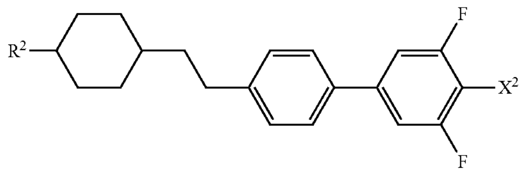
(3-28)
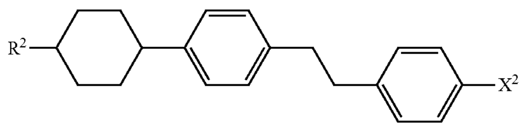
(3-29)
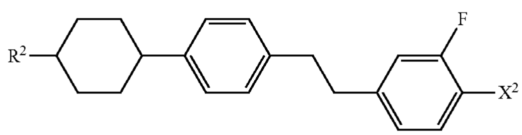
(3-30)
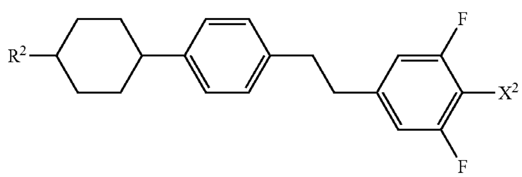
(3-31)
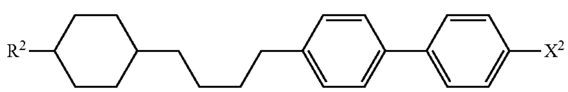
(3-32)
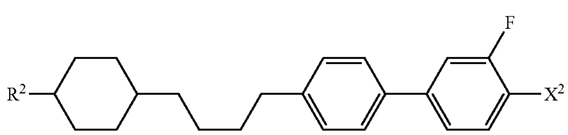
(3-33)
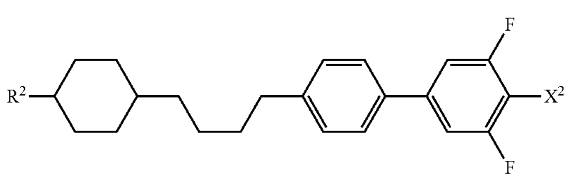
(3-34)
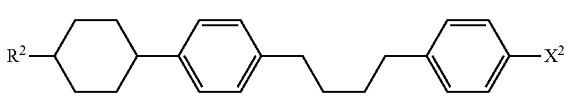
(3-35)
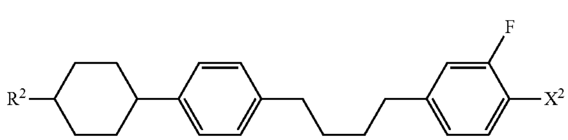
-continued
(3-36)
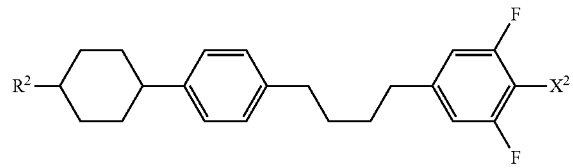
(3-37)
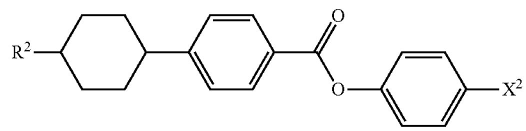
(3-38)
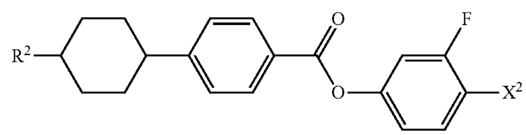
(3-39)
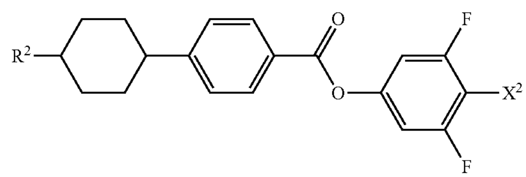
(3-40)
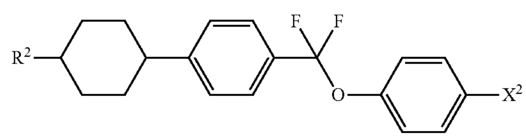
(3-41)
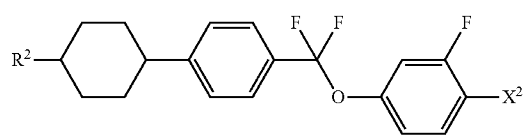
(3-42)
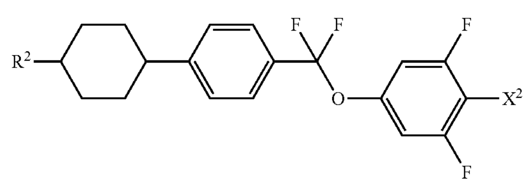
(3-43)
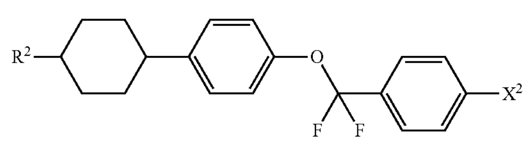
(3-44)
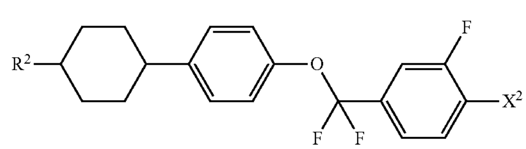

-continued
(3-45)
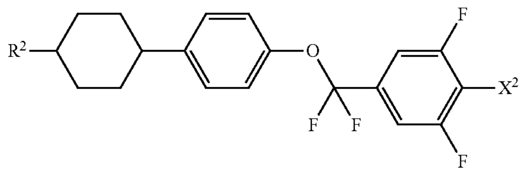
(3-46)
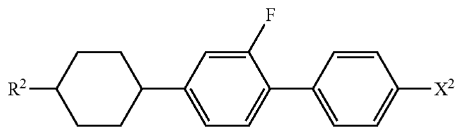
(3-47)
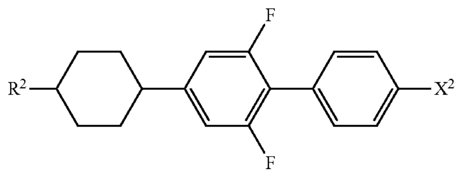
(3-48)
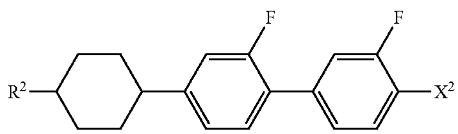
(3-49)
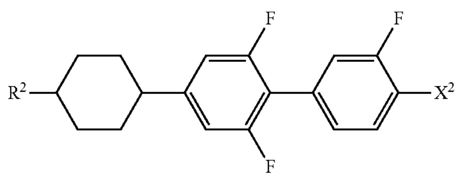
(3-50)
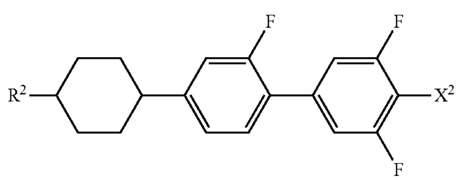
(3-51)
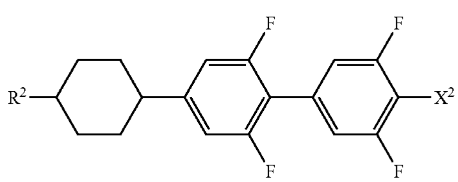
(3-52)
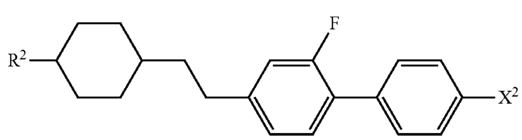
(3-53)
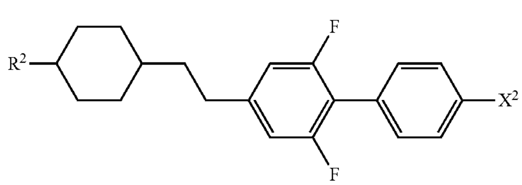
-continued
(3-54)
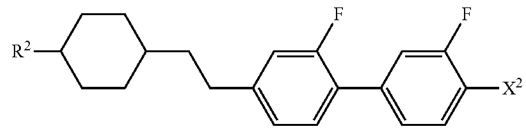
(3-55)
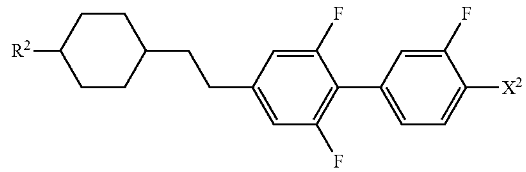
(3-56)
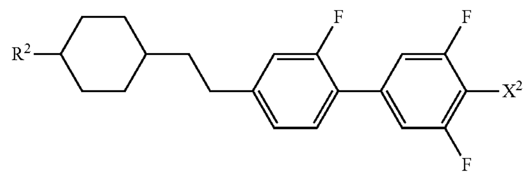
(3-57)
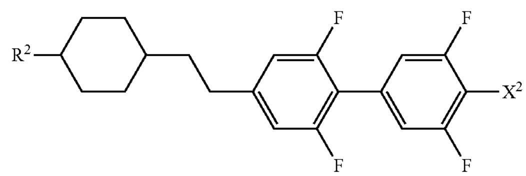
(3-58)
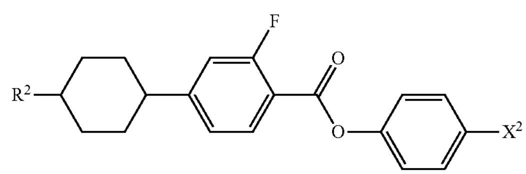
(3-59)
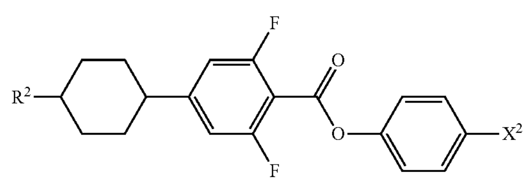
(3-60)
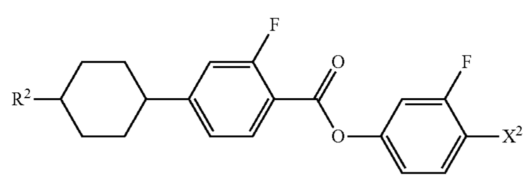
(3-61)
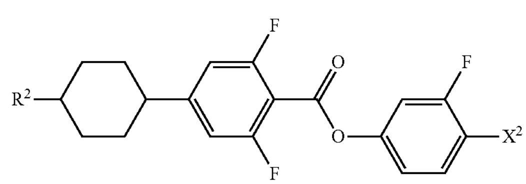

(3-62)
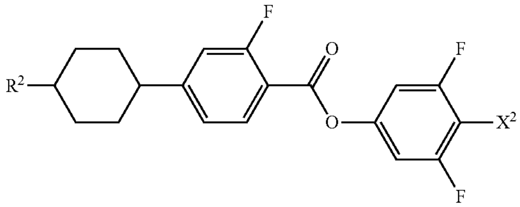
(3-63)
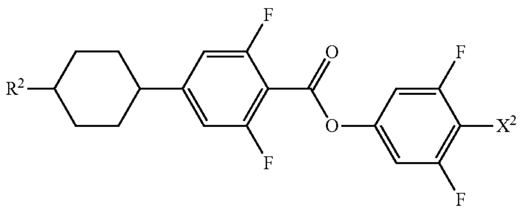
(3-64)
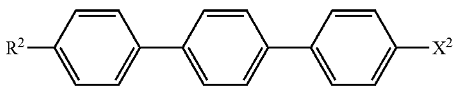
(3-65)
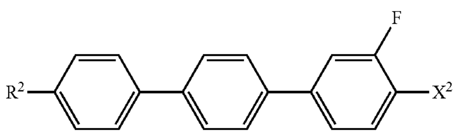
(3-66)
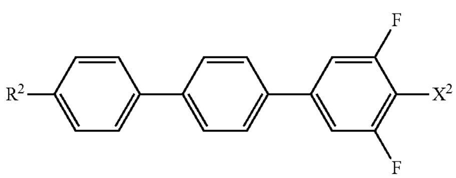
(3-67)
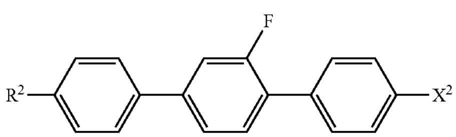
(3-68)
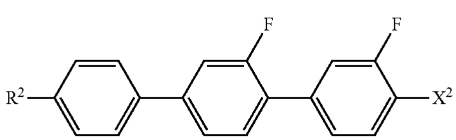
(3-69)
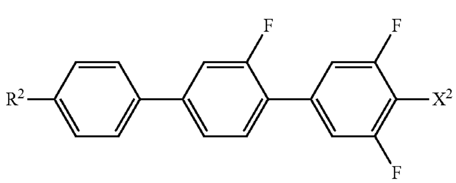
(3-70)
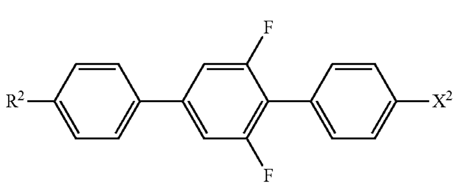
(3-71)
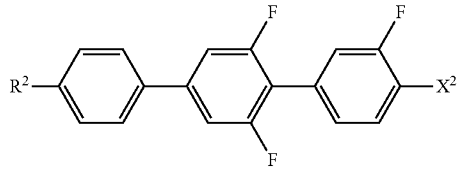
(3-72)
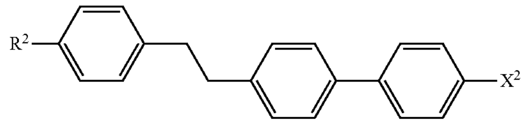
(3-73)
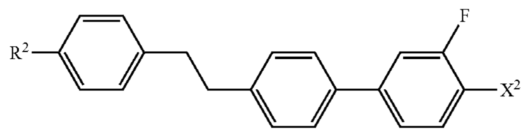
(3-74)
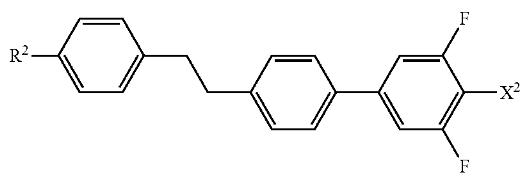
(3-75)
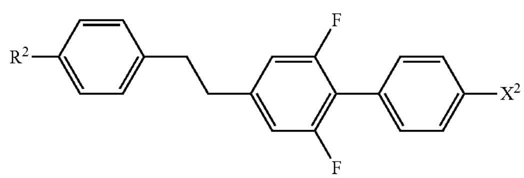
(3-76)
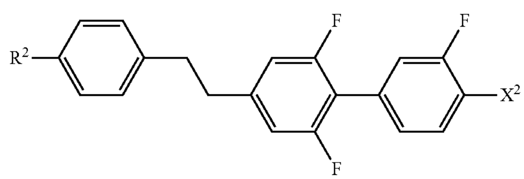
(3-77)
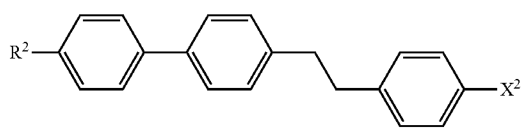
(3-78)
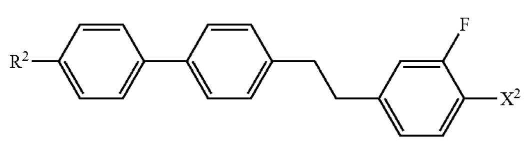
(3-79)
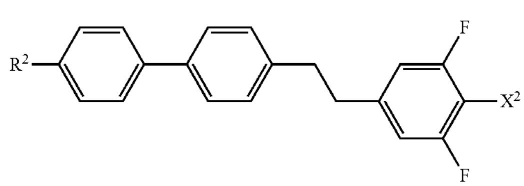

-continued
(3-80)
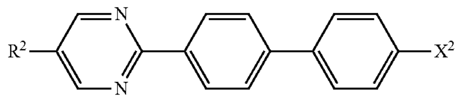
(3-81)
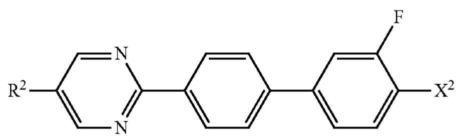
(3-82)
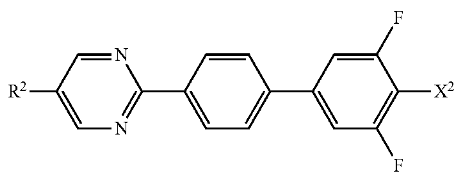
(3-83)
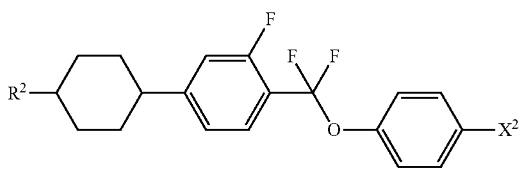
(3-84)
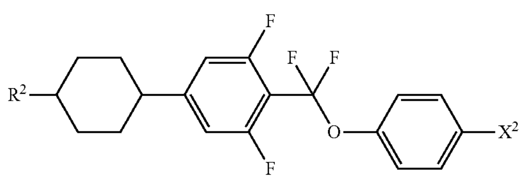
(3-85)
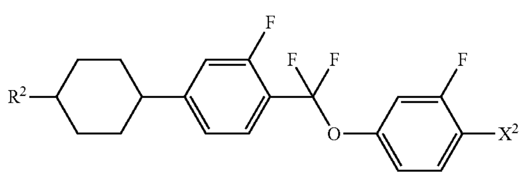
(3-86)
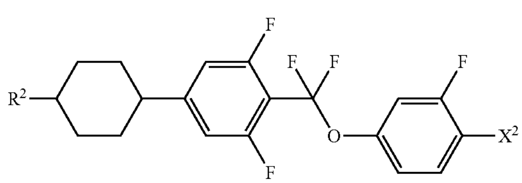
(3-87)
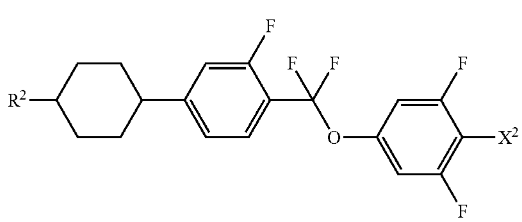
-continued
(3-88)
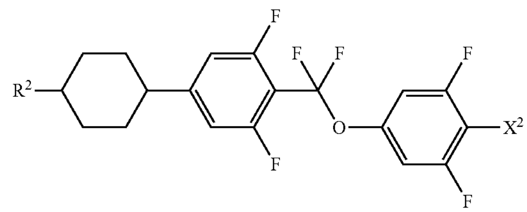
(3-89)
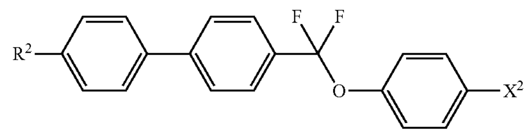
(3-90)
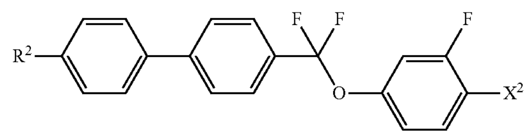
(3-91)
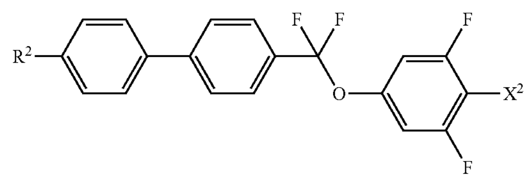
(3-92)
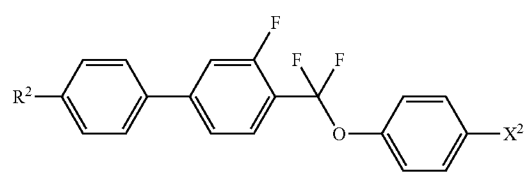
(3-93)
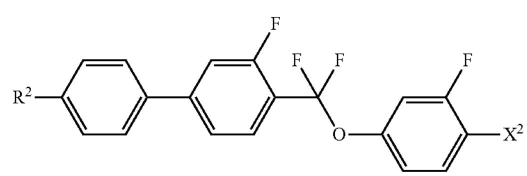
(3-94)
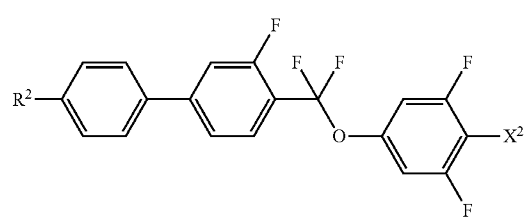
(3-95)
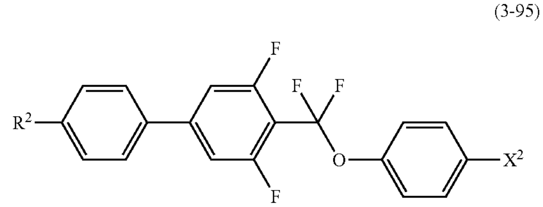

-continued
(3-96)
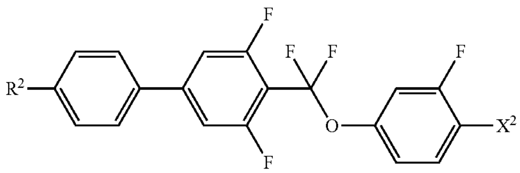
(3-97)
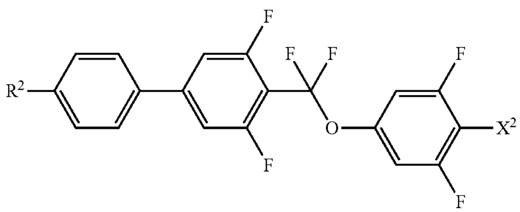
(3-98)
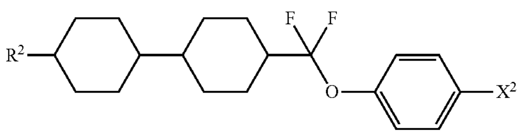
(3-99)
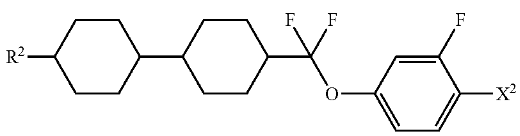
(3-100)
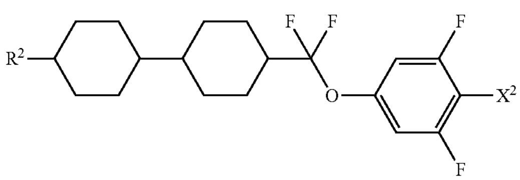
(3-101)
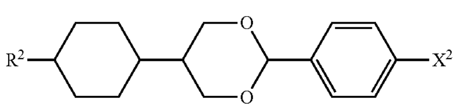
(3-102)
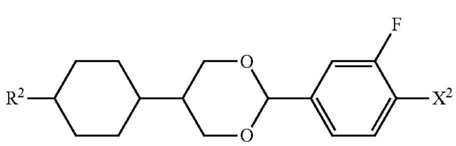
(3-103)
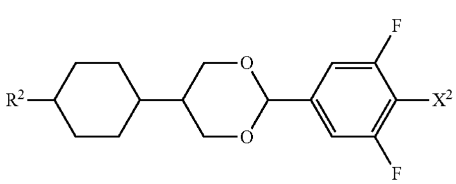
(3-104)
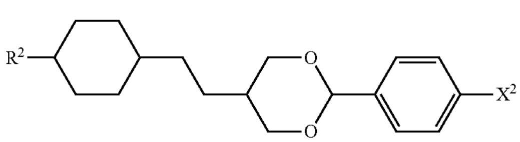
-continued
(3-105)
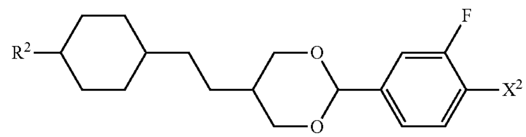
(3-106)
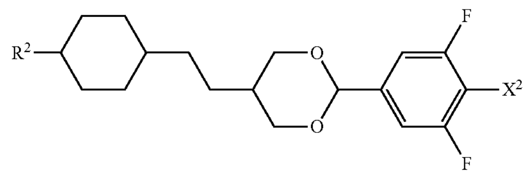
(3-107)
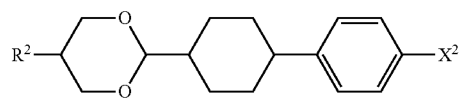
(3-108)
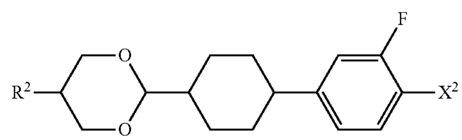
(3-109)
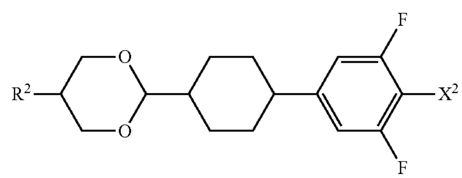
(3-110)
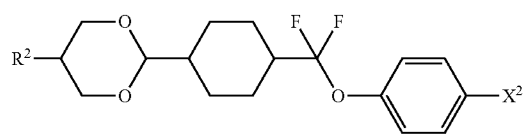
(3-111)
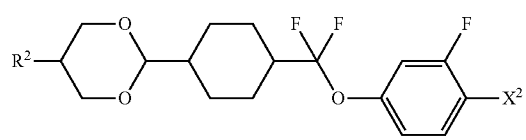
(3-112)
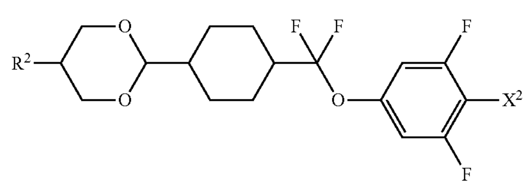
(4-1)
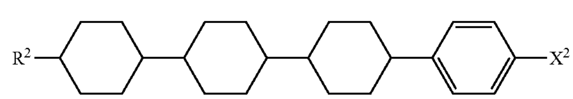
(4-2)
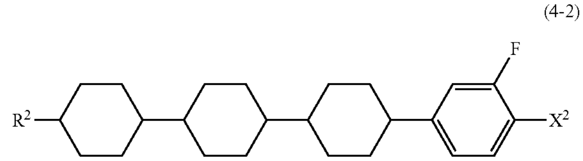

-continued
(4-3)
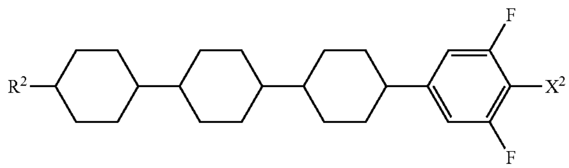
(4-4)
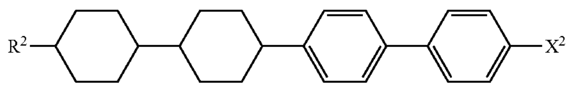
(4-5)
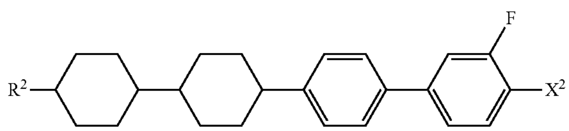
(4-6)
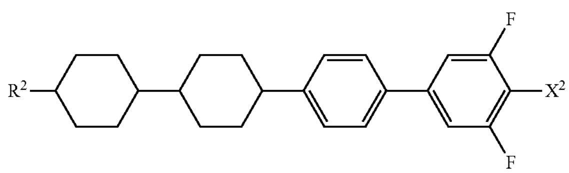
(4-7)
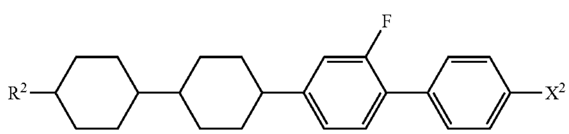
(4-8)
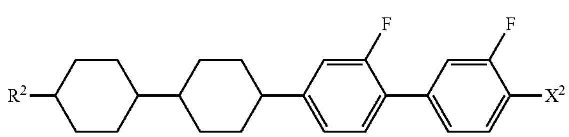
(4-9)
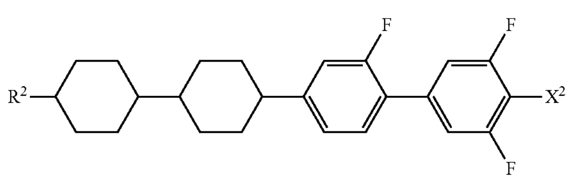
(4-10)
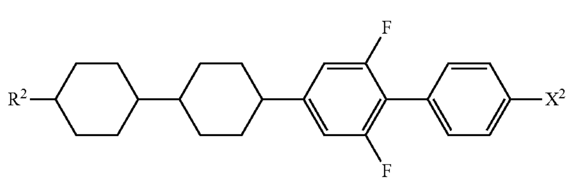
(4-11)
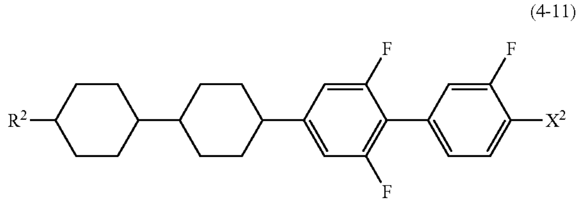
-continued
(4-12)
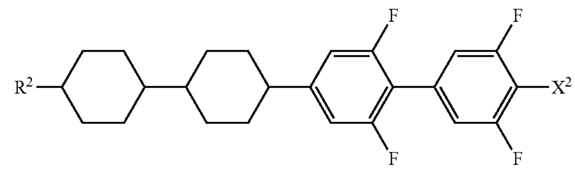
(4-13)
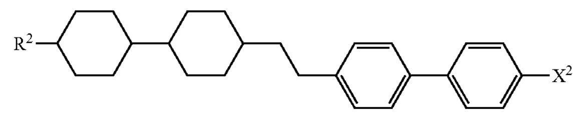
(4-14)
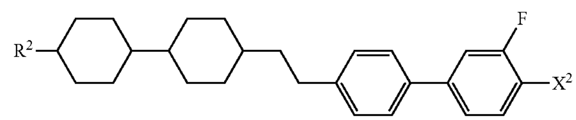
(4-15)
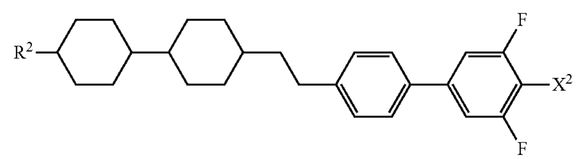
(4-16)
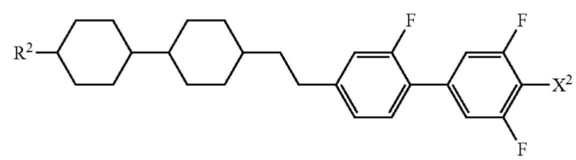
(4-17)
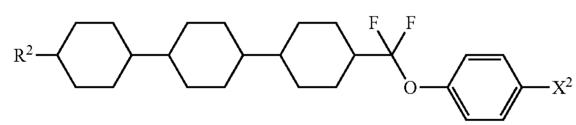
(4-18)
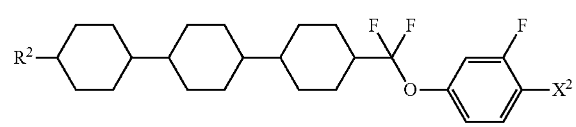
(4-19)
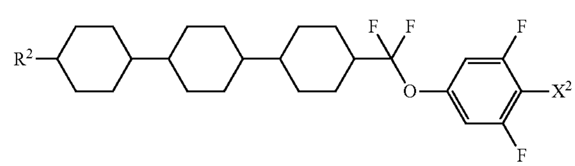
(4-20)
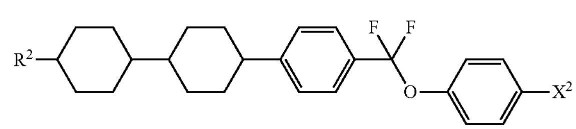
(4-21)
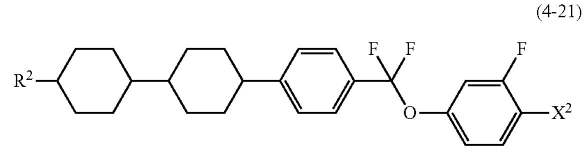

(4-22)
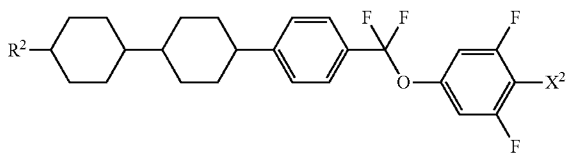
(4-23)
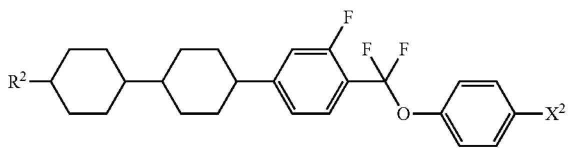
(4-24)
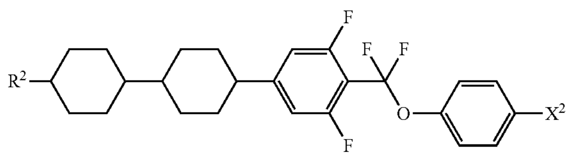
(4-25)
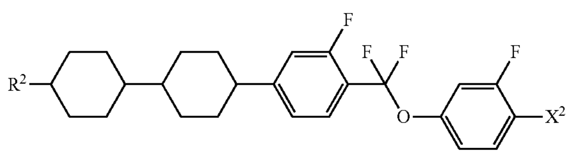
(4-26)
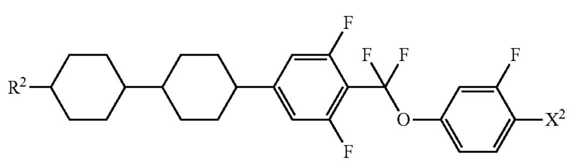
(4-27)
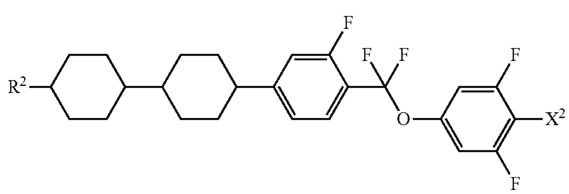
(4-28)
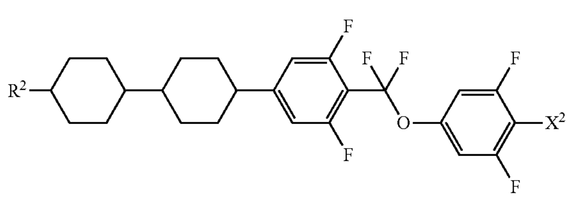
(4-29)
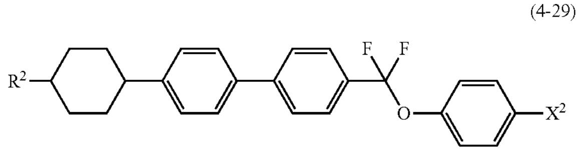
(4-30)
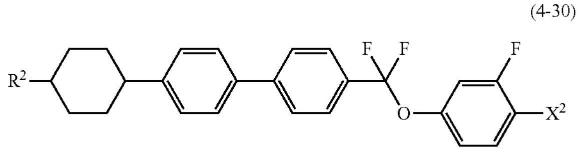
(4-31)
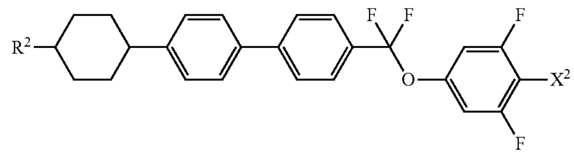
(4-32)
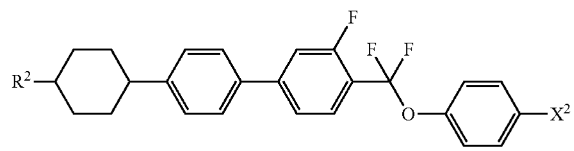
(4-33)
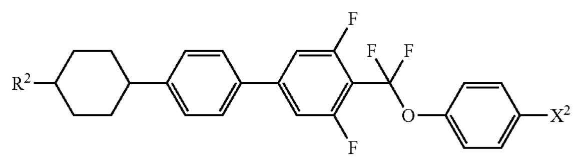
(4-34)
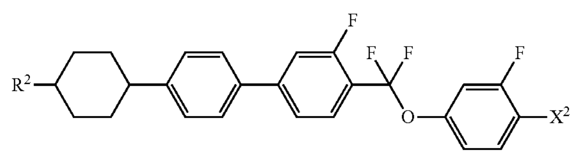
(4-35)
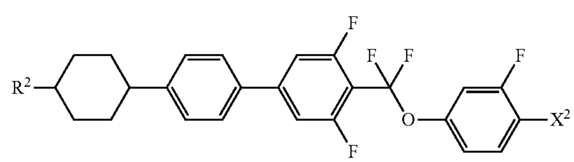
(4-36)
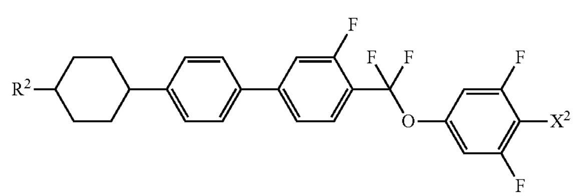
(4-37)
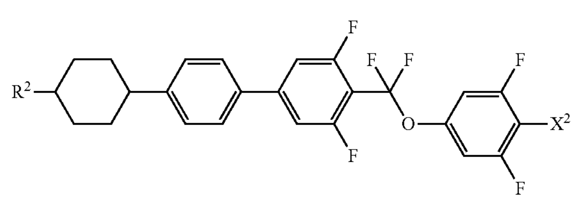
(4-38)
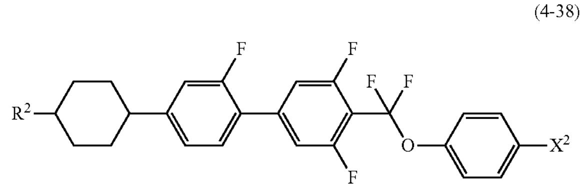

-continued (4-39)

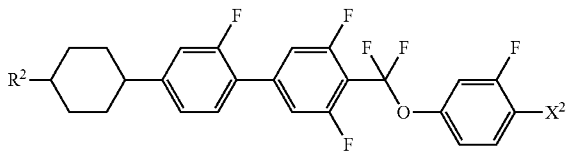

(4-40)

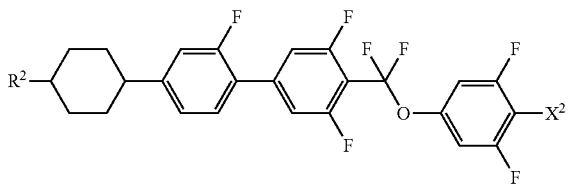

(4-41)

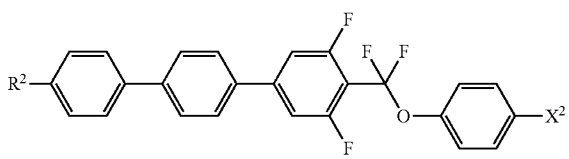

(4-42)

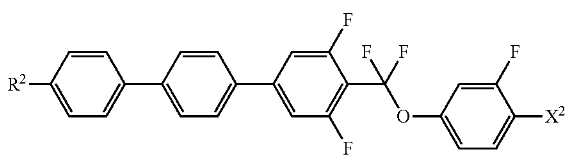

(4-43)

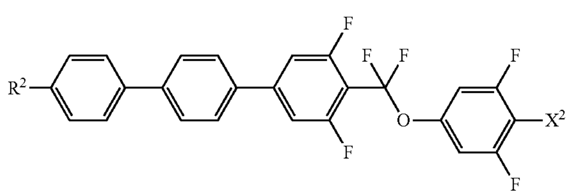

(4-44)

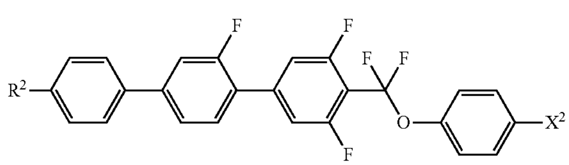

(4-45)

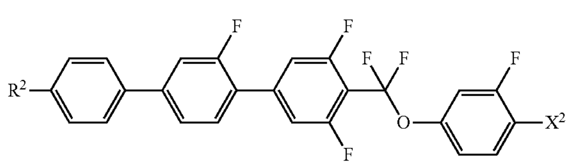

(4-46)

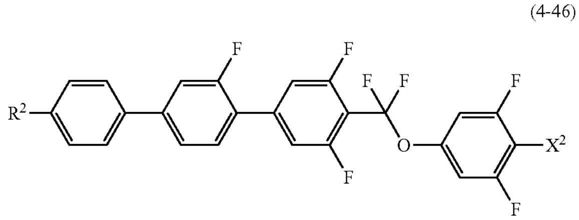

-continued (4-47)

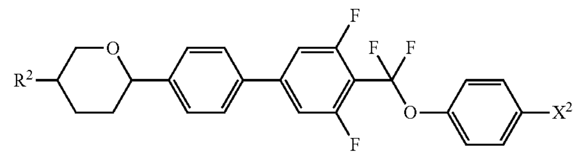

(4-48)

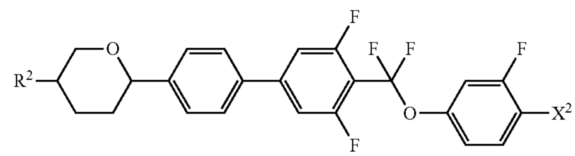

(4-49)

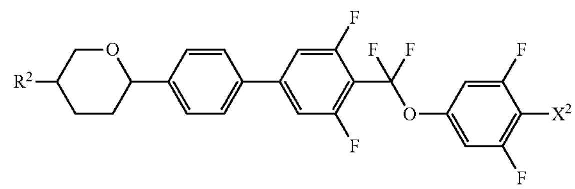

(4-50)

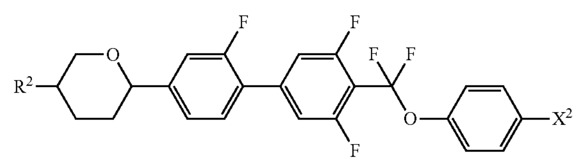

(4-51)

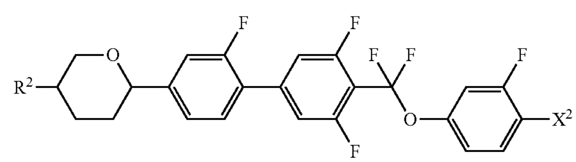

(4-52)

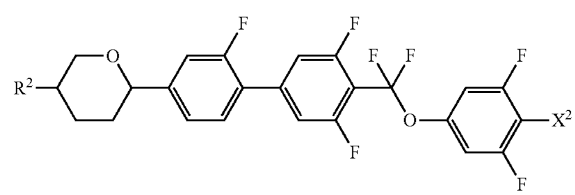

In the formulas, $R^2$ and $X^2$ are defined as above.

Component B including compounds represented by formulas (2) to (4) has a positive dielectric anisotropy value and superb thermal stability and chemical stability, and therefore is used in a case where a liquid-crystal composition for TFT is prepared. The content of component B in the liquid-crystal composition of the invention is suitably in the range of 0 wt % to 99 wt %, preferably in the range of 0 wt % to 20 wt %, based on the total weight of the liquid-crystal composition.

(2) Component C

Component C includes compounds represented by formula (5). Preferred examples of the compounds represented by formula (5) include those represented by formulas (5-1) to (5-26).

In addition, component C may include a single compound or a plurality of compounds.

(5-1)
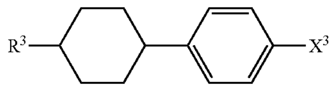
(5-2)
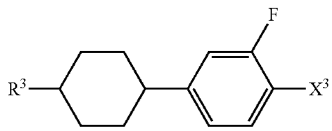
(5-3)
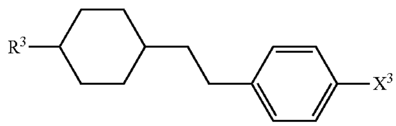
(5-4)
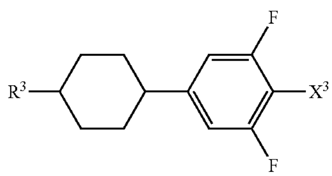
(5-5)
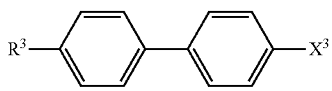
(5-6)
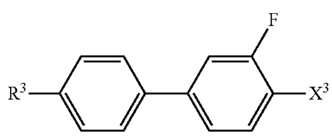
(5-7)
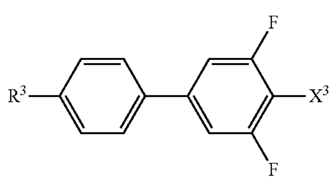
(5-8)
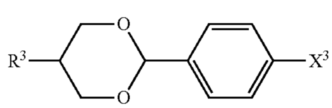
(5-9)
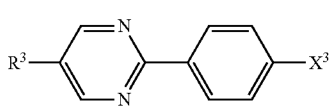
(5-10)
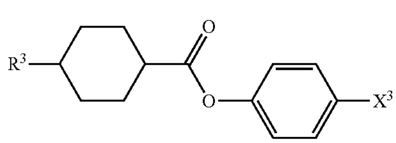
(5-11)
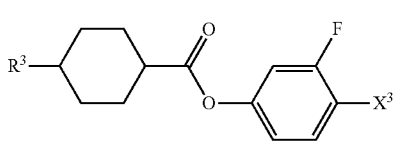
-continued
(5-12)
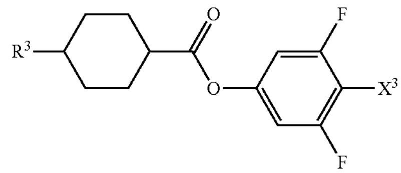
(5-13)
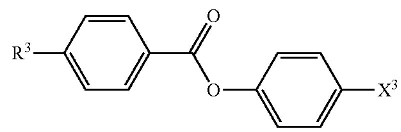
(5-14)
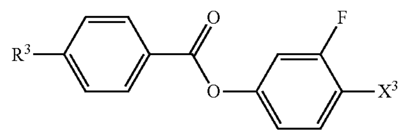
(5-15)
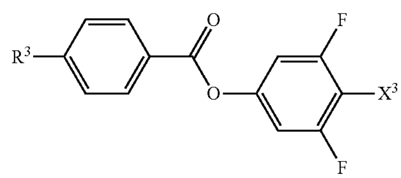
(5-16)
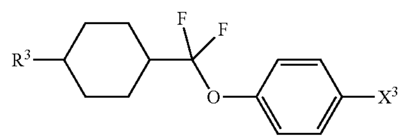
(5-17)
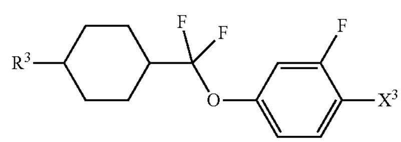
(5-18)
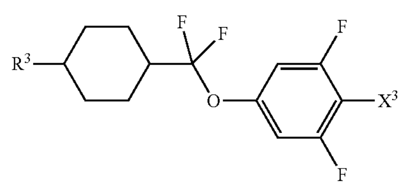
(5-19)
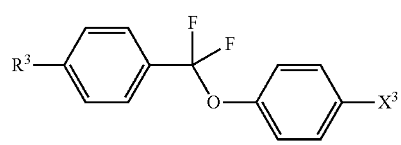
(5-20)
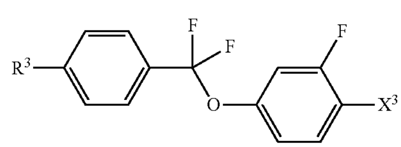
(5-21)
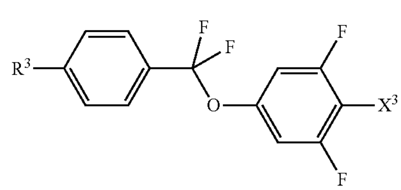

-continued
(5-22)
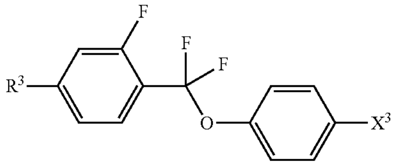
(5-23)
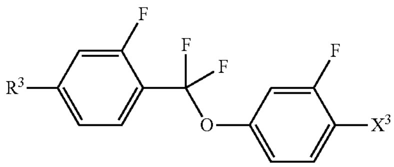
(5-24)
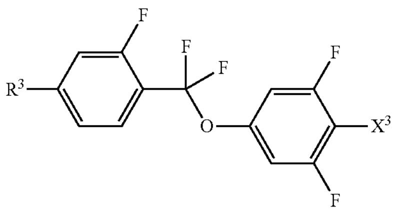
(5-25)
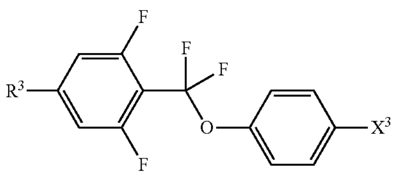
(5-26)
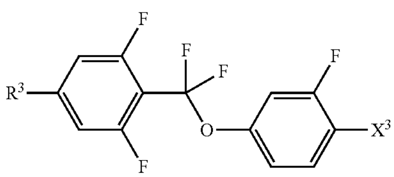
(5-27)
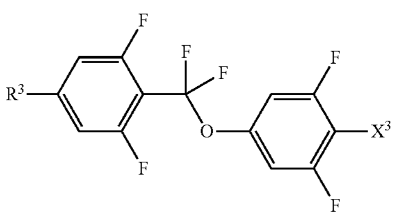
(5-28)
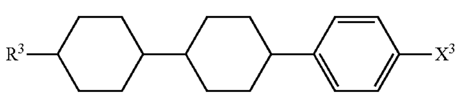
(5-29)
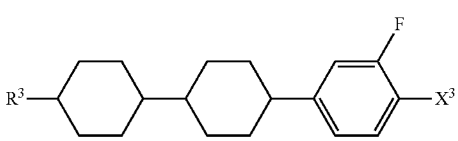
(5-30)
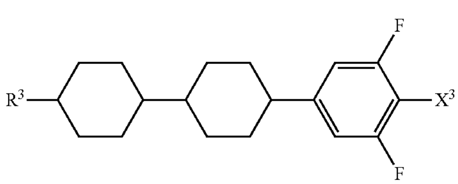
-continued
(5-31)
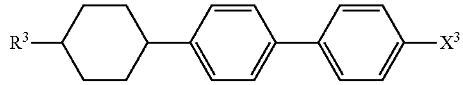
(5-32)
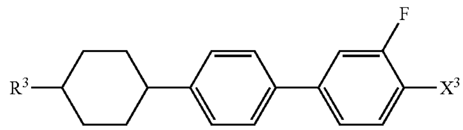
(5-33)
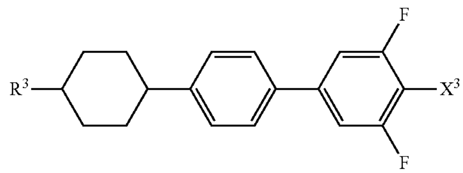
(5-34)
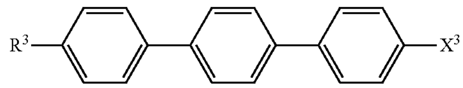
(5-35)
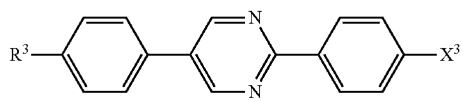
(5-36)
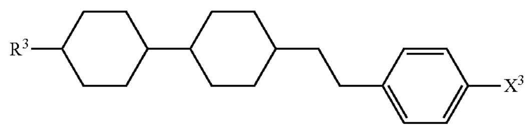
(5-37)
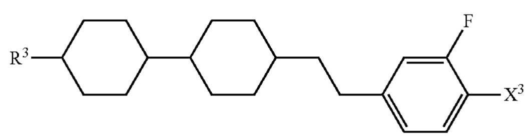
(5-38)
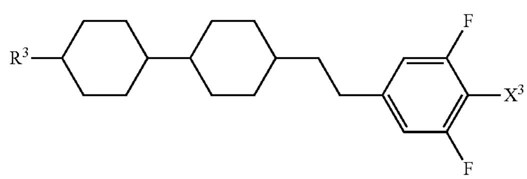
(5-39)
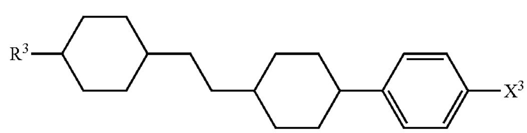
(5-40)
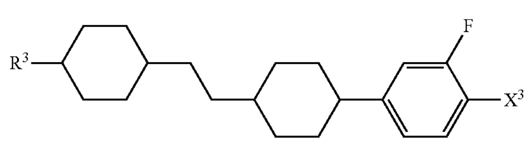

-continued
(5-41)
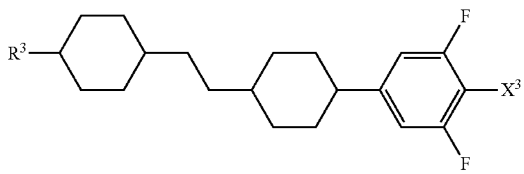
(5-42)
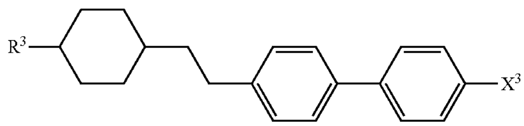
(5-43)
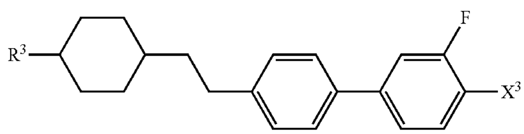
(5-44)
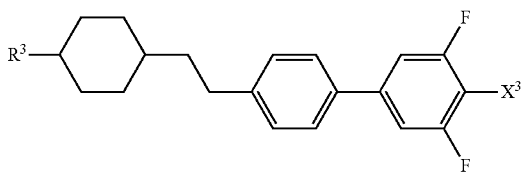
(5-45)
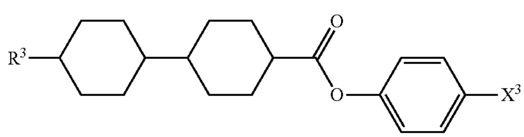
(5-46)
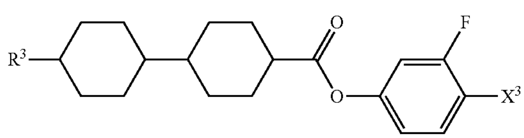
(5-47)
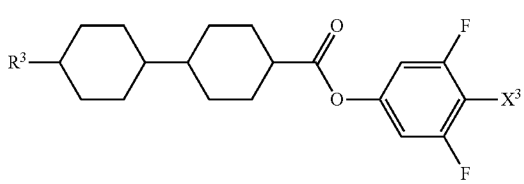
(5-48)
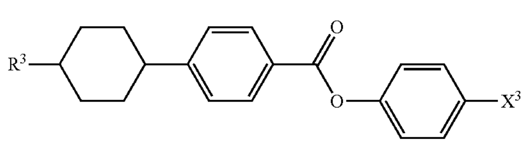
(5-49)
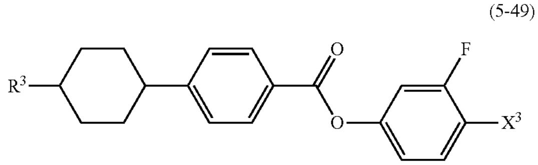
-continued
(5-50)
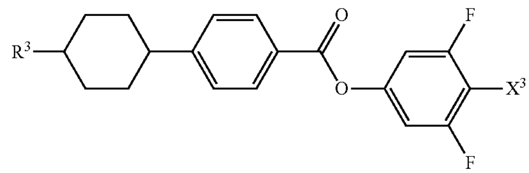
(5-51)
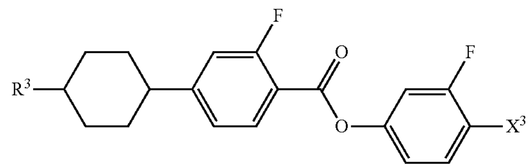
(5-52)
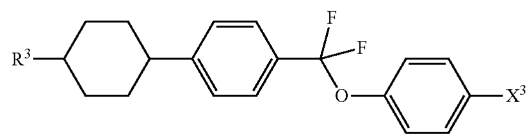
(5-53)
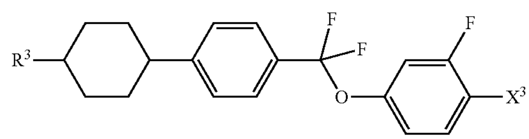
(5-54)
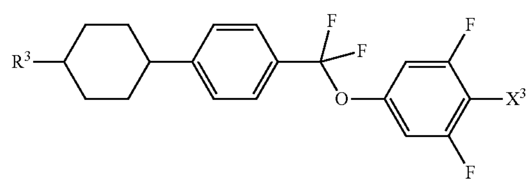
(5-55)
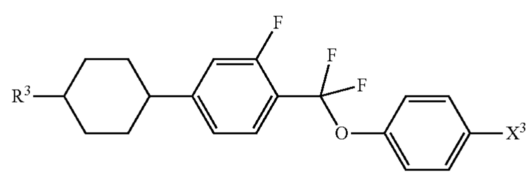
(5-56)
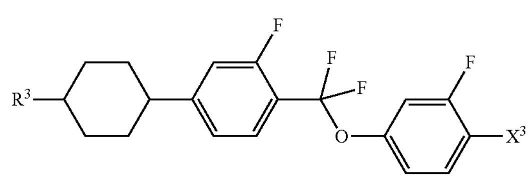
(5-57)
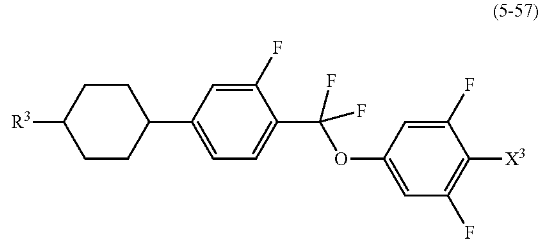

-continued (5-58)

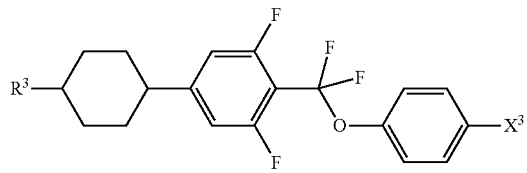

(5-59)

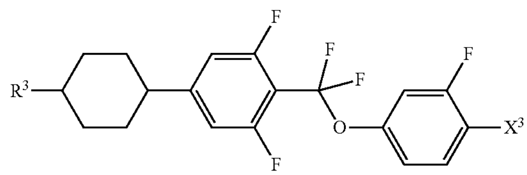

(5-60)

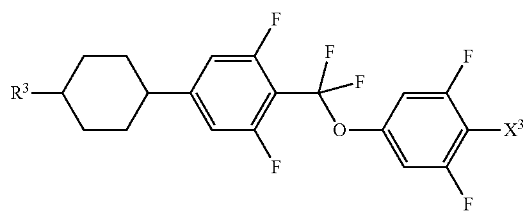

(5-61)

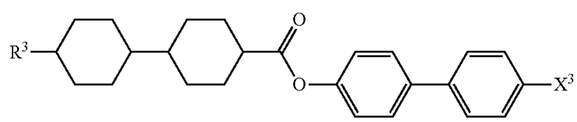

(5-62)

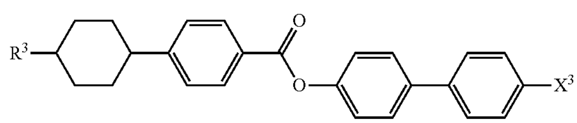

In the formulas, $R^3$ and $X^3$ are defined as above.

Component C including compounds represented by formula (5) has a positive dielectric anisotropy value that is very large. By containing component C, the driving voltage of the composition can be decreased. Moreover, the viscosity can be adjusted, the refractive index anisotropy value can be adjusted, and the temperature range of the liquid-crystal phase can be expanded.

The content of component C is preferably in the range of 0 wt % to 99.9 wt %, and more preferably in the range of 0 wt % to 20 wt %, based on the total weight of the liquid-crystal composition. Moreover, by mixing a component described later, the threshold voltage, the temperature range of the liquid-crystal phase, the refractive index anisotropy value, the dielectric anisotropy value, the viscosity and so on can be adjusted.

Component D includes compounds represented by the formula (6), and preferred examples of the compounds represented by formula (6) include those represented by formulas (6-1) to (6-6). In addition, components D may include a single compound or a plurality of compounds.

(6-1)

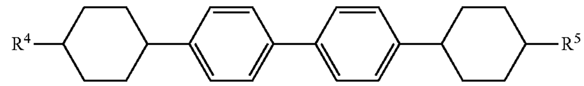

(6-2)

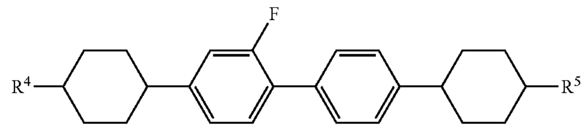

(6-3)

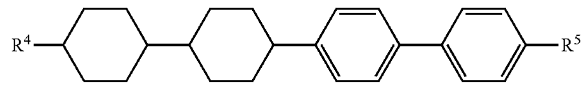

(6-4)

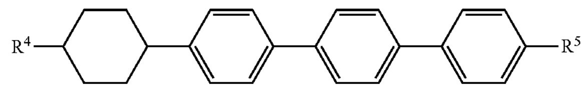

(6-5)

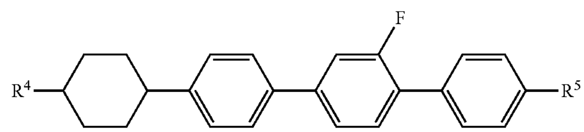

(6-6)

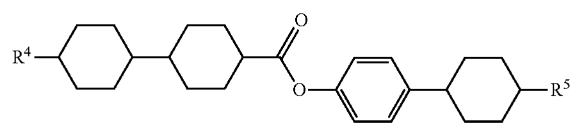

In the formulas, $R^4$ and $R^5$ are defined as above.

Component D including compounds represented by formula (6) has a small absolute value of dielectric anisotropy value, and is close to neutrality. The compound represented by formula (6) is effective in expanding the temperature range of the optically isotropic liquid-crystal phase such as increasing the clearing point, or effective in adjusting the refractive index anisotropy value.

When the content of the compound of component D is increased, the driving voltage of the liquid-crystal composition increases, and the viscosity decreases. Therefore, the content is desirably higher, as long as the required value of the driving voltage of the liquid-crystal composition is satisfied. In a case of preparing a liquid-crystal composition for TFT, the content of component D is preferably in the range of 60 wt % or less and more preferably in the range of 40 wt % or less, based on the total weight of the composition.

(4) Component E

Component E includes at least one compound selected from the group of compounds represented by formulas (7) to (10). Preferred examples of the compounds represented by formula (7) include those represented by formulas (7-1) to (7-8), preferred examples of the compounds represented by formula (8) include those represented by formulas (8-1) to (8-26), preferred examples of the compounds represented by formula (9) include those represented by formulas (9-1) to (9-20), and preferred examples of the compounds represented by formula (10) include those represented by formulas (10-1) to (10-5).

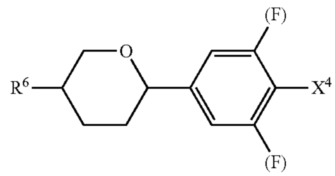
(7-1)
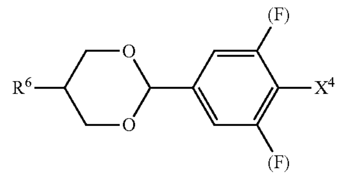
(7-2)
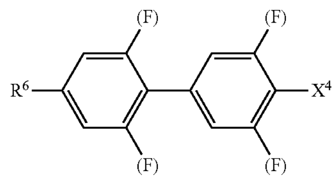
(7-3)
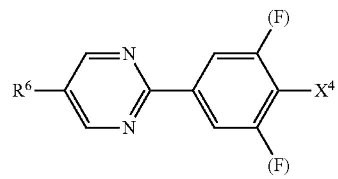
(7-4)
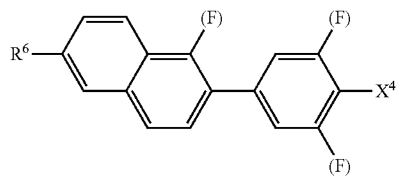
(7-5)
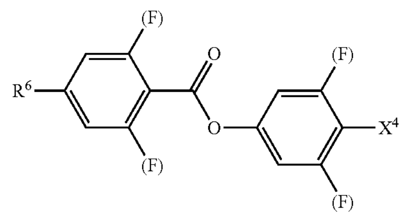
(7-6)
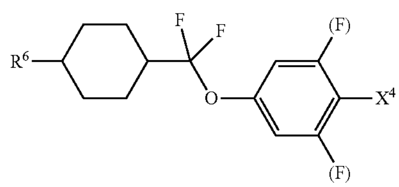
(7-7)
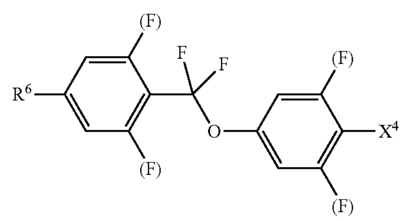
(7-8)
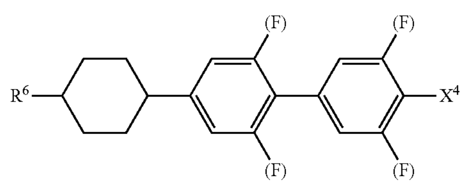
(8-1)
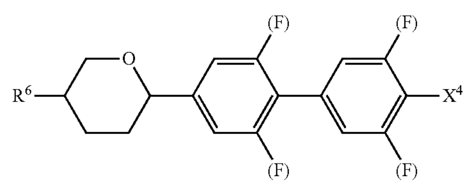
(8-2)
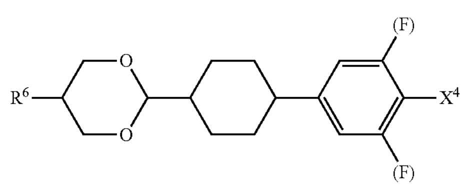
(8-3)
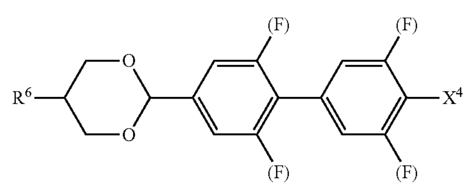
(8-4)
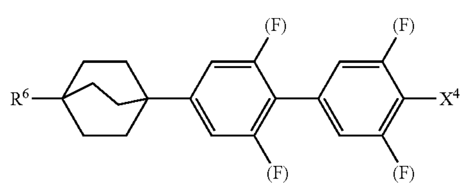
(8-5)
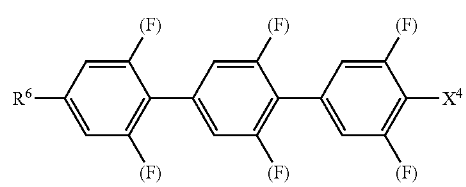
(8-6)
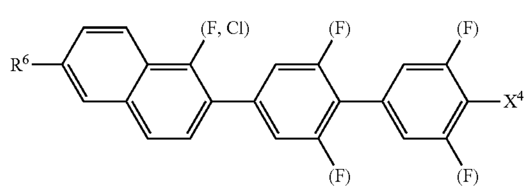
(8-7)
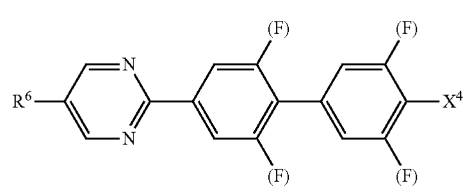
(8-8)

-continued
(8-9)
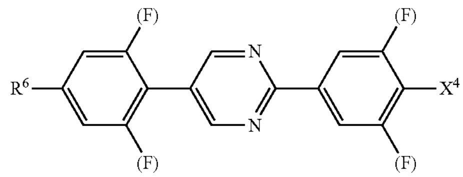
(8-10)
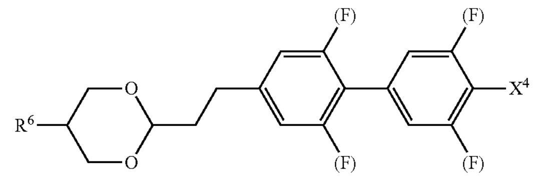
(8-11)
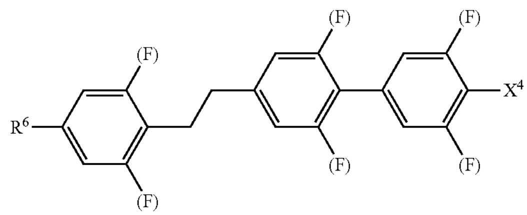
(8-12)
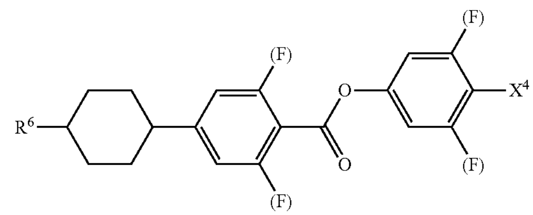
(8-13)
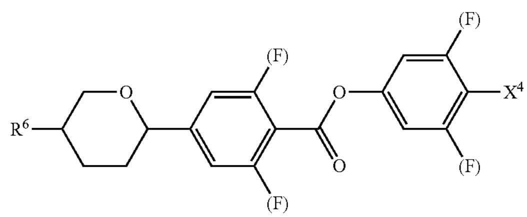
(8-14)
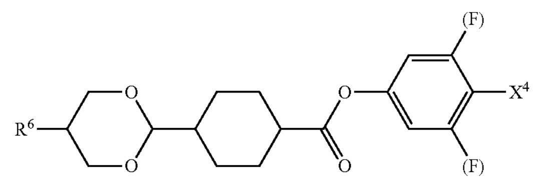
(8-15)
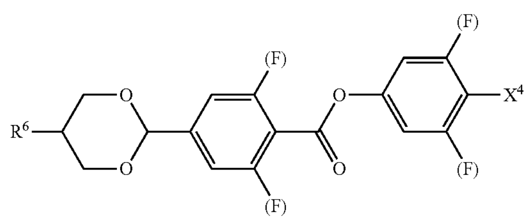
(8-16)
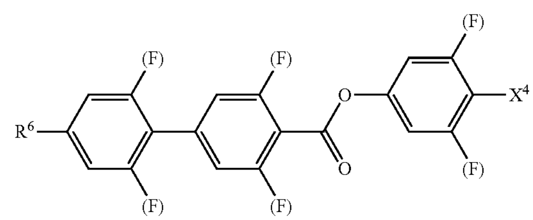
(8-17)
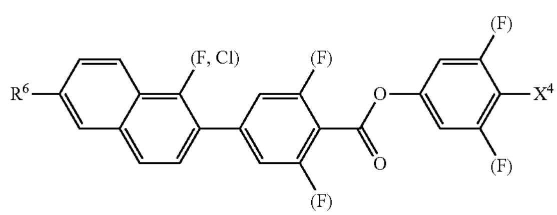
(8-18)
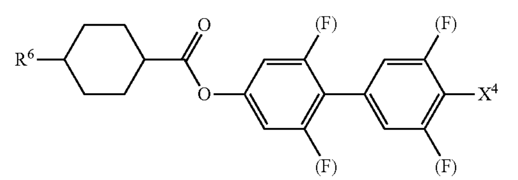
(8-19)
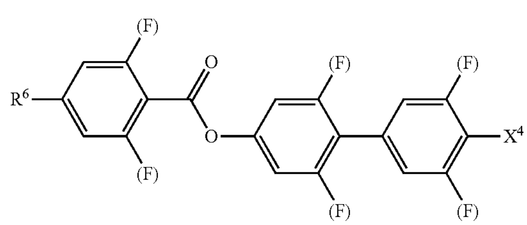
(8-20)
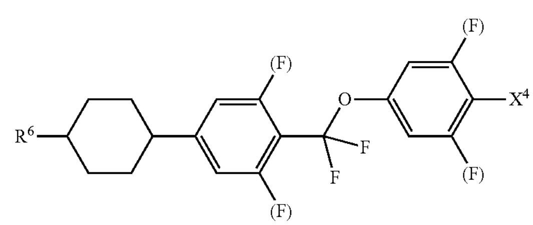
(8-21)
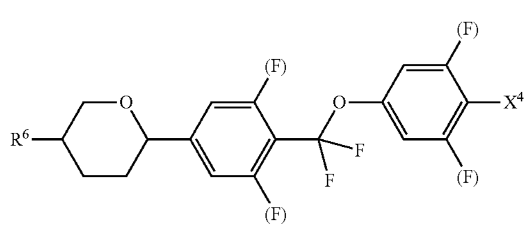
(8-22)
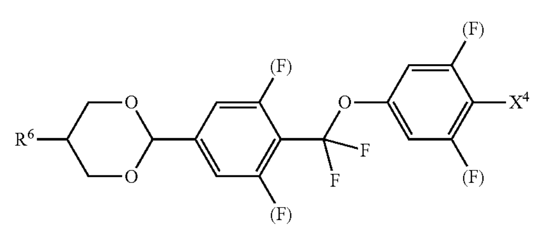

-continued
(8-23)
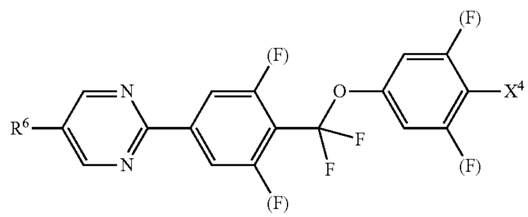
(8-24)
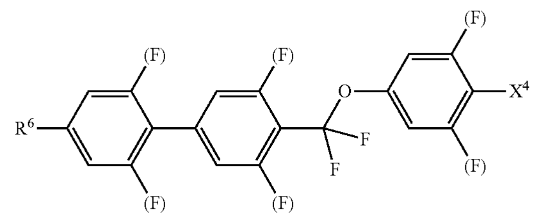
(8-25)
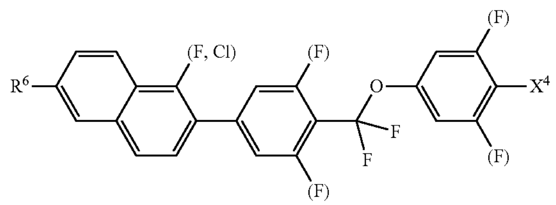
(8-26)
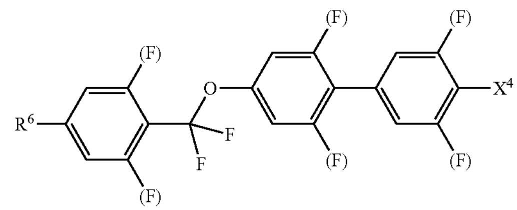
(9-1)
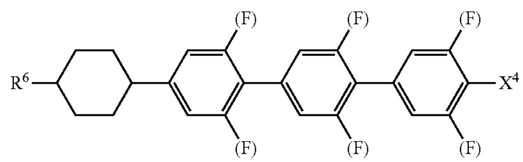
(9-2)
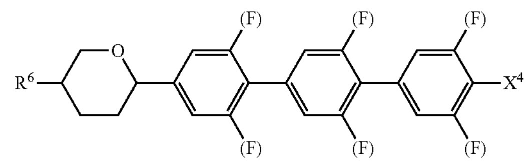
(9-3)
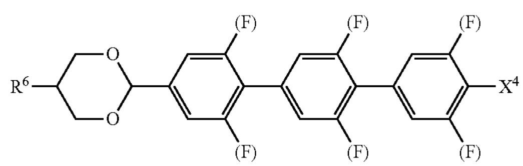
(9-4)
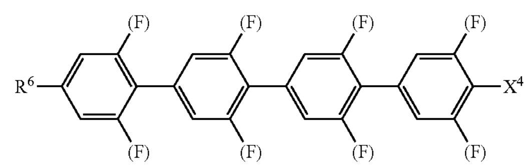
(9-5)
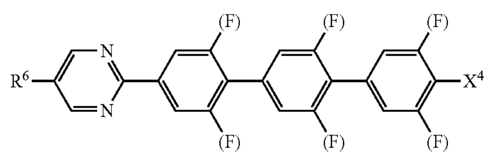
(9-6)
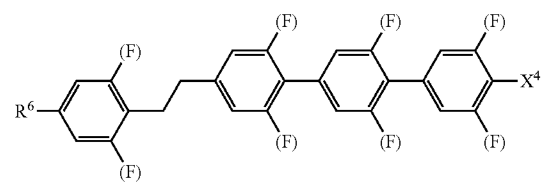
(9-7)
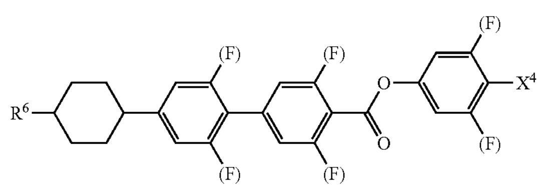
(9-8)
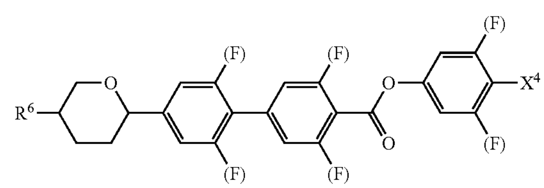
(9-9)
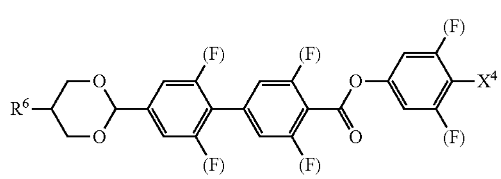
(9-10)
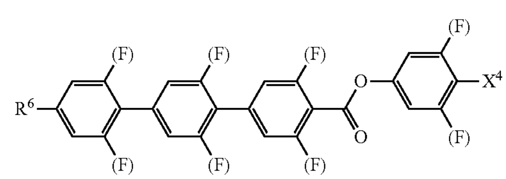
(9-11)
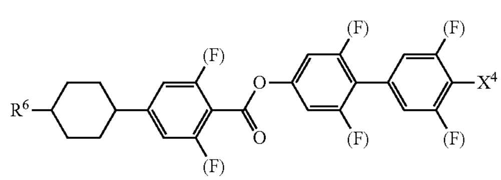
(9-12)
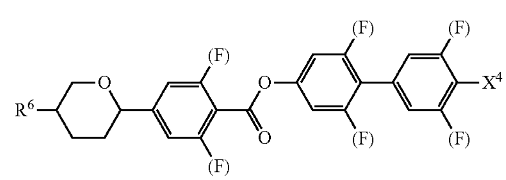

-continued
(9-13)
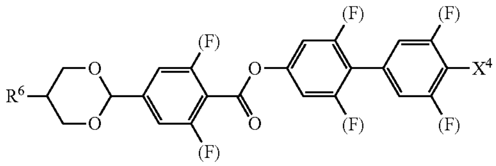
(9-14)
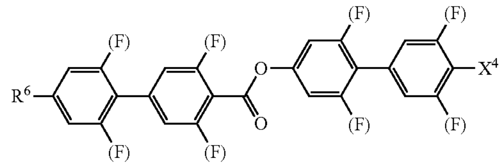
(9-15)
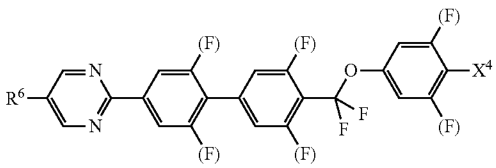
(9-16)
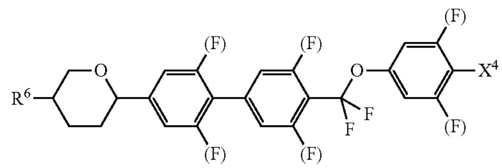
(9-17)
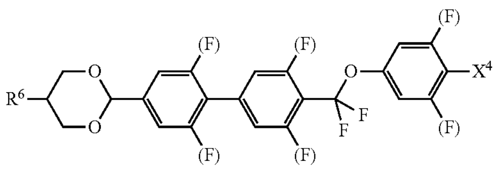
(9-18)
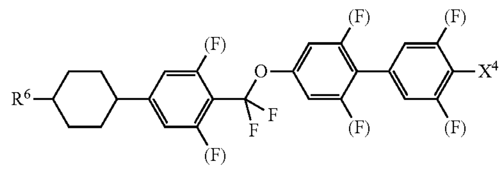
(9-19)
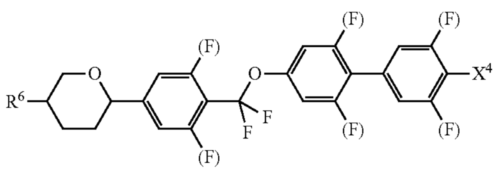
(9-20)
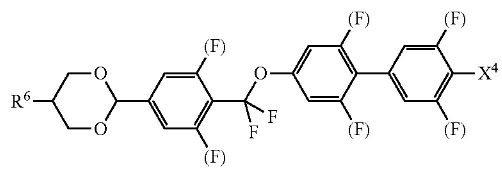
(10-1)
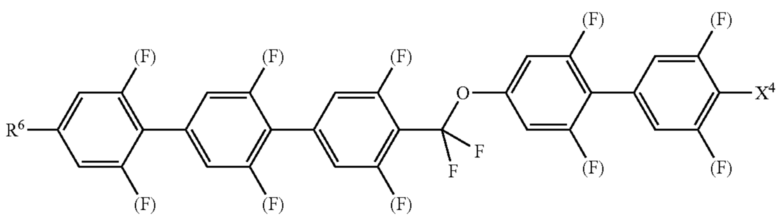
(10-2)
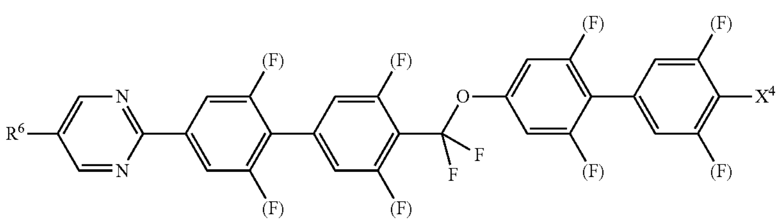
(10-3)
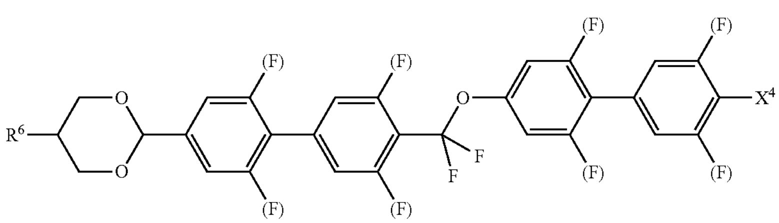
(10-4)
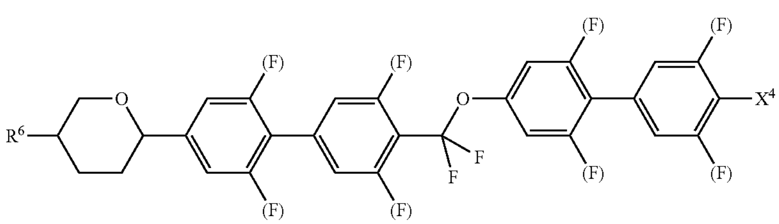

-continued (10-5)

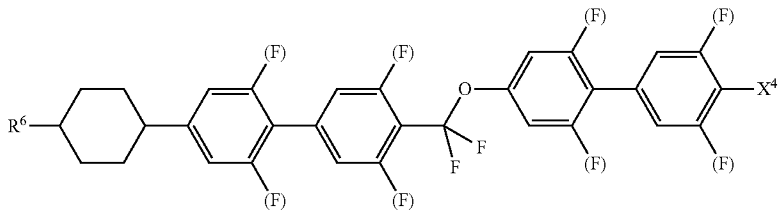

In the formulas, $R^6$ and $X^4$ are defined as above, (F) represents hydrogen or fluorine, and (F, Cl) represents fluorine or chlorine.

Component E including compounds represented by formulas (7) to (10) has a positive dielectric anisotropy value that is very large, and superb thermal stability and chemical stability, and therefore is suitable in a case where a liquid-crystal composition for active driving such as TFT driving is prepared. The content of component E in the composition of the invention is suitably in the range of 1 wt % to 99 wt %, preferably in the range of 1 wt % to 50 wt %, and more preferably in the range of 10 wt % to 50 wt %, based on the total weight of the liquid-crystal composition. Moreover, the clearing point and the viscosity can be adjusted by using component E together with the compound represented by formula (6) (component D).

(5) Component F

Component F includes compounds represented by formula (11). Preferred examples of the compounds represented by formula (11) include those represented by formulas (11-1) to (11-37). In addition, component F may include a single compound or a plurality of compounds.

(11-1)

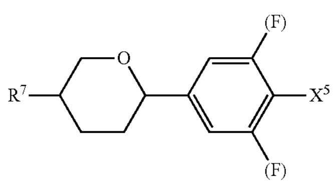

(11-2)

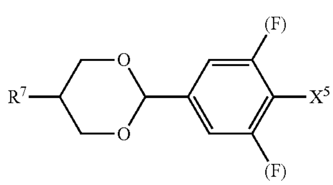

(11-3)

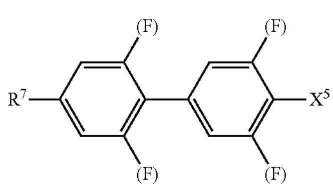

(11-4)

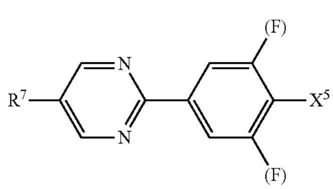

-continued (11-5)

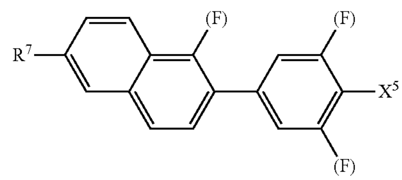

(11-6)

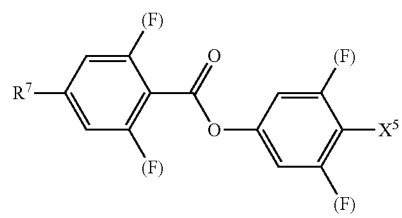

(11-7)

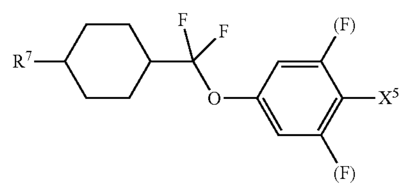

(11-8)

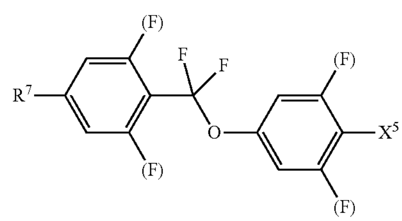

(11-9)

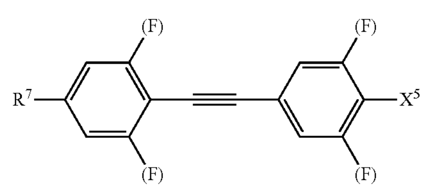

(11-10)

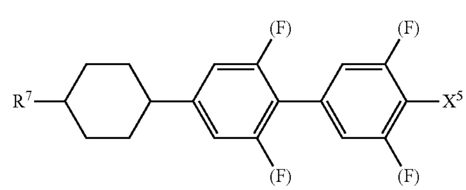

-continued
(11-11)
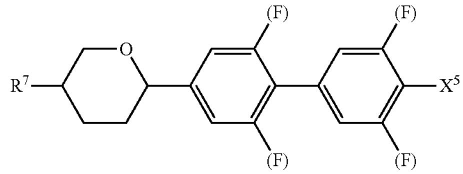
(11-12)
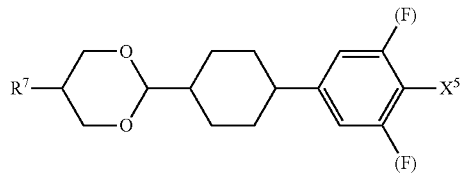
(11-13)
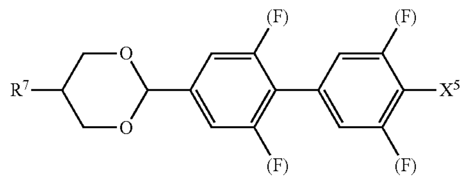
(11-14)
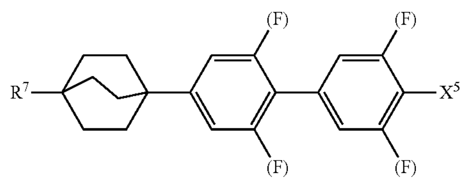
(11-15)
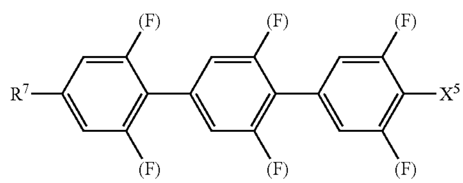
(11-16)
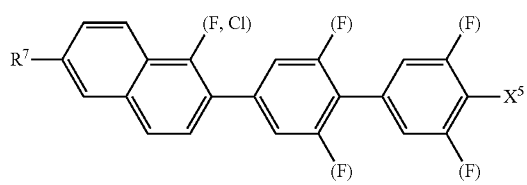
(11-17)
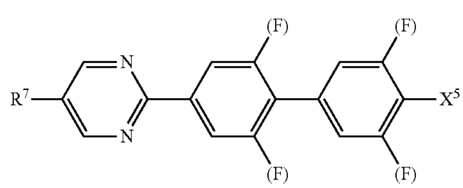
(11-18)
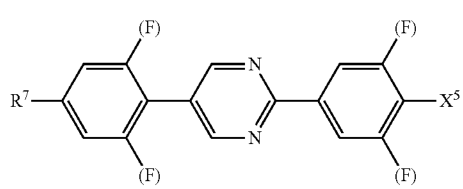
-continued
(11-19)
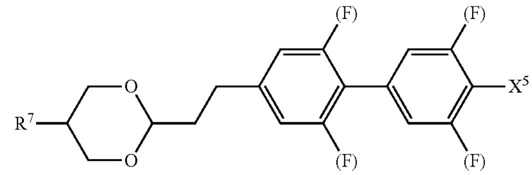
(11-20)
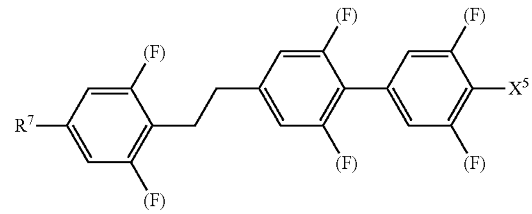
(11-21)
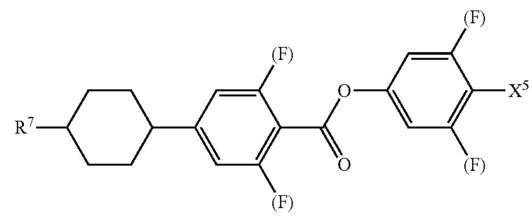
(11-22)
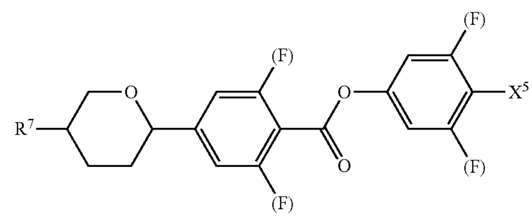
(11-23)
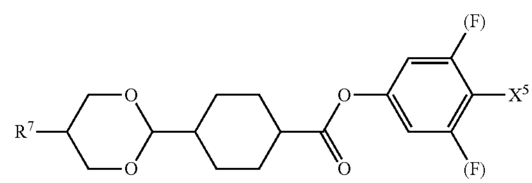
(11-24)
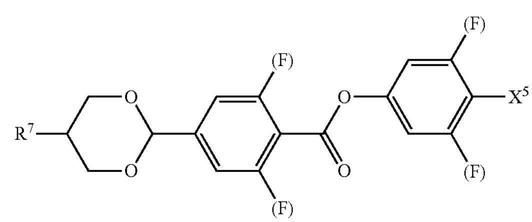
(11-25)
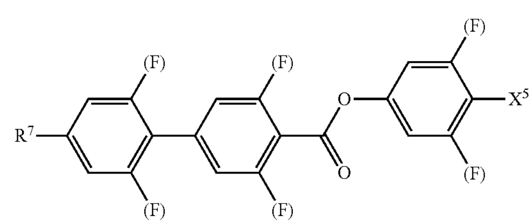

-continued (11-26)

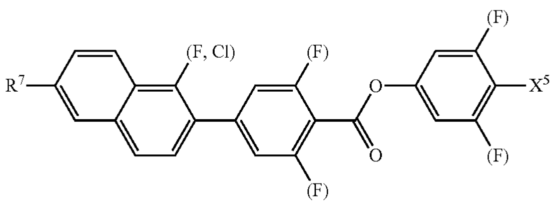

(11-27)

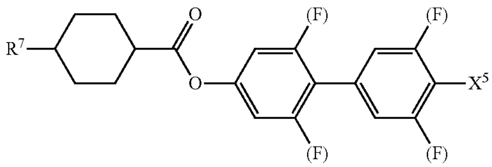

(11-28)

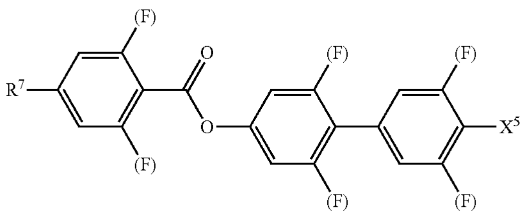

(11-29)

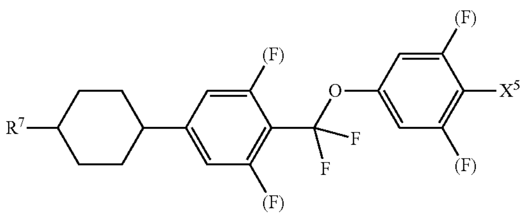

(11-30)

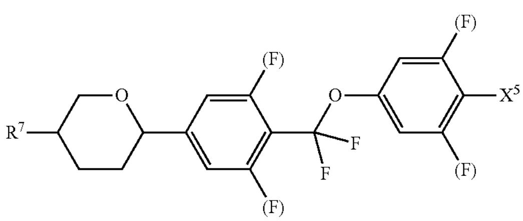

(11-31)

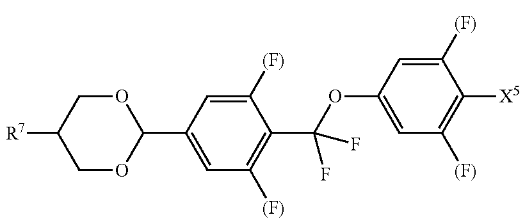

(11-32)

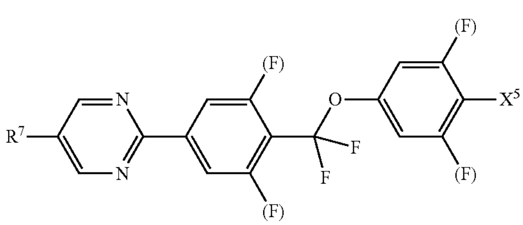

-continued (11-33)

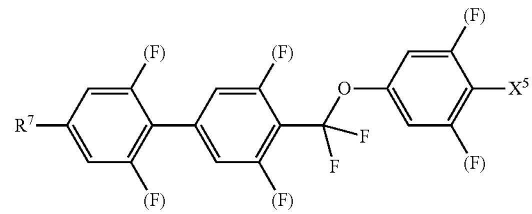

(11-34)

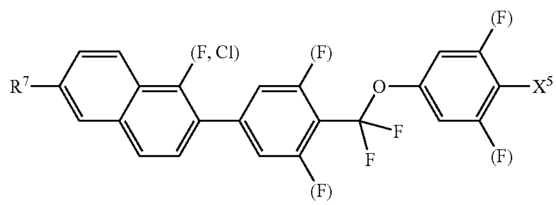

(11-35)

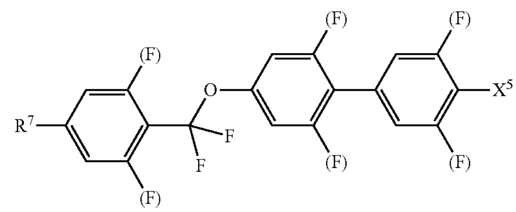

(11-36)

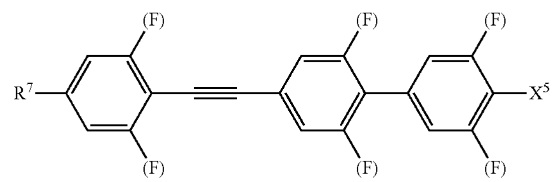

(11-37)

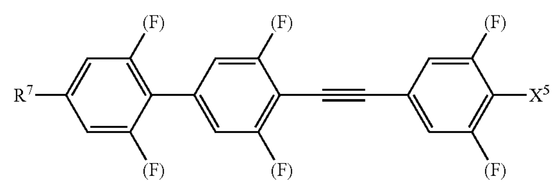

In the formulas, $R^7$, $X^5$ (F) and (F, Cl) are defined as above.

Component F including compounds represented by formulas (11) has a positive dielectric anisotropy value that is very large, and therefore is mainly used in cases where the driving voltage is to be reduced for devices such as a device driven in an optically anisotropic liquid-crystal phase, PDLCD, PNLCD and PSCLCD, etc. When component F is introduced contained, the driving voltage of the composition can be decreased. Moreover, the viscosity can be adjusted, the refractive index anisotropy value can be adjusted, and the temperature range of the liquid-crystal phase can be expanded. Furthermore, the composition can be utilized to improve the steepness.

The content of component F is preferably in the range of 0 wt % to 99.9 wt %, more preferably, in the range of 0 wt % to 95 wt %, still more preferably, in the range of 0 wt % to 80 wt %, based on the total weight of the liquid-crystal composition.

2 Chiral Agent

The liquid-crystal composition of the invention contains liquid-crystal component A and a chiral agent.

As the chiral agent to be contained in the composition of the invention, a compound having a large helical twisting power is preferred. With the compound having the large helical twisting power, the addition amount required for obtaining a desired pitch can be reduced. Therefore a rise in the driving voltage can be suppressed, and the compound is advantageous in practical use. Specifically, the compounds represented by the following formulas (K1) to (K5) are preferred.

(K1)

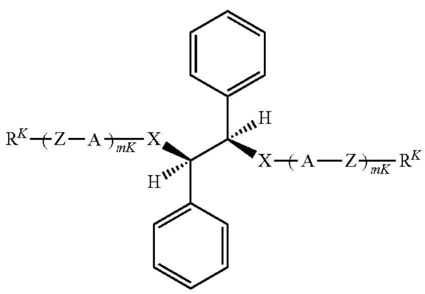

(K2)

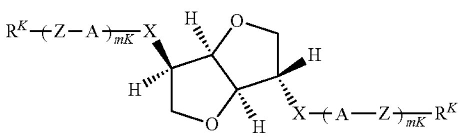

(K3)

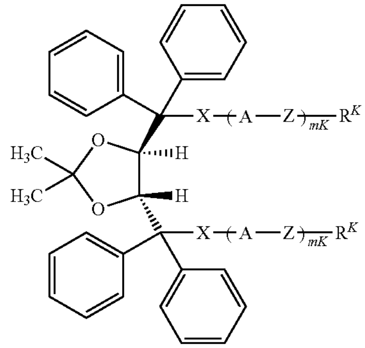

(K4)

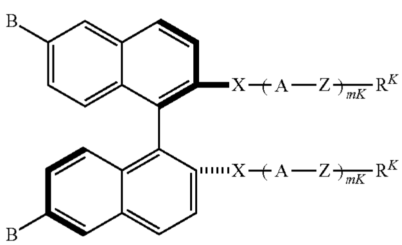

-continued (K5)

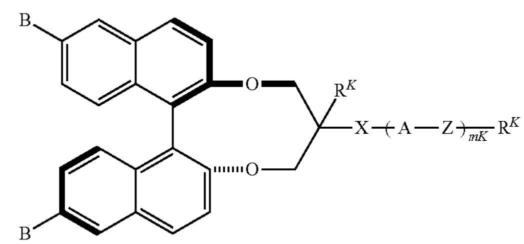

wherein, in formulas (K1) to (K5), each $R^K$ is independently hydrogen, halogen, —C≡N, —N=C=O, —N=C=S or alkyl having 1 to 20 carbons, arbitrary $—CH_2—$ in the alkyl may be replaced by —O—, —S—, —COO—, —OCO—, —CH=CH—, —CF=CF— or —C≡C—, and arbitrary hydrogen in the alkyl may be replaced by halogen; each A is independently an aromatic or non-aromatic three-membered to eight-membered ring, or a fused ring having 9 or more carbons, arbitrary hydrogen in the rings may be replaced by halogen, or alkyl or haloalkyl each having 1 to 3 carbons, $—CH_2—$ may be replaced by —O—, —S— or —NH—, and —CH= may be replaced by —N=; each B is independently hydrogen, halogen, alkyl having 1 to 3 carbons, haloalkyl having 1 to 3 carbons, an aromatic or non-aromatic three-membered to eight-membered ring, or a fused ring having 9 or more carbons, arbitrary hydrogen in the rings may be replaced by halogen, or alkyl or haloalkyl each having 1 to 3 carbons, $—CH_2—$ may be replaced by —O—, —S— or —NH—, and —CH= may be replaced by —N=; each Z is independently a single bond, or alkylene having 1 to 8 carbons in which arbitrary $—CH_2—$ may be replaced by —O—, —S—, —COO—, —OCO—, —CSO—, —OCS—, —N=N—, —CH=N—, —N=CH—, —CH=CH—, —CF=CF— or —C≡C—, and arbitrary hydrogen may be replaced by halogen; X is a single bond, —COO—, —OCO—, $—CH_2O—$, $—OCH_2—$, $—CF_2O—$, $—OCF_2—$ or $—CH_2CH_2—$; and mK is 1 to 4.

Among the compounds, the chiral agent to be added to the liquid-crystal composition is preferably from the compounds represented by formulas (K2-1) to (K2-8) included in formula (K2), the compounds represented by formulas (K4-1) to (K4-6) included in formula (K4), and the compounds represented by formulas (K5-1) to (K5-3) included in formula (KS).

(K2-1)

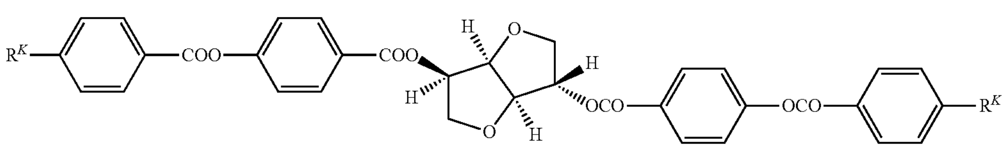

(K2-2)

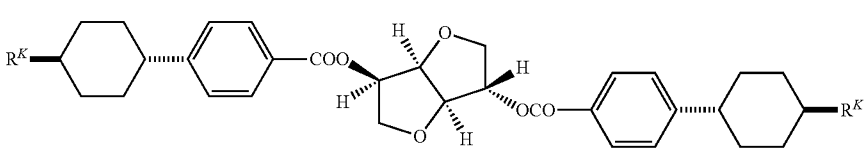

-continued
(K2-3)
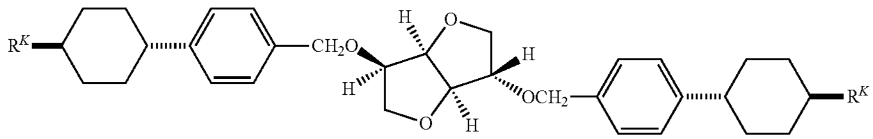
(K2-4)
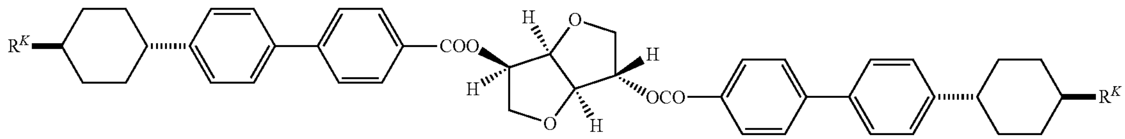
(K2-5)
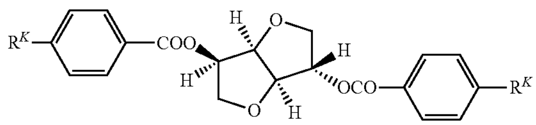
(K2-6)
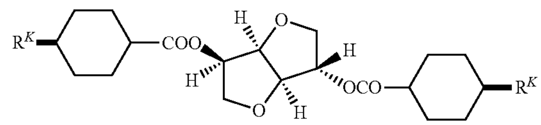
(K2-7)
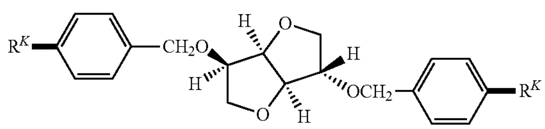
(K2-8)
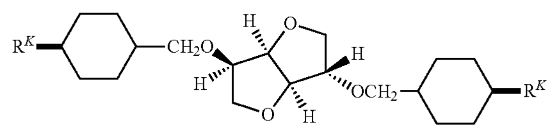
(K4-1)
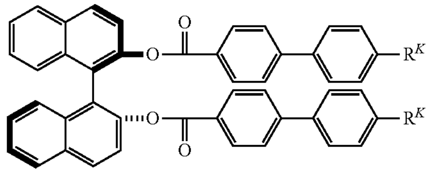
(K4-2)
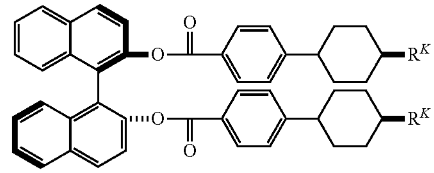
(K4-3)
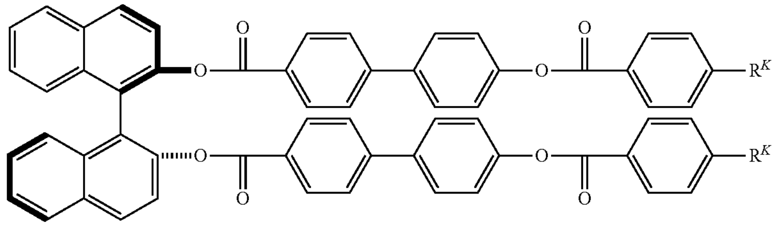
(K4-4)
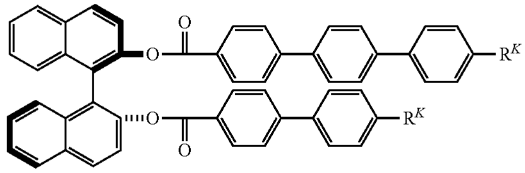
(K4-5)
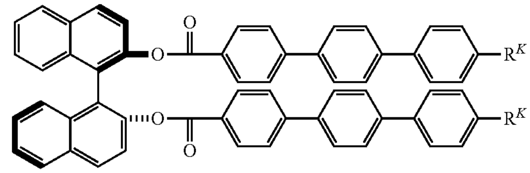
(K4-2)
(K4-6)
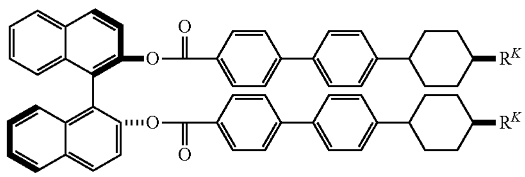
(K5-1)
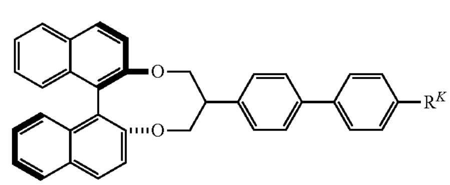

-continued (K5-2)

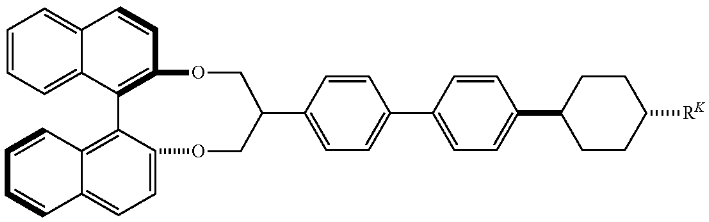

(K5-3)

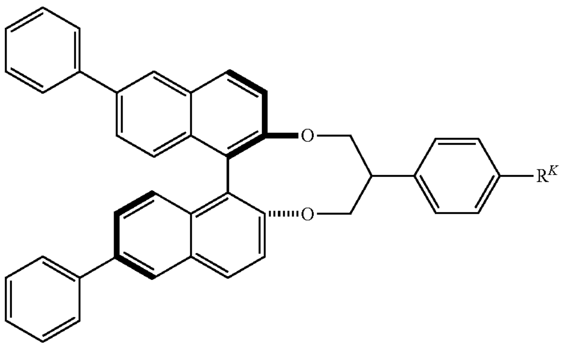

In the formulas, each $R^K$ is independently alkyl having 3 to 10 carbons, in which the —$CH_2$— adjacent to a ring may be replaced by —O—, and arbitrary —$CH_2$— may be replaced by —CH═CH—.

The pitch (at 25° C.) of the liquid-crystal composition of the invention is not particularly limited when selective reflection is not utilized, but when a color in a visible light region is displayed by utilizing selective reflection, the selective reflection wavelength is preferably from 400 nm to 800 nm, more preferably from 400 nm to 750 nm, and particularly preferably from 420 nm to 740 nm. In addition, the selective reflection wavelength herein is defined as the central wavelength in the range of the selective reflection wavelength.

The chiral agent used to induce such a selective reflection wavelength is preferably from, as compounds having a large helical twisting power, the compounds represented by formulas (K1) to (K5) and the compounds represented by formulas (K2-1) to (K2-8), (K4-1) to (K4-6) and (K5-1) to (K5-3).

On the other hand, the chiral agent used may be a compound having a twisting power being not so large. Specific examples of such a chiral agent include the compounds added to a liquid-crystal composition for a device (in a TN mode or a STN mode, etc.) driven in a nematic phase.

Specific examples of the chiral agent having a helical twisting power being relatively not so large include optically active compounds (Op-1) to (Op-13) shown below.

(Op-1)

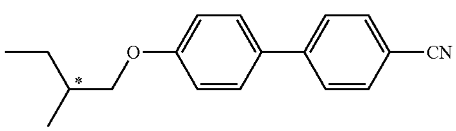

(Op-2)

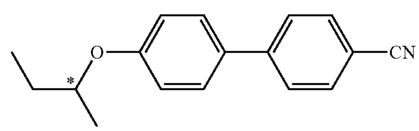

(Op-3)

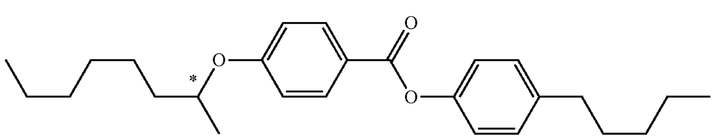

(Op-4)

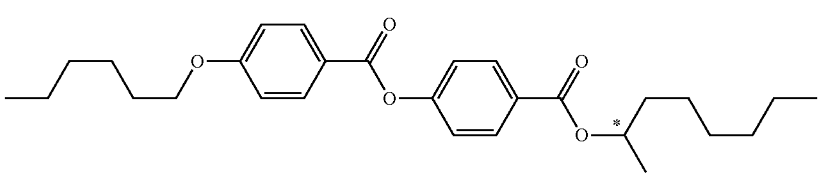

(Op-5)

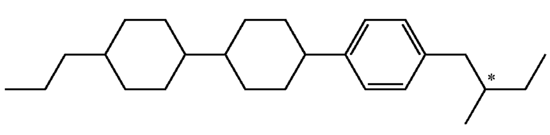

(Op-6)

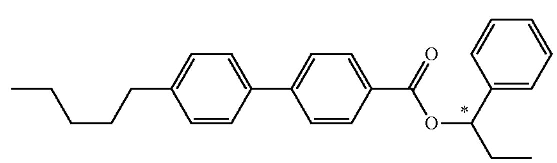

-continued
(Op-7)
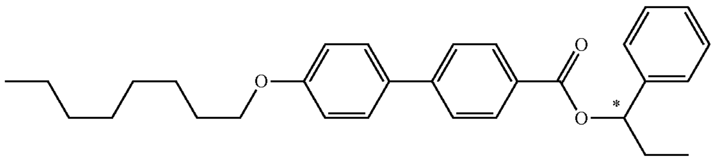
(Op-8)
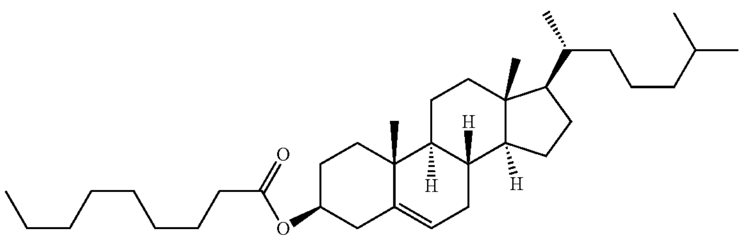
(Op-9)
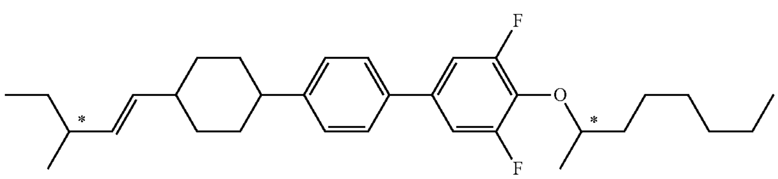
(Op-10)
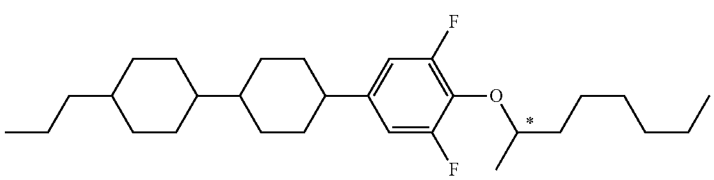
(Op-11)
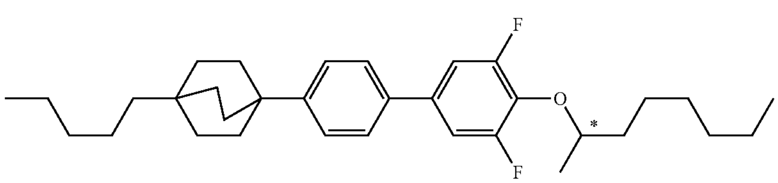
(Op-12)
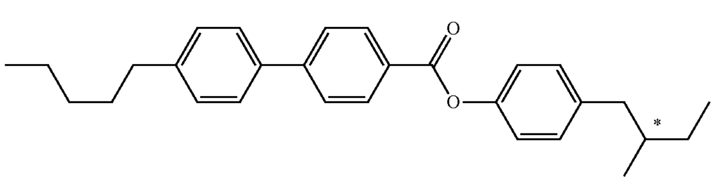
(Op-13)
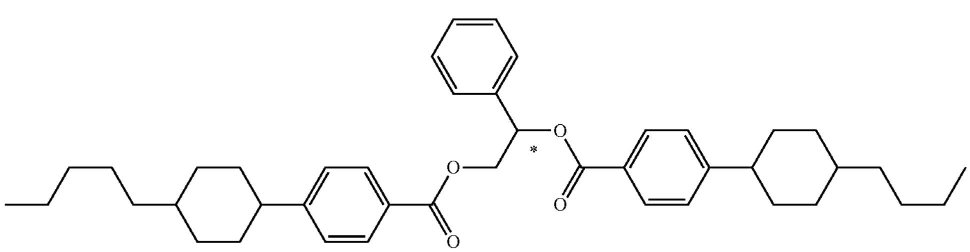

3 Composition Formulation of the Liquid-Crystal Composition of the Invention

The liquid-crystal composition of the invention includes a cholesteric liquid-crystal composition that contains liquid-crystal component A and a chiral agent, and does not exhibit an optically isotropic liquid-crystal phase. The liquid-crystal composition of the invention can be used for an optical device driven in the cholesteric phase.

The liquid-crystal composition of the invention preferably contains at least one compound represented by formulas (1-1) to (1-3) in a proportion in the range of 0.1 wt % to 99 wt % for exhibiting excellent characteristics.

A compound represented by formula (1-1) that may be contained in liquid-crystal component A has a large dielectric anisotropy and a large refractive index anisotropy, and shows a high VHR. The content of the compound is satisfactorily from 5 wt % to 100 wt %, preferably from 5 wt % to 80 wt %, and more preferably from 10 wt % to 70 wt %, based on the total weight of the achiral liquid-crystal component in which the chiral agent is not added.

A compound represented by formula (1-2) that may be contained in liquid-crystal component A has a large dielectric anisotropy and a large refractive index anisotropy, and an excellent compatibility. Content of the compound is satisfactorily from 5 wt % to 100 wt %, preferably from 5 wt % to 80 wt %, and more preferably from 10 wt % to 70 wt %, based on the total weight of the achiral liquid-crystal component in which the chiral agent is not added.

A compound represented by formula (1-3) that may be contained in liquid-crystal component A has a large dielectric anisotropy and a large refractive index anisotropy, and an excellent compatibility. The content of the compound is satisfactorily from 5 wt % to 100 wt %, preferably from 5 wt % to 80 wt %, and more preferably from 10 wt % to 70 wt %, based on the total weight of the achiral liquid-crystal component in which the chiral agent is not added.

Even when the achiral liquid-crystal component includes liquid-crystal component A only, the liquid-crystal composition of the invention exhibits excellent characteristics. Liquid-crystal component A includes one or more components selected from the group of compounds (1-1), (1-2) and (1-3). Specifically, liquid-crystal component A may include compound (1-1) only, compound (1-2) only or compound (1-3) only. In order to improve predetermined characteristics (satisfying both the temperature range and the driving voltage, for example), liquid-crystal component A preferably includes compounds (1-1) and (1-2), compounds (1-1) and (1-3), or compounds (1-2) and (1-3), and most preferably includes compounds (1-1), (1-2) and (1-3).

The chiral agent is preferably contained in the range of 0.1 wt % to 40 wt %, more preferably in the range of 1 wt % to 25 wt %, and most preferably in the range of 1 wt % to 7 wt %, based on the total weight of the liquid-crystal composition.

The chiral agent contained in the liquid-crystal composition may include a single compound or two or more compounds.

4. Any Other Component

Any other compound such as an oil gelling agent and a polymer material may be further added to the cholesteric liquid-crystal composition of the invention in the range not adversely affecting the characteristics of the composition. The liquid-crystal composition of the invention may contain a dichroic dye and a photochromic compound, in addition to the oil gelling agent and the polymer material, for example. Specific examples of the dichroic dye include the dichroic dyes of merocyanine type, styryl type, azo type, azomethine type, azoxy type, quinophthalone type, anthraquinone type and tetrazine type.

5 Preparation of Liquid-Crystal Composition

The liquid-crystal composition of the invention is prepared according to a publicly known method, for example, a method that dissolves necessary components at a high temperature.

Moreover, each component of the liquid-crystal composition used in the invention does not have a large difference in physical properties even when the component is constituted of an analog including an isotopic element of arbitrary element.

6 Polymer/Liquid-Crystal Composite Material

The liquid-crystal composition of the invention may be a mixture containing a polymerizable monomer. If the mixture is polymerized in the cholesteric phase, the polymer/liquid-crystal composite material of the invention is obtained.

"Polymer/liquid-crystal composite material" of the invention is not particularly limited, as long as the composite material contains both a liquid-crystal material and a polymer compound, but may be in a state in which the polymer is phase-separated from the liquid-crystal material under a state in which the polymer is partially or entirely not dissolved into the liquid-crystal material. In addition, unless otherwise noted, the nematic phase herein means a nematic phase in a narrow sense without including a chiral nematic phase.

The polymer/liquid-crystal composite material concerning a preferred embodiment of the invention can exhibit a cholesteric liquid-crystal phase in a wide temperature range. Moreover, the polymer/liquid-crystal composite material concerning the preferred embodiment of the invention has a low driving voltage and a high reflectance. Moreover, the polymer/liquid-crystal composite material concerning the preferred embodiment of the invention can be suitably used for an optical device such as a display device, based on the advantageous effects thereof.

6.1 Polymer

The composite material of the invention can also be made by mixing the cholesteric liquid-crystal composition, and a polymer obtained by prior polymerization, but is preferably made by mixing a low molecular weight monomer, a macromonomer, an oligomer or the like (hereafter, collectively referred to as "monomer or the like") to be converted to a polymer material, and the cholesteric liquid-crystal composition, and then performing a polymerization reaction in the mixture. The mixture containing the monomer or the like and the liquid-crystal composition is referred to as "polymerizable monomer/liquid-crystal mixture" herein. "Polymerizable monomer/liquid-crystal mixture" may contain, as required, a polymerization initiator, a curing agent, a catalyst, a stabilizer, a dichroic dye or a photochromic compound as described later in the range not adversely affecting advantageous effects of the invention. For example, the polymerizable monomer/liquid-crystal mixture of the invention may contain, as required, 0.1 to 20 parts by weight of the polymerization initiator based on 100 parts by weight of the polymerizable monomer.

The polymerization temperature is preferably a temperature at which the mixture of the monomer and the liquid-crystal material exhibits a cholesteric liquid-crystal phase.

As the monomer contained in the mixture or the raw material of the polymer that constitutes the polymer/liquid-crystal composite material according to the invention, a low molecular weight monomer, a macromonomer or an oligomer can be used, for example. "Raw material monomer of the polymer" herein is used in the meaning covering a low molecular weight monomer, a macromonomer and an oligomer, etc.

Moreover, the polymer obtained preferably has a three-dimensional crosslinking structure, and therefor a polyfunctional monomer having two or more polymerizable functional groups is preferably used as the raw material monomer of the polymer. The polymerizable functional group is not particularly limited, but specific examples thereof include an acrylic group, a methacrylic group, a glycidyl group, an epoxy group, an oxetanyl group and a vinyl group, wherein the acrylic group and the methacrylic group are preferred from the viewpoint of the polymerization rate. Among the raw material monomers of the polymer, a monomer having two or more polymerizable functional groups is preferably contained in the range of 10 wt % or more in the monomer material.

Moreover, in order to obtain a preferred polymer/liquid-crystal composite material, the polymer preferably has a mesogen moiety, and a raw material monomer having a mesogen moiety can be used as a part or entirety of the raw material monomer of the polymer.

6.2 Monofunctional or Bifunctional Monomer Having Mesogen Moiety

A mono- or bi-functional monomer having a mesogen moiety used as the raw material of the polymer constituting the polymer/liquid-crystal composite material of the invention is not particularly structurally limited, but specific examples include the compounds represented by formula (M1) and (M2) as described below.

$$R^a\text{—}Y\text{-}(A^M\text{-}Z^M)_{m1}\text{-}A^M\text{-}Y\text{—}R^b \quad \text{(M1)}$$

$$R^b\text{—}Y\text{-}(A^M\text{-}Z^M)_{m1}\text{-}A^M\text{-}Y\text{—}R^b \quad \text{(M2)}$$

(M3-1)

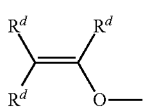

(M3-2)

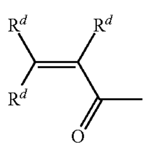

(M3-3)

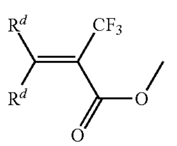

(M3-4)

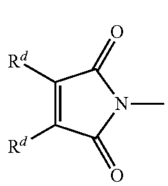

(M3-5)

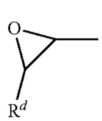

(M3-6)

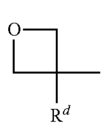

-continued (M3-7)

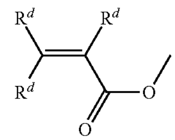

$R^a$ in formula (M1) is each independently hydrogen, halogen, —C≡N, —N=C=O, —N=C=S, or alkyl having 1 to 20 carbons. In the alkyl, arbitrary —$CH_2$— may be replaced by —O—, —S—, —CO—, —COO—, —OCO—, —CH=CH—, —CF=CF, or —C≡C—, and arbitrary hydrogen may be replaced by halogen or —C≡N. $R^b$ is each independently a polymerizable group represented by formulas (M3-1) to (M3-7).

Preferred $R^a$ in formula (M1) is hydrogen, halogen, —C≡N, —$CF_3$, —$CF_2H$, —$CFH_2$, —$OCF_3$, —$OCF_2H$, alkyl having 1 to 20 carbons, alkoxy having 1 to 19 carbons, alkenyl having 2 to 21 carbons, and alkynyl having 2 to 21 carbons. Particularly preferred $R^a$ is —C≡N, alkyl having 1 to 20 carbons and alkoxy having 1 to 19 carbons.

$R^b$ in formula (M2) is each independently a polymerizable group represented by formulas (M3-1) to (M3-7).

Herein, $R^d$ in formulas (M3-1) to (M3-7) is each independently hydrogen, halogen or alkyl having 1 to 5 carbons, and in the alkyl, arbitrary hydrogen may be replaced with halogen. Preferred $R^d$ is hydrogen, halogen and methyl. Particularly preferred $R^d$ is hydrogen, fluorine and methyl.

Moreover, a monomer represented by formula (M3-2), (M3-3), (M3-4) or (M3-7) is suitably polymerized by radical polymerization. A monomer represented by formula (M3-1), (M3-5) or (M3-6) is suitably polymerized by cationic polymerization. Any polymerization is living polymerization, and hence polymerization starts if a small amount of radicals or cation active species is generated in the reaction system. A polymerization initiator can be used to accelerate the generation of the active species. For example, light or heat can be used to generate the active species.

$A^M$ in formulas (M1) and (M2) is each independently an aromatic or non-aromatic five-membered ring or six-membered ring, or a fused ring having 9 or more carbons, wherein —$CH_2$— in the ring may be replaced by —O—, —S—, —NH— or —$NCH_3$—, —CH= in the ring may be replaced by —N=, and a hydrogen atom on the ring may be replaced by halogen, or alkyl or alkyl halide each having 1 to 5 carbons. Specific examples of preferred $A^M$ include 1,4-cyclohexylene, 1,4-cyclohexenylene, 1,4-phenylene, naphthalene-2,6-diyl, tetrahydronaphthalene-2,6-diyl, fluorene-2,7-diyl and bicyclo[2.2.2]octane-1,4-diyl, wherein arbitrary —$CH_2$— in the rings may be replaced by —O—, arbitrary —CH= may be replaced by —N=, and arbitrary hydrogen in the rings may be replaced by halogen, or alkyl or alkyl halide each having 1 to 5 carbons.

In consideration of the stability of the compound, —$CH_2$—O—$CH_2$—O— in which two oxygen atoms are not adjacent is preferred to —$CH_2$—O—O—$CH_2$— in which two oxygen atoms are adjacent. A similar rule also applies to the case of sulfur.

Among the variety of $A^M$, particularly preferred ones are 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-methyl-1,4-phenylene, 2-trifluoromethyl-1,4-phenylene, 2,3-bis(trifluoromethyl)-1,4-phenylene, naphthalene-2,6-diyl, tetrahydronaphthalene-2,6-diyl, fluorene-2,7-diyl, 9-methylfluorene-2,7-diyl, 1,3-dioxane-2,5-diyl, pyridine-2,5-diyl and pyrimidine-2,5-diyl. In addition, with regard to the configuration of 1,4-cyclohexylene and 1,3-dioxane-2,5-diyl described above, trans is preferred to cis.

Because 2-fluoro-1,4-phenylene is structurally identical with 3-fluoro-1,4-phenylene, the latter is not exemplified. The rule also applies to the case of 2,5-difluoro-1,4-phenylene and 3,6-difluoro-1,4-phenylene, and so on.

Y in formulas (M1) and (M2) is each independently a single bond or alkylene having 1 to 20 carbons. In the alkylene, arbitrary —$CH_2$— may be replaced by —O— or —S—, —CH═CH—, —C≡C—, —COO— or —OCO—. Preferred ones of Y are a single bond, —$(CH_2)_{m2}$—, —$O(CH_2)_{m2}$— and —$(CH_2)_{m2}O$— (in the formulas, m2 is an integer of from 1 to 20.). Particularly preferred ones of Y are a single bond, —$(CH_2)_{m2}$—, —$O(CH_2)_{m2}$— and —$(CH_2)_{m2}O$— (in the formulas, m2 is an integer of from 1 to 10.). In consideration of the stability of the compound, —Y—$R^a$ and —Y—$R^b$ preferably does not have —O—O—, —O—S—, —S—O— or —S—S— in the groups.

$Z^M$ in formulas (M1) and (M2) is each independently a single bond, —$(CH_2)_{m3}$—, —$O(CH_2)_{m3}$—, $(CH_2)_{m3}O$—, $O(CH_2)_{m3}O$—, —CH═CH—, —C≡C—, —COO—, —OCO—, —$(CF_2)_2$—, —$(CH_2)_2$—COO—, —OCO—$(CH_2)_2$—, —CH═CH—COO—, —OCO—CH═CH—, —C≡C—COO—, —OCO—C≡C—, —CH═CH—$(CH_2)_2$—, —$(CH_2)_2$—CH═CH—, —CF═CF—, —C≡C—CH═CH—, —CH═CH—C≡C—, —$OCF_2$—$(CH_2)_2$—, —$(CH_2)_2$—$CF_2O$—, —$OCF_2$— or —$CF_2O$— (in the formulas, m3 is an integer from 1 to 20.).

Preferred ones of $Z^M$ are a single bond, —$(CH_2)_{m3}$—, —$O(CH_2)_{m3}$—, —$(CH_2)_{m3}O$—, —CH═CH—, —C≡C—, —COO—, —OCO—, —$(CH_2)_2$—COO—, —OCO—$(CH_2)_2$—, —CH═CH—COO—, —OCO—CH═CH—, —$OCF_2$— and —$CF_2O$—.

Then, m1 in formulas (M1) and (M2) is an integer of from 1 to 6. Preferred m1 is an integer of from 1 to 3. When m1 is 1, the monomer is a bicyclic compound having two rings such as two six-membered rings. When m1 is 2 or 3, the monomers is a tricyclic compound or a tetracyclic compound. For example, when m1 is 1, two of $A^M$ may be identical or different. For example, when m1 is 2, three of $A^M$ (or two of $Z^M$) may also be identical or different. When m1 is 3 to 6, the same rule applies. The same rule also applies to the cases of $R^a$, $R^b$, $R^d$, $Z^M$, $A^M$ and Y.

If compound (M1) represented by formula (M1) and compound (M2) represented by formula (M2) contain an isotope such as 2H (deuterium) and $^{13}C$ in an amount higher than the amount of its natural abundance, compound (M1) and compound (M2) still have similar characteristics and therefore can be preferably used.

More preferred examples of compound (M1) and compound (M2) include compounds (M1-1) to (M1-41) and compounds (M2-1) to (M2-27) as represented by formulas (M1-1) to (M1-41) and (M2-1) to (M2-27), respectively. In the compounds, $R^a$, $R^b$, $R^d$, $Z^M$ and Y are defined as in the cases of formulas (M1) and (M2) as described in the embodiment of the invention.

The following partial structures in compounds (M1-1) to (M1-41) and (M2-1) to (M2-27) will be explained. Partial structure (a1) represents 1,4-phenylene in which arbitrary hydrogen is replaced by fluorine. Partial structure (a2) represents 1,4-phenylene in which arbitrary hydrogen may be replaced by fluorine. Partial structure (a3) represents 1,4-phenylene in which arbitrary hydrogen may be replaced by either fluorine or methyl. Partial structure (a4) represents fluorene in which the hydrogen at 9-position may be replaced by methyl.

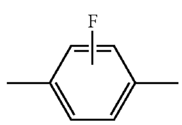

(a1)

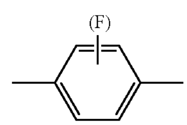

(a2)

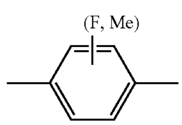

(a3)

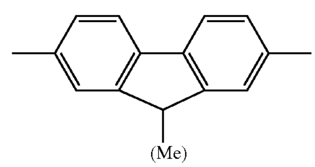

(a4)

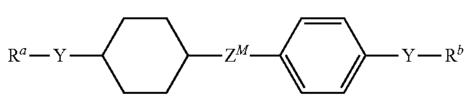

(M1-1)

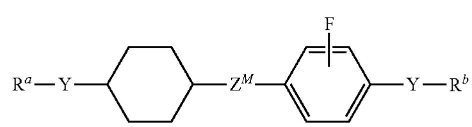

(M1-2)

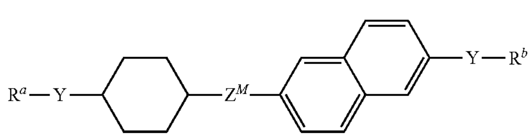

(M1-3)

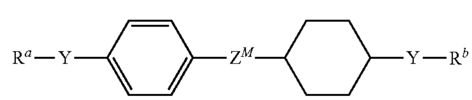

(M1-4)

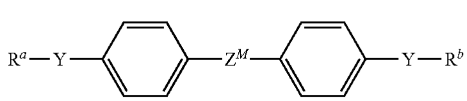

(M1-5)

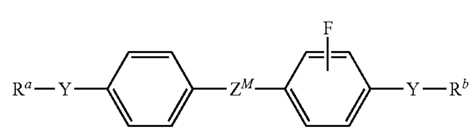

(M1-6)

-continued
(M1-7)
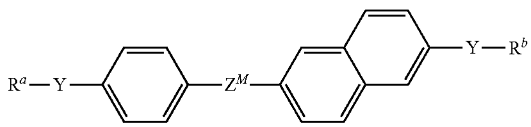
(M1-8)
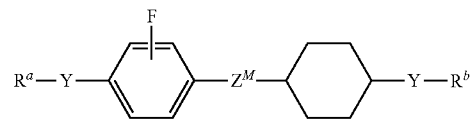
(M1-9)
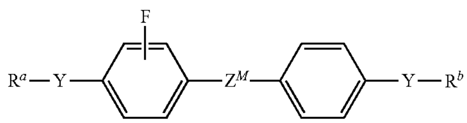
(M1-10)
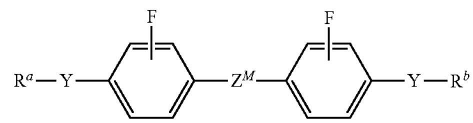
(M1-11)
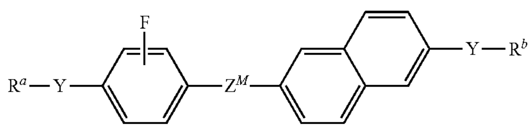
(M1-12)
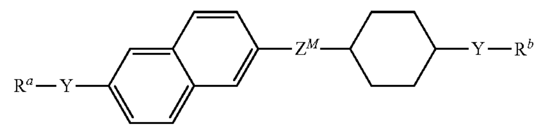
(M1-13)
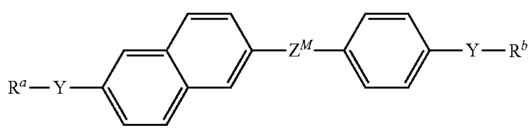
(M1-14)
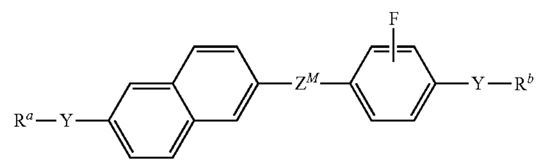
(M1-15)
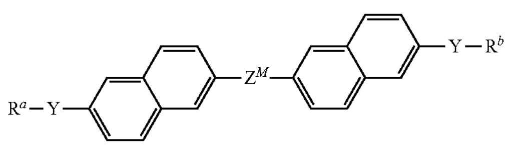
(M1-16)
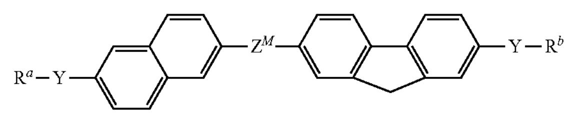
(M1-17)
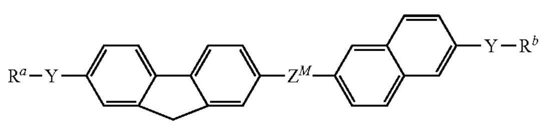
(M1-18)
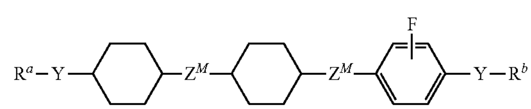
(M1-19)
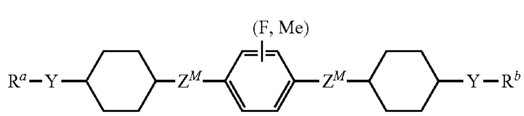
(M1-20)
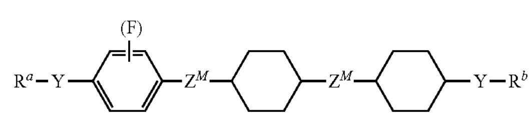
(M1-21)
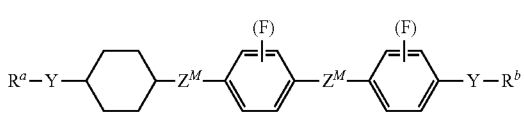
(M1-22)
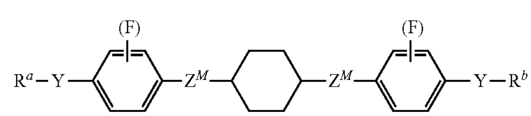
(M1-23)
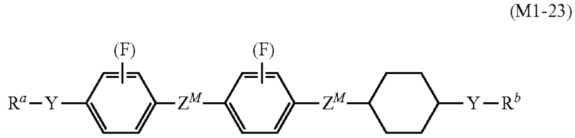
(M1-24)
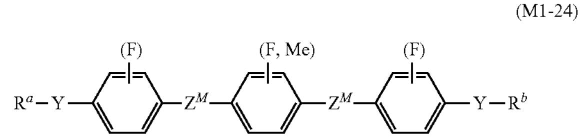
(M1-25)
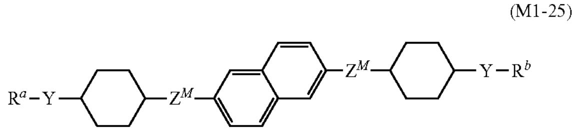
(M1-26)
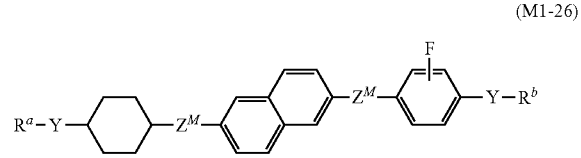

-continued
(M1-27)
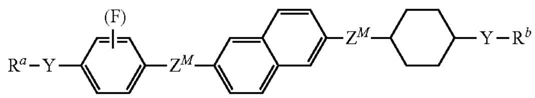
(M1-28)
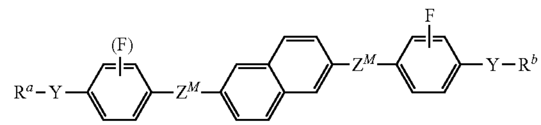
(M1-29)
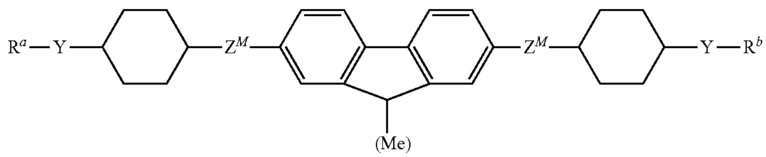
(M1-30)
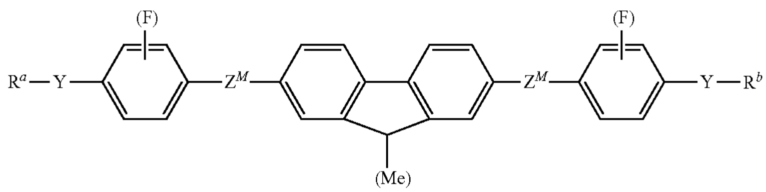
(M1-31)
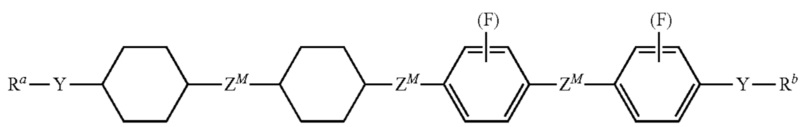
(M1-32)
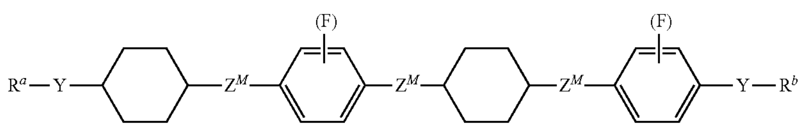
(M1-33)
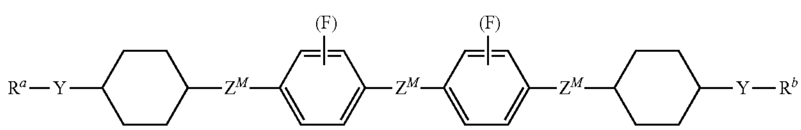
(M1-34)
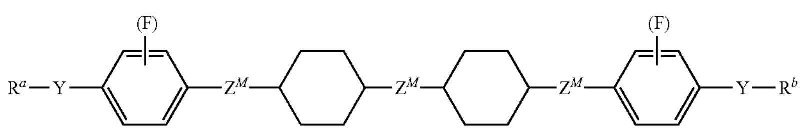
(M1-35)
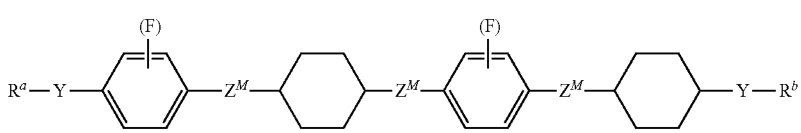
(M1-36)
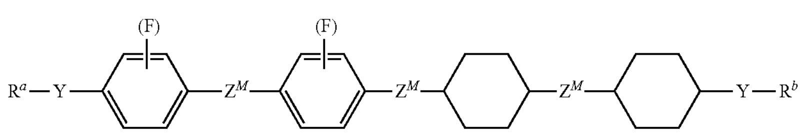
(M1-37)
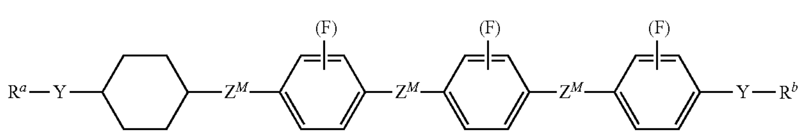
(M1-38)
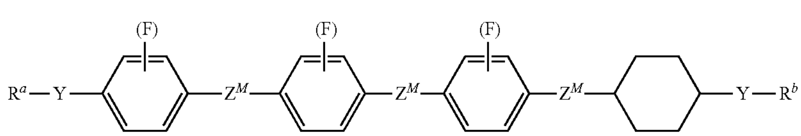

-continued
(M1-39)
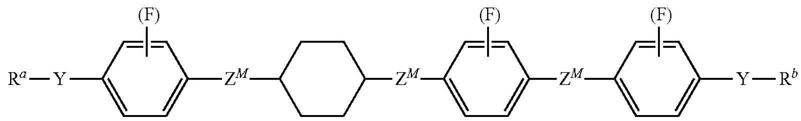
(M1-40)
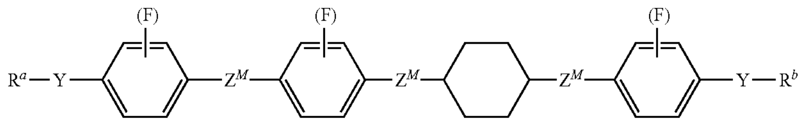
(M1-41)
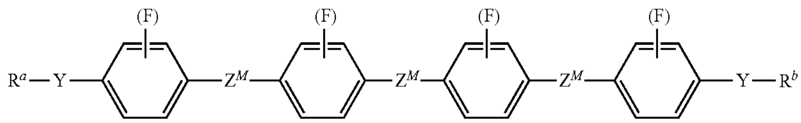
(M2-1)
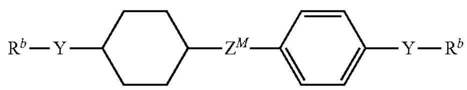
(M2-2)
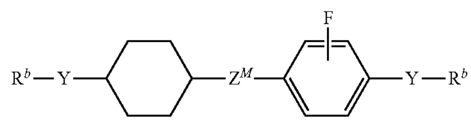
(M2-3)
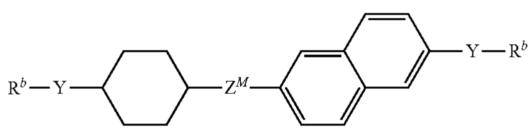
(M2-4)
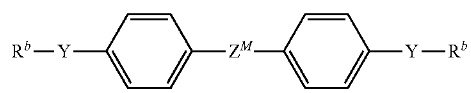
(M2-5)
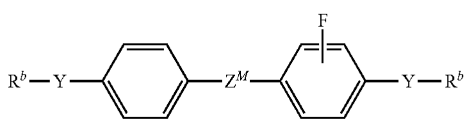
(M2-6)
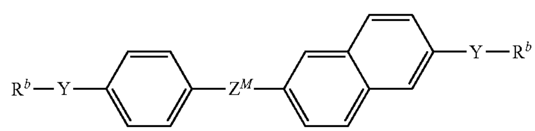
(M2-7)
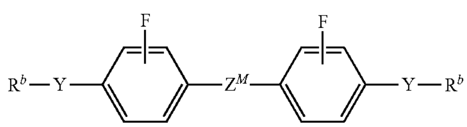
(M2-8)
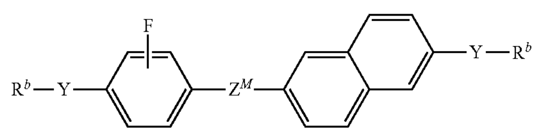
(M2-9)
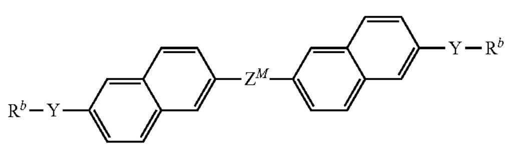
(M2-10)
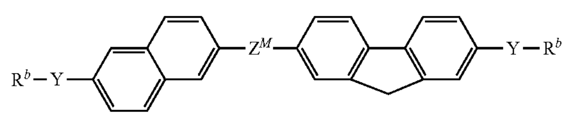
(M2-11)
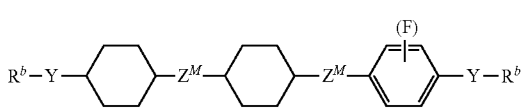
(M2-12)
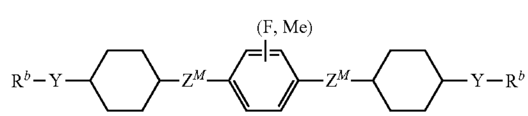
(M2-13)
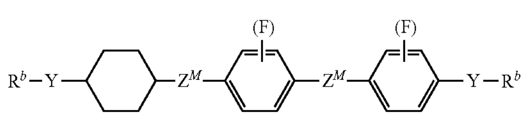
(M2-14)
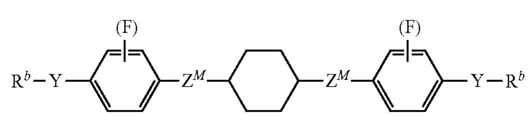
(M2-15)
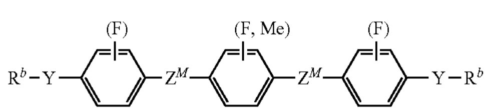
(M2-16)
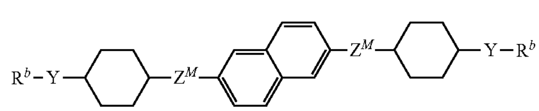

-continued
(M2-17)
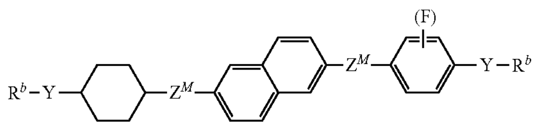
(M2-18)
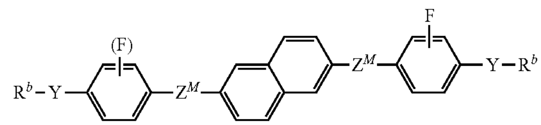
(M2-19)
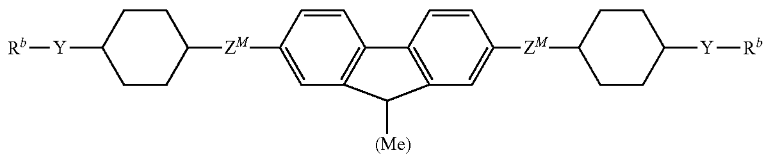
(M2-20)
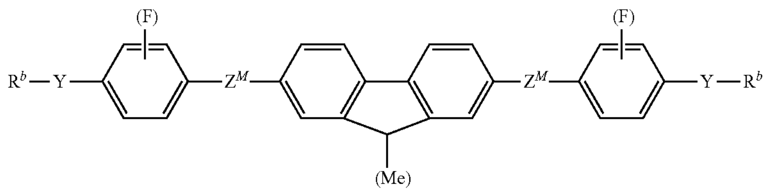
(M2-21)
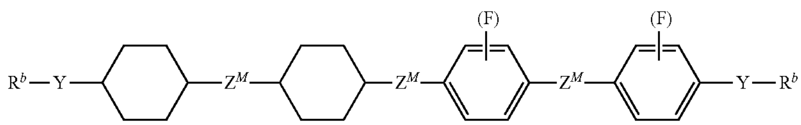
(M2-22)
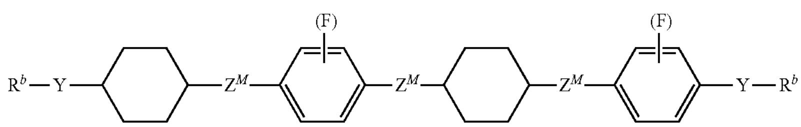
(M2-23)
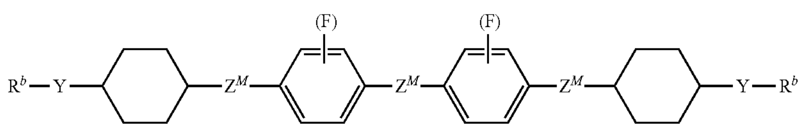
(M2-24)
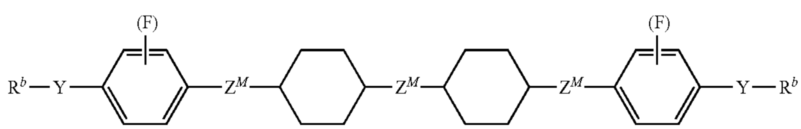
(M2-25)
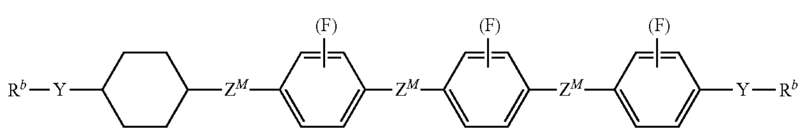
(M2-26)
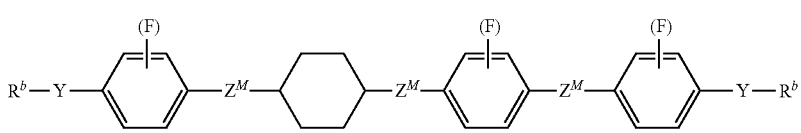

-continued (M2-27)

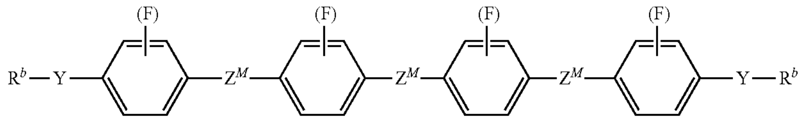

A monomer having no aforementioned mesogen moiety, and a polymerizable compound other than monomers (M1) and (M2) having a mesogen moiety can be used, as required.

For the purpose of optimizing the optical isotropy of the polymer/liquid-crystal composite material of the invention, a monomer having a mesogen moiety and having three or more polymerizable functional groups can also be used. As the monomer having the mesogen moiety and having three or more polymerizable functional groups, a publicly known compound can be suitably used. Specific examples thereof include those represented by formulas (M4-1) to (M4-3), and further specific examples thereof include those described in JP 2000-327632 A, JP 2004-182949 A and JP 2004-59772 A. However, in formulas (M4-1) to (M4-3), $R^b$, $Z^M$, Y and (F) are defined as above.

(M4-1)

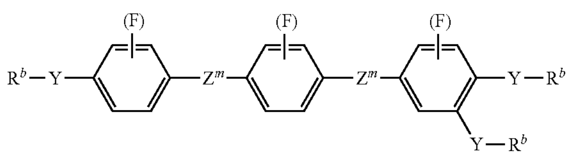

(M4-2)

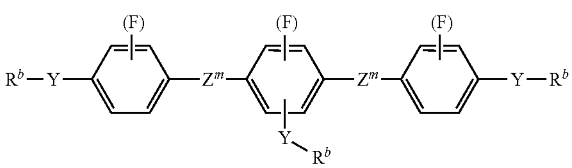

(M4-3)

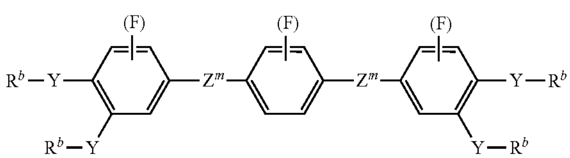

6.3 Monomer Having Polymerizable Functional Group but No Mesogen Moiety

Specific examples of monomers having a polymerizable functional group but no mesogen moiety include straight-chain or branched acrylate having 1 to 30 carbons, straight-chain or branched diacrylate having 1 to 30 carbons, and, as monomers having three or more functional groups, glycerol propoxylate (1PO/OH) triacrylate, pentaerythritol propoxylate triacrylate, pentaerythritol triacrylate, trimethylolpropane ethoxylated triacrylate, trimethylolpropane propoxylate triacrylate, trimethylolpropane triacrylate, di(trimethylolpropane) tetraacrylate, pentaerythritol tetraacrylate, di(pentaerythritol)pentaacrylate, di(pentaerythritol) hexaacrylate and trimethylolpropane triacrylate, but are not limited thereto.

6.4 Polymerization Initiator

The polymerization reaction in forming the polymer contained in the polymer/liquid-crystal composite material of the invention is not particularly limited. For example, photoradical polymerization, thermal radical polymerization, photocationic polymerization or the like is performed.

Specific examples of the photoradical polymerization initiator that can be used in photoradical polymerization include DAROCUR™ 1173 and 4265 (both being trade names, by BASF Japan Ltd.) and IRGACURE™ 184, 369, 500, 651, 784, 819, 907, 1300, 1700, 1800, 1850 and 2959 (all being trade names, by BASF Japan Ltd.).

Specific examples of the preferred initiators for thermal radical polymerization that can be used in radical polymerization by heat include benzoyl peroxide, diisopropyl peroxydicarbonate, t-butyl peroxy-2-ethylhexanoate, t-butyl peroxypivalate, t-butyl peroxydiisobutyrate, lauroyl peroxide, dimethyl-2,2'-azobisisobutyrate (MAIB), di-t-butyl peroxide (DTBPO), azobisisobutyronitrile (AIBN) and azobiscyclohexanecarbonitrile (ACN).

Specific examples of the photocationic polymerization initiator that can be used in photocationic polymerization include diaryliodonium salts (hereinafter, referred to as "DAS") and triarylsulfonium salts (hereinafter, referred to as "TAS").

Specific examples of DAS include diphenyliodonium tetrafluoroborate, diphenyliodonium hexafluorophosphonate, diphenyliodonium hexafluoroarsenate, diphenyliodonium trifluoromethanesulfonate, diphenyliodonium trifluoroacetate, diphenyliodonium p-toluenesulfonate, diphenyliodonium tetra(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromethanesulfonate, 4-methoxyphenylphenyliodonium trifluoroacetate and 4-methoxyphenylphenyliodonium p-toluenesulfonate.

Improvement in the sensitivity can be achieved by adding a photosensitizer, such as thioxanthone, phenothiazine, chlorothioxanthone, xanthone, anthracene, diphenylanthracene or rubrene, etc., to DAS.

Specific examples of TAS include triphenylsulfonium tetrafluoroborate, triphenylsulfonium hexafluorophosphonate, triphenylsulfonium hexafluoroarsenate, triphenylsulfonium trifluoromethanesulfonate, triphenylsulfoniumtrifluoroacetate, triphenylsulfonium p-toluenesulfonate, triphenylsulfonium tetra(pentafluorophenyl)borate, 4-methoxyphenydiphenylsulfonium tetrafluoroborate, 4-methoxyphenydiphenylsulfonium hexafluorophosphonate, 4-methoxyphenydiphenylsulfonium hexafluoroarsenate, 4-methoxyphenyldiphenylsulfonium trifluoromethanesulfonate, 4-methoxyphenyldiphenylsulfonium trifluoroacetate, and 4-methoxyphenydiphenylsulfonium p-toluenesulfonate.

Specific examples of the trade names of the photocationic polymerization initiator include Cyracure™ UVI-6990, Cyracure™ UVI-6974 and Cyracure™ UVI-6992 (each being a trade name, by UCC), Adekaoptomer SP-150, SP-152, SP-170 and SP-172 (each being a trade name, by ADEKA Corporation) and Rhodorsil Photoinitiator 2074 (trade name, by Rhodia Japan, Ltd.), IRGACURE™ 250

(trade name, by BASF Japan Ltd.) and UV-9380C (trade name, by GE Toshiba Silicones Co., Ltd.).

6.5 Curing Agent, Stabilizer and so on

In producing the polymer constituting the polymer/liquid-crystal composite material of the invention, one, two or more other suitable components, for example, a curing agent, a catalyst and a stabilizer, may be added in addition to the monomer and so on and the polymerization initiator.

As the curing agent, a publicly known latent curing agent that has been used as a curing agent for epoxy resins so far can be used ordinarily. Specific examples of the latent curing agent for epoxy resins include amine curing agents, novolak resin curing agents, imidazole curing agents and acid anhydride curing agents. Specific examples of the amine curing agents include: aliphatic amines such as diethylenetriamine, triethylenetetramine, tetraethylenepentamine, m-xylenediamine, trimethylhexamethylenediamine, 2-methylpentamethylenediamine and diethylaminopropylamine; alicyclic polyamines such as isophoronediamine, 1,3-bisaminomethylcyclohexane, bis(4-aminocyclohexyl)methane, norbornenediamine, 1,2-diaminocyclohexane and Laromine; and aromatic polyamines such as diaminodiphenylmethane, diaminodiphenylethane and metaphenylenediamine.

Specific examples of the novolak resin curing agents include phenol novolak resins and bisphenol novolak resins, etc. Specific examples of the imidazole curing agents include 2-methylimidazole, 2-ethylhexylimidazole, 2-phenylimidazole, and 1-cyanoethyl-2-phenylimidazolium trimellitate.

Specific examples of the acid anhydride curing agent include tetrahydrophthalic anhydride, hexahydrophthalic anhydride, methyltetrahydrophthalic anhydride, methylhexahydrophthalic anhydride, methylcyclohexenetetracarboxylic dianhydride, phthalic anhydride, trimellitic anhydride, pyromellitic anhydride and benzophenonetetracarboxylic dianhydride Moreover, a curing accelerator for accelerating a curing reaction between a polymerizable compound having a glycidyl group, an epoxy group or an oxetanyl group and the curing agent may be further used. Specific examples of the curing accelerator include: tertiary amines such as benzyldimethylamine, tris(dimethylaminomethyl)phenol and dimethylcyclohexylamine; imidazoles such as 1-cyanoethyl-2-ethyl-4-methylimidazole and 2-ethyl-4-methylimidazole; organic phosphorus compounds such as triphenylphosphine; quaternary phosphonium salts such as tetraphenylphosphonium bromide; diazabicycloalkenes such as 1,8-diazabicyclo[5.4.0]undecene-7 and organic acid salts thereof; quaternary ammonium salts such as tetraethylammonium bromide and tetrabutylammonium bromide; and boron compounds such as boron trifluoride and triphenyl borate. The curing accelerators can be used alone or in combination of two or more thereof.

In order to prevent unwanted polymerization during storage, for example, a stabilizer is preferably added. All the compounds known as stabilizers by those of ordinary skill in the art can be used. Representative examples thereof include 4-ethoxyphenol, hydroquinone, and butylated hydroxytoluene (BHT).

6.6 Composition of Polymer/Liquid-Crystal Composite Material

The content of the liquid-crystal composition in the polymer/liquid-crystal composite material of the invention is preferably as high as possible, as long as the composite material can exhibit memory properties. The reason is that the driving voltage of the composite material of the invention becomes lower as the content of the liquid-crystal composition is higher.

In the polymer/liquid-crystal composite material of the invention, the content of the liquid-crystal composition is preferably from 60 wt % to 99 wt %, more preferably from 60 wt % to 95 wt %, and particularly preferably from 65 wt % to 95 wt %, based on the composite material. The content of the polymer is preferably from 1 wt % to 40 wt %, more preferably from 5 wt % to 40 wt %, and particularly preferably from 5 wt % to 35 wt %, based on the composite material.

6.7 Any Other Component

The polymer/liquid-crystal composite material of the invention may contain, e.g., a dichroic dye and a photochromic compound in the range not adversely affecting the advantageous effects of the invention.

7. Microcapsule

The liquid-crystal composition, the mixture or the polymer/liquid-crystal composite material according to the invention may be encapsulated in a microcapsule (as microencapsulation). As a technique for microencapsulating the liquid-crystal composition or the like, a publicly known technique can be used. The technique is not particularly limited, but can be exemplified by the techniques described in JP 2001-311079 A, JP 2003-96454 A, JP 2005-99180 A, JP 2006-183046 A, JP 2006-193742 A, JP 2008-191420 A, JP 2009-149814 A and JP 2010-47775 A, etc.

The microcapsule of a preferred embodiment of the invention can exhibit a cholesteric phase in a wide temperature range. The microcapsule of a preferred embodiment of the invention has a low driving voltage and a high reflectance. Moreover, the polymer/liquid-crystal composite material of a preferred embodiment of the invention can be suitably used for an optical device such as a display device, based on the advantageous effects.

8 Optical Device

The optical device of the invention has two substrates with an electrode arranged on a surface of one or both of the substrates, a liquid-crystal medium arranged between the substrates, and an electric field applying means for applying an electric field to the liquid-crystal medium through the electrode, wherein the liquid-crystal medium is the cholesteric liquid-crystal composition, the polymer/liquid-crystal composite material or the microcapsule according to the invention.

Herein, the liquid-crystal composition, the polymer/liquid-crystal composite material and the microcapsule of the invention is occasionally referred to as "liquid-crystal medium" in general.

EXAMPLES

Hereafter, the invention will be explained in more details by way of Examples, but the invention is not limited by the Examples. In addition, unless otherwise noted, "%" means "wt %".

Analytical Method

A compound used in Examples was identified on the basis of a nuclear magnetic resonance spectrum obtained by a $^1$H-NMR analysis, a gas chromatogram obtained by a gas chromatography (GC) analysis, and so forth. Therefore, the analytical methods will be explained first.

$^1$H-NMR Analysis: As a measuring apparatus, DRX-500 (made by Bruker BioSpin Corporation) was used. A sample prepared in Examples and so forth was dissolved in a deuterated solvent such as $CDCl_3$ in which the sample was soluble, and the measurement was carried out under the conditions of room temperature, 500 MHz and 24 times of accumulation. In the interpretation of the nuclear magnetic resonance spectrum obtained, s, d, t, q and m stand for a singlet, a doublet, a triplet, a quartet and a multiplet, respectively. Tetramethylsilane (TMS) was used for a reference material for a zero point of the chemical shifts (δ values).

GC Analysis: As a measuring apparatus, GC-14B Gas Chromatograph made by Shimadzu Corporation was used. A capillary column CBP1-M25-025 (length 25 m, bore 0.22 mm, film thickness 0.25 μm; dimethylpolysiloxane as a stationary liquid phase; non-polar) made by Shimadzu Corporation was used. Helium was used as a carrier gas, and its flow rate was adjusted to 1 milliliter per minute. The temperature in the sample injector was set at 300° C. and the temperature of the detector (FID) part was set at 300° C.

A sample was dissolved in toluene to prepare a 1% solution, and then 1 microliter of the obtained solution was injected into the sample injector.

As a recorder, C-R6A Chromatopac made by Shimadzu Corporation or an equivalent thereof was used. The resultant gas chromatogram showed the retention time of the peak and the value of the peak area corresponding to each of the component compounds.

As a solvent for diluting the sample, chloroform or hexane, for example, may also be used. Moreover, as the column, capillary column DB-1 (length 30 m, bore 0.32 mm, film thickness 0.25 μm) made by Agilent Technologies Inc., HP-1 (length 30 m, bore 0.32 mm, film thickness 0.25 μm) made by Agilent Technologies Inc., Rtx-1 (length 30 m, bore 0.32 mm, film thickness 0.25 μm) made by Restek Corporation, BP-1 (length 30 m, bore 0.32 mm, film thickness 0.25 μm) made by SGE International Pty. Ltd. and so forth may also be used.

The ratio of the peak areas in the gas chromatogram corresponds to the ratio of the component compounds. In general, the weight percents of the respective component compounds in an analytical sample are not completely identical with the percentages of the respective peak areas in the analytical sample. However, when the column described above was used in the invention, the weight percents of the respective component compounds in the analytical sample substantially correspond to the percentages of the respective peak areas in the analytical sample, because the correction coefficient is substantially equal to one. The reason is that no significant difference exists among the correction coefficients of the component compounds. In order to more accurately determine the composition ratio of the liquid-crystal compounds in the liquid-crystal composition by the chromatogram, an internal standard method by based on gas chromatogram is applied. Each of the liquid-crystal compound components (detected components) and a liquid-crystal compound as a standard (standard reference material) as weighed accurately in fixed amounts are simultaneously measured by means of gas chromatography, and the relative intensity as the ratio of the peak area of each detected component to that of the standard reference material is calculated in advance. When correction is performed using the relative intensity of the peak area of each component to that of the standard reference material, the composition ratio of the liquid-crystal compounds in the liquid-crystal composition can be more accurately determined from the gas chromatographic analysis.

Sample for Determining Values of Physical Properties of Liquid-Crystal Compound or the Like The sample for determining the values of the physical properties of a liquid-crystal compound includes two types: a type where the compound per se is used as the sample, and another type where the compound is mixed with a mother liquid crystal to be used as the sample.

In the latter case where a sample prepared by mixing a compound with a mother liquid crystal is used, the measurement is carried out according to the method described below. First, a sample is prepared by mixing 15% of the obtained liquid-crystal compound and 85% of the mother liquid crystal. Then, according to an extrapolation method based on the equation as described below, extrapolated values are calculated the from measured values of the obtained sample. The extrapolated values are taken as the values of the physical properties of the compound.

$$\text{(Extrapolated value)}=\{100\times\text{(measured value of a sample)}-\text{(\% of the mother liquid crystal)}\times\text{(measured value of the mother liquid crystal)}\}/\text{(\% of the liquid-crystal compound)}.$$

When a smectic phase or crystals precipitated at 25° C. even at the above ratio of the liquid-crystal compound to the mother liquid crystal, the ratio of the liquid-crystal compound to the mother liquid crystal was changed in the order of 10%:90%, 5%:95% and 1%:99%. The physical properties of the sample were measured using a composition at a ratio in which a smectic phase or crystals did not precipitate at 25° C. The extrapolated values were determined according to the above equation and taken as the values of the physical properties of the liquid-crystal compound.

As the mother liquid crystal used for measurement, various kinds thereof exist. For example, the composition (%) of mother liquid crystal A is as described below.

Mother Liquid Crystal A:

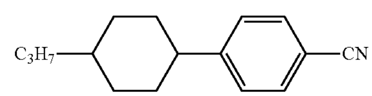

24%

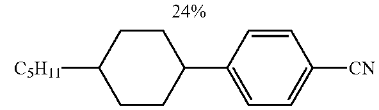

36%

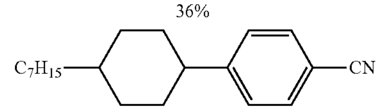

25%

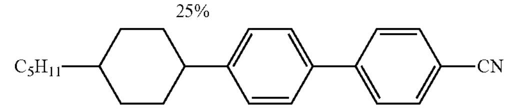

15%

Methods for Determining Values of Physical Properties of Liquid-Crystal Compound and so on The values of physical properties were determined according to the methods described below. Most of the measuring methods are described in EIAJ ED-2521A of the Standard of Electronic Industries Association of Japan, or are modified versions of methods therein. Moreover, no TFT was attached to the TN device used for measurement.

Among the measured values, in a case where the liquid crystal compound per se was used as the sample, the obtained values were described as experimental data. In the case where a mixture of the liquid crystal compound with the mother liquid crystal was used as the sample, the values obtained with the extrapolation method were described as experimental data.

Phase structure and phase transition temperature (° C.): the measurement was carried out with method (1) and method (2) below.

(1) A compound was placed on a hot plate of a melting point apparatus (FP-52 Hot Stage, made by Mettler-Toledo International Inc.) equipped with a polarizing microscope, and the state of phase and the change thereof were observed with the polarizing microscope while the compound was heated at a rate of 3° C. per minute, and the type of the liquid-crystal phase was specified.

(2) A sample was heated and then cooled at a rate of 3° C. per minute using a differential scanning calorimeter, DSC-7 System or Diamond DSC System, made by PerkinElmer, Inc. The starting point (on set) of an endothermic peak or an exothermic peak caused by a phase change of the sample was determined by extrapolation, and thus a phase transition temperature was determined.

Hereinafter, crystals were expressed as K, and when crystals were further distinguishable, each type of crystal was expressed as $K_1$ or $K_2$. The smectic phase was expressed as Sm, a nematic phase as N, and a cholesteric phase (chiral nematic phase) as N*. A liquid (isotropic) was expressed as I. When smectic B phase or smectic B phase was distinguishable between the smectic phases, the phases were expressed as SmB or SmA, respectively. BP stands for a blue phase or an optically isotropic phase. Coexistence state of two phases is occasionally expressed in the form of (N*+I) or (N*+BP). Specifically, (N*+I) stands for a phase in which a non-liquid-crystal isotropic phase and a cholesteric phase coexist, and (N*+BP) stands for a phase in which a BP phase or a optically isotropic liquid-crystal phase and a cholesteric phase coexist. Un stands for an unconfirmed phase that is not optically isotropic. As an expression of the phase transition temperature, for example, "K 50.0 N 100.0 I" shows that the phase transition temperature (KN) from the crystals to the nematic phase is 50.0° C., and the phase transition temperature (NI) from the nematic phase to the liquid is 100.0° C. The same rule applied to other expressions.

Maximum temperature of a nematic phase ($T_{NI}$) (° C.): A sample (a mixture of a liquid-crystal compound and a mother liquid crystal) was placed on a hot plate of a melting point apparatus (FP-52 Hot Stage, made by Mettler-Toledo International Inc.) equipped with a polarizing microscope, and was observed with the polarizing microscope while being heated at a rate of 1° C. per minute. The temperature at which a part of the sample changed from the nematic phase to the isotropic liquid was taken as the maximum temperature of the nematic phase. Hereinafter, the upper limit of the temperature range of the nematic phase is abbreviated simply as "maximum temperature."

Compatibility at a low temperature: Samples were prepared by mixing a liquid-crystal compound with the mother liquid crystal such that the amounts of the liquid-crystal compound became 20%, 15%, 10%, 5%, 3% and 1%, respectively, and placed in glass vials. After the glass vials were kept in freezers at −10° C. or −20° C. for a predetermined period of time, whether or not crystals or a smectic phase precipitated was observed.

Viscosity (η) (measured at 20° C.) (mPa·s): The mixture of a liquid-crystal compound and the mother liquid crystal was measured with an E-type viscometer.

Optical anisotropy (Δn): the measurement was carried out by means of Abbe refractometer with a polarizing plate mounted on the ocular by using light at a wavelength of 589 nm at 25° C. The surface of the main prism was rubbed in one direction, and then a sample (a mixture of a liquid-crystal compound and the mother liquid crystal) was added dropwise onto the main prism. The refractive index $n_{\parallel}$ was measured when the direction of polarized light was parallel to the direction of rubbing. The refractive index $n_{\perp}$ was measured when the direction of polarized light was perpendicular to the direction of rubbing. The value of optical anisotropy (Δn) was calculated with the equation of $\Delta n = n_{\parallel} - n_{\perp}$.

Dielectric anisotropy (Δ∈) (measured at 25° C.): A sample (a mixture of a liquid-crystal compound and the mother liquid crystal) was put in a liquid-crystal cell in which the distance (gap) between two glass substrates was about 9 μm and a twist angle was 80 degrees. A voltage of 20 V was applied to the cell, and the dielectric constant $\in_{\parallel}$ in the major axis direction of the liquid-crystal molecule was measured. A voltage of 0.5 V was applied to the cell, and the dielectric constant $\in_{\perp}$ in the minor axis direction of the liquid-crystal molecule was measured. The value of dielectric anisotropy was calculated with the equation of $\Delta\in = \in_{\parallel} - \in_{\perp}$.

Pitch (p) (Measured at 25° C.; nm)

The pitch length was measured utilizing selective reflection (Handbook of Liquid crystals, page 196, issued in 2000, Maruzen Co., Ltd.). The relational equation of $\langle n\rangle p/\lambda = 1$ applies for the selective reflection wavelength λ. Herein, <n> represents an average refractive index and is calculated by the equation of $\langle n\rangle = \{(n_{\parallel}^2 + n_{\perp}^2)/2\}^{1/2}$. The selective reflection wavelength was measured with a microspectrophotometer (trade name: MSV-350, by JEOL Co., Ltd.). The pitch was determined by dividing the reflection wavelength obtained by the average refractive index. A pitch of cholesteric liquid-crystals having a reflection wavelength in a region of wavelength longer than the wavelengths of visible light is proportional to the reciprocal number of the concentration of the optically active compound in a region in which the concentration of the optically active compound is low. Thus, the pitch length of the liquid-crystal with a selective reflection wavelength in the visible light region was measured in several points, and the pitch was determined by a linear extrapolation method. "Optically active compound" corresponds to a chiral agent in the invention.

1 Synthesis Example 1-1

Synthesis of Compound (S1-1-8)

(S1-1-8)

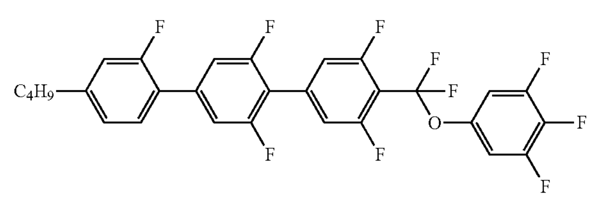

K 92.4 N 95.4 I (° C.)

Scheme 10

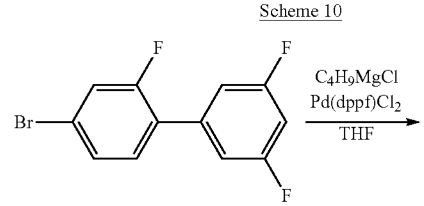

(S1-1-1)

-continued

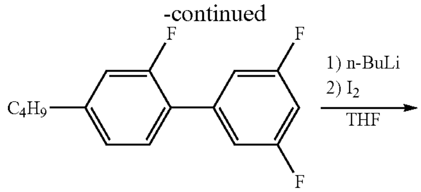

(S1-1-2)

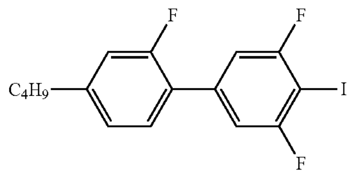

(S1-1-3)

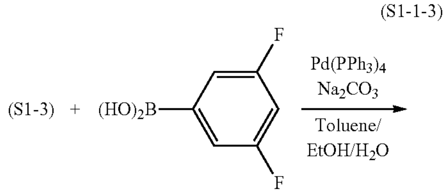

(S1-1-4)

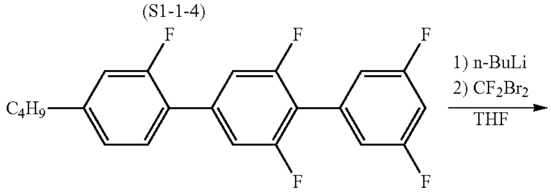

(S1-1-5)

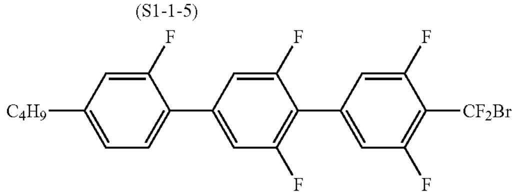

(S1-1-6)

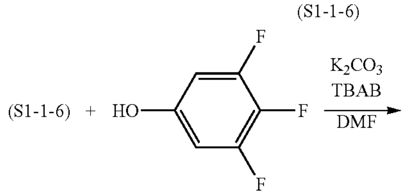

(S1-1-7)

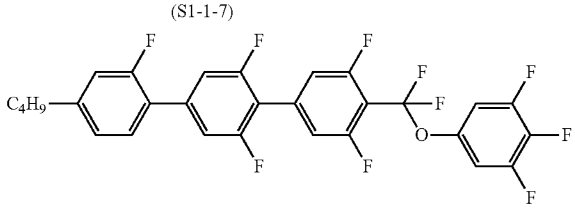

(S1-1-8)

Based on the above Scheme 10, a synthesis scheme of compound (S1-1-8) being a compound represented by formula (1-1) will be explained.

Synthesis of Compound (S1-1-2)

To a reaction vessel under a nitrogen atmosphere, 88.3 g of (S1-1-1), 7.54 g of a catalyst, and 900 mL of tetrahydrofuran (THF) were added, and a THF solution of 2 mol/L of butylmagnesium chloride was added dropwise thereto at room temperature, and the resultant mixture was refluxed for 4 hours. The resultant reaction mixture was cooled to room temperature, toluene was added thereto, and the resultant mixture was washed with 1 N-hydrochloric acid and water. After drying over magnesium sulfate, the solvent was distilled off under a reduced pressure. The resultant product was purified by means of silica gel column chromatography by using heptane as the eluent, and the resultant purified product was dried under a reduced pressure, and thus 75.7 g of (S1-1-2) was obtained. The yield of (S1-1-2) based on (S1-1-1) was 93.1%.

(2) Synthesis of Compound (S1-1-3)

To a reaction vessel under a nitrogen atmosphere, 55.5 g of (S1-1-2) and 550 mL of tetrahydrofuran (THF) were added, the resultant mixture was cooled to −70° C., 161 mL of n-BuLi (1.55 M; n-hexane solution) was added dropwise thereto, and the resultant mixture was agitated for 1 hour at a temperature as was. To the resultant reaction mixture, 450 mL of a THF solution containing 63.4 g of iodine was added dropwise at −70° C., and the resultant mixture was agitated for 5 hours at a temperature as was. The resultant reaction mixture was warmed to room temperature, and poured into an aqueous solution of sodium thiosulfate. The resultant product was extracted with ethyl acetate, and the organic layer was washed with an aqueous solution of sodium thiosulfate and water. After drying over magnesium sulfate, the solvent was distilled off under s reduced pressure. The resultant product was purified by means of silica gel column chromatography by using heptane/toluene=3/1 (in a volume ratio) as an eluent, and the resultant purified product was dried under a reduced pressure, and thus 79.1 g of (S1-1-3) was obtained. The yield of (S-1-3) based on (S1-1-2) was 97.5%.

(3) Synthesis of Compound (S1-1-5)

To a reaction vessel under a nitrogen atmosphere, 79.1 g of (S1-1-3), 38.4 g of 3,5-difluoropheylboronic acid (S1-1-4), 3.5 g of tetrakistriphenylphosphine palladium, 70.9 g of sodium carbonate, and 560 mL of a mixed solvent of toluene/ethanol/water=3/3/1 (in a volume ratio) were added, and the resultant mixture was refluxed for 7 hours. The resultant reaction mixture was cooled to room temperature, toluene was added thereto, and the resultant mixture was washed with 1 N-hydrochloric acid and water. After drying over magnesium sulfate, the solvent was distilled off under reduced pressure. The resultant product was purified by means of silica gel column chromatography by using heptane as an eluent, the resultant purified product was dried in s reduced pressure, and the residue was recrystallized in ethanol/ethyl acetate=4/1, and thus 50.6 g of (S1-1-5) was obtained. The yield of (S1-1-5) based on (S1-1-3) was 66.2%.

(4) Synthesis of Compound (S1-1-6)

To a reaction vessel under a nitrogen atmosphere, 15.0 g of compound (S1-1-5) and 150 mL of THF were added, and the resultant mixture was cooled to −74° C. Thereto, 27.4 mL of a n-hexane solution containing 1.60 M of n-butyllithium was added dropwise in the temperature range of −74° C. to −60° C., and the resultant mixture was agitated for another 60 minutes. Then, 20 mL of a THF solution containing 12.6 g of dibromodifluoromethane was added dropwise in the temperature range of −75° C. to −70° C., and the resultant mixture was agitated while returning to 25° C. The resultant reaction mixture was poured into 150 mL of ice water and mixed. Then, 100 mL of toluene was added to separate the layers into an organic layer and an aqueous layer, the organic layer obtained by performing an extraction operation was fractionated, and subsequently washed with brine and dried over anhydrous magnesium sulfate. The resultant solution was concentrated under a reduced pressure, and the residue was purified by fractionation by means of silica gel column chromatography using heptane as an eluent. The solvent was distilled off, the resultant residue was dried, and thus 16.5 g of (S1-1-6) was obtained.

(5) Synthesis of Compound (S1-1-8)

To a reaction vessel under a nitrogen atmosphere, 6.0 g of compound (S1-1-6), 1.4 g of 3,4,5-trifluorophenol (S1-1-7), 2.8 g of potassium carbonate and 100 mL of N,N-dimethylformamide (DMF) were added, and the resultant mixture was agitated at 90° C. for 120 minutes. The resultant reaction mixture was returned to 25° C., and then poured into 50 mL of ice water and mixed, 100 mL of toluene was added to separate the layers into an organic layer and an aqueous layer, and the organic layer obtained by performing an extraction operation was fractionated, and subsequently sequentially washed with a saturated aqueous solution of sodium hydrogencarbonate, an aqueous solution of 0.5 N sodium hydroxide and brine, and then dried over anhydrous magnesium sulfate. The resultant solution was concentrated under a reduced pressure, and the residue was purified by fractionation by means of silica gel column chromatography using heptane as an eluent. The resultant product was further purified by recrystallization from a mixed solvent of heptane/Solmix A-11, and the resultant purified product was dried, and thus 1.7 g of (S1-8) was obtained. The yield of (S1-1-8) based on (S1-1-5) was 20.4%.

The phase transition temperature of compound (S1-1-8) obtained was as described below.

Phase transition temperature (° C.): K 92.4 N 95.4 I.

Chemical shifts δ (ppm) by $^{1}$H NMR analysis were as described below, and the compound obtained was identified to be compound (S1-1-8). In addition, the solvent for measurement was $CDCl_3$.

Chemical shifts (δ (ppm)): 7.36 (t, 1H), 7.26-7.20 (m, 4H), 7.08 (d, 1H), 7.04-6.99 (m, 3H), 2.67 (t, 2H), 1.67-1.64 (m, 2H), 1.41-1.37 (m, 2H), 0.96 (t, 3H).

(6) Physical Properties of Compound (S1-1-8)

Mother liquid crystal A having a nematic phase was prepared by mixing four compounds described as the mother liquid crystal A. The physical properties of mother liquid-crystal A were as described below.

Maximum temperature ($T_{NI}$)=71.7° C.; dielectric anisotropy (Δ∈)=11.0; refractive index anisotropy (Δn)=0.137.

Liquid-crystal composition B including 90% of mother liquid crystal A and 10% of (S1-1-8) obtained in Example 1 was prepared. The values of physical properties of liquid-crystal composition B obtained were determined, and extrapolated values of the physical properties of liquid-crystal compound (S1-1-8) were calculated by extrapolating the measured values. The values were as described below.

Maximum temperature ($T_{NI}$)=54.7° C.; dielectric anisotropy (Δ∈)=54.2; refractive index anisotropy (Δn)=0.167.

The findings show that liquid-crystal compound (S1-1-8) has large dielectric anisotropy (Δ∈) and refractive index anisotropy (Δn).

2 Synthesis Example 1-2

Synthesis of Compound (S1-2-1), Compound (S1-3-1) and Compound (S1-4-1)

(S1-2-1)

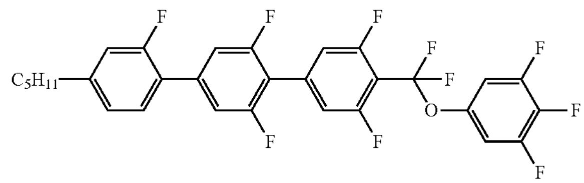

K 91.5 N 99.2 I (S1-3-1)

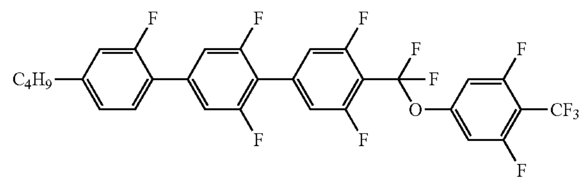

K 95.7(SmA 85.9) N 96.8 I (S1-4-1)

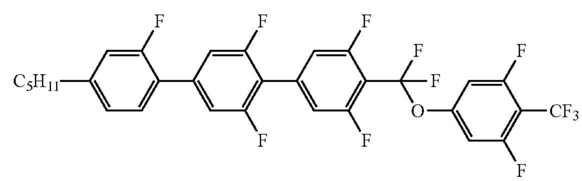

K 91.5 (SmA 85.1) N 100.4 I

The unit of the phase transition point described above is ° C.

Compounds (S1-2-1), (S1-3-1) and (S1-4-1) were prepared using a suitable reagent with the method in Synthesis Example 1-1.

(1) Physical Properties of Compound (S1-2-1)

Mother liquid crystal A having a nematic phase was prepared by mixing four compounds described as the mother liquid-crystal A. The physical properties of mother liquid crystal A were as described below.

Maximum temperature ($T_{NI}$)=71.7° C.; dielectric anisotropy (Δ∈)=11.0; refractive index anisotropy (Δn)=0.137.

Liquid-crystal composition C including 90% of mother liquid crystal A and 10% of (S1-2-1) obtained in Synthesis Example 2 was prepared. The values of the physical properties of liquid-crystal composition C obtained were determined, and extrapolated values of the physical properties of liquid-crystal compound (S1-2-1) were calculated by extrapolating the measured values. The values were as described below.

Maximum temperature ($T_{NI}$)=61.7° C.; dielectric anisotropy (Δ∈)=51.1; refractive index anisotropy (Δn)=0.177.

The findings show that liquid-crystal compound (S1-2-1) has large dielectric anisotropy (Δ∈) and refractive index anisotropy (Δn).

(2) Physical Properties of Liquid-Crystal Compound (S1-3-1)

Liquid-crystal composition D including 90% of mother liquid crystal A and 10% of (S1-3-1) obtained in Synthesis Example 1-2 was prepared. The values of the physical properties of liquid-crystal composition D obtained were determined, and extrapolated values of the physical properties of liquid-crystal compound (S1-3-1) were calculated by extrapolating the measured values. The values were as described below.

Maximum temperature ($T_{NI}$)=55.7° C.; dielectric anisotropy (Δ∈)=68.1; refractive index anisotropy (Δn)=0.177.

The findings show that liquid-crystal compound (S1-3-1) has a very large dielectric anisotropy (Δ∈).

(3) Physical Properties of Liquid-Crystal Compound (S1-4-1)

Liquid-crystal composition E including 90% of mother liquid crystal A and 10% of (S1-4-1) obtained in Synthesis Example 1-2 was prepared. The values of physical properties of liquid-crystal composition E obtained were determined, and extrapolated values of the physical properties of liquid-crystal compound (S1-4-1) were calculated by extrapolating the measured values. The values were as described below.

Maximum temperature ($T_{NI}$)=59.7° C.; dielectric anisotropy (Δ∈)=65.9; refractive index anisotropy (Δn)=0.167.

The findings show that liquid-crystal compound (S1-4-1) has a very large dielectric anisotropy (Δ∈).

3 Synthesis Example 1-5

Synthesis of Compound (S1-5-3)

(S1-5-3)

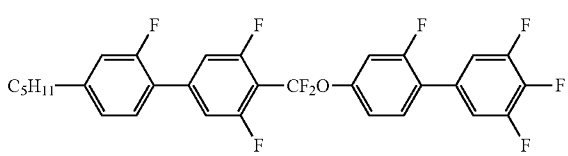

K 63.1 N 88.5 I (°C.)

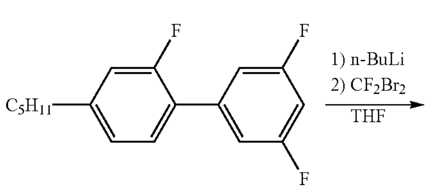

(S1-1-2)

-continued

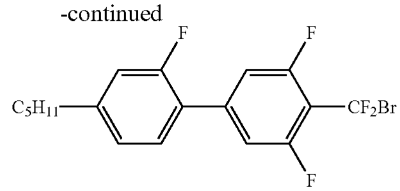

(S1-5-1)

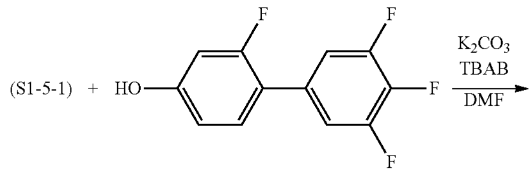

(S1-5-2)

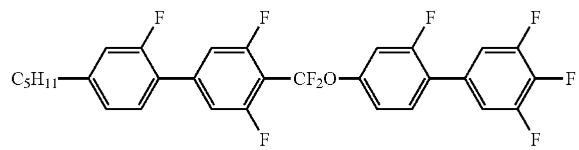

(S1-5-3)

Based on the above Scheme, a synthesis scheme of compound (S1-5-3) being a compound represented by formula (1-1) will be explained.

(1) Synthesis of Compound (S1-5-3)

Compounds (S1-1-2) to (S1-5-1) were prepared in a manner similar to the technique for synthesizing compounds (S1-1-5) to (S1-1-6) in Synthesis Example 1-1. Specifically, (S1-1-2) was used in place of (S1-1-5). Compounds (S1-5-1) to (S1-5-3) were prepared in a manner similar to the technique for synthesizing compounds (S1-1-6) to (S1-1-8) in Synthesis Example 1-1. Specifically, (S1-5-1) was used in phase of (S1-1-6), and (S1-5-2) was used in place of (S1-1-7). The phase transition temperature of compound (S1-5-3) obtained was as described below.

Phase transition temperature (° C.): K 63.1 N 88.5 I.

(2) Physical Properties of Liquid-Crystal Compound (S1-5-3)

Liquid-crystal composition F including 85% of mother liquid crystal A and 15% of (S1-5-3) obtained in Synthesis Example 1-5 was prepared. The values of physical properties of liquid-crystal composition F obtained were determined, and extrapolated values of the physical properties of liquid-crystal compound (S1-5-3) were calculated by extrapolating the measured values. The values were as described below.

Maximum temperature ($T_{NI}$)=55.7° C.; dielectric anisotropy (Δ∈)=42.1; refractive index anisotropy (Δn)=0.164.

The findings show that liquid-crystal compound (S1-5-3) has an excellent compatibility with other liquid-crystal compounds, and large dielectric anisotropy (Δ∈) and refractive index anisotropy (Δn).

4. Synthesis Example 1-6

Synthesis of Compound (S1-6-1)

(S1-6-1)

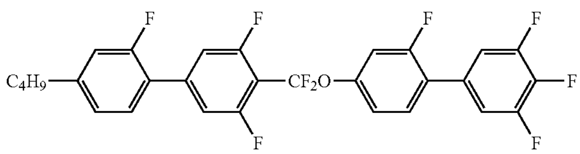

K 71.7 N 82.6 I (° C.)

Compound (S1-6-1) was prepared in a manner similar to the technique for synthesizing compound (S1-5-3) in Synthesis Example 1-5.

(1) Physical Properties of Liquid-Crystal Compound (S1-6-1)

Liquid-crystal composition G including 85% of mother liquid crystal A and 15% of (S1-6-1) obtained in Synthesis Example 6 was prepared. The values of the physical properties of liquid-crystal composition G obtained were determined, and extrapolated values of the physical properties of liquid-crystal compound (S1-6-1) were calculated by extrapolating the measured values. The values were as described below.

Maximum temperature ($T_{NI}$)=51.0° C.; dielectric anisotropy (Δ∈)=43.4; refractive index anisotropy (Δn)=0.164.

The findings show that liquid-crystal compound (S1-6-1) has an excellent compatibility with other liquid-crystal compounds, and large dielectric anisotropy (Δ∈) and refractive index anisotropy (Δn).

Synthesis Example 2-1

Synthesis of Compound (S2-1-11)

Compound (S2-1-11) is a compound of formula (1-2-4-3) in which $R^{1L}$ is $C_4H_9$, $L^1$ is hydrogen, all of $L^2$, $L^4$ and $L^5$ are fluorine, and $X^1$ is $—CF_3$, and is identical with compound (1-2-4-3-a).

(S2-1-11)

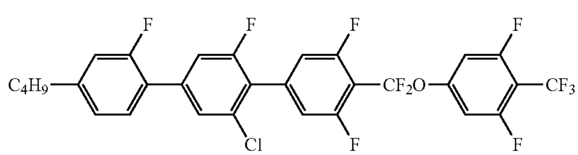

Scheme 12

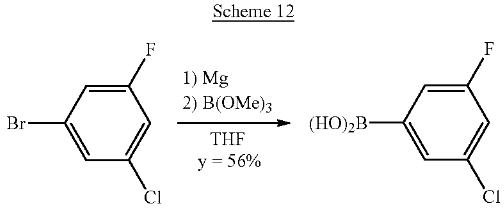

(S2-1-1) (S2-1-2)

-continued

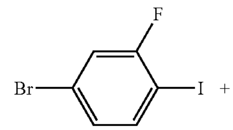

(S2-1-3)

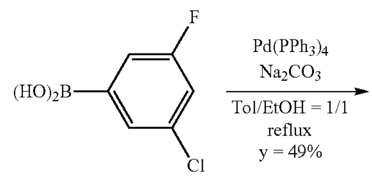

(S2-1-2)

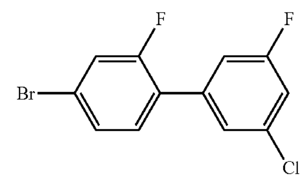

(S2-1-4)

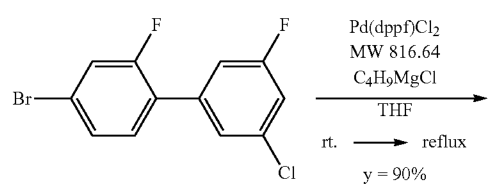

(S2-1-4)

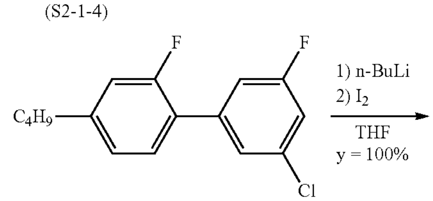

(S2-1-5)

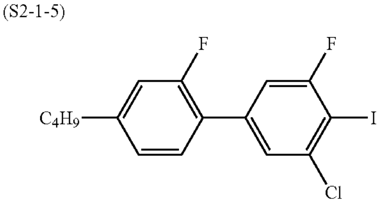

(S2-1-6)

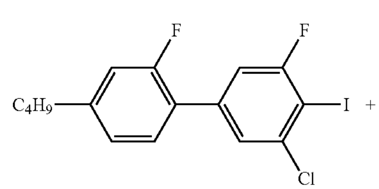

(S2-1-6)

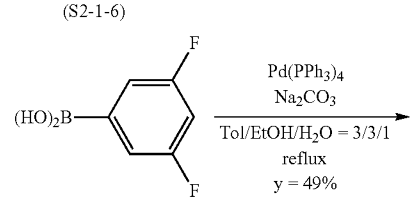

(S2-1-7)

-continued

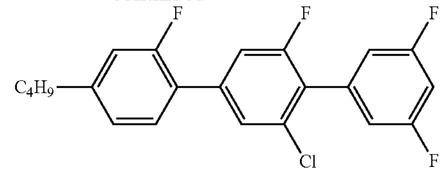

(S2-1-8)

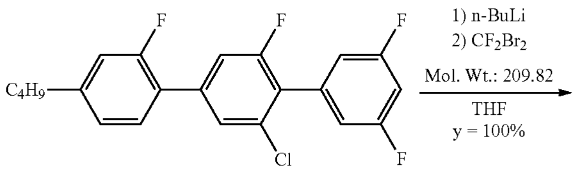

(S2-1-8)

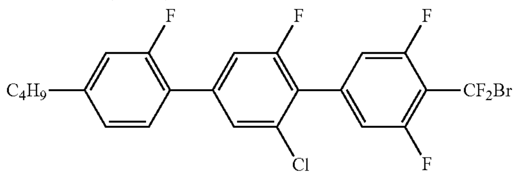

(S2-1-9)

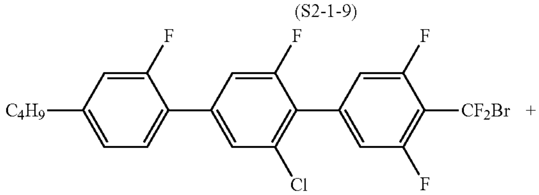

(S2-1-9)

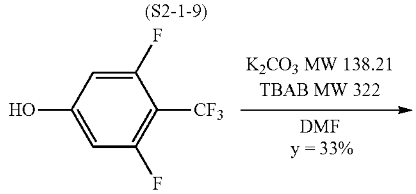

(S2-1-10)

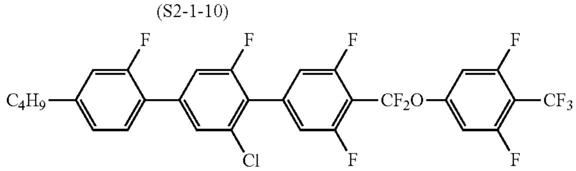

(S2-1-11)

Based on Scheme 12, a synthesis scheme of compound (S2-1-11) being a compound represented by formula (1-2) will be explained.

(1) Synthesis of Compound (S2-1-2)

Under a nitrogen atmosphere, a Grignard reagent was prepared from 11.3 g of dry magnesium and 75.0 g of 1-bromo-3-chloro-5-fluorobenzene (S2-1-1) by using 220 mL of tetrahydrofuran (hereinafter, referred to as THF), and the resultant mixture was cooled to −70° C. Thereto, 200 mL of a THF solution containing 52.0 g of trimethyl borate was added dropwise, and the resultant mixture was agitated for 3 hours at a temperature as was, warmed to room temperature in 1 hour, and agitated for 12 hours. To the resultant reaction mixture, 2 N-hydrochloric acid was added dropwise, the resultant mixture was agitated for 1 hour, and the resultant product was extracted with ethyl acetate, and then the organic layer was washed with water, dried, and the solvent was distilled off under a reduced pressure. The residue was washed with heptane, and thus 34.7 g of (S2-1-2) was obtained. The yield of (S2-1-2) was 55.7%.

(2) Synthesis of Compound (S2-1-4)

To a reaction vessel under a nitrogen atmosphere, 64.5 g of 3-chloro-5-fluorophenylboronic acid (S2-1-2), 110.0 g of 1-bromo-3-fluoro-5-iodobenzene (S2-1-3), 6.0 g of tetrakistriphenylphosphine palladium, 130.0 g of potassium carbonate, and 1,000 mL of a mixed solvent of toluene/ethanol/water=3/3/1 (in a volume ratio) were added, and the resultant mixture was refluxed for 40 hours. The resultant reaction mixture was cooled to room temperature, toluene was added thereto, and the resultant mixture was washed with 1 N-hydrochloric acid and water. After drying over magnesium sulfate, the solvent was distilled off under a reduced pressure. The resultant product was purified by means of silica gel column chromatography by using heptane as an eluent, the resultant purified product was dried under a reduced pressure, and thus 53.8 g of (S2-1-4) was obtained. The yield of (S2-1-4) based on (S2-1-3) was 48.5%.

(3) Synthesis of Compound (S2-1-5)

To a reaction vessel under a nitrogen atmosphere, 25.3 g of compound (S2-1-4) and 250 mL of THF were added, 120 mL of 0.91 M n-butylmagnesium chloride was added dropwise thereto, and the resultant mixture was warmed and refluxed for 6 hours. The resultant mixture was cooled to room temperature, 1 N hydrochloric acid was added dropwise, and the resultant mixture was agitated for 1 hour. Then, the resultant product was extracted with toluene, and the organic layer was washed with water. After drying over magnesium sulfate, the solvent was distilled off under s reduced pressure. The resultant product was purified by means of silica gel column chromatography by using heptane as an eluent, and the resultant purified product was dried under a reduced pressure, and thus 21.1 g of (S2-1-5) was obtained. The yield of (S2-1-5) based on (S2-1-4) was 90.2%.

(4) Synthesis of Compound (S2-1-6)

To a reaction vessel under a nitrogen atmosphere, 21.1 g of (S2-1-5) and 300 mL of tetrahydrofuran (THF) were added, and the resultant mixture was cooled to −70° C. Thereto, 56.4 mL of n-BuLi (1.6 M; n-hexane solution) was added dropwise, and the resultant mixture was agitated for 1 hour at a temperature as was. To the resultant reaction mixture, 200 mL of a THF solution containing 22.8 g of iodine was added dropwise at −70° C., and the resultant mixture was agitated for 1 hour at a temperature as was. The resultant reaction mixture was warmed to room temperature, and poured into an aqueous solution of sodium thiosulfate. The resultant product was extracted with toluene, and the organic layer was washed with an aqueous solution of sodium thiosulfate and water. After drying over magnesium sulfate, the solvent was distilled off under a reduced pressure. The resultant product was purified by means of silica gel column chromatography by using heptane as an eluent, and the resultant purified product was dried under a reduced pressure, and thus 30.7 g of (S2-1-6) was obtained. The yield of (S2-1-6) based on (S2-1-5) was 100%.

(5) Synthesis of Compound (S2-1-8)

To a reaction vessel under a nitrogen atmosphere, 30.7 g of (S2-1-6), 24.0 g of 3,5-difluorophenyl boronic acid (S2-1-7), 5.0 g of tetrakistriphenylphosphine palladium, 25.0 g of sodium carbonate, and 280 mL of a mixed solvent of toluene/ethanol/water=3/3/1 (in a volume ratio) were added, and the resultant mixture was refluxed for 30 hours. Thereto, 2.0 g of tetrakistriphenylphosphine palladium was further added, and the resultant mixture was refluxed for another 10 hours. The resultant reaction mixture was cooled to room temperature, toluene was added thereto, and the resultant mixture was washed with 1 N-hydrochloric acid and water. After drying over magnesium sulfate, the solvent was distilled off under a reduced pressure. The resultant product was purified by means of silica gel column chromatography by using heptane as an eluent, and the resultant purified product was dried under a reduced pressure, and thus 14.5 g of (S2-1-8) was obtained. The yield of (S2-1-8) based on (S2-1-6) was 48.9%.

(6) Synthesis of Compound (S2-1-9)

To a reaction vessel under a nitrogen atmosphere, 14.5 g of compound (S2-1-8) and 100 mL of THF were added. Thereto, 26.8 mL of n-hexane solution containing 1.59 M n-butyllithium was added dropwise in the temperature range of −74° C. to −60° C., and the resultant mixture was agitated for another 60 minutes. Then, 20.0 mL of a THF solution containing 12.0 g of dibromodifluoromethane was added dropwise in the temperature range of −75° C. to −70° C., and the resultant mixture was agitated for 60 minutes while returning to room temperature. The resultant mixture was poured into 150 mL of ice water and mixed. Then, 100 mL of toluene was added to separate the layers into an organic layer and an aqueous layer, the organic layer obtained by performing an extraction operation was fractionated, and subsequently washed with brine and dried over anhydrous magnesium sulfate. The resultant solution was concentrated under a reduced pressure, and the residue was purified according to a fractionation operation by means of silica gel column chromatography by using heptane as an eluent. The solvent was distilled off for drying, and thus 16.5 g of crudely purified product of (S2-1-9) was obtained.

(7) Synthesis of Compound (S2-1-11)

To a reaction vessel under a nitrogen atmosphere, 16.5 g compound (S2-1-9), 5.0 g of 3,5-difluoro-4-trifluoromethylphenol (S2-1-10), 10.5 g of potassium carbonate, 0.5 g of tetrabutylammonium bromide, and 150 mL of N,N-dimethylformamide (DMF) were added, and the resultant mixture was agitated at 95° C. for 90 minutes. The resultant reaction mixture was returned to 25° C., and then poured into 50 mL of ice water and mixed, 100 mL of toluene was added to separate the layers into an organic layer and an aqueous layer, and the organic layer obtained by performing an extraction operation was fractionated, sequentially washed with a saturated aqueous solution of sodium hydrogencarbonate and brine, and dried over anhydrous magnesium sulfate. The resultant solution was concentrated under a reduced pressure, and the residue was purified by a fractionation operation by means of silica gel column chromatography by using heptane as an eluent. The resultant product was further purified by recrystallization from a mixed solvent of ethanol/ethyl acetate=9/1, and dried, and thus 5.5 g of (S2-1-11) was obtained. The yield of (S2-1-11) based on (S2-1-8) was 23.3%.

The phase transition temperature of compound (S2-1-11) obtained was as described below.

Phase transition temperature (° C.): K 83.7 I.

The findings show that compound (S2-1-11) has a relatively low melting point.

Chemical shifts (δ (ppm)) by $^1$H NMR analysis were as described below, and the compound obtained was identified to be (S1-11). In addition, the solvent for measurement was $CDCl_3$.

Chemical shift (δ (ppm)): 7.53 (m, 1H), 7.37-7.33 (m, 2H), 7.12-7.07 (m, 3H), 7.04-7.01 (m, 3H), 2.67 (t, 2H), 1.67-1.61 (m, 2H), 1.43-1.35 (m, 2H), 0.96 (t, 3H).

(8) Physical Properties of Liquid-Crystal Compound (S2-1-11)

Mother liquid crystal A having a nematic phase was prepared by mixing four compounds described as the mother liquid-crystal A. The physical properties of mother liquid-crystals A were as described below.

Maximum temperature ($T_{NI}$)=71.7° C.; dielectric anisotropy (Δ∈)=11.0; refractive index anisotropy (Δn)=0.137.

Liquid-crystal composition AS1 including 90% of mother liquid crystal A and 10% of (S2-1-10) obtained in Synthesis Example 2-1 was prepared. The values of the physical properties of liquid-crystal composition AS1 obtained were determined, and extrapolated values of the physical properties of liquid-crystal compound (S2-1-11) were calculated by extrapolating the measured values. The values were as described below.

Maximum temperature ($T_{NI}$)=14.7° C.; dielectric anisotropy (Δ∈)=63.7; refractive index anisotropy (Δn)=0.137.

The findings show that liquid-crystal compound (S2-1-11) has an excellent compatibility with other liquid-crystal compounds and large dielectric anisotropy (Δ∈) and refractive index anisotropy (Δn).

6 Synthesis Example 2-2

Synthesis of Compound (S2-2-1)

Compound (S2-2-1) is a compound of formula (1-2-4-3) in which $R^{1L}$ is $C_5H_{11}$, $L^1$ is hydrogen, all of $L^2$, $L^4$ and $L^5$ are fluorine, and $X^1$ is —$CF_3$.

(S2-2-1)

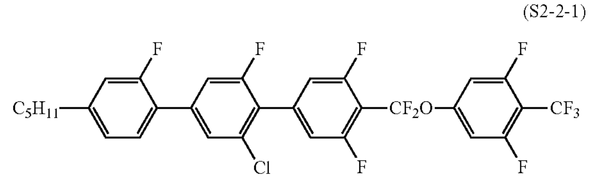

(1) Synthesis of Compound (S2-2-1)

Compound (S2-2-1) being a compound represented by formula (1-2) was prepared in a manner similar to the technique for synthesizing (S2-1-11) in Synthesis Example 2-1. The phase transition temperature of compound (S2-2-1) obtained was as described below.

Phase transition temperature (° C.): K 91.4 (N 34.4) I.

Chemical shifts (δ (ppm)) by $^1$H NMR analysis were as described below, and the compound obtained was identified to be (S2-1). In addition, the solvent for measurement was $CDCl_3$.

Chemical shift (δ (ppm)): 7.53 (m, 1H), 7.37-7.33 (m, 2H), 7.12-7.07 (m, 3H), 7.04-7.01 (m, 3H), 2.66 (t, 2H), 1.69-1.63 (m, 2H), 1.41-1.31 (m, 4H), 0.92 (t, 3H).

7 Synthesis Example 2-3

Synthesis of Compound (S2-3-1)

Compound (S2-3-1) is a compound of formula (1-2-4-3) in which $R^{1L}$ is $C_6H_{13}$, $L^1$ is hydrogen, all of $L^2$, $L^4$ and $L^5$ are fluorine, and $X^1$ is —$CF_3$, and is identical with compound (1-2-4-3-c).

(S2-3-1)

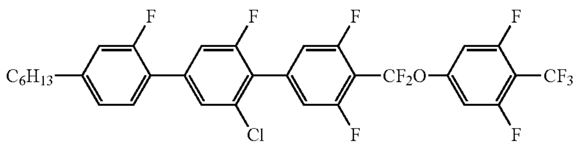

(1) Synthesis of Compound (S2-3-1)

Compound (S2-3-1) was prepared in a manner similar to the technique for synthesizing (S2-1-11) in Synthesis Example 2-1. The phase transition temperature of compound (S2-3-1) obtained was as described below.

Phase transition temperature (° C.): K 69.4 (N 27.7) I.

Chemical shifts (δ (ppm)) by $^1$H NMR analysis were as described below, and the compound obtained was identified to be (S3-1). In addition, the solvent for measurement was $CDCl_3$.

Chemical shift (δ (ppm)): 7.53 (m, 1H), 7.37-7.33 (m, 2H), 7.12-7.07 (m, 3H), 7.04-7.01 (m, 3H), 2.66 (t, 2H), 1.68-1.62 (m, 2H), 1.39-1.29 (m, 6H), 0.90 (t, 3H).

(2) Physical Properties of Liquid-Crystal Compound (S2-3-1)

Mother liquid crystal A having a nematic phase was prepared by mixing four compounds described as the mother liquid crystal A. The physical properties of mother liquid-crystal A were as described below.

Maximum temperature ($T_{NI}$)=71.7° C.; dielectric anisotropy (Δ∈)=11.0; refractive index anisotropy (Δn)=0.137.

Liquid-crystal composition AS3 including 85% of mother liquid crystal A and 15% of (S2-3-1) obtained in Synthesis Example 2-3 was prepared. The values of the physical properties of liquid-crystal composition AS3 obtained were determined, and extrapolated values of the physical properties of liquid-crystal compound (S2-3-1) were calculated by extrapolating the measured values. The values were as described below.

Maximum temperature ($T_{NI}$)=18.4° C.; dielectric anisotropy (Δ∈)=59.7; refractive index anisotropy (Δn)=0.130.

The findings show that liquid-crystal compound (S2-3-1) has an excellent compatibility with other liquid-crystal compounds and large dielectric anisotropy (Δ∈) and refractive index anisotropy (Δn).

8 Synthesis Example 2-4

Synthesis of Compound (S2-4-1)

Compound (S2-4-1) is a compound of formula (1-2-1-2) in which $R^{1L}$ is $C_6H_{13}$, both $L^1$ and $L^3$ are hydrogen, all of $L^2$, $L^4$ and $L^5$ are fluorine, and $X^1$ is fluorine.

(S2-4-1)

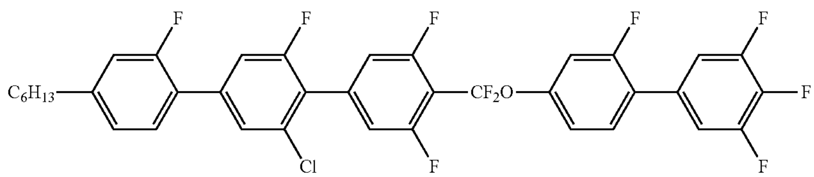

(1) Synthesis of Compound (S2-4-1)

Compound (S2-4-1) being a compound represented by formula (2-1) was prepared in a manner similar to the technique for synthesizing (S2-1-11) in Synthesis Example 2-1. The phase transition temperature of compound (S2-4-1) obtained was as described below.

Phase transition temperature (° C.): K 82.9 N 136.6 I.

Chemical shifts (δ (ppm)) by $^1$H NMR analysis were as described below, and the compound obtained was identified to be (S2-4-1). In addition, the solvent for measurement was $CDCl_3$.

Chemical shift (δ (ppm)): 7.53 (m, 1H), 7.41-7.34 (m, 3H), 7.23-7.18 (m, 4H), 7.11-7.02 (m, 4H), 2.66 (t, 2H), 1.67-1.62 (m, 2H), 1.39-1.32 (m, 6H), 0.90 (t, 3H).

Liquid-crystal composition AS4 including 85% of mother liquid crystal A and 15% of (S2-4-1) obtained in Synthesis Example 2-4 was prepared. The values of the physical properties of liquid-crystal composition AS4 obtained were determined, and extrapolated values of the physical properties of liquid-crystal compound (S2-4-1) were calculated by extrapolating the measured values. The values were as described below.

Maximum temperature ($T_{NI}$)=72.4° C.; dielectric anisotropy (Δ∈)=54.1; refractive index anisotropy (Δn)=0.177.

The findings show that liquid-crystal compound (S2-4-1) has an excellent compatibility with other liquid-crystal compounds and large dielectric anisotropy (Δ∈) and refractive index anisotropy (Δn).

9 Synthesis Example 3-1

Synthesis of Compound (S3-1)

(S3-1)

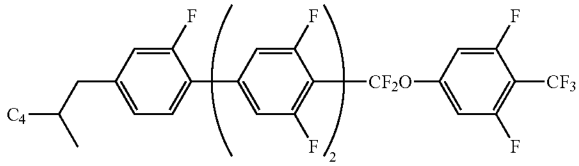

(A compound of formula (1-3-1-11) in which $R^{1a}$ is $C_4H_9$, $R^{1b}$ is hydrogen, $L^1$ is hydrogen, all of $L^2$, $L^3$ and $L^4$ are fluorine, and X is —$CF_3$).

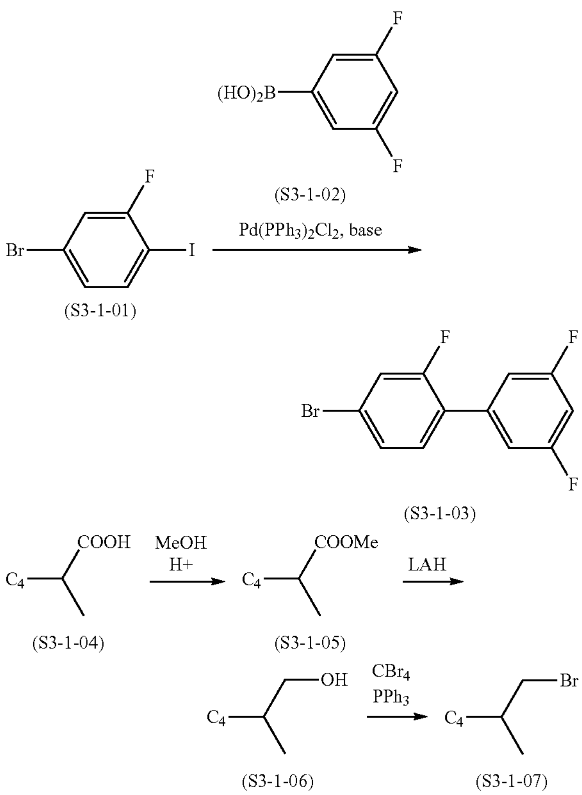

Based on the above Scheme, a synthesis scheme of compound (S3-1-03) and compound (S3-1-07) both being intermediate raw materials will be explained.

(1) Synthesis of Compound (S3-1-03)

Under a nitrogen flow, 1-bromo-3-fluoro-4-iodobenzene (S3-1-01) (21.5 g, 71.6 mmol), 3,5-difluoro-phenylboronic acid (S3-1-02) (11.3 g, 71.6 mmol), dichloro(bistriphenylphosphine) palladium (0.503 g, 0.716 mmol), triphenylphosphine (0.375 g, 1.43 mmol), potassium carbonate (14.8 g, 107 mmol), tetrabutylammonium bromide (5.71 g, 17.9 mmol), and a mixed solution of ethanol (100 mL) and toluene (100 mL) were agitated and heated at 80° C. for 6 hours. The resultant reaction mixture was poured into water, and extracted with toluene (300 mL) twice, and the organic layer was washed with water three times and then concentrated under a reduced pressure. The residue was then purified by means of silica gel column chromatography with heptane as a solvent, and thus compound (S3-1-03) (15.8 g, 55.1 mmol, yield: 77%) was obtained.

(2) Synthesis of Compound (S3-1-06)

Under a nitrogen flow, 98% concentrated sulfuric acid (1.0 mL) was added to a methanol (150 mL) solution of 2-methylhexanoic acid (S1-04) (54.1 g, 413 mmol), and the resultant mixture was agitated and heated at 70° C. for 2 hours. The resultant reaction mixture was poured into water and extracted with diethyl ether (300 mL) twice, and the organic phase was washed with sodium hydrogencarbonate water once and with water three times and then concentrated under a normal pressure. Thus, compound (S3-1-05) (42.6 g, 296 mmol, yield: 72%) was obtained.

Under a nitrogen flow, a THF (150 mL) solution of previously obtained compound (S3-1-05) (42.6 g, 296 mmol) was slowly added dropwise, at 0 to 10° C., to a mixture of lithium aluminum hydride (LAH) (7.88 g, 207 mmol) and THF (50 mL), and the resultant mixture was agitated for 2 hours at a temperature as was. Then, a 1 N sulfuric acid aqueous solution was added dropwise to the resultant reaction mixture at 0° C., and then the resultant mixture was poured into water and extracted with ethyl acetate (500 mL). The organic phase was washed with water three times and then concentrated under a normal pressure, and thus compound (S3-1-06) (33.6 g, 290 mmol, yield: 98%) was obtained.

(3) Synthesis of Compound (S3-1-07)

Under a nitrogen flow, a dichloromethane solution of carbon tetrabromide (129 g, 388 mmol) was slowly added dropwise, at 0° C., to a dichloromethane (200 mL) solution of a mixture of compound (S3-1-06) (30.0 g, 259 mmol) obtained in the preceding step and triphenyl phosphine (84.8 g, 323 mmol), and the resultant mixture was agitated for 30 minutes at a normal temperature. The resultant reaction mixture was poured into water, dichloromethane (500 mL) was added, and the organic phase was washed with water three times and then concentrated under a normal pressure. The residue was purified by means of silica gel column chromatography with n-pentane as a solvent, and thus compound (S3-1-07) (33.4 g, 186 mmol, yield: 72%) was obtained.

Next, compound (S3-1) was prepared according to Scheme 14 as described below by using the resultant compound (S3-1-03) and compound (S3-1-07).

Scheme 14

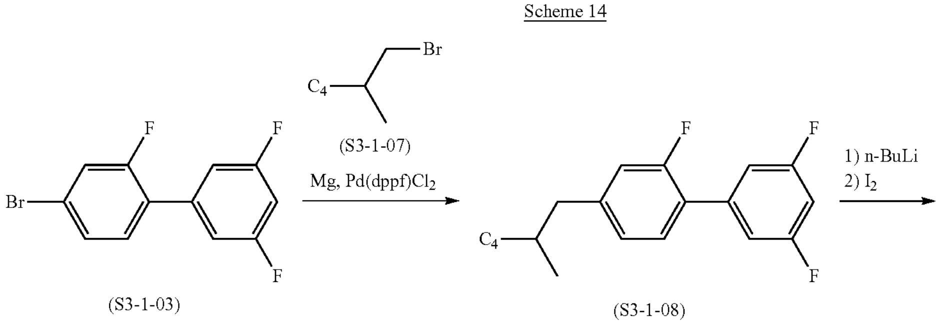

-continued

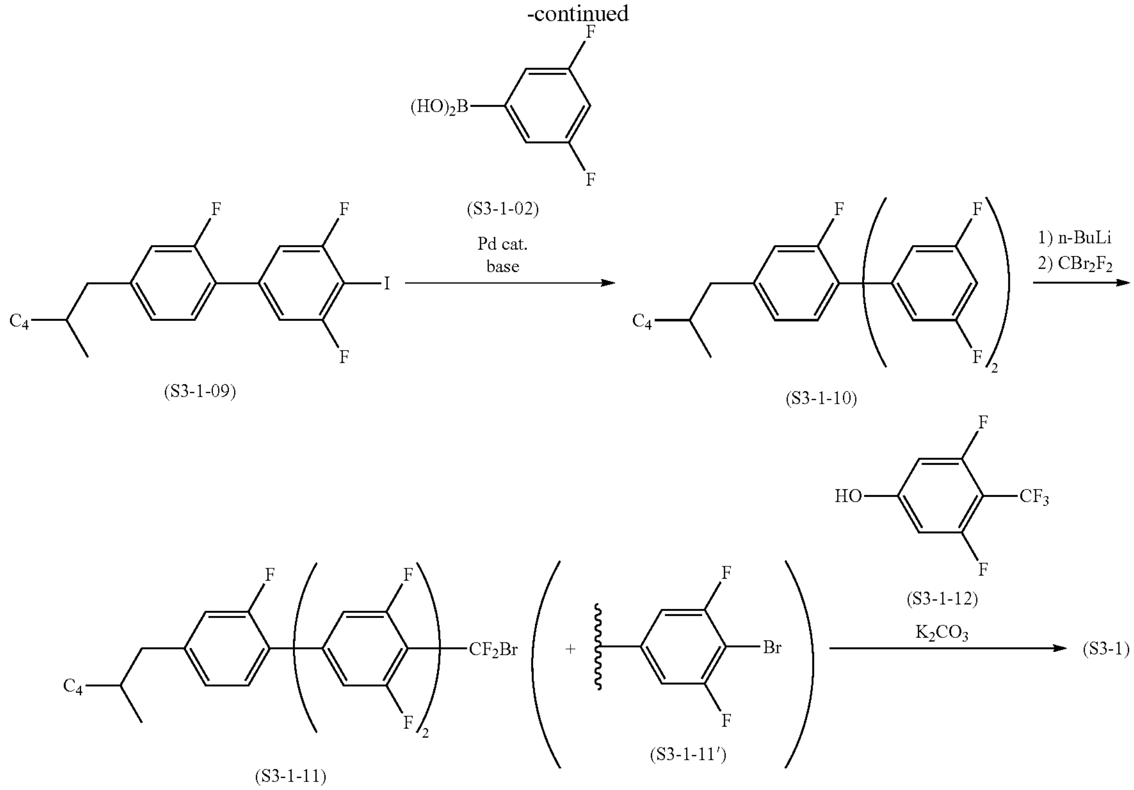

(4) Synthesis of Compound (S3-1-08)

Under a nitrogen flow, a solution of compound (S3-1-07) (25.0 g, 140 mmol) obtained in the preceding step and THF (100 mL) was slowly added dropwise to a mixture of magnesium (3.39 g 140 mmol) and THF (10 mL), and a Grignard reagent was prepared while the inside of the system was kept at 20 to 30° C. In a separate vessel, a mixture of compound (S3-1-03) (26.7 g, 93.1 mmol) obtained in previous step (1), dichloro{bis(diphenylphosphino)ferrocene}palladium (0.760 g, 0.931 mmol) and THF (200 mL) was prepared, the Grignard reagent previously obtained was slowly added dropwise thereto at 30° C., and the resultant mixture was agitated and heated at 50° C. for 6 hours. The resultant reaction mixture was poured into a 1 N—HCl aqueous solution and extracted with toluene (400 mL) twice, and the organic phase was washed with water three times and with sodium hydrogencarbonate water once and then concentrated under a reduced pressure. The residue was purified by means of silica gel column chromatography with n-heptane as a solvent, and thus compound (S3-1-08) (24.5 g, 80.0 mmol, 86% yield) was obtained.

(5) Synthesis of Compound (S3-1-09)

Under a nitrogen flow, an n-butyllithium/hexane solution (1.67 mol/L) (52.7 mL, 88.1 mmol) was slowly added dropwise, at −60° C., to a THF (150 mL) solution of compound (S3-1-08) (24.5 g, 80.0 mmol) obtained in the preceding step, and the resultant mixture was agitated for 1 hour at a temperature as was. Further, an iodine (22.3 g, 88.1 mmol)/THF (100 mL) solution was slowly added dropwise in the system, and the resultant mixture was agitated for 2 hours at a temperature as was. The resultant reaction mixture was poured into water and extracted with toluene (300 mL) twice, and the organic phase was washed with water three times and with an aqueous solution of sodium thiosulfate once and then concentrated under a reduced pressure. The residue was purified by means of silica gel column chromatography with n-heptane as a solvent, and thus compound (S3-1-09) (27.6 g, 63.9 mmol, yield: 80%) was obtained.

(6) Synthesis of Compound (S3-1-10)

Under a nitrogen flow, a mixed solution of compound (S3-1-09) (27.6 g, 63.9 mmol) obtained in the preceding step, 3,5-difluorophenylboronic acid (10.6 g, 67.1 mmol), potassium carbonate (35.3 g, 256 mmol) and tetra(butylammonium)bromide (6.17 g, 19.2 mmol) in toluene (100 mL)/ethanol (100 mL)/water (10 mL) was agitated and heated at 70° C. for 3 hours. The resultant reaction mixture was poured into water, toluene (300 mL) was added, and the organic phase was washed with water three times and with sodium hydrogencarbonate water once and then concentrated under a reduced pressure. The residue was purified by means of silica gel column chromatography with n-heptane as a solvent, and thus compound (S3-1-10) (23.5 g, 56.2 mmol, yield: 88%) was obtained.

(7) Synthesis of Compound (S3-1-11)

Under a nitrogen flow, an n-butyllithium/hexane solution (1.67 mol/L) (34.9 mL, 58.3 mmol) was slowly added dropwise, at −40° C., to a THF (150 mL) solution of compound (S3-1-10) (23.2 g, 55.5 mmol) obtained in the preceding step, and the resultant mixture was agitated for 1 hour at a temperature as was. Then, a dibromodifluoromethane (12.8 g, 61.1 mmol)/THF (50 mL) solution was slowly added dropwise in the system at a temperature as was, and the resultant mixture was agitated for 1 hour while gradually returning to a normal temperature. The resultant reaction mixture was poured into water and extracted with toluene (300 mL), and the organic phase was washed with water three times and then concentrated under a reduced pressure. The residue was purified by means of silica gel column chromatography with a solvent of toluene/n-heptane=1/5 (in a volume ratio), and a mixture (27.6 g (75%), 37.8 mmol, yield: 68%) of compounds (S3-1-11) and (S3-1-11') was obtained. The mixture was used as was in the next reaction.

(8) Synthesis of Compound (S3-1)

Under a nitrogen flow, a mixed solution of the mixture (5.00 g (75%), 6.40 mmol) of compounds (S3-1-11) and (S3-1-11') obtained in the preceding step, potassium carbonate (1.85 g, 13.4 mmol) and tetrabutylammonium bromide (0.206 g, 0.640 mmol) in 50 mL of DMF was agitated and heated at 40° C. for 30 minutes. Then, 3,5-difluoro-4-trifluoromethylphenol (S3-1-12) (1.33 g, 6.72 mmol) was slowly added to the system, and the resultant mixture was agitated and heated at 80° C. for 5 hours. The resultant reaction mixture was poured into water and extracted with toluene (100 mL), and the organic phase was washed with water three times and with sodium hydrogencarbonate water twice and concentrated under a reduced pressure. The residue was purified by means of silica gel column chromatography with a solvent of toluene/n-heptane=1/5 (in a volume ratio), and further by recrystallization (solvent: ethanol/ethyl acetate=1/1 in a volume ratio) and filtration, and thus compound (S3-1) (1.50 g, 2.26 mmol, yield: 35%) as the final object was obtained. The phase transition temperatures (° C.) of the compound was C•72.8 (•56.9•SmA•69.1•N)•I.

$^{1}$H-NMR ($CDCl_3$): δ(ppm): 0.893 (t, 3H), 0.905 (t, 3H), 1.02-1.37 (m, 6H), 1.75 (m, 1H), 2.40 (dd, 1H), 2.69 (dd, 1H), 6.98-7.05 (m, 4H), 7.22 (d, 2H), 7.26 (d, 2H), 7.36 (dd, 1H).

$^{19}$F-NMR ($CDCl_3$): δ (ppm): −56.8 (t, 3F), −62.5 (t, 2F), −108.8 (m, 2F), −111.3 (dt, 2F), −114.7 (d, 2F), −118.7 (dd, 1F).

Synthesis Example 3-2

Synthesis of Compound (S3-2)

(S3-2)

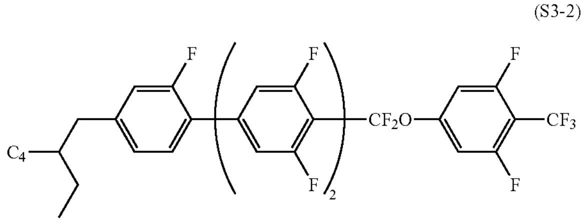

(A compound of formula (1-3-1-2i) in which $R^{1a}$ is $C_4H_9$, $R^{1b}$ is $CH_3$, $L^1$ is hydrogen, $L^2$, $L^3$ and $L^4$ are fluorine, and $X^1$ is —$CF_3$)

Scheme 15

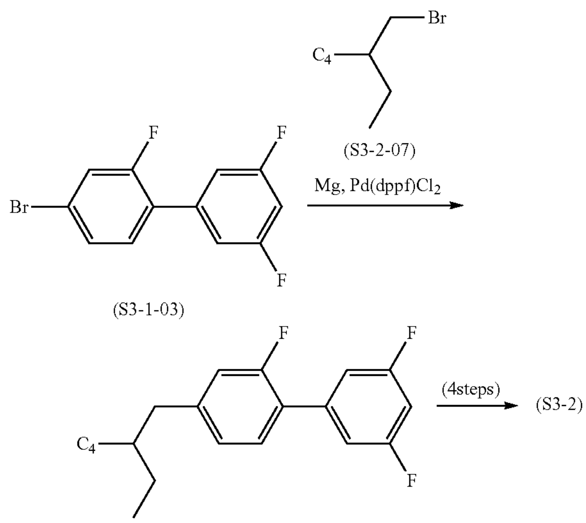

Based on Scheme 15, a synthesis scheme of compound (S3-2) being a compound represented by formula (1-3) will be explained. In addition, 1-bromo-3-ethylheptane (S3-2-07) is commercially available.

(1) Synthesis of Compound (S3-2-08)

Compound (S3-2-08) (4.64 g, 14.5 mmol, yield: 55%) was obtained using compound (S3-2-07) (5.04 g, 26.1 mmol) by performing the same operations (in step (4)) in Synthesis Example 3-1.

(2) Synthesis of Compound (S3-2)

Compound (S3-2) (1.20 g, 1.77 mmol, total yield: 12%) was obtained, from (S3-2-08) (4.64 g, 14.5 mmol) obtained in the preceding step, by performing the same operations (in step (5) to step (8)) in Synthesis Example 3-1. The phase transition temperatures (° C.) of the compound was C•64.5•I.

$^{1}$H-NMR ($CDCl_3$): δ (ppm): 0.897 (t, 3H), 0.902 (t, 3H), 1.25-1.36 (m, 8H), 1.61 (m, 1H), 2.58 (m, 2H), 6.98-7.06 (m, 4H), 7.22 (d, 2H), 7.26 (d, 2H), 7.35 (dd, 1H).

$^{19}$F-NMR ($CDCl_3$): δ (ppm): −56.8 (t, 3F), −62.5 (t, 2F), −108.8 (m, 2F), −111.2 (dt, 2F), −114.8 (d, 2F), −118.7 (dd, 1F).

11 Synthesis Example 3-3

Synthesis of Compound (S3-3)

(S3-3)

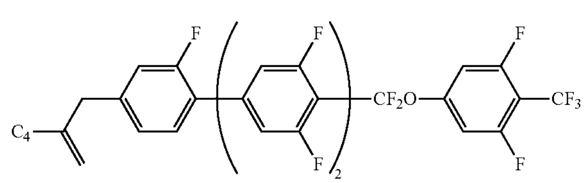

(A compound of formula (1-3-1-1i) in which $R^{1a}$ is $C_4H_9$, $R^{1b}$ is hydrogen, $L^1$ is hydrogen, $L^2$, $L^3$ and $L^4$ are fluorine, and $X^1$ is —$CF_3$).

Scheme 16

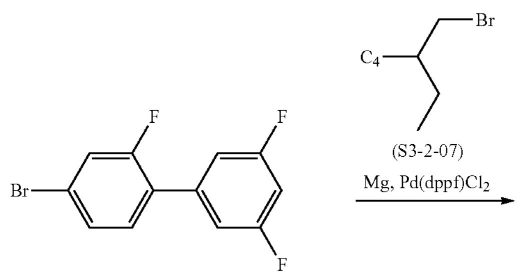

(S3-1-03)

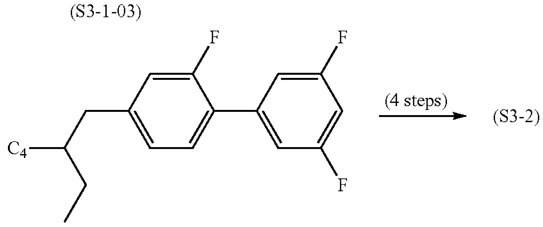

(S3-2-08)

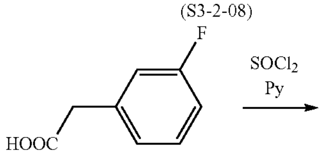

(S3-3-01)

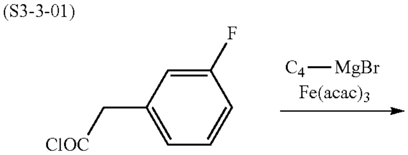

(S3-3-02)

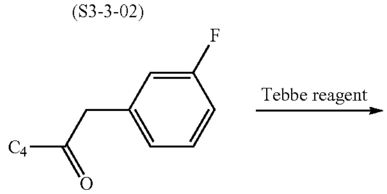

(S3-3-03)

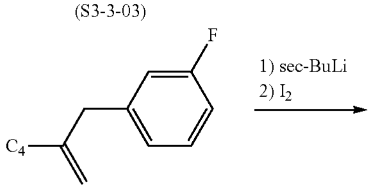

(S3-3-04)

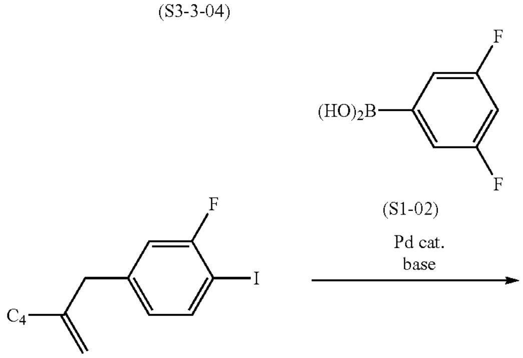

(S3-3-05)

-continued

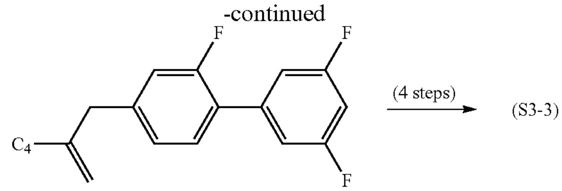

(S3-3-06)

Based on Scheme 16, a synthesis scheme of compound (S3-3) being a compound represented by formula (1-3) will be explained.

(1) Synthesis of Compound (S3-3-03)

Under a nitrogen flow, pyridine (0.3 mL) was added to a toluene (100 mL) solution of carboxylic acid derivative (S3-3-01) (30.0 g, 195 mmol), thionyl chloride (25.5 g, 214 mmol) was slowly added while the inside of the system was kept at 40 to 50° C., and the resultant mixture was agitated and heated for 30 minutes at a temperature as was. The resultant reaction mixture was directly concentrated under a reduced pressure, and thus compound (S3-3-02) (32.0 g, 185 mmol) was obtained.

Under nitrogen flow, a n-butylmagnesium bromide/THF solution (0.91 mol/L) (224 mL, 204 mmol) was slowly added dropwise, at −30° C., to a THF (250 mL) solution of compound (S3-3-02) (32.0 g, 185 mmol) obtained in the preceding step and iron (III) acetylacetonate (0.960 g), and the resultant mixture was agitated for 3 hours at a temperature as was. The resultant reaction mixture was poured into a 1 N—HCl aqueous solution and extracted with toluene (600 mL), and the organic phase was washed with water three times and with sodium hydrogencarbonate water once and then concentrated under a reduced pressure. The residue was purified by means of silica gel column chromatography with a solvent of toluene/n-heptane=1/1 (in a volume ratio), and thus compound (S3-3-03) (25.0 g, 128 mmol, yield: 66%) was obtained.

(2) Synthesis of Compound (S3-3-04)

Under a nitrogen flow, a Tebbe reagent (0.5 mol/L) (250 mL, 125 mmol) was slowly added dropwise, at −10 to 0° C., to a toluene (100 mL) solution of compound (S3-3-03) (20.2 g, 104 mmol) obtained in the preceding step, and the resultant mixture was agitated for 20 hours at 0° C. The resultant reaction mixture was poured into water, diethyl ether (100 mL) was added, and the organic phase was washed with water three times and then concentrated under a reduced pressure. The residue was purified by means of silica gel column chromatography with n-heptane as a solvent, and thus compound (S3-3-04) (9.00 g, 47 mmol, yield: 45%) was obtained.

(3) Synthesis of Compound (S3-3-05)

Under a nitrogen flow, a sec-butyllithium/cyclohexane solution (1.07 mol/L) (14.0 mL, 14.9 mmol) was slowly added dropwise, at −60° C., to a THF (50 mL) solution of compound (S3-3-04) (1.40 g, 7.29 mmol) obtained in the preceding step, and the resultant mixture was agitated for 1 hour at a temperature as was. Then, an iodine (2.04 g, 8.02 mmol)/THF (10 mL) solution was slowly added dropwise, and the resultant mixture was agitated for 1 hour while gradually returning to a normal temperature. The resultant reaction mixture was poured into water and extracted with toluene (100 mL), and the organic phase was washed with water three times and with an aqueous solution of sodium thiosulfate twice and then concentrated under a reduced pressure. The residue was purified by means of silica gel column chromatography with n-heptane as a solvent, and thus compound (S3-3-05) (1.80 g, 5.92 mmol, yield: 81%) was obtained.

(4) Synthesis of Compound (S3-3-06)

Under a nitrogen flow, an ethanol (10 mL)/toluene (10 mL) solution of compound (S3-3-05) (1.80 g, 5.92 mmol) obtained in the preceding step, 3,5-difluorophenylboronic acid (S3-1-02) (0.982 g, 6.22 mmol), potassium carbonate (3.27 g, 23.7 mmol), tetrabutylammonium bromide (0.191 g, 0.592 mmol) and Pd/C (NX type) (0.10 g) was agitated and heated for 3 hours at 70° C. The resultant reaction mixture was poured into water, toluene (100 mL) was added, and the organic phase was washed with water three times and with sodium hydrogencarbonate water once and then concentrated under a reduced pressure. The residue was purified by means of silica gel column chromatography with n-heptane as a solvent, and thus compound (S3-3-06) (1.40 g, 4.60 mmol, yield: 78%) was obtained.

(5) Synthesis of Compound (S3-3)

Compound (S3-3) (0.40 g, 0.604 mmol, total yield: 13%) was obtained, from (S3-3-06) (1.40 g, 4.60 mmol) obtained in the preceding step, by performing the same operations (in step (5) to step (8)) in Synthesis Example 3-1. The phase transition temperatures (° C.) of the compound was C•59.2•I.

$^{1}$H-NMR ($CDCl_3$): δ(ppm): 0.905 (t, 3H), 1.31 (m, 2H), 1.44 (m, 2H), 2.00 (t, 2H), 3.38 (s, 2H), 4.79 (s, 1H), 4.90 (d, 1H), 7.00 (d, 2H), 7.05 (dd, 1H), 7.09 (dd, 1H), 7.22 (d, 2H), 7.27 (d, 2H), 7.38 (dd, 1H).

$^{19}$F-NMR ($CDCl_3$): δ (ppm): −56.8 (t, 3F), −62.5 (t, 2F), −108.8 (m, 2F), −111.2 (dt, 2F), −114.7 (d, 2F), −118.4 (dd, 1F)

12 Synthesis Example 3-4

Synthesis of Compound (S3-4)

(S3-4)

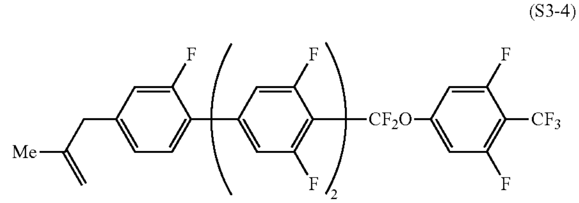

(A compound of formula (1-3-1-1i) in which $R^{1a}$ is $CH_3$, $R^{1b}$ is hydrogen, L is hydrogen, $L^2$, $L^3$ and $L^4$ are fluorine, and $X^1$ is —$CF_3$)

Scheme 17

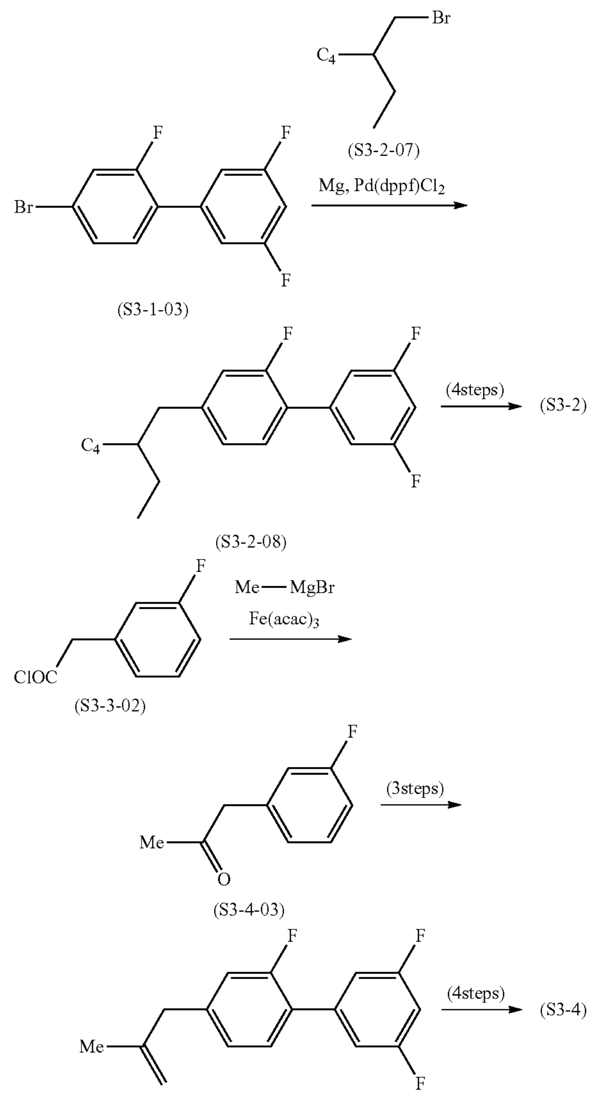

Based on Scheme 17, a synthesis scheme of compound (S3-4) being a compound represented by formula (1-3) will be explained.

(1) Synthesis of Compound (S3-4-03)

Compound (S3-4-03) (2.08 g, 13.7 mmol, yield: 70%) was obtained by performing the same operations in Synthesis Example 3-3 except that compound (S3-3-02) (3.38 g, 19.6 mmol) obtained in step (1) was used as a starting material, and methylmagnesium bromide was used in place of butylmagnesium bromide in step (2).

(2) Synthesis of Compound (S3-4-06)

Compound (S3-4-06) (1.83 g, 7.00 mmol, total yield: 51%) was obtained, from compound (S3-4-03) (2.08 g, 13.7 mmol) obtained in the preceding step, by performing completely the same operations in step (3) to step (5) in Synthesis Example 3-3.

(3) Synthesis of Compound (S3-4)

Compound (S3-4) (0.890 g, 1.47 mmol, total yield: 21%) was obtained, from compound (S3-4-06) (1.83 g, 7.00 mmol) obtained in the preceding step, by performing completely the same operations in step (5) to step (8) in Synthesis Example 1. The phase transition temperatures (° C.) of the compound was C•89.4•C•93.0•I.

$^{1}$H-NMR ($CDCl_3$): δ (ppm): 1.72 (s, 3H), 3.37 (s, 2H), 4.80 (d, 1H), 4.90 (s, 1H), 7.00 (d, 2H), 7.06 (dd, 1H), 7.09 (dd, 1H), 7.22 (d, 2H), 7.27 (d, 2H), 7.38 (dd, 1H).

$^{19}$F-NMR ($CDCl_3$): δ (ppm): −56.7 (t, 3F), −62.4 (t, 2F), −108.7 (m, 2F), −111.2 (dt, 2F), −114.5 (d, 2F), −118.3 (dd, 1F).

13 Synthesis Example 3-5

Synthesis of Compound (S3-5)

Based on Scheme 18, a synthesis scheme of compound (S3-5) being a compound represented by formula (1-3) will be explained.

Compound (S3-5) (1.20 g, 1.69 mmol, total yield: 29%) was obtained by performing the same operations in Synthesis Example 3-1 except that a mixture (4.00 g (75%), 5.48 mmol) of compounds (S3-1-11) and (S3-1-11') as obtained in step (7) was used as a starting material, and compound (S3-5-01) (1.39 g, 5.76 mmol) was used in place of compound (S3-1-12) in step (8). The phase transition temperatures (° C.) of the compound was C•77.4•N•165.0•I.

$^{1}$H-NMR ($CDCl_3$): δ (ppm): 0.894 (t, 3H), 0.905 (t, 3H), 1.19-1.40 (m, 6H), 1.76 (m, 1H), 2.41 (dd, 1H), 2.69 (dd, 1H), 6.99 (d, 1H), 7.04 (d, 1H), 7.15-7.29 (m, 8H), 7.37 (m, 2H).

$^{19}$F-NMR ($CDCl_3$): δ (ppm): −61.8 (t, 2F), −111.3 (dt, 2F), −111.4 (d, 2F), −114.9 (dd, 1F), −118.7 (dd, 1F), −134.7 (dd, 2H), −161.7 (tt, 1H).

(S3-5)

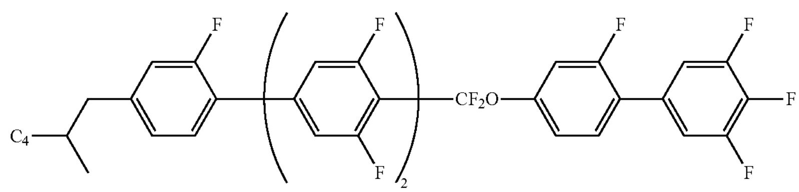

(A compound of (1-3-2-2f) in which $R^{1a}$ is $C_4H_9$, $R^{1b}$ is hydrogen, $L^1$ is hydrogen, $L^2$, $L^3$, $L^4$ and $L^5$ are fluorine, and $X^1$ is fluorine)

$^{19}$F-NMR ($CDCl_3$): δ (ppm): −61.8 (t, 2F), −111.3 (dt, 2F), −111.4 (d, 2F), −114.9 (dd, 1F), −118.7 (dd, 1F), −134.7 (dd, 2H), −161.7 (tt, 1H).

Scheme 18

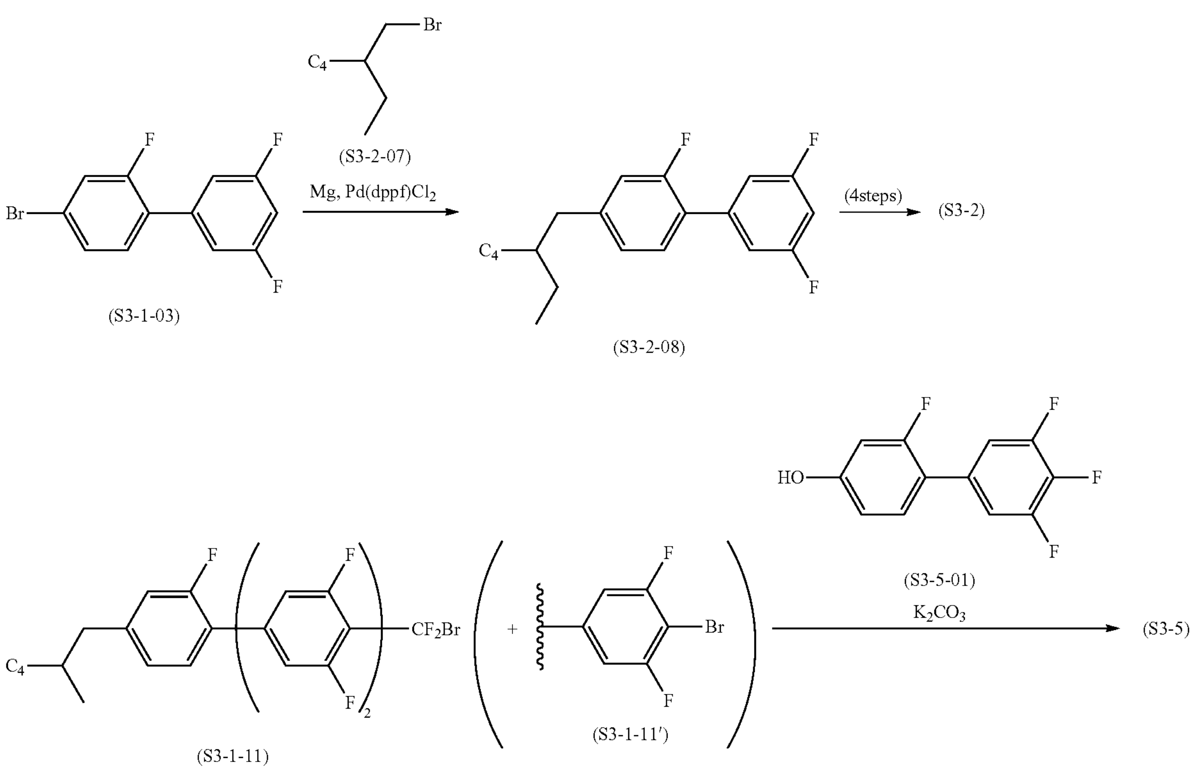

14 Synthesis Example 3-6

Synthesis of Compound (S3-6)

(S3-6)

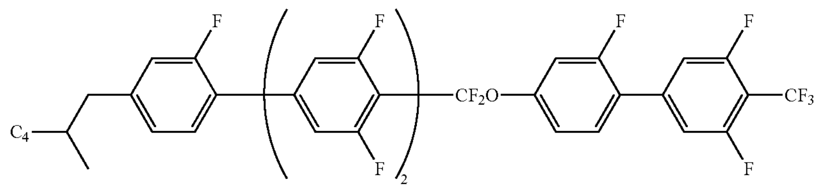

(A compound of (1-3-2-2f) in which $R^{1a}$ is $C_4H_9$, $R^{1b}$ is hydrogen, $L^1$ is hydrogen, $L^2$, $L^3$, $L^4$ and $L^5$ are fluorine, and $X^1$ is —$CF_3$).

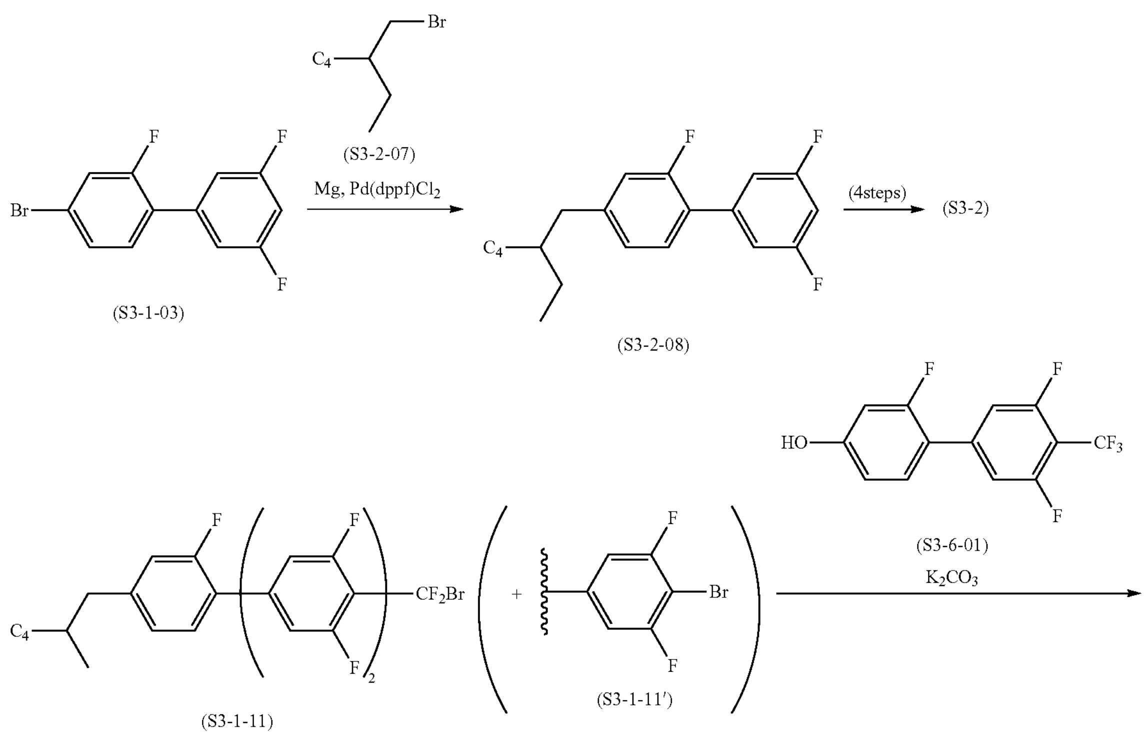

(S3-6)

Based on the above Scheme, a synthesis scheme of compound (S3-6) being a compound represented by formula (1-3) will be explained.

Compound (S3-6) (1.05 g, 1.38 mmol, total yield: 26%) was obtained by performing the same operations in Synthesis Example 3-1 except that a mixture (4.00 g (75%), 5.48 mmol) of compounds (S3-1-11) and (S3-1-11') as obtained in step (7) was used as a starting material, and compound (S3-6-01) (1.57 g, 5.37 mmol) was used in place of compound (S3-1-12) in step (8). The phase transition temperatures (° C.) of the compound was C•116.4•SmA•135.2•N•169.1.1.

$^1$H-NMR ($CDCl_3$): δ (ppm): 0.891 (t, 3H), 0.907 (t, 3H), 1.16-1.40 (m, 6H), 1.76 (m, 1H), 2.41 (dd, 1H), 2.69 (dd, 1H), 6.99 (dd, 1H), 7.04 (dd, 1H), 7.21-7.28 (m, 8H), 7.37 (t, 1H), 7.45 (t, 1H).

$^{19}$F-NMR ($CDCl_3$): δ (ppm): −56.8 (t, 3F), −61.8 (t, 2F), −111.1 (m, 2F), −111.3 (dt, 2F), −114.1 (dd, 1F), −114.8 (d, 2H), −118.7 (dd, 1H).

Physical Properties of Liquid-Crystal Compound (S3-1)

Mother liquid crystal A having a nematic phase was prepared by mixing four compounds described as the mother liquid crystal A. The physical properties of mother liquid crystal A were as described below.

Maximum temperature ($T_{NI}$)=71.7° C.; dielectric anisotropy (Δ∈)=11.0; refractive index anisotropy (Δn)=0.137.

Liquid-crystal composition AS2 including 85% of mother liquid crystal A and 15% of (S3-1) obtained in Synthesis Example 3-1 was prepared. The values of the physical properties of liquid-crystal composition AS2 obtained were determined, and extrapolated values of the physical properties of liquid-crystal compound (S3-1) were calculated by extrapolating the measured values. The values were as described below.

Maximum temperature ($T_{NI}$)=35.0° C.; dielectric anisotropy ($\Delta\epsilon$)=57.4; refractive index anisotropy ($\Delta n$)=0.144.

The findings show that liquid-crystal compound (S3-1) shows a low melting point and also has an excellent compatibility with other liquid-crystal compounds and large dielectric anisotropy ($\Delta\epsilon$) and refractive index anisotropy ($\Delta n$).

Physical Properties of Liquid-Crystal Compound (S3-3)

Liquid-crystal composition AS3 including 85% of mother liquid crystal A and 15% of (S3-3) obtained in Synthesis Example 3-3 was prepared. The values of the physical properties of liquid-crystal composition AS3 obtained were determined, and extrapolated values of the physical properties of liquid-crystal compound (S3-3) were calculated by extrapolating the measured values. The values were as described below.

Maximum temperature ($T_{NI}$)=−9.60° C.; dielectric anisotropy ($\Delta\epsilon$)=49.7; refractive index anisotropy ($\Delta n$)=0.124.

The findings show that liquid-crystal compound (S3-3) shows a low melting point and also has an excellent compatibility with other liquid-crystal compounds and large dielectric anisotropy ($\Delta\epsilon$) and refractive index anisotropy ($\Delta n$).

Example 1

Liquid-crystal composition A was prepared by mixing the liquid-crystal compounds shown below at a ratios described below. The number of structural formulas was described at the right side of the formulas.

The compounds represented by formulas (1-1-2C) to (1-1-3A) in liquid-crystal composition A include compounds represented by formula (1-1), the compounds represented by formulas (1-2-4-3a) to (1-2-1-2) includes compounds represented by formula (1-2), and the compounds represented by a formula (1-3-2-2i) include compounds represented by formula (1-3).

Liquid-Crystal Composition A (1-1-2C)

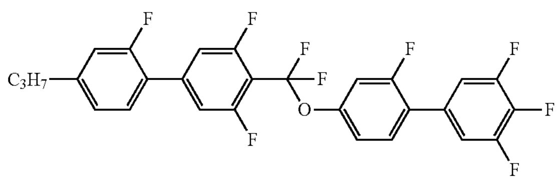

10 wt %

(1-1-2C)

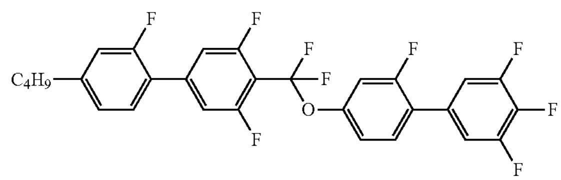

10 wt %

(1-1-2C)

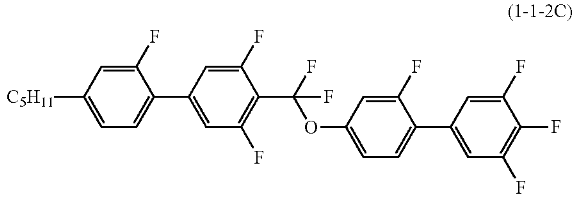

10 wt %

(1-1-3A)

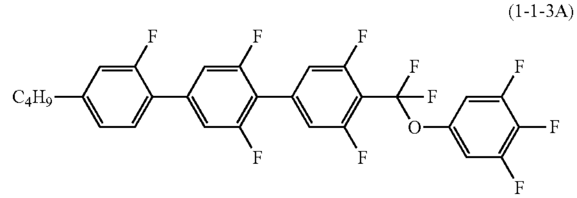

10 wt %

(1-1-3A)

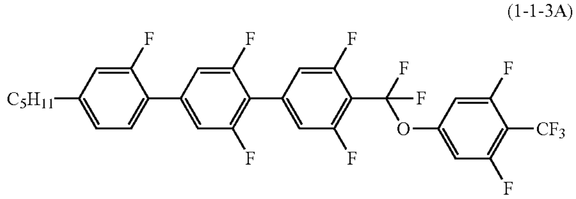

10 wt %

(1-2-4-3-a)

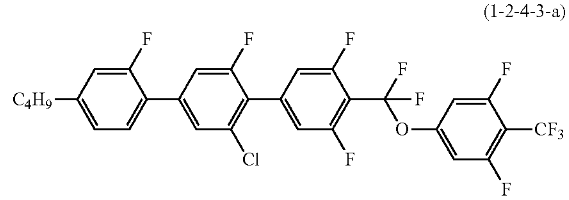

10 wt %

(1-2-4-3)

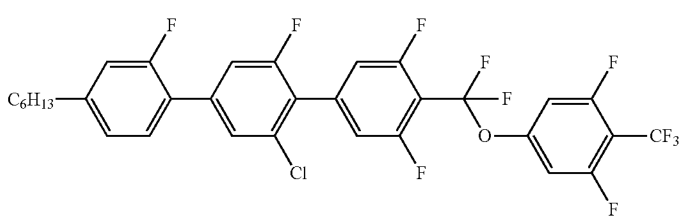

10 wt %

-continued (1-2-1-2)

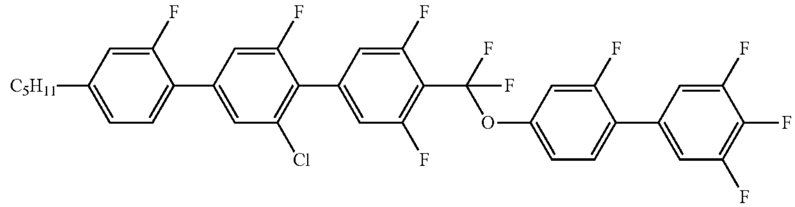

10 wt %

(1-2-1-2)

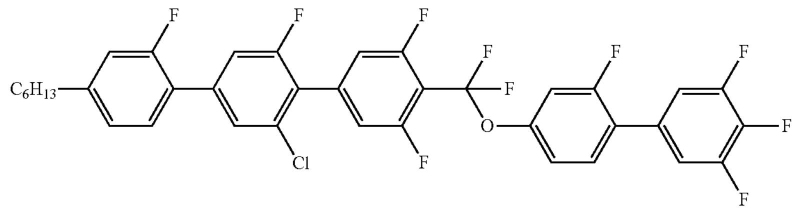

10 wt %

(1-3-1-2i)

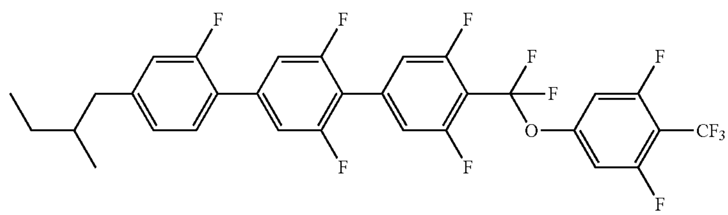

10 wt %

Next, cholesteric liquid-crystal compositions A1, A2 and A3 including liquid-crystal composition A and chiral agent BN-5 represented by the formula shown below were prepared. The mixing ratios of A to BN-5 in liquid-crystal compositions A1 to A3 are as described below.

A1: liquid-crystal composition A: 96.0 wt %; BN-5: 4.0 wt %.

A2: liquid-crystal composition A: 96.8 wt %; BN-5: 3.2 wt %.

A3: liquid-crystal composition A: 97.6 wt %; BN-5: 2.4 wt %.

BN-5

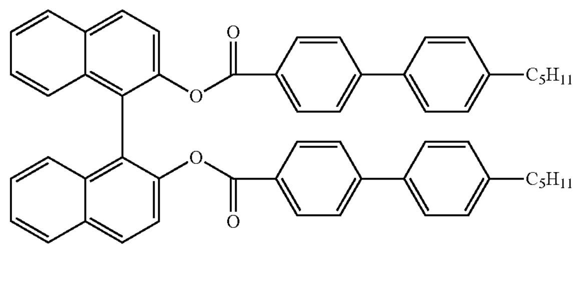

Example 2

Liquid-crystal compositions A1 to A3 each were injected into a cell (cell thickness: 7 μm) including two substrates with ITO electrodes at 100° C., and the cell was cooled to room temperature (25° C.). The liquid-crystal composition had planer alignment. The wavelength dependence of transmittance was measured using the cells by means of a spectrophotometer. The results were as shown in FIG. 1. Moreover, the selective reflection wavelengths of liquid-crystal compositions A1 to A3 at 25° C. were as described below.

Liquid-crystal composition A1: 450 nanometers.

Liquid-crystal composition A2: 540 nanometers.

Liquid-crystal composition A3: 740 nanometers.

The longitudinal axis of FIG. 1 is transmittance, and FIG. 1 shows that the transmittance decreases by selective reflection of liquid-crystal compositions A1 to A3. Thus, the findings show that the wavelength band of selective reflection is wide.

Example 3

Rectangular waves having a frequency of 60 Hz were applied to the cell obtained in Example 2, and the voltage at which the liquid-crystal composition formed homeotropic alignment was investigated. The result is shown below.

Liquid-crystal composition A1: 18.0 V.

Liquid-crystal composition A2: 13.9 V.

Liquid-crystal composition A3: 10.9 V.

Thus, the findings show that the cell can be driven at a low voltage.

Comparative Example 1-1

Liquid-crystal composition B was prepared by mixing liquid-crystal compounds shown below at the ratio described below. Liquid-crystal composition B

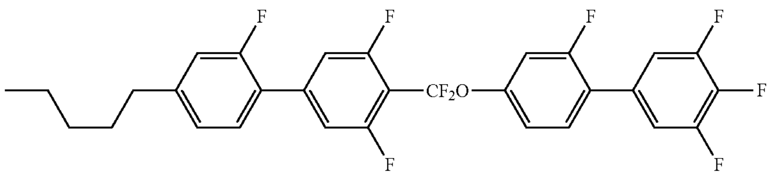
20 wt %
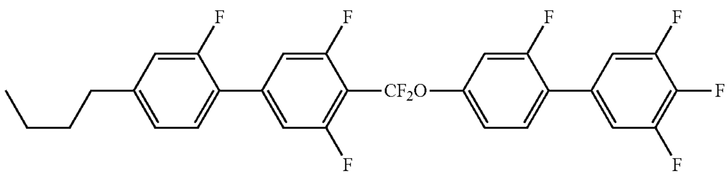
20 wt %
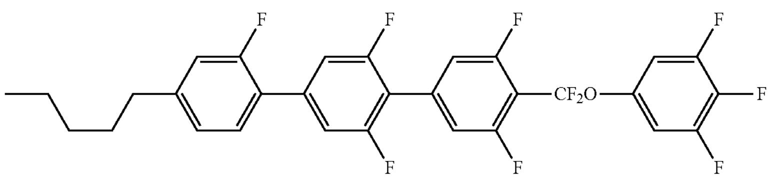
10 wt %
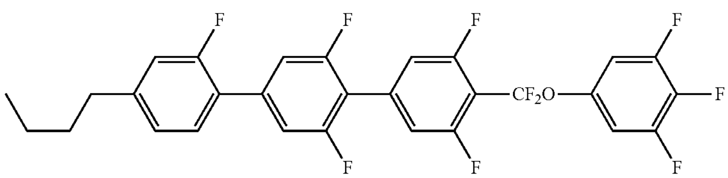
10 wt %
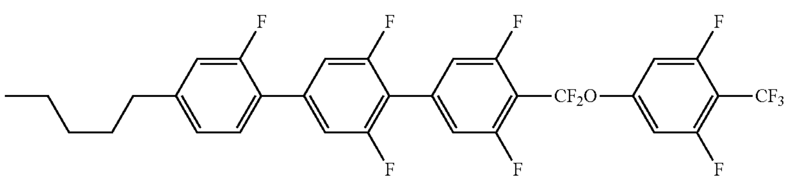
10 wt %
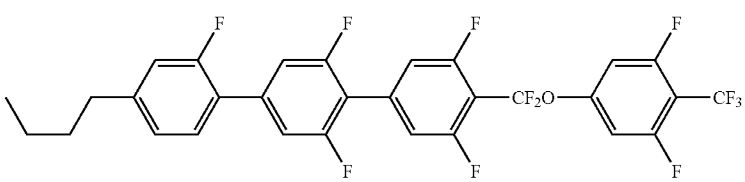
10 wt %
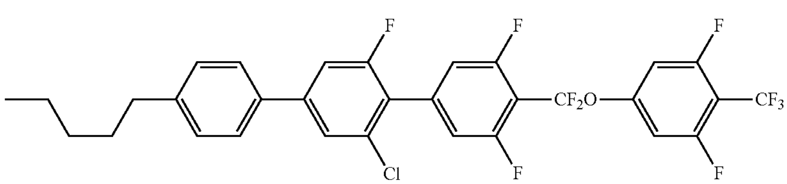
10 wt %
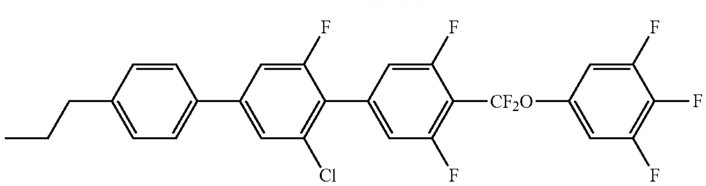
10 wt %

Next, liquid-crystal composition B1 including liquid crystal composition B (94 wt %) and the chiral agent ISO-60BA2 (6 wt %) represented by the formula shown below was obtained.

In addition, ISO-60BA2 was obtained by esterificating isosorbide and 4-hexyloxybenzoic acid in the presence of dicyclohexylcarbodiimide (DCC) and 4-dimethylaminopyridine. ISO-60BA2

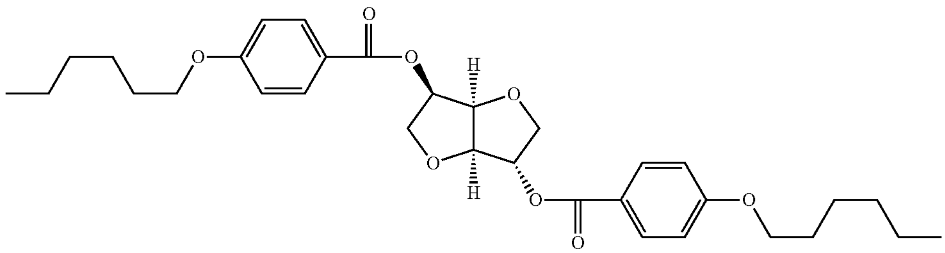 [SMILES: CCCCCCOc1ccc(C(=O)O[C@H]2CO[C@H]3[C@@H]2OC[C@H]3OC(=O)c2ccc(OCCCCCC)cc2)cc1]

When a selective reflection wavelength was measured on liquid-crystal composition B1 under the same conditions in Example 1, the measured value was less than 400 nm.

Comparative Example 1-2

As a mixture of liquid-crystal composition B1 and a monomer, liquid-crystal composition B2-M was prepared in which liquid-crystal composition B-2 was mixed in an amount of 79.4 wt %, n-dodecylacrylate in an amount of 10.0 wt %, 1,4-di(4-(6-(acryloyloxy)hexyloxy)benzoyloxy)-2-methylbenzene in an amount of 10.0 wt %, and, as a photopolymerization initiator, 2,2'-dimethoxy phenylacetophenone in an amount of 0.6 wt %.

Liquid-crystal composition B2-M was interposed between a comb electrode substrate not subjected to an alignment treatment, and an opposite glass substrate (without an electrode given) (cell thickness: 10 μm) and the cell obtained was heated at 63.0° C. Under the state, ultraviolet light (intensity of ultra violet light: 23 $mWcm^{-2}$ (365 nm)) was used to irradiate for 1 minute to perform a polymerization reaction. Thus, polymer/liquid-crystal composite material B2-P was prepared.

When a selective reflection wavelength was measured on liquid-crystal compositions B2-M and B2-P under the same conditions in Example 1, the measured value was less than 400 nm.

Comparative Example 2-1

Liquid-crystal composition C was prepared by mixing liquid-crystal compounds shown below at the ratio as described below. Liquid-crystal composition C

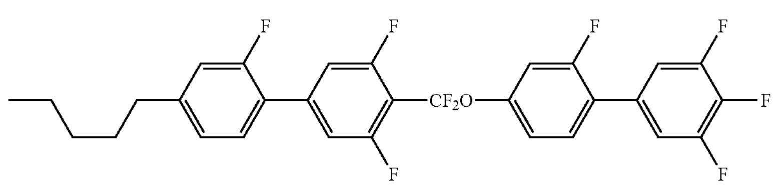

8 wt %

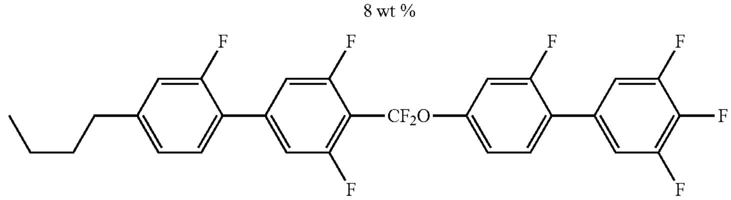

8 wt %

-continued
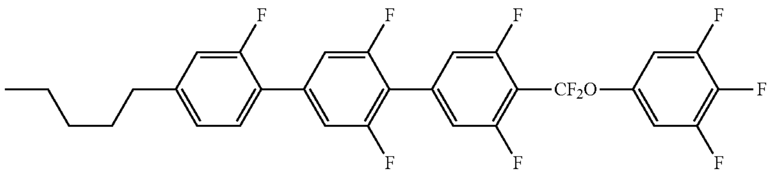
14 wt %
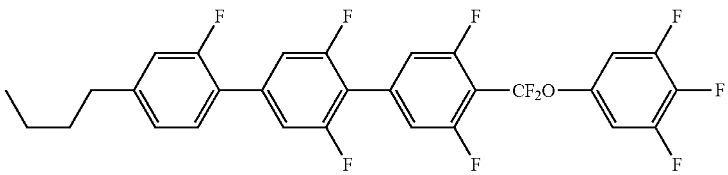
14 wt %
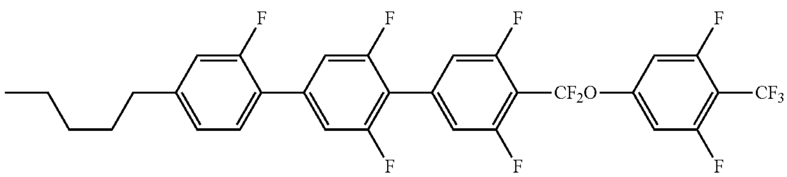
12 wt %
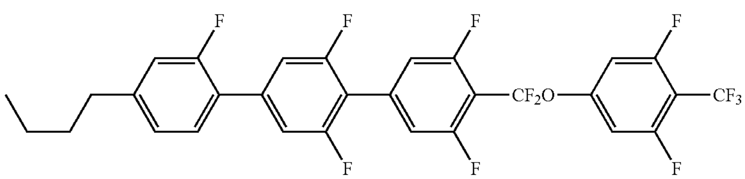
5 wt %
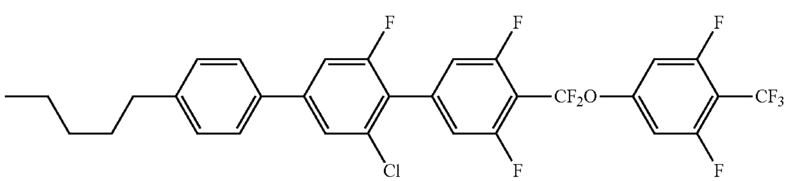
5 wt %
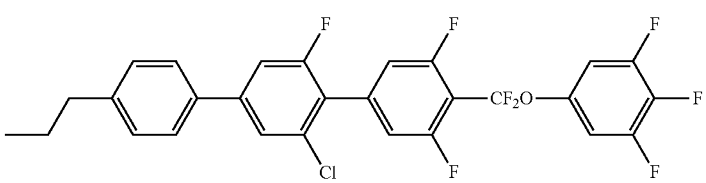
5 wt %
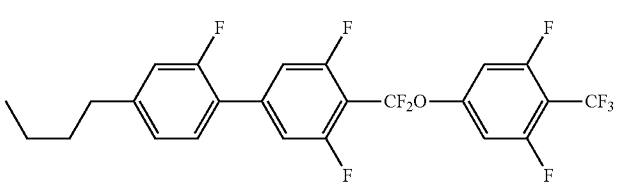
9 wt %
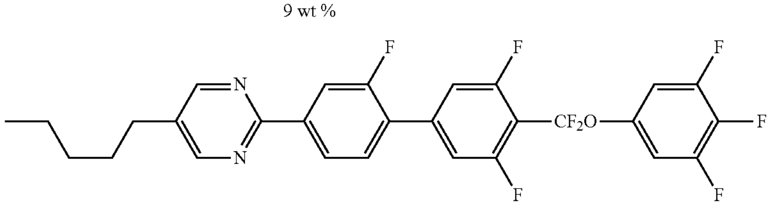
10 wt %

-continued

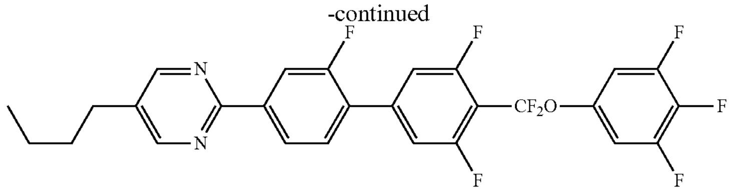

10 wt %

Next, liquid-crystal composition C1 including liquid-crystal composition C (94 wt %) and chiral agent 2 (6.1 wt %) represented by the formula shown below was obtained.

Chiral Agent 2

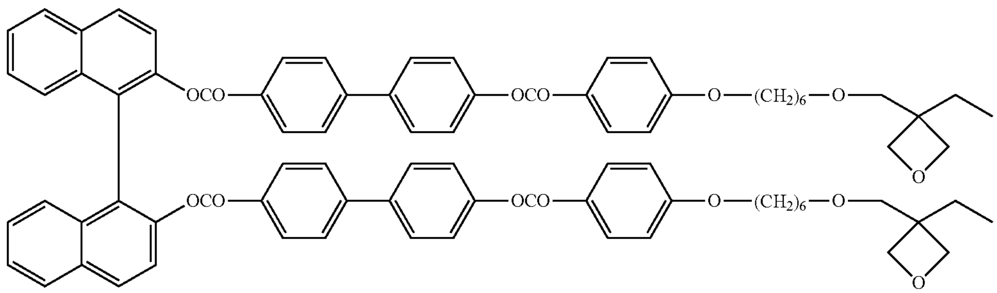

When a selective reflection wavelength was measured on liquid-crystal composition C1 under the same conditions in Example 1, the measured value was less than 400 nm.

Comparative Example 2-2

As a mixture of liquid-crystal composition C1 and a monomer, liquid-crystal composition C2-M was prepared in which liquid-crystal composition C2 was mixed in an amount of 87.4 wt %, n-dodecylacrylate in an amount of 6.0 wt %, 1,4-di(4-(6-(acryloyloxy)propyloxy)benzoyloxy)-2-methylbenzene in an amount of 6.0 wt %, and, as a photopolymerization initiator, 2,2'-dimethoxy phenylacetophenone in an amount of 0.6 wt %.

Liquid-crystal composition C2-M was interposed between a comb electrode substrate not subjected to an alignment treatment, and an opposite glass substrate (without an electrode given) (cell thickness: 10 μm), and the obtained cell was heated at 77° C. Under the state, ultraviolet light (intensity of UV light: 23 $mWcm^{-2}$ (365 nm)) was used to irradiate for 1 minute to perform a polymerization reaction. Thus, polymer/liquid-crystal composite material C2-P was prepared.

When a selective reflection wavelength was measured on liquid-crystal compositions C2-M and C2-P under the same conditions in Example 1, the measured value was less than 400 nm.

Comparative Example 3-1

Liquid-crystal composition D was prepared by mixing liquid-crystal composition C described above and compound (16-16a) shown below at a weight ratio of 85/15.

Compound (16-16a)

(16-16a)

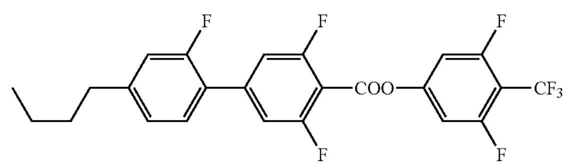

Next, liquid-crystal composition D1 including liquid-crystal composition D (94 wt %) and the above chiral agent 2 (7.0 wt %) was obtained.

When a selective reflection wavelength was measured on liquid-crystal composition D1 under the same conditions in Example 1, the measured value was less than 400 nm.

Comparative Example 3-2

As a mixture of liquid-crystal composition D1 and a monomer, liquid-crystal composition D2-M was prepared in which liquid-crystal composition D2 was mixed in an amount of 87.4 wt %, n-dodecylacrylate in an amount of 6.0 wt %, 1,4-di(4-(6-(acryloyloxy)propyloxy)benzoyloxy-2-methylbenzene in an amount of 6.0 wt %, and, as a photopolymerization initiator, 2,2'-dimethoxy phenylacetophenone in an amount of 0.6 wt %.

Liquid-crystal composition D2-M was interposed between a comb electrode substrate not subjected to an alignment treatment, and an opposite glass substrate (without an electrode given) (cell thickness: 10 μm) and the cell obtained was heated at 60.0° C. Under the state, ultraviolet light (intensity of UV light: 23 $mWcm^{-2}$ (365 nm)) was used to irradiate for 1 minute to perform a polymerization reaction. Thus, polymer/liquid-crystal composite material D2-P was prepared.

When a selective reflection wavelength was measured on liquid-crystal compositions D2-M and D2-P under the same conditions in Example 1, the measured value was less than 400 nm.

INDUSTRIAL APPLICABILITY

The invention can be applied to, for example, a liquid-crystal material, a liquid-crystal device using the liquid-crystal material, and so forth.

What is claimed is:

1. A cholesteric liquid-crystal composition that contains a liquid-crystal component and a chiral agent, and has a selective reflection wavelength in a range of 400 nm to 800 nm at 25° C., wherein the liquid-crystal component contains a liquid-crystal component A including at least one compound selected from the group of compounds represented by formulas (1-1), (1-2) and (1-3):

(1-1)

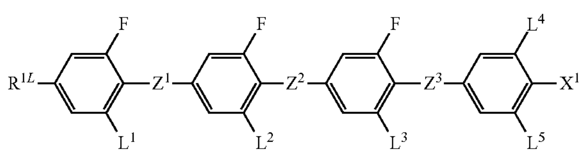

(1-2)

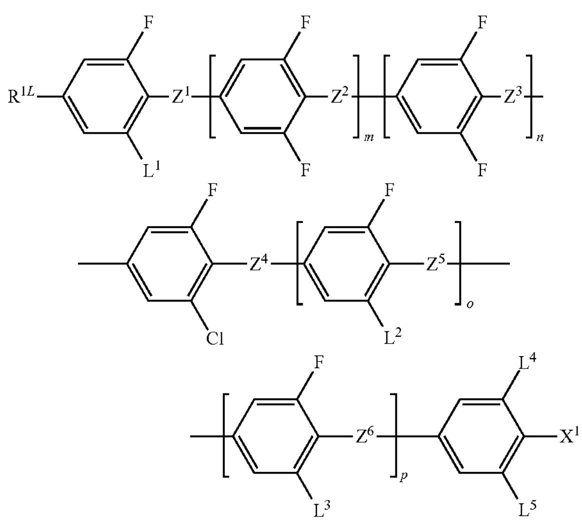

(1-3)

$$R^{1D}-A^1-(Z^1-A^2)_m-(Z^2-A^3)_n-(Z^3-A^4)_p-Z^4-A^5-X^1$$

wherein, in formulas (1-1) to (1-3), $R^{1L}$ is hydrogen, straight-chain alkyl having 1 to 20 carbons in which arbitrary —CH$_2$— may be replaced by —S—, —COO— or —OCO—, straight-chain alkenyl having 2 to 20 carbons, straight-chain alkynyl having 2 to 20 carbons, straight-chain alkoxy having 1 to 20 carbons, straight-chain alkoxyalkyl having 2 to 20 carbons or straight-chain alkenyloxy having 2 to 20 carbons, and hydrogen in the alkyl, the alkenyl, the alkynyl, the alkoxy, the alkoxyalkyl and the alkenyloxy may be replaced by halogen; $R^{1D}$ is branched alkyl having 3 to 20 carbons, branched alkenyl having 3 to 20 carbons, branched alkoxy having 3 to 20 carbons or branched alkoxyalkenyl having 3 to 20 carbons, arbitrary —CH$_2$—CH$_2$— in the branched alkyl or the branched alkenyl may be replaced by —CH═CH—, —CF═CF— or —C≡C—, and arbitrary hydrogen in the branched alkyl, the branched alkenyl, the branched alkoxy and the branched alkoxyalkenyl may be replaced by fluorine; rings $A^1$, $A^2$, $A^3$, $A^4$ and $A^5$ are independently 1,4-phenylene, 1,3-dioxane-2,5-diyl, tetrahydropyran-2,5-diyl, tetrahydropyran-3,6-diyl, pyrimidine-2,5-diyl, pyridine-2,5-diyl or naphthalene-2,6-diyl, and arbitrary hydrogen in the ring may be replaced by fluorine or chlorine; $Z^1$, $Z^2$, $Z^3$, $Z^4$, $Z^5$ and $Z^6$ are independently a single bond or alkylene having 1 to 4 carbons, arbitrary —CH$_2$— in the alkylene may be replaced by —O—, —COO— or —CF$_2$O—, arbitrary —CH$_2$—CH$_2$— in the alkylene may be replaced by —CH═CH—, —CF═CF— or —C≡C—, and arbitrary hydrogen may be replaced by halogen, with a proviso that at least one of $Z^1$ to $Z^3$ in formula (1-1) is CF$_2$O and at least one of $Z^1$ to $Z^6$ in formula (1-2) is CF$_2$O; $L^1$, $L^2$, $L^3$, $L^4$ and $L^5$ are independently hydrogen or fluorine; $X^1$ is halogen, —N═C═S, —SF$_5$ or alkyl having 1 to 3 carbons in which arbitrary —CH$_2$— may be replaced by —S—, —COO— or —OCO—, alkenyl having 2 to 3 carbons, alkynyl having 2 to 3 carbons, alkoxy having 1 to 3 carbons, alkoxyalkyl having 2 to 3 carbons or alkenyloxy having 2 to 3 carbons, and hydrogen in the alkyl, the alkenyl, the alkynyl, the alkoxy, the alkoxyalkyl and the alkenyloxy may be replaced by halogen; and m, n, o and p are independently 0 or 1, an inequality of $1 \leq m+n+o+p \leq 2$ applies to formula (1-2), and an inequality of $1 \leq m+n+p \leq 3$ applies to formula (1-3).

2. The cholesteric liquid-crystal composition according to claim 1, wherein the selective reflection wavelength at 25° C. is in a range of 400 nm to 750 nm.

3. The cholesteric liquid-crystal composition according to claim 1, wherein the liquid-crystal component A contains a compound represented by formula (1-2) or a compound represented by formula (1-3).

4. The cholesteric liquid-crystal composition according to claim 1, wherein the liquid-crystal component A contains a compound represented by formula (1-1), a compound represented by formula (1-2) and a compound represented by formula (1-3).

5. The cholesteric liquid-crystal composition according to claim 4, wherein in the liquid-crystal component A, a content of the compound represented by formula (1-1) is in a range of 5 wt % to 90 wt %, a content of the compound represented by formula (1-2) is in a range of 5 wt % to 90 wt %, and a content of the compound represented by formula (1-3) is in a range of 5 wt % to 90 wt %.

6. The cholesteric liquid-crystal composition according to claim 1, wherein in the liquid-crystal component, a content of the liquid-crystal component A including at least one compound selected from the group of compounds represented by formulas (1-1), (1-2) and (1-3) is 15 wt % or more.

7. The cholesteric liquid-crystal composition according to claim 6, wherein in the liquid-crystal component, the content of the liquid-crystal component A is in a range of 40 wt % to 85 wt %.

8. The cholesteric liquid-crystal composition according to claim 1, wherein the liquid-crystal component A contains a compound of formula (1-3) in which at least one of $Z^1$ to $Z^4$ is CF$_2$O.

9. The cholesteric liquid-crystal composition according to claim 1, wherein the liquid-crystal component A contains a compound of formula (1-3) in which $R^{1D}$ is alkyl or alkenyl each having 4 to 20 carbons and being branched at 2-position carbon.

10. The cholesteric liquid-crystal composition according to claim 1, wherein the liquid-crystal component A contains a compound represented by formula (1-3-1) or a compound represented by formula (1-3-2):

(1-3-1)

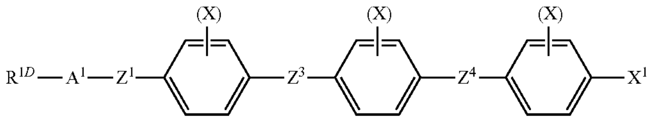

(1-3-2)

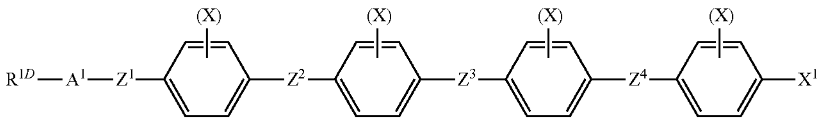

wherein in formulas (1-3-1) to (1-3-2), $R^{1D}$ is branched alkyl or branched alkenyl each having 3 to 20 carbons, arbitrary hydrogen in the alky may be replaced by fluorine; ring $A^1$ is 1,4-phenylene, 1,3-dioxane-2,5-diyl, tetrahydropyran-2,5-diyl, tetrahydropyran-3,6-diyl, pyrimidine-2,5-diyl or pyridine-2,5-diyl, and arbitrary hydrogen in the ring may be replaced by fluorine; $Z^1$, $Z^2$, $Z^3$ and $Z^4$ are independently a single bond, —$CH_2CH_2$—, —COO— or —$CF_2O$—, with a proviso that arbitrary one of $Z^1$, $Z^2$, $Z^3$ and $Z^4$ is —COO— or —$CF_2O$—; $X^1$ is fluorine, chlorine, —C≡N or alkyl having 1 to 3 carbons in which arbitrary hydrogen is replaced by fluorine, arbitrary —$CH_2$— in the alkyl may be replaced by —O—, and arbitrary —$CH_2$—$CH_2$— in the alkyl may be replaced by —CH═CH—; X is fluorine or chlorine; and an expression in which 1,4-phenylene and (X) are connected with a straight line represents 1,4-phenylene in which one or two of hydrogen may be replaced by X.

11. The cholesteric liquid-crystal composition according to claim 1, wherein the liquid-crystal component A contains at least one compound selected from the group of compounds represented by formulas (1-1-2), (1-1-3), (1-2-1-1), (1-2-1-2), (1-2-2-1), (1-2-2-2), (1-2-3-1), (1-2-3-2), (1-2-4-2), (1-2-4-3), (1-2-5-3), (1-3-1-1), (1-3-1-2), (1-3-1-3), (1-3-1-4), (1-3-1-5), (1-3-1-6), (1-3-1-7), (1-3-1-8), (1-3-2-1), (1-3-2-2), (1-3-2-3), (1-3-2-4), (1-3-2-5), (1-3-2-6), (1-3-2-7) and (1-3-2-8):

(1-1-2)

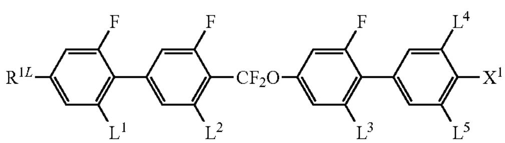

(1-1-3)

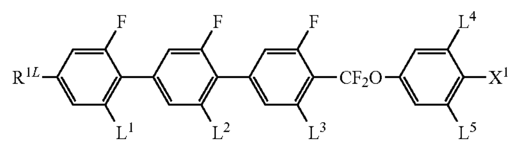

(1-2-1-1)

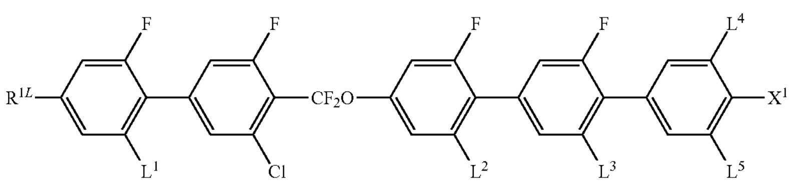

(1-2-1-2)

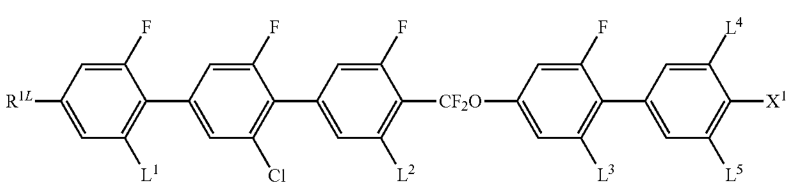

(1-2-2-1)

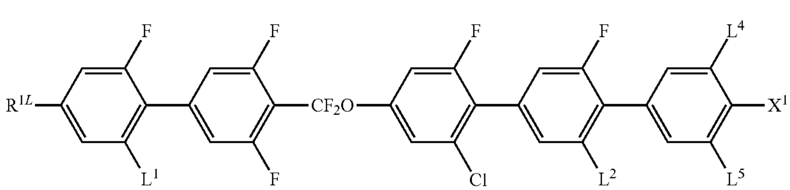

(1-2-2-2)

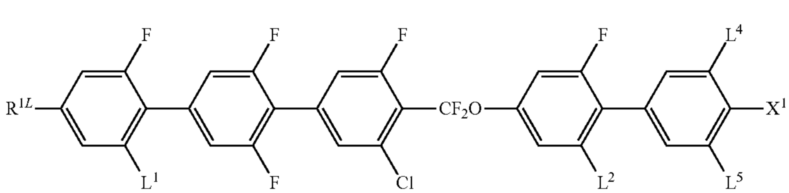

-continued
(1-2-3-1)
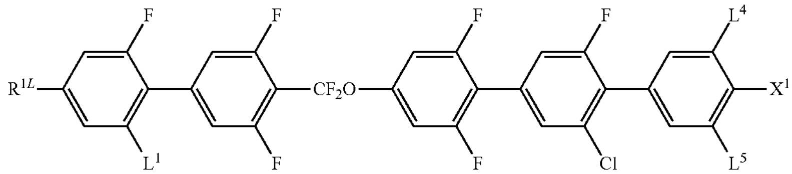
(1-2-3-2)
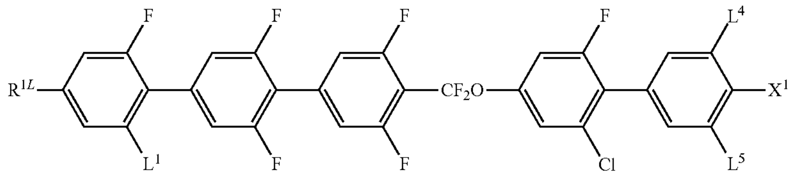
(1-2-4-2)
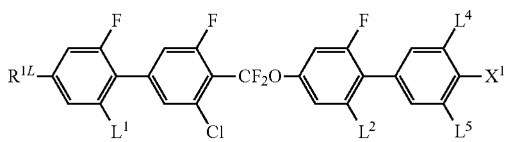
(1-2-4-3)
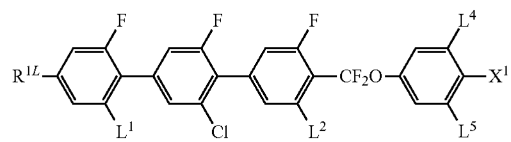
(1-2-5-3)
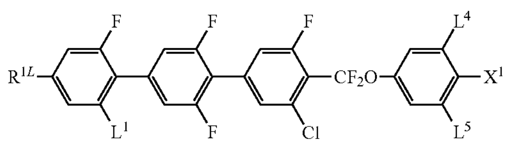
(1-3-1-1)
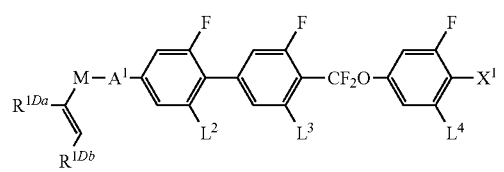
(1-3-1-2)
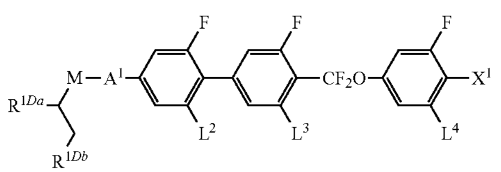
(1-3-1-3)
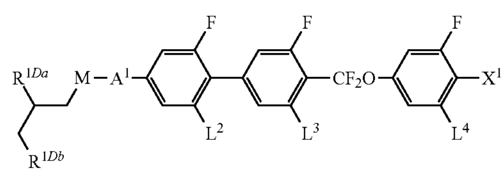
(1-3-1-4)
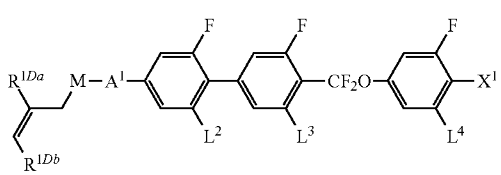
(1-3-1-5)
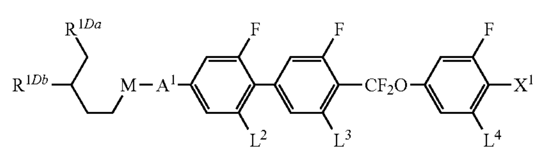
(1-3-1-6)
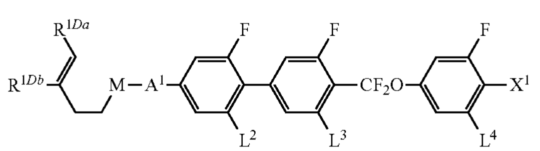
(1-3-1-7)
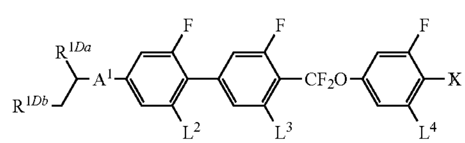
(1-3-1-8)
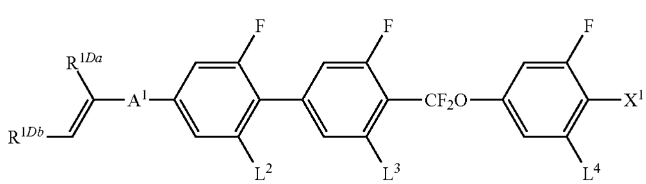

-continued
(1-3-2-1)
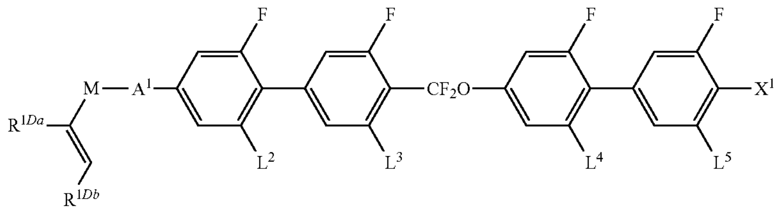
(1-3-2-2)
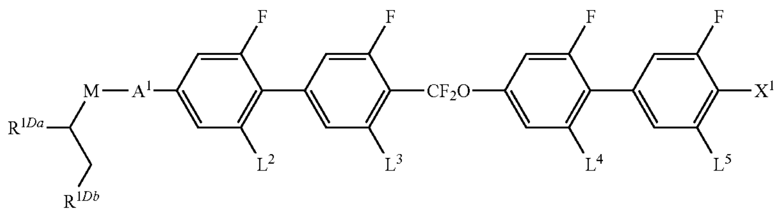
(1-3-2-3)
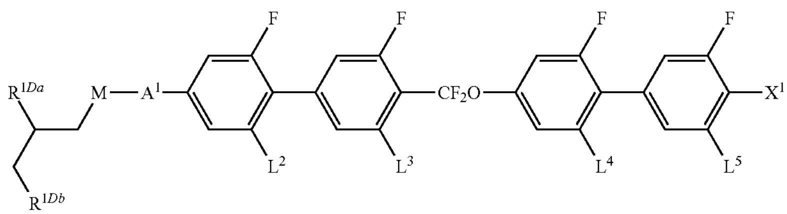
(1-3-2-4)
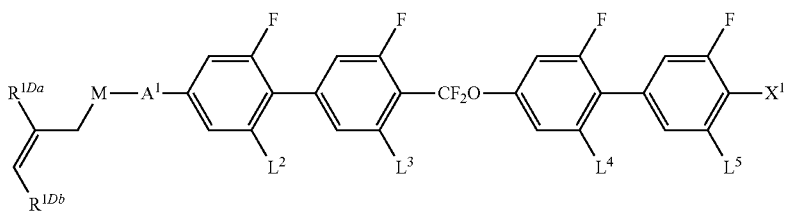
(1-3-2-5)
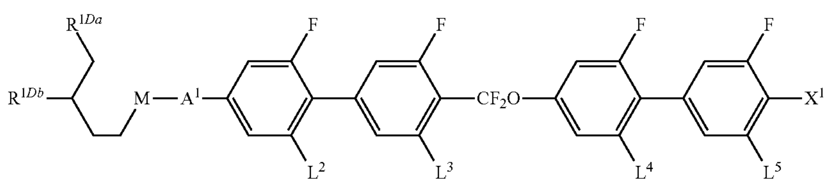
(1-3-2-6)
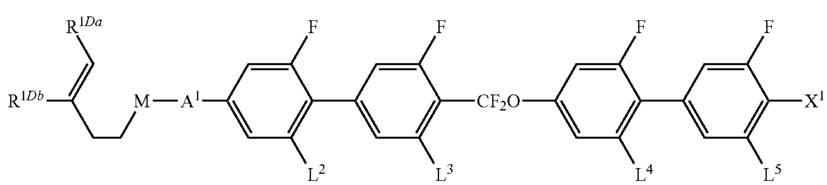
(1-3-2-7)
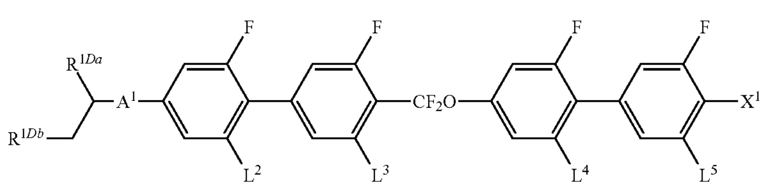
(1-3-2-8)
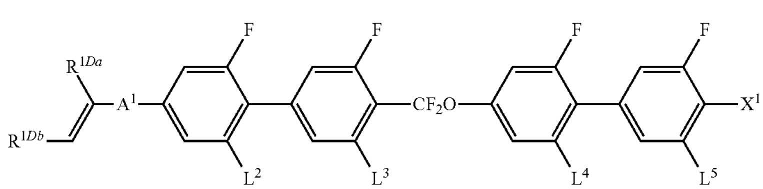

wherein, $R^{1L}$ is hydrogen or straight-chain alkyl having 1 to 20 carbons, arbitrary —$CH_2$— in the alkyl may be replaced by —O—, —S—, —COO—, —OCO—, —CH═CH—, —CF═CF— or —C≡C—, and arbitrary hydrogen in the alkyl or in a group obtained by replacing arbitrary —$CH_2$— in the alkyl by —O—, —S—, —COO—, —OCO—, —CH═CH—, —CF═CF— or —C≡C— may be replaced by halogen or alkyl having 1 to 3 carbons; $R^{1Da}$ is alkyl having 1 to 10 carbons, arbitrary —$CH_2$— in the alkyl may be replaced by —O—, and arbitrary —$CH_2$—$CH_2$— in the alkyl may be replaced by —CH═CH—; $R^{1Db}$ is hydrogen or alkyl having 1 to 10 carbons, arbitrary —$CH_2$— in the alkyl may be replaced by —O—, and arbitrary —$CH_2$—$CH_2$— in the alkyl may be replaced by —CH═CH—; M is —$CH_2$— or —O—; $L^1$, $L^2$, $L^3$, $L^4$ and $L^5$ are independently hydrogen, fluorine or chlorine; $A^1$ is 1,4-phenylene, 1,3-dioxane-2,5-diyl, tetrahydropyran-2,5-diyl, tetrahydropyran-3,6-diyl, pyrimidine-2,5-diyl or pyridine-2,5-diyl, and arbitrary hydrogen in the ring may be replaced by fluorine; and $X^1$ is fluorine, chlorine, —C≡N, alkyl having 1 to 3 carbons in which arbitrary hydrogen is replaced by fluorine, alkenyl in which arbitrary hydrogen is replaced by fluorine or alkoxy in which arbitrary hydrogen is replaced by fluorine.

12. The liquid-crystal composition according to claim 1, wherein the liquid-crystal component further contains at least one compound selected from the group of compounds represented by formulas (2), (3) and (4):

(2)

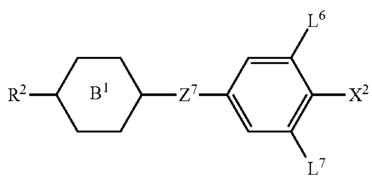

(3)

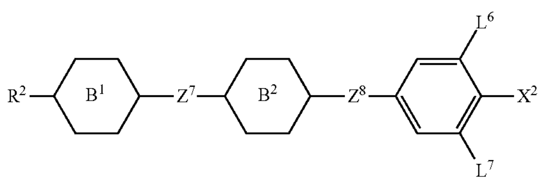

(4)

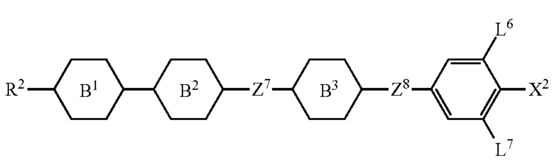

wherein, in the formulas, $R^2$ is alkyl having 1 to 10 carbons or alkenyl having 2 to 10 carbons, and in the alkyl and the alkenyl, arbitrary hydrogen may be replaced by fluorine, and arbitrary —$CH_2$— may be replaced by —O—; $X^2$ is fluorine, chlorine, —$OCF_3$, —$OCHF_2$, —$CF_3$, —$CHF_2$, —$CH_2F$, —$OCF_2CHF_2$ or —$OCF_2CHFCF_3$; ring $B^1$, ring $B^2$ and ring $B^3$ are independently 1,4-cyclohexylene, 1,3-dioxane-2,5-diyl, pyrimidine-2,5-diyl, tetrahydropyran-2,5-diyl, 1,4-phenylene, naphthalene-2,6-diyl, 1,4-phenylene in which arbitrary hydrogen is replaced by fluorine, or naphthalene-2,6-diyl in which arbitrary hydrogen is replaced by fluorine or chlorine; $Z^7$ and $Z^8$ are independently —$(CH_2)_1$—, —$(CH_2)_4$—, —COO—, —$CF_2O$—, —$OCF_2$—, —CH═CH—, —C≡C—, —$CH_2O$— or a single bond; and $L^6$ and $L^7$ are independently hydrogen or fluorine.

13. The cholesteric liquid-crystal composition according to claim 1, wherein the liquid-crystal component further contains a compound represented by formula (5):

(5)

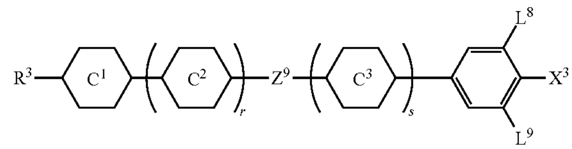

wherein, in formula (5), $R^3$ is alkyl having 1 to 10 carbons or alkenyl having 2 to 10 carbons, and in the alkyl and the alkenyl, arbitrary hydrogen may be replaced by fluorine, and arbitrary —$CH_2$— may be replaced by —O—; $X^3$ is —C≡N or —C≡C—C≡N; ring $C^1$, ring $C^2$ and ring $C^3$ are independently 1,4-cyclohexylene, 1,4-phenylene, 1,4-phenylene in which arbitrary hydrogen is replaced by fluorine, naphthalene-2,6-diyl, naphthalene-2,6-diyl in which arbitrary hydrogen is replaced by fluorine or chlorine, 1,3-dioxane-2,5-diyl, tetrahydropyran-2,5-diyl or pyrimidine-2,5-diyl; $Z^9$ is —$(CH_2)_2$—, —COO—, —$CF_2O$—, —$OCF_2$—, —C≡C—, —$CH_2O$— or a single bond; $L^8$ and $L^9$ are independently hydrogen or fluorine; and r is 1 or 2, s is 0 or 1, and a sum of r and s is 0, 1 or 2.

14. The cholesteric liquid-crystal composition according to claim 1, wherein the liquid-crystal component further contains a compound represented by formula (6):

(6)

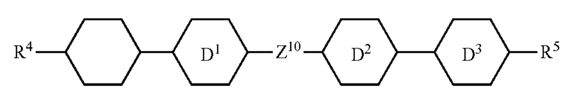

wherein, in formula (6), $R^4$ and $R^5$ are independently alkyl having 1 to 10 carbons or alkenyl having 2 to 10 carbons, and in the alkyl and the alkenyl, arbitrary hydrogen may be replaced by fluorine, and arbitrary —$CH_2$— may be replaced by —O—; ring $D^1$, ring $D^2$ and ring $D^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^{10}$ is —C≡C—, —COO—, —$(CH_2)_2$—, —CH═CH— or a single bond.

15. The cholesteric liquid-crystal composition according to claim 1, further containing at least one antioxidant and/or at least one ultraviolet light absorber.

16. The cholesteric liquid-crystal composition according to claim 1, wherein a ratio of the chiral agent is in a range of 1 wt % to 20 wt % based on a total weight of the cholesteric liquid-crystal composition.

17. The cholesteric liquid-crystal composition according to claim 1, wherein the chiral agent contains at least one compound selected from the group of compounds represented by formulas (K1) to (K5), respectively:

(K1)

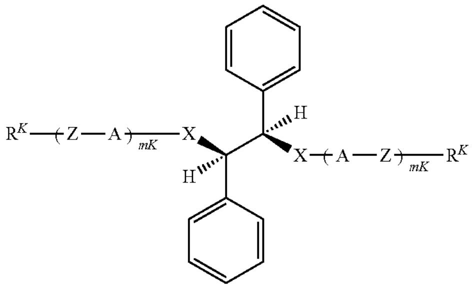

(K2)

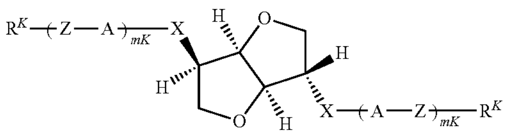

(K3)

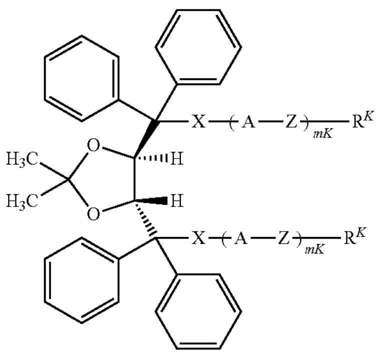

(K4)

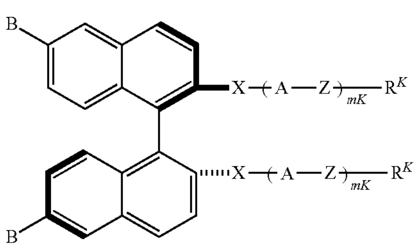

-continued (K5)

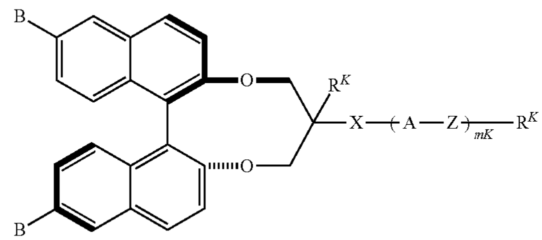

wherein, in formulas (K1) to (K5), $R^K$ is independently hydrogen, halogen, —C≡N, —N=C=O, —N=C=S or alkyl having 1 to 20 carbons, arbitrary —$CH_2$— in the alkyl may be replaced by —O—, —S—, —COO—, —OCO—, —CH=CH—, —CF=CF— or —C≡C—, and arbitrary hydrogen in the alkyl may be replaced by halogen; each A is independently an aromatic or non-aromatic three-membered to eight-membered ring, or a fused ring having 9 or more carbons, arbitrary hydrogen in the rings may be replaced by halogen, or alkyl or haloalkyl having 1 to 3 carbons, —$CH_2$— in the rings may be replaced by —O—, —S— or —NH—, and —CH= may be replaced by —N=; each B is independently hydrogen, halogen, alkyl having 1 to 3 carbons, haloalkyl having 1 to 3 carbons, an aromatic or non-aromatic three-membered to eight-membered ring, or a fused ring having 9 or more carbons, arbitrary hydrogen in the rings may be replaced by halogen, or alkyl or haloalkyl each having 1 to 3 carbons, —$CH_2$— may be replaced by —O—, —S— or —NH—, and —CH= may be replaced by —N=; each Z is independently a single bond, or alkylene having 1 to 8 carbons in which arbitrary —$CH_2$— may be replaced by —O—, —S—, —COO—, —OCO—, —CSO—, —OCS—, —N=N—, —CH=N—, —CH=CH—, —CF=CF— or —C≡C—, and arbitrary hydrogen may be replaced by halogen; X is a single bond, —COO—, —OCO—, —$CH_2O$—, —$OCH_2$—, —$CF_2O$—, —$OCF_2$— or —$CH_2CH_2$—; and mK is an integer of from 1 to 4.

18. The cholesteric liquid-crystal composition according to claim 1, wherein the chiral agent contains at least one compound selected from the group of compounds represented by formulas (K2-1) to (K2-8), (K4-1) to (K4-6) and (K5-1) to (K5-3), respectively:

(K2-1)

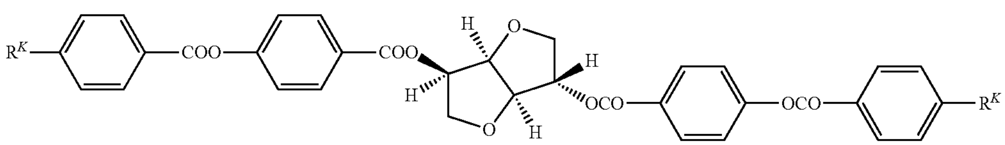

(K2-2)

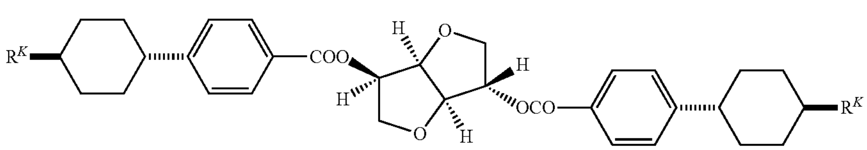

(K2-3)

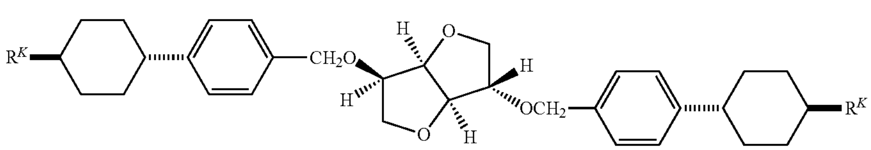

-continued
(K2-4)
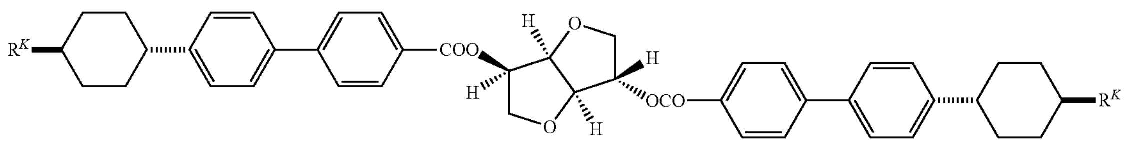
(K2-5)
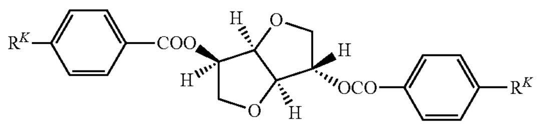
(K2-6)
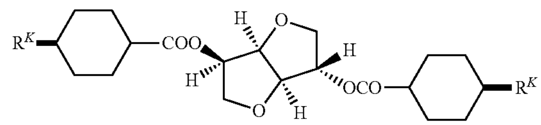
(K2-7)
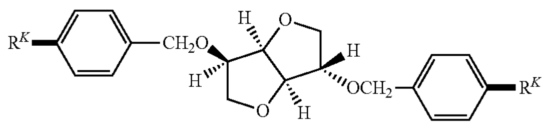
(K2-8)
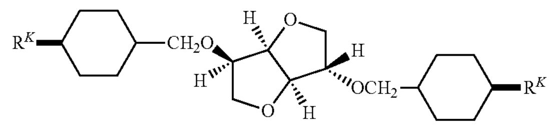
(K4-1)
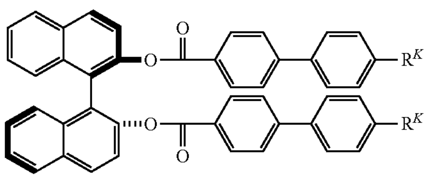
(K4-2)
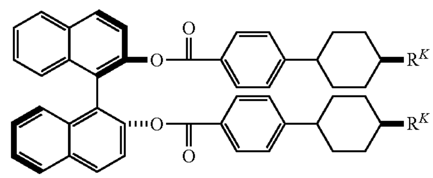
(K4-3)
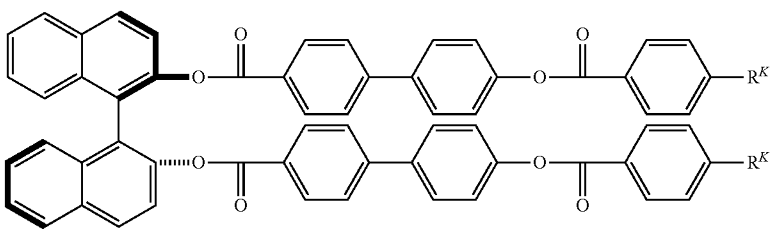
(K4-4)
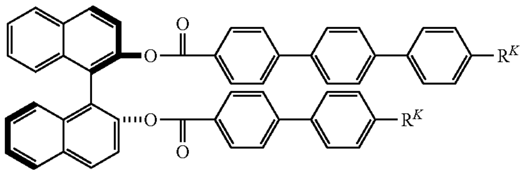
(K4-5)
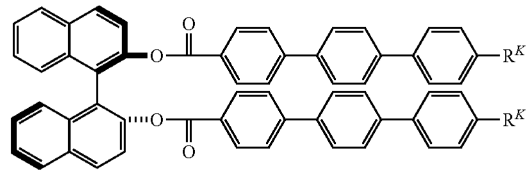
(K4-6)
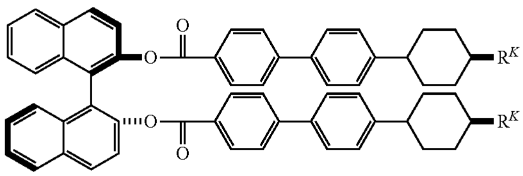
(K5-1)
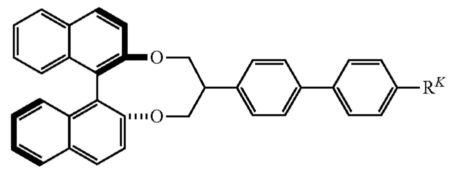
(K5-2)
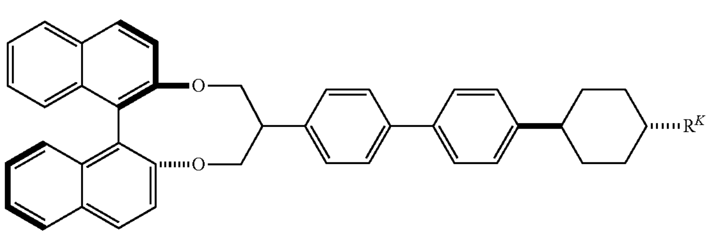

-continued (K5-3)

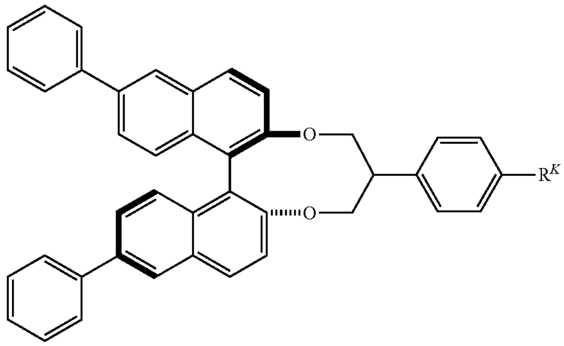

wherein, in the formulas, $R^K$ is independently alkyl having 3 to 10 carbons, in which —$CH_2$— adjacent to a ring may be replaced by —O—, and arbitrary —$CH_2$— may be replaced by —CH═CH—.

19. A mixture, containing the cholesteric liquid-crystal composition according to claim 1 and a polymerizable monomer.

20. A polymer/liquid-crystal composite material, obtained by polymerizing the mixture according to claim 19 in a cholesteric phase.

21. The polymer/liquid-crystal composite material according to claim 20, wherein a polymer contained in the polymer/liquid-crystal composite material has a mesogen moiety.

22. The polymer/liquid-crystal composite material according to claim 20, wherein the cholesteric liquid-crystal composition is contained in a range of 60 wt % to 99 wt % and the polymer is contained in a range of 1 wt % to 40 wt %.

23. A microcapsule, encapsulating the cholesteric liquid-crystal composition according to claim 1.

24. An optical device, comprising two substrates with an electrode arranged on a surface of one or both thereof, a liquid-crystal medium arranged between the substrates, and an electric field applying means for applying an electric field to the liquid-crystal medium through the electrode, wherein the liquid-crystal medium is the cholesteric liquid-crystal composition according to claim 1, and planar alignment and focalconic alignment are controlled by voltage.

25. A microcapsule, encapsulating the mixture according to claim 19.

26. A microcapsule, encapsulating the polymer/liquid-crystal composite material according to claim 20.

27. An optical device, comprising two substrates with an electrode arranged on a surface of one or both thereof, a liquid-crystal medium arranged between the substrates, and an electric field applying means for applying an electric field to the liquid-crystal medium through the electrode, wherein the liquid-crystal medium is the polymer/liquid-crystal composite material according to claim 20, and planar alignment and focalconic alignment are controlled by voltage.

28. An optical device, comprising two substrates with an electrode arranged on a surface of one or both thereof, a liquid-crystal medium arranged between the substrates, and an electric field applying means for applying an electric field to the liquid-crystal medium through the electrode, wherein the liquid-crystal medium is the microcapsule according to claim 26, and planar alignment and focalconic alignment are controlled by voltage.

* * * * *